United States Patent
Hasegawa et al.

(10) Patent No.: US 10,237,541 B2
(45) Date of Patent: Mar. 19, 2019

(54) STEREOSCOPIC IMAGE DISPLAY DEVICE, IMAGE PROCESSING DEVICE, AND STEREOSCOPIC IMAGE PROCESSING METHOD WITH REDUCED 3D MOIRE

(71) Applicant: NLT Technologies, Ltd., Kanagawa (JP)

(72) Inventors: Takefumi Hasegawa, Kanagawa (JP); Koji Shigemura, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 614 days.

(21) Appl. No.: 13/955,485

(22) Filed: Jul. 31, 2013

(65) Prior Publication Data

US 2014/0035972 A1 Feb. 6, 2014

(30) Foreign Application Priority Data

Jul. 31, 2012 (JP) ................ 2012-170646
Apr. 22, 2013 (JP) ................ 2013-089531

(51) Int. Cl.
*H04N 13/366* (2018.01)
*H04N 13/133* (2018.01)
(Continued)

(52) U.S. Cl.
CPC ......... *H04N 13/366* (2018.05); *H04N 13/133* (2018.05); *H04N 13/144* (2018.05);
(Continued)

(58) Field of Classification Search
None
See application file for complete search history.

(56) References Cited

U.S. PATENT DOCUMENTS 5,742,332 A 4/1998 Imai
7,932,915 B2 4/2011 Miyata
(Continued)

FOREIGN PATENT DOCUMENTS

CN 102378032 A 3/2012
CN 102487446 A 6/2012
(Continued)

OTHER PUBLICATIONS

Chinese Office Action dated Apr. 25, 2016; Application No. 201310325429.3.
(Continued)

*Primary Examiner* — Srilakshmi K Kumar
*Assistant Examiner* — Karin Kiyabu
(74) *Attorney, Agent, or Firm* — Young & Thompson

(57) ABSTRACT

The stereoscopic image display device includes: an observer position measuring unit which measures the observing position of the observer; an image processing unit which calculates the relative position of the observing position of the observer and the stereoscopic display panel, calculates the luminance adjustment amount suited for stereoscopic image display for the relative position, and performs luminance adjustment processing on the image data according to the luminance adjustment amount; and a stereoscopic display panel unit which projects the image data on which the luminance adjustment processing is performed to the right eye and the left eye of the observer via the stereoscopic display panel.

6 Claims, 89 Drawing Sheets

(51) Int. Cl.
  *H04N 13/398* (2018.01)
  *H04N 13/305* (2018.01)
  *H04N 13/144* (2018.01)
(52) U.S. Cl.
  CPC ......... *H04N 13/305* (2018.05); *H04N 13/398* (2018.05); *H04N 2213/002* (2013.01)

(56) References Cited

U.S. PATENT DOCUMENTS

| | | | |
|---|---|---|---|
| 8,520,036 B2 | 8/2013 | Miyata | |
| 8,570,314 B2 | 10/2013 | Hasegawa | |
| 8,654,182 B2 | 2/2014 | Ishikawa | |
| 8,964,009 B2* | 2/2015 | Yoshida | G02B 27/2214 348/54 |
| 9,197,884 B2 | 11/2015 | Lee et al. | |
| 2004/0223218 A1 | 11/2004 | Putilin et al. | |
| 2005/0248508 A1 | 11/2005 | Seong | |
| 2010/0079578 A1* | 4/2010 | Mihara | H04N 13/0497 348/43 |
| 2010/0315414 A1 | 12/2010 | Lowe | |
| 2011/0006979 A1* | 1/2011 | Min | G02B 27/0093 345/156 |
| 2011/0169821 A1* | 7/2011 | Ishiguchi | G09G 3/003 345/419 |
| 2011/0316985 A1* | 12/2011 | Ishikawa | G02B 27/2214 348/51 |
| 2012/0032952 A1* | 2/2012 | Lee | H04N 13/0477 345/419 |
| 2012/0154382 A1 | 6/2012 | Ikeda | |
| 2012/0162196 A1 | 6/2012 | Chen | |
| 2012/0182407 A1* | 7/2012 | Yoshida | G02B 27/2214 348/54 |
| 2013/0162691 A1* | 6/2013 | Yang | H04N 13/0409 345/690 |
| 2013/0187961 A1* | 7/2013 | Hunt | H04N 13/0409 345/697 |
| 2013/0229710 A1* | 9/2013 | Watanabe | G02B 27/22 359/462 |
| 2013/0314512 A1* | 11/2013 | Watanabe | H04N 13/32 348/51 |
| 2013/0335463 A1* | 12/2013 | Chiang | H04N 13/0409 345/697 |
| 2014/0035907 A1* | 2/2014 | Hasegawa | G09G 5/14 345/419 |
| 2014/0036047 A1* | 2/2014 | Watanabe | G02B 27/2214 348/54 |
| 2015/0312546 A1* | 10/2015 | Hasegawa | H04N 13/0497 348/59 |

FOREIGN PATENT DOCUMENTS

| | | |
|---|---|---|
| CN | 102540693 A | 7/2012 |
| JP | H-08322068 A | 12/1996 |
| JP | 2003-107392 | 4/2003 |
| JP | 2004-343290 A | 12/2004 |
| JP | 2005-121724 A | 5/2005 |
| JP | 2005-234552 A | 9/2005 |
| JP | 2005-321775 A | 11/2005 |
| JP | 2008-078846 A | 4/2008 |
| JP | 2008-089787 | 4/2008 |
| JP | 2010-026045 A | 7/2008 |
| JP | 2008-185629 | 8/2008 |
| JP | 2009-080144 | 4/2009 |
| JP | 2010-014800 A | 1/2010 |
| JP | 2010-145664 A | 7/2010 |
| JP | 2011-018049 | 1/2011 |
| JP | 2011-166744 | 8/2011 |
| JP | 2012-010084 A | 1/2012 |
| JP | 2012-044308 | 3/2012 |
| JP | 2012-063556 | 3/2012 |
| JP | 2012-134748 A | 7/2012 |
| WO | 2008126654 | 10/2008 |
| WO | 2012-070444 A1 | 5/2012 |

OTHER PUBLICATIONS

European Office Action, dated Apr. 14, 2015, in corresponding European Patent Applicaton No. 13 178 753.3.
Extended European Search Report—EP 13 17 8753—dated Jan. 31, 2014.
Juyong Park el al., "Active Crosstalk Reduction on Multi-View Displays Using Eye Detection", SID2011 61 4, pp. 920-923.
Japanese Office Action Application No. 2013-089531; dated Jan. 5, 2017.

* cited by examiner

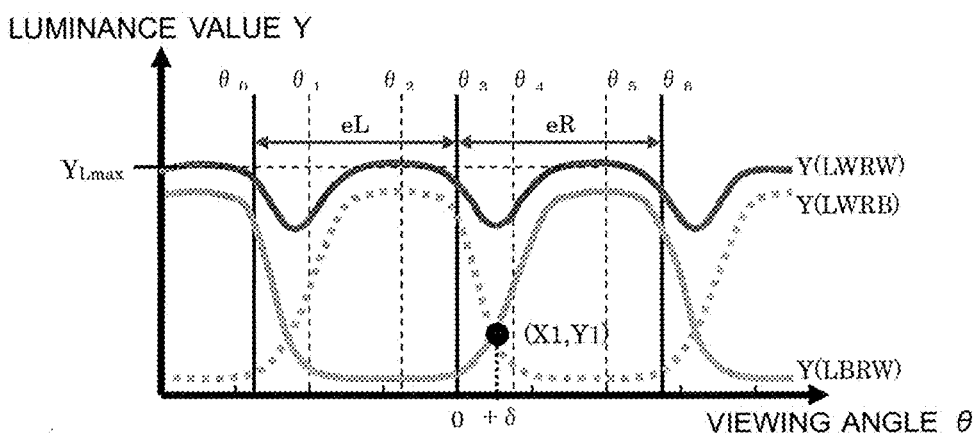
FIG. 5A  LEFT END
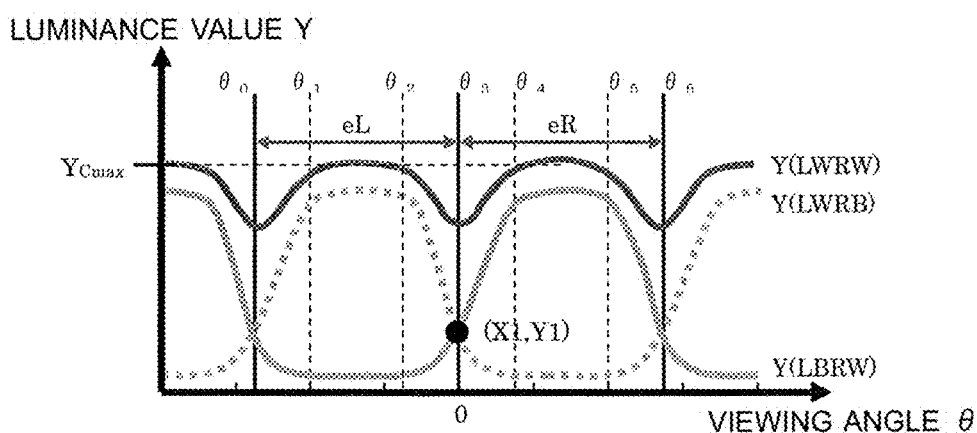
FIG. 5B  CENTER
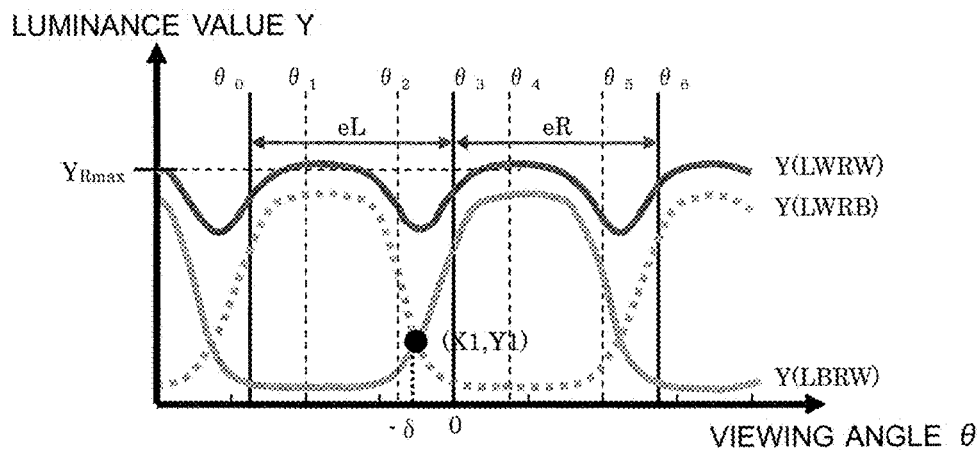
FIG. 5C  RIGHT END FIG. 7A  POSITION A
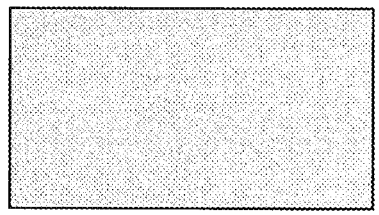
FIG. 7B  POSITION B
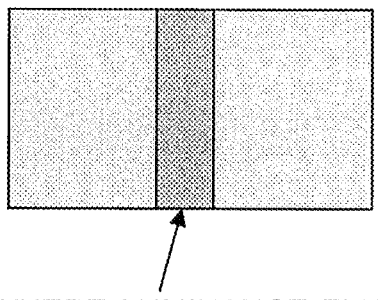
IMAGE AREA WHERE LUMINANCE FLUCTUATION
BY 3D MOIRÉ
FIG. 7C  POSITION C
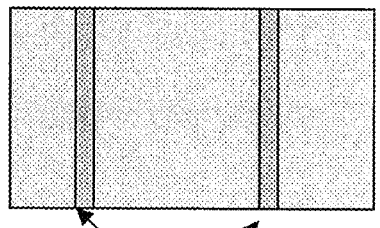
IMAGE AREA WHERE LUMINANCE FLUCTUATION
BY 3D MOIRÉ

IMAGE AREA WHERE LUMINANCE FLUCTUATION
BY 3D MOIRÉ

FIG. 14
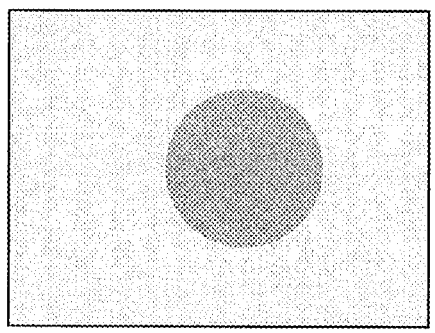
L IMAGE
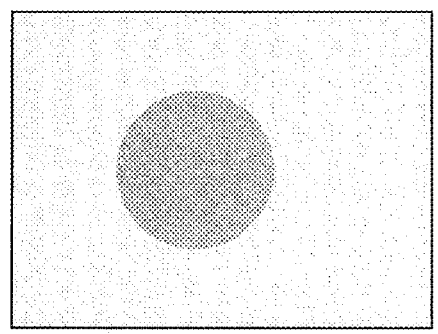
R IMAGE

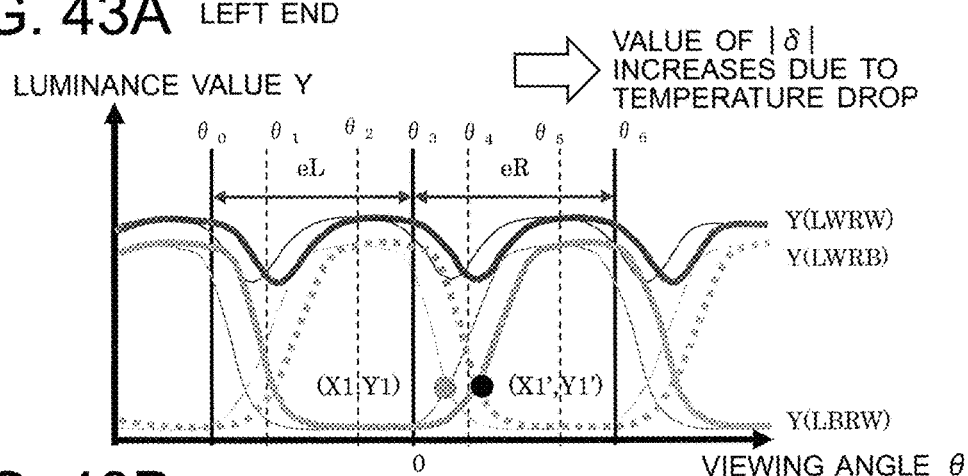
FIG. 43A LEFT END
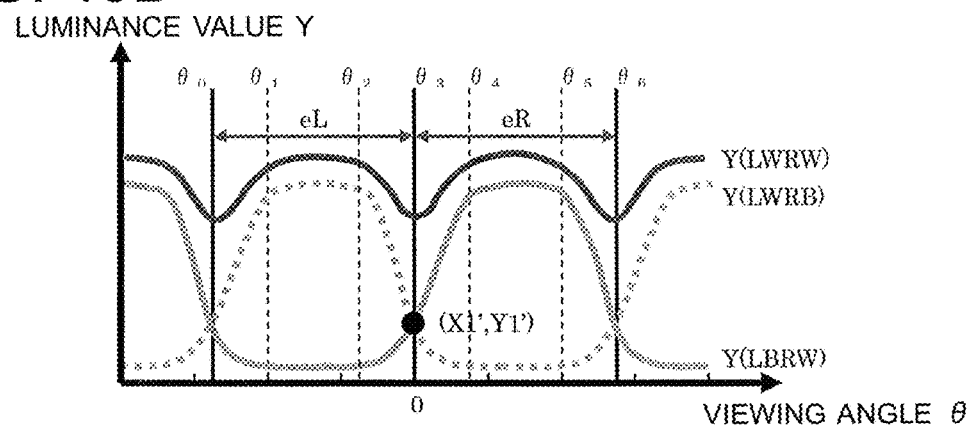
FIG. 43B CENTER
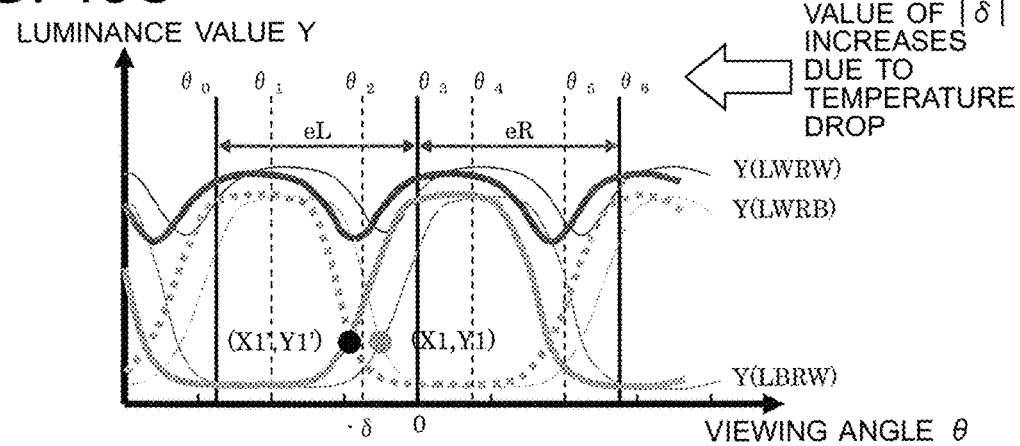
FIG. 43C RIGHT END

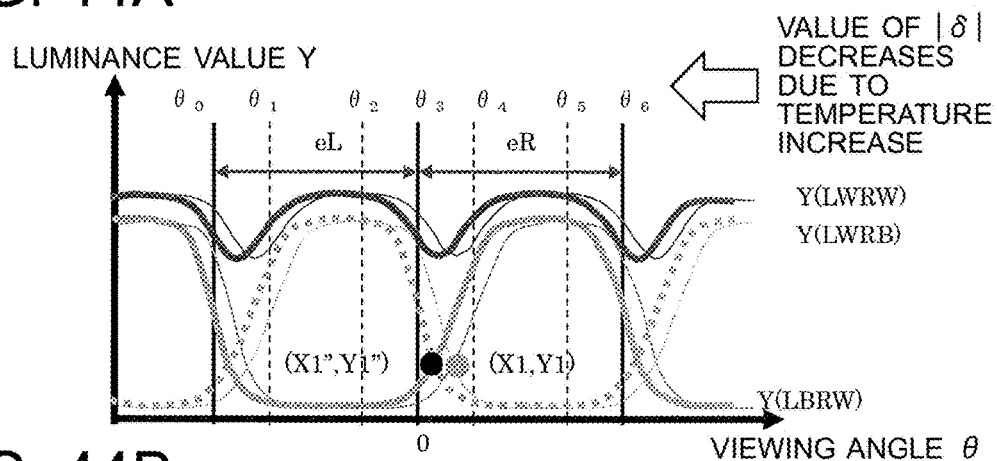
FIG. 44A LEFT END
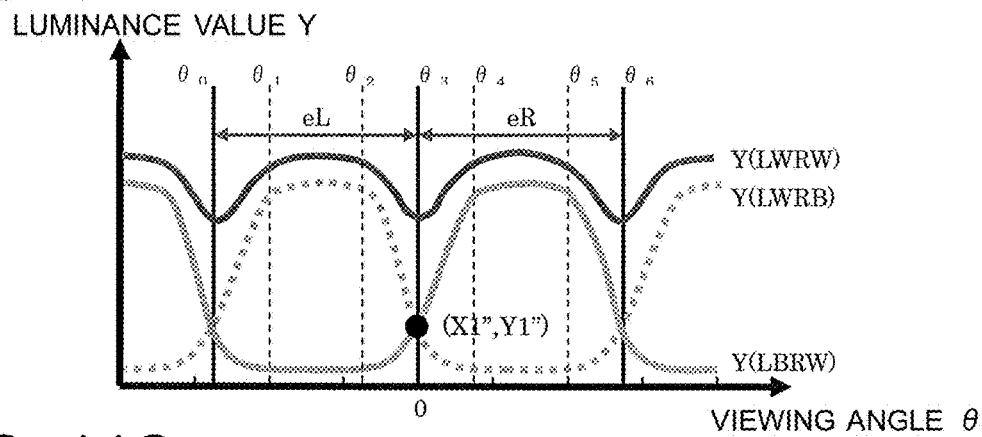
FIG. 44B CENTER
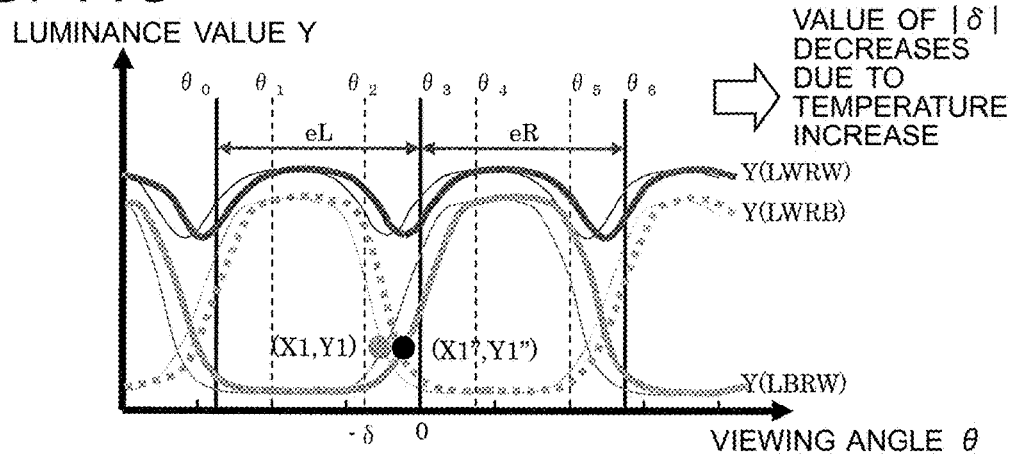
FIG. 44C RIGHT END

FIG. 56A

| 1/16 | 2/16 | 1/16 |
|---|---|---|
| 2/16 | 4/16 | 2/16 |
| 1/16 | 2/16 | 1/16 |

FIG. 56B

| 1/256 | 4/256 | 6/256 | 4/256 | 1/256 |
|---|---|---|---|---|
| 4/256 | 16/256 | 24/256 | 16/256 | 4/256 |
| 6/256 | 24/256 | 36/256 | 24/256 | 6/256 |
| 4/256 | 16/256 | 24/256 | 16/256 | 4/256 |
| 1/256 | 4/256 | 6/256 | 4/256 | 1/256 |

FIG. 63

| RIGHT EYE | LEFT EYE | PARALLAX ADJUSTMENT PROCESSING | DISPLAY STATE |
|---|---|---|---|
| R IMAGE | L IMAGE | UNEXECUTED | 3D |
| R IMAGE | CT IMAGE | EXECUTED | 3D~2D |
| R IMAGE | R IMAGE | UNEXECUTED | 2D |
| L IMAGE | L IMAGE | UNEXECUTED | 2D |
| L IMAGE | CT IMAGE | EXECUTED | 3D~2D |
| L IMAGE | R IMAGE | PARALLAX INVERTED | 3D |
| CT IMAGE | L IMAGE | EXECUTED | 3D~2D |
| CT IMAGE | CT IMAGE | EXECUTED | 2D |
| CT IMAGE | R IMAGE | EXECUTED | 3D~2D |

- LUMINANCE FLUCTUATION BY 3D MOIRÉ APPEARS IN IMAGE AREA OF $X_3, X_4, X_5, X_6$
- CT-IMAGE BY 3D CROSSTALK APPEARS IN IMAGE AREAS OF $X_3, X_4$

IMAGE AREA WHERE LUMINANCE FLUCTUATION BY 3D MOIRÉ

OBSERVED IMAGE FROM FRONT DIRECTION ($\phi = 0$)

LUMINANCE PROFILE OF OBSERVED IMAGE FROM FRONT DIRECTION

OBSERVED IMAGE FROM UPPER DIRECTION ($\phi \neq 0$)

LUMINANCE PROFILE OF OBSERVED
IMAGE FROM UPPER DIRECTION

FIG. 83A

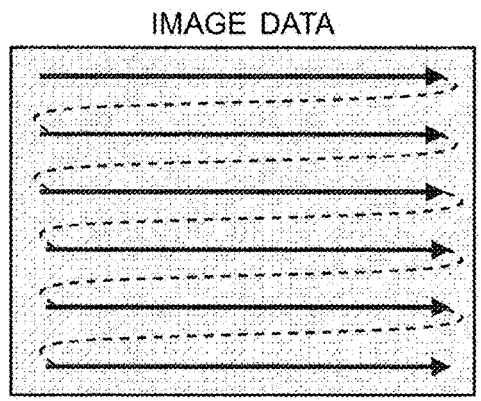
IMAGE DATA

FIG. 83B

| COMPRESSED PIXEL | COMPRESSION-TARGET PIXEL | ERROR DIFFUSION 7/16 |
|---|---|---|
| ERROR DIFFUSION 3/16 | ERROR DIFFUSION 5/16 | ERROR DIFFUSION 1/16 |

Floyd-Steinberg ERROR DIFFUSION PATTERN

FIG. 83C

| COMPRESSED PIXEL | COMPRESSED PIXEL | COMPRESSION-TARGET PIXEL | ERROR DIFFUSION 7/48 | ERROR DIFFUSION 5/48 |
|---|---|---|---|---|
| ERROR DIFFUSION 3/48 | ERROR DIFFUSION 5/48 | ERROR DIFFUSION 7/48 | ERROR DIFFUSION 5/48 | ERROR DIFFUSION 3/48 |
| ERROR DIFFUSION 1/48 | ERROR DIFFUSION 3/48 | ERROR DIFFUSION 5/48 | ERROR DIFFUSION 3/48 | ERROR DIFFUSION 1/48 |

JajuNi ERROR DIFFUSION PATTERN

FIG. 85A

| COMPRESSED PIXEL | ERROR DIFFUSION 3/16 |
|---|---|
| COMPRESSION-TARGET PIXEL | ERROR DIFFUSION 5/16 |
| ERROR DIFFUSION 7/16 | ERROR DIFFUSION 1/16 |

Floyd-Steinberg ERROR DIFFUSION PATTERN

FIG. 85B

| COMPRESSED PIXEL | ERROR DIFFUSION 3/48 | ERROR DIFFUSION 1/48 |
|---|---|---|
| COMPRESSED PIXEL | ERROR DIFFUSION 5/48 | ERROR DIFFUSION 3/48 |
| COMPRESSION-TARGET PIXEL | ERROR DIFFUSION 7/48 | ERROR DIFFUSION 5/48 |
| ERROR DIFFUSION 7/48 | ERROR DIFFUSION 5/48 | ERROR DIFFUSION 3/48 |
| ERROR DIFFUSION 5/48 | ERROR DIFFUSION 3/48 | ERROR DIFFUSION 1/48 |

JajuNi ERROR DIFFUSION PATTERN

FIG. 87

IMAGE DATA WHERE GRADATION VALUE IS EXPANDED

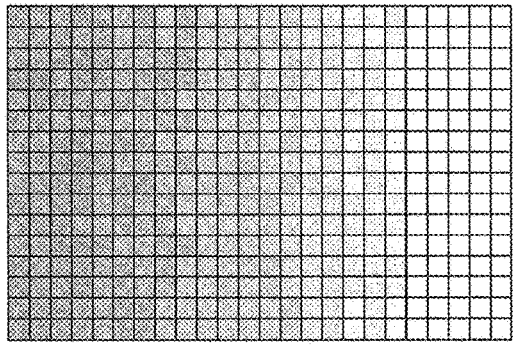

COMPRESSION OF GRADATION VALUE

DITHERING PROCESSING IS PERFORMED WHEN COMPRESSING GRADATION VALUE

IMAGE DATA (WITH DITHERING)

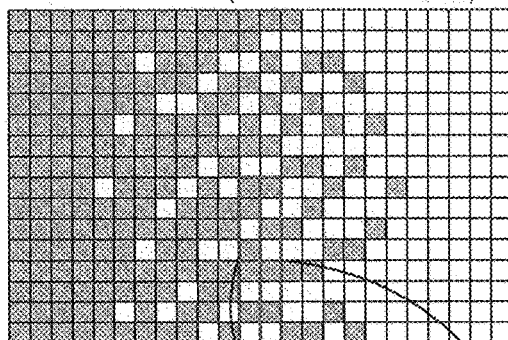

IMAGE DATA (WITHOUT DITHERING)

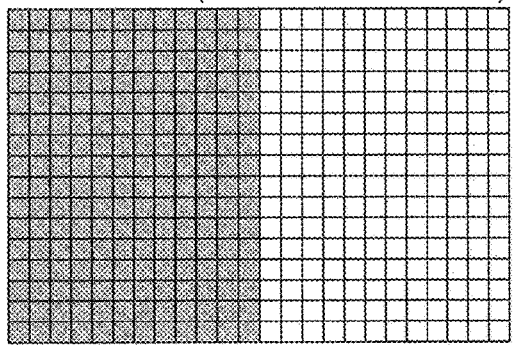

ERROR

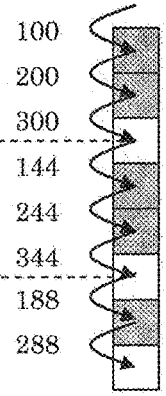

100
200
300
144
244
344
188
288

LUMINANCE VALUE IS CARRIED UP, AND ERROR BECOMES 44

LUMINANCE VALUE IS CARRIED UP, AND ERROR BECOMES 88

ERROR

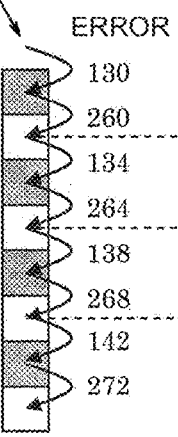

130
260
134
264
138
268
142
272

LUMINANCE VALUE IS CARRIED UP, AND ERROR BECOMES 4

LUMINANCE VALUE IS CARRIED UP, AND ERROR BECOMES 8

LUMINANCE VALUE IS CARRIED UP, AND ERROR BECOMES 12

STEREOSCOPIC IMAGE DISPLAY DEVICE, IMAGE PROCESSING DEVICE, AND STEREOSCOPIC IMAGE PROCESSING METHOD WITH REDUCED 3D MOIRE

CROSS-REFERENCE TO RELATED APPLICATION

This application is based upon and claims the benefit of priority from Japanese patent application No. 2012-170646, filed on Jul. 31, 2012 and No. 2013-089531, filed on Apr. 22, 2013, the disclosure of which is incorporated herein in its entirety by reference.

BACKGROUND OF THE INVENTION

1. Field of the Invention

The present invention relates to a stereoscopic image display technique. More specifically, the present invention relates to a stereoscopic image display device and the like for converting an image to a stereoscopic image with which an observer does not feel a sense of discomfort even when the observer changes one's position.

2. Description of the Related Art

Recently, television sets capable of viewing stereoscopic images are on the general market. Accordingly, the amount of the stereoscopic image contents is increased, and the environments for viewing the stereoscopic images are coming to be in good condition. In general, the observer wears eyeglasses for stereoscopic image display to project images of different parallaxes on left and right eyes so that the observer can view the stereoscopic image on the stereoscopic image television set. However, there are many observers who feel a sense of displeasure to wear the eyeglasses for stereoscopic image display, and a stereoscopic image display device that requires no such eyeglasses is desired. Further, when the eyeglass-type stereoscopic image display device is utilized as a mobile device, it is inconvenient since the stereoscopic image display device and the eyeglasses for stereoscopic image display are required to be carried to the outside. Thus, such stereoscopic image display device that requires no eyeglasses is more strongly desired for mobile use.

As the stereoscopic image display that requires no eyeglasses for stereoscopic image display, generally used is a type which divides spatial areas for projecting a stereoscopic image, and projects images of different parallaxes to each of the divided spatial areas so as to project images of different parallaxes to the left and right eyes of the observer. Through providing a lenticular lens and a parallax barrier on a stereoscopic display panel of the stereoscopic display device, the images of different parallaxes are provided for each of the divided spatial areas by separating the optically projected images.

With such-type of stereoscopic image display device using an optical light separating module such as a lenticular lens or a parallax barrier, it is not necessary to wear the eyeglasses for stereoscopic image display. Thus, it is excellent in terms of avoiding such trouble of wearing eyeglasses and is expected to be utilized in mobile use in particular. With the stereoscopic image display device which projects different images towards a plurality of viewpoints by using the optical light separating module, luminance unevenness (luminance fluctuation) occurs depending on the position of the stereoscopic display panel, and an image area that is displayed darker than peripheral image areas may appear when the observing position of the observer is shifted. This phenomenon is caused when a no display area (a light-shielding part referred to as black matrix in general in liquid crystal panel) between pixels of each viewpoint is visually recognized. The above-described phenomenon generated in accordance with shift of the observing position of the observer does not occur in a typical image display device having no optical light separating module. Thus, the observers may feel a sense of discomfort or deterioration of the image quality for such phenomenon occurred in the stereoscopic image display device having the optical light separating module.

This is the phenomenon referred to as "3D moiré" in general. 3D moiré is periodical luminance unevenness (also means color unevenness) caused when different images are projected to different angular directions. 3D moiré is luminance angular fluctuation, which may not be an issue depending on the observing position. However, when the luminance angular fluctuation is large, it is considered to give an undesired influence for stereoscopic image display. Therefore, it is desirable to make the luminance fluctuation equal to or smaller than a prescribed value.

In order to improve the issues caused due to the optical light separating module and the light-shielding part by the black matrix, various related techniques are proposed.

As a related technique, there is proposed a stereoscopic image display device with which the influence of the 3D moiré is lightened by moderating the luminance fluctuation caused by the 3D moiré by employing a structure in which the shape of pixels in a liquid crystal panel is formed in a substantially trapezoid form, the aperture part of sub-pixels is formed with a substantially trapezoid form having an upper base and a lower base substantially in parallel to the X-axis and two slopes tilted in directions different from the Y-axis direction, and a light-shielding part formed in a substantially triangular form is provided in an acute part of the substantially trapezoid form (Japanese Unexamined Patent Publication 2012-063556 (Patent Document 1)).

As another related technique, there is proposed a stereoscopic image display device with which the influence of the 3D moiré and the 3D crosstalk sensed by an observer is lightened by avoiding simultaneous generations of the image fluctuation effects of the both through shifting the image switching position and the positions where the 3D moiré and the 3D crosstalk appear by switching a left-eye image and a right-eye image not on a boundary line between a stereoscopic viewing space and a pseudoscopic viewing space but at a position nearer than that (Japanese Unexamined Patent Publication 2003-107392 (Patent Document 2)).

Further, with a stereoscopic image display device displaying images of multi-viewpoints, the luminance becomes higher in parallax images towards the center because of the viewing angle characteristic of a liquid crystal panel, the incident angle for the lens, and the lens aberration. Thus, luminance fluctuation is generated between the parallax image at the center and the parallax image at the edge. As a related technique for overcoming such issue, there is proposed a stereoscopic image display device with which the luminance fluctuation generated between the parallax image at the center and the parallax image at the edge is lightened through performing luminance adjustment processing which sets a range of brightness displayed on a pixel located in the center of element pixels which generate the parallax image to be smaller than a range of brightness of an image displayed on a pixel located on the boundary of the element pixels (Japanese Unexamined Patent Publication 2009-080144 (Patent Document 3)).

Further, with a stereoscopic image display device having an optical light separating module, a double image by the 3D crosstalk (3D crosstalk image, or, CT-image) appears depending on the observing position of the observer, thereby giving an undesired influence on stereoscopic image display. As a related technique for overcoming such issue, there is proposed a stereoscopic image display device with which the influence of a CT-image caused by the 3D crosstalk is lightened by measuring the observing position of the observer and performing luminance adjustment processing within sub-pixels which generate parallax images of multi-viewpoints according to the observing position (Juyong Park, et al, "Active Crosstalk Reduction on Multi-View Displays Using Eye Detection" SID2011, 61. 4, pp. 920-923 (Non-Patent Document 1)).

As another related technique, there is proposed a method which lightens the influence of a CT-image caused by the 3D crosstalk through converting one of the image data out of the image data of two viewpoints into a black image and projecting only the other image data at the observing position where the CT-image by the 3D crosstalk is projected (Japanese Unexamined Patent Publication 2008-089787 (Patent Document 4)).

Further, with a time-division stereoscopic image display device, luminance fluctuation occurs due to delay of a liquid crystal shutter. As a related technique for overcoming such issue, there is proposed a method which lightens the influence of the luminance fluctuation through adding black-side correction data or white-side correction data to the image area where the luminance value changes within the left-eye image (L image) and the right-eye image (R image) of a stereoscopic image content. Furthermore, also proposed is a method which lightens the influence of the CT-image caused by the 3D crosstalk through performing image blurring processing such as lowpass filter to the black-side image data and the white-side image data by adding gradual correction data so that the CT-image is hardly recognized by human eyes (Japanese Unexamined Patent Publication 2011-166744 (Patent Document 5)).

Further, with a parallax-barrier type stereoscopic image display device, luminance fluctuation occurs in a process of changing the transmittance characteristic of a barrier member by setting ON and OFF the electrodes. As a related technique for overcoming such issue, there is proposed a stereoscopic image display device with which the influence of the luminance fluctuation is lightened by adding a prescribed voltage (Japanese Unexamined Patent Publication 2011-018049 (Patent Document 6)).

Further, even when a stereoscopic image of a same parallax is displayed, the parallax of the stereoscopic image content observed by the observer changes depending on the distance between the stereoscopic image display device and the observing position of the observer. When the distance between the stereoscopic image display device and the observing position of the observer is too close, the parallax of the stereoscopic image content becomes too large and the stereoscopic image cannot be visually recognized. In order to overcome such issue, there is proposed a method for displaying a stereoscopic image by adjusting the parallax of the stereoscopic image content according to the distance between the stereoscopic image display device and the observing position of the observer (Japanese Unexamined Patent Publication 2012-044308 (Patent Document 7)).

Further, there is proposed a method which changes the barrier aperture position and the numerical aperture in the direction for increasing the number of viewpoints to adjust the luminance deterioration caused in accordance with the deterioration in the barrier numerical aperture generated in case of multi-viewpoints in order to widen the observing position of the observer with a parallax-barrier type stereoscopic image display device (Japanese Unexamined Patent Publication 2008-185629 (Patent Document 8)).

With the naked-eye stereoscopic image display device that requires no eyeglasses for stereoscopic image display, there is a large luminance fluctuation by the influence of 3D moiré depending on the observing position of the observer. This gives not only a sense of discomfort to the observer but also is one of the factors for causing physiological instability such as feeling video sickness and eye fatigue in a case of a stereoscopic image display device with a low picture quality, which is a reason for preventing the naked-eye stereoscopic image display device from being spread.

As a method for overcoming such issues, Patent Document 1 and the like are proposed. Patent Document 1 discloses a technique which lightens the luminance fluctuation caused by the influence of the 3D moiré with the shape of the pixels of the liquid crystal panel. However, with the technique of Patent Document 1, it is hard to lighten the influence of the luminance fluctuation by the 3D moiré in a case where slight 3D moiré is generated due to changes in the pixel shapes by the processing precision and manufacture variations and in a case where a liquid crystal panel having pixels in a shape other than that of the pixel shape used for a countermeasure for the 3D moiré is used.

Further, Patent Document 2 proposes a technique which lightens the influence of the 3D moiré and 3D crosstalk sensed by the observer by shifting the image switching position and the position where the 3D moiré and the 3D crosstalk appear. However, the technique of Patent Document 2 does not substantially lighten the influence of the luminance fluctuation by the 3D moiré even when the image switching position is shifted.

Further, Patent Document 3 proposes a technique which lightens the luminance fluctuation of parallax image of multi-viewpoints caused by the viewing angle characteristic of the liquid crystal panel, the incident angle for the lens, and the lens aberration by performing luminance adjustment of the element pixels which generate the parallax images. However, the technique of Patent Document 3 does not consider the method for lightening the luminance fluctuation caused by the 3D moiré generated from the black matrix of the liquid crystal panel and an optical light separating module such as a lenticular lens and does not perform luminance adjustment processing according to the observing position of the observer. Therefore, the influence of the luminance fluctuation caused by the 3D moiré cannot be lightened.

Furthermore, Non-Patent Document 1 proposes a technique which lightens the influence of a CT-image caused by the 3D crosstalk through measuring the observing position of the observer and performing luminance adjustment processing within sub-pixels which generate parallax images of multi-viewpoints according to the observing position. However, the technique of Non-Patent Document 1 does not consider the method for lightening the luminance fluctuation caused by the 3D moiré, so that the influence of the luminance fluctuation caused by the 3D moiré cannot be lightened.

Further, Patent Document 4 discloses a technique which lightens the influence of a CT-image caused by the 3D crosstalk through converting one of image data to a black image. However, the technique of Patent Document 4 has following issues. Since only the other image data is projected to the observer, the luminance value of the observed image projected to the observer is deteriorated, thereby causing the luminance fluctuation. As a countermeasure for the luminance fluctuation, it is depicted to increase the output of the backlight. However, the power consumption is increased, and the life of the backlight becomes shortened. Further, while the influence of the CT-image caused by the 3D crosstalk is taken into consideration therein, the influence of the luminance fluctuation by the 3D moiré is not taken into consideration. Therefore, the influence of the luminance fluctuation by the 3D moiré cannot be lightened.

Further, Patent Document 5 proposes a technique which lightens the influence of a CT-image caused by the 3D crosstalk through performing luminance adjustment processing by adding black-side correction data and white-side correction data for a time-division type stereoscopic image display device. However, the technique of Patent Document 5 does not perform the luminance adjustment processing by considering the observing position of the observer, so that it is not possible to lighten the influence of the luminance fluctuation which is caused by the 3D moiré when the observing position of the observer is shifted.

Patent Document 6 proposes a technique which lightens the luminance fluctuation through changing the transmittance of a barrier member by adding a prescribed voltage to the barrier member. However, the technique of Patent Document 6 has following issues: the cost of the stereoscopic image display device is increased since a device for applying the prescribed voltage is required; the technique can only be applied to a parallax-barrier type stereoscopic image display device; the influence of the luminance fluctuation by the 3D moiré cannot be lightened; etc.

Further, Patent Document 7 proposes a technique which performs parallax adjustment processing on a stereoscopic image content according to the distance between the stereoscopic image display device and the observing position of the observer. However, the technique of Patent Document 7 does not consider an image processing method for lightening the influence of the luminance fluctuation caused by the 3D moiré that appears in a naked-eye type stereoscopic image display device which projects a right-eye image and a left-eye image by spatially separating them with the use of a lenticular lens or a parallax barrier. Therefore, the influence of the luminance fluctuation caused by the 3D moiré cannot be lightened.

Further, Patent Document 8 discloses a method which adjusts the luminance deterioration caused in accordance with the decrease in the numerical aperture when the barrier aperture position is changed in the direction for increasing the number of viewpoints to have multi-viewpoints according to the observing position of the observer. However, the technique of Patent Document 8 has following issues: a method for lightening the luminance fluctuation of the 3D moiré generated from the black matrix of the liquid crystal panel and the optical light separating module such as a lenticular lens is not considered: the influence of the luminance fluctuation by the 3D moiré cannot be lightened with the luminance adjustment processing in accordance with the change in the barrier numerical aperture according to the observing position of the observer; etc.

SUMMARY OF THE INVENTION

It is therefore an exemplary object of the present invention to overcome the above-described issues and to provide a stereoscopic image display device and the like with which the influence of the luminance fluctuation by the 3D moiré is lightened so that a sense of discomfort is not felt by the observer even when the observing position of the observer is shifted even in a case of a naked-eye type stereoscopic image display device.

The stereoscopic image display device according to an exemplary aspect of the invention is characterized as a stereoscopic image display device, which includes a stereoscopic display panel unit which includes: a stereoscopic display panel in which a plurality of pixels, each having at least a sub-pixel for displaying a first-viewpoint image and a sub-pixel for displaying a second-viewpoint image, are arranged in matrix; and an optical module which distributes light emitted from each of the sub-pixels to different directions from each other, wherein, assuming that the direction of distributing the light ray is a first direction, luminance is deteriorated by 3D moiré generated between aperture parts of the pixels and the optical module when a viewpoint position of an observer is shifted to the first direction, and the stereoscopic image display device further includes:

an image data saving unit which saves or receives image data corresponding to at least two viewpoints;

an observer position measuring unit which measures an observing position of the observer;

a relative position calculating unit which calculates a relative position of the observing position and the stereoscopic display panel unit;

a luminance adjustment amount calculating unit which calculates a luminance adjustment amount suited for stereoscopic image display with respect to the relative position; and a luminance adjustment processing unit which performs luminance adjustment processing on image data corresponding to each of the viewpoints according to the luminance adjustment amount.

The image processing device according to another exemplary aspect of the invention is characterized as an image processing device, which includes:

a relative position calculating unit which calculates a relative position of an observing position of an observer and a stereoscopic display panel;

a 3D moiré image area calculating unit which calculates a luminance fluctuation area by 3D moiré at the relative position based on device characteristic data;

a luminance adjustment amount calculating unit which calculates a luminance adjustment amount suited for stereoscopic image display based on the luminance fluctuation area; and a luminance adjustment processing unit which performs luminance adjustment processing on image data corresponding to each of the viewpoints according to the luminance adjustment amount.

The stereoscopic image processing method according to still another exemplary aspect of the invention is characterized as a stereoscopic image processing method applied to a stereoscopic display panel which includes: a display panel in which a plurality of pixels, each having at least a sub-pixel for displaying a first-viewpoint image and a sub-pixel for displaying a second-viewpoint image, are arranged in matrix; and an optical module which distributes light emitted from each of the sub-pixels to different directions from each other, wherein, assuming that the direction of distributing the light ray as a first direction, luminance is deteriorated by 3D moiré generated between aperture parts of the pixels and the optical module when a viewpoint position of an observer is shifted to the first direction, and the method includes:

measuring an observing position of the observer;
calculating a relative position of the observing position and the stereoscopic display panel;
calculating a luminance adjustment amount suited for stereoscopic image display with respect to the relative position;
performing luminance adjustment processing on image data according to the luminance adjustment amount; and
outputting image data on which the luminance adjustment processing is performed to the stereoscopic display panel.

BRIEF DESCRIPTION OF THE DRAWINGS

FIGS. 5A-5C are charts showing the luminance characteristic data at positions of the left end, center, and right end of the stereoscopic display panel, respectively;
FIGS. 7A-7C are illustrations showing observer images at each viewpoint positions A, B, and C, respectively;
FIG. 14 is an illustration of image data saved within an image data saving unit.

FIGS. 43A-43C are charts showing luminance characteristic data at low temperatures at the left end, the center, and the right end, respectively;
FIGS. 44A-44C are charts showing luminance characteristic data at high temperatures at the left end, the center, and the right end, respectively.

FIGS. 56A and 56B are charts showing an image filter (Gaussian filter) as 3×3 and 5×5 matrices, respectively;

FIG. 63 is a chart showing a parallax adjustment processing execution judgment table;

FIG. 83A is an illustration showing processing directions of dithering, and FIG. 83B and FIG. 83C are tables showing error diffusion patterns:

FIG. 85A and FIG. 85B are tables showing an error diffusion pattern utilizing Floyd-Steinberg and JajuNi error diffusion, respectively:

FIG. 87 is a chart showing error diffusion processing for dithering; and

DETAILED DESCRIPTIONS OF THE PREFERRED EMBODIMENTS

Modes (referred to as "exemplary embodiments" hereinafter) for embodying the present invention will be described hereinafter by referring to the accompanying drawings. Note that "stereoscopic display" of the present invention includes the so-called N-image (N is a natural number of 2 or larger) switching mode display which displays a flat image by projecting a same image to the left eye and the right eye of the observer and switches the content of the flat image depending on the observing position.

First Exemplary Embodiment

Figure 1:
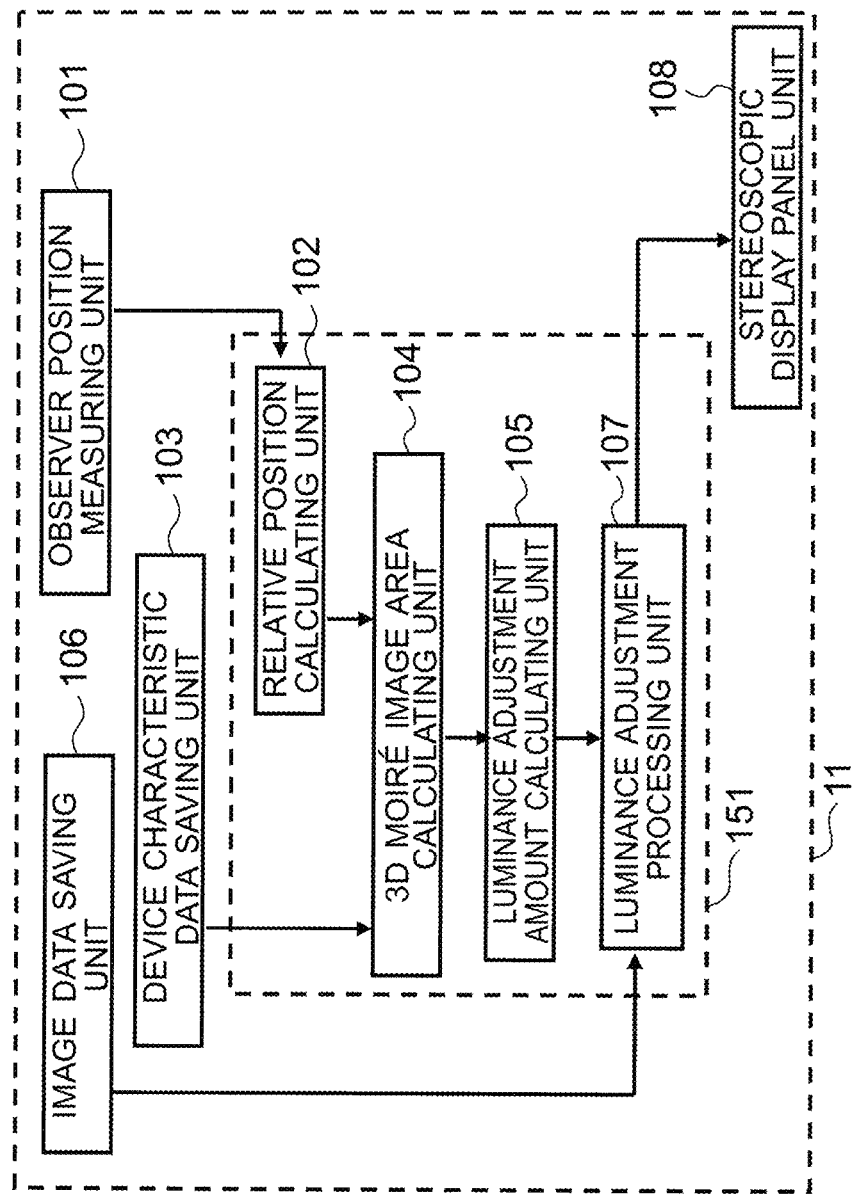
FIG. 1 is a block diagram showing a stereoscopic image display device according to a first exemplary embodiment.

The structure of a stereoscopic image display device according to a first exemplary embodiment will be described below. FIG. 1 is a block diagram of a stereoscopic image display device 11. The stereoscopic image display device 11 includes: an observer position measuring unit 101; a relative position calculating unit 102; a device characteristic data saving unit 103; a 3D moiré image area calculating unit 104; a luminance adjustment amount calculating unit 105; an image data saving unit 106; a luminance adjustment processing unit 107; and a stereoscopic display panel unit 108. Further, a processing unit that is an integration of the relative position calculating unit 102, the 3D moiré image area calculating unit 104, the luminance adjustment amount calculating unit 105; and the luminance adjustment processing unit 107 is referred to as an image processing unit 151.

Figure 2:
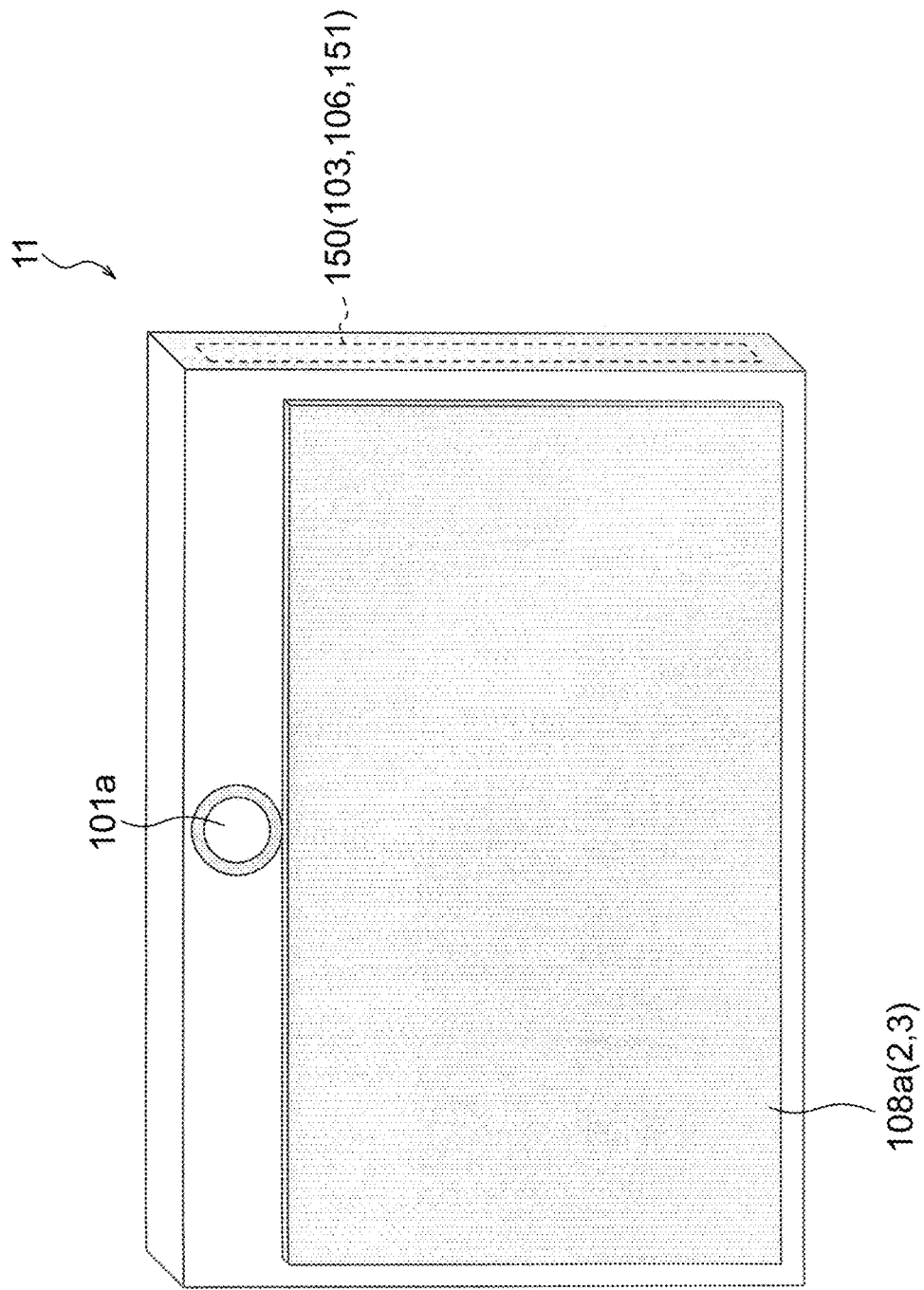
FIG. 2 is an external appearance of the stereoscopic image display device.
Figure 3:
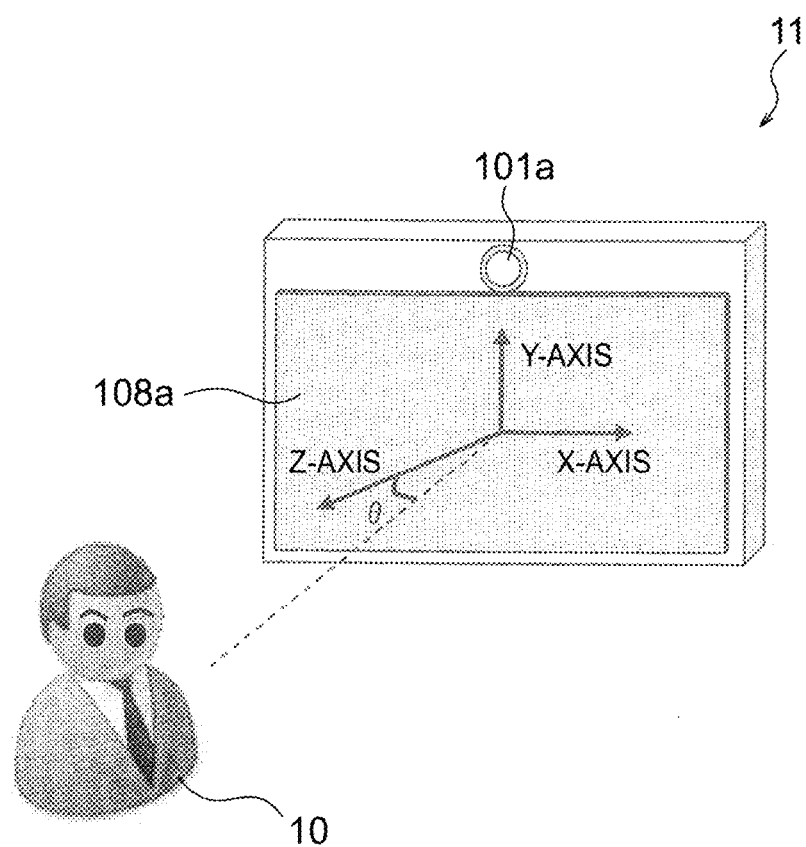
FIG. 3 is a chart showing a coordinate system of the relative positions regarding the observing position of an observer and the stereoscopic display panel.

FIG. 2 shows an external appearance of the stereoscopic image display device 11. FIG. 3 shows a coordinate system of the relative positions regarding the observing position of an observer 10 and a stereoscopic display panel 108a. The stereoscopic display panel 108a is a part of the stereoscopic display panel 108, and a camera 101a is a part of the observer position measuring unit 101. In the stereoscopic image display device 11, the camera 101a is placed on the upper side of the stereoscopic display panel 108a, and the observing position of the observer 10 is measured through capturing the observer 10 by the camera 101a. The stereoscopic display panel 108a is constituted with: a display panel 2 as an electro-optical module in which a plurality of pixels each including at least a sub-pixel for displaying a first-viewpoint image and a sub-pixel for displaying a second-viewpoint image are arranged in matrix; and a lenticular lens 3 as a light separating module which can separate each of the images to prescribed different directions (see FIG. 6A, for example). As an example of the electro-optical module, it is possible to use a liquid crystal type, an organic EL type, a plasma type, or the like. As an example of the light separating module, it is possible to use a lenticular lens, a parallax barrier, a liquid crystal lens or the like. The first exemplary embodiment will be described by using a combination of the display panel 2 and the lenticular lens 3. In FIG. 3, the X-axis direction corresponds to an example of "first direction" depicted in the exemplary embodiments, and the Y-axis direction corresponds to an example of "second direction" depicted in the exemplary embodiments. Further, "light separating module (also referred to as an optical separating module)" described above corresponds to an example of "optical module" depicted in the exemplary embodiments.

Further, the set positions of the camera 101a and the stereoscopic display panel 108a are fixed, so that the relative positions between the observing position of the observer 10 and the stereoscopic display panel 108a can be calculated through capturing the observer 10 by using the camera 101a. In the rear part of the stereoscopic display panel 108a, a calculator 150 which implements the functions of the image processing unit 151, the device characteristic data saving unit 103, the image data saving unit 106 is placed.

Hereinafter, functions of each unit included in the stereoscopic image display device 11 will be described.

The observer position measuring unit 101 has a function which measures the position of the observer 10 who is observing a stereoscopic image content displayed on the stereoscopic display panel 108a. For measuring the observer position, the positions of the right and the left eye of the observer 10 are measured by capturing the observer 10 with the camera 101a placed at the upper side of the stereoscopic display panel 108a.

Not only the position in the horizontal direction (X axis, Y axis) of the capturing plane of the camera 101a but also the position in the depth direction (Z axis) with respect to the camera 101a is measured for measuring the observing position of the observer 10. Many methods are proposed for measuring the distance in the depth direction with respect to the camera 101a.

One of those is an optical pattern projection method with which an optical pattern of an infrared ray or the like is projected towards the observer from a viewpoint different from the camera and the depth distance is measured from the displacement amount based on the triangulation theory. Measurement equipment employing the optical pattern projection method has recently been put into products as home-use game machines and computer peripheral equipment.

The second method is a TOF (Time of Flight) method with which a near infrared sine wave light is irradiated to the observer 10 from the camera 101a, and the depth distance is measured from the time lag of the light flight until the sine wave light reflected from the observer 10 reaches the camera 101a. Recently, the improvement in the performance of the TOF sensor is remarkable, thereby making it almost possible to measure the depth distance with a small and cheap camera.

The third method is a multi-viewpoint camera method with which two or more cameras are placed at different viewpoints. For measuring the depth distance, the feature point of the observer is detected from images of arbitrary viewpoints, and the points corresponding to the feature point are searched from the images of different viewpoints to calculate the depth distance based on the triangulation theory.

The fourth method uses lens focus information, with which the depth distance of the observer is measured from a group of multi-focus-points images captured at various focal points by using optical-system lenses of different depths of fields.

The four methods for measuring the depth distance are described above. The first exemplary embodiment can employ any of those methods. Further, any other measuring methods can also be employed. For example, the depth distance may be measured by saving the size of the face of the observer in advance and comparing it with the face image size of the observer captured by a camera.

With the processing for detecting the face of the observer from a captured image, template data is generated in advance from the feature amount (eyes, nose, mouth, chin, and the like) of the face image, and the face of the observer is detected by matching the captured image with the template data. The template data is generated by using mechanical learning methods such as a support vector machine (SVM) and a vector quantization from the face image of the observer. As the face detecting functions, it is also possible to use multi-purpose software. Further, it is possible with the face detecting function software to achieve face detecting processing by considering the direction towards which the observer is facing through the use of depth information. Thus, the detection precision is improved further.

With the above-described processing, the positions of the right eye and the left eye are measured by detecting the face of the observer. As another example, it is also possible to use an acceleration sensor and a gyro sensor without using a camera. Various kinds of sensors are placed in the stereoscopic image display device in advance, and positional information acquired from the sensors is referred to measure the observing position of the observer.

The relative position calculating unit 102 has a function which calculates the relative positions from the stereoscopic display panel 108a to the observing position of the observer 10. As shown in FIG. 3, the relative position to the observing position of the observer 10 with respect to the center of the stereoscopic display panel 108a as the origin is calculated while assuming that the lateral direction with respect to the plane of the stereoscopic display panel 108a is the X-axis, the longitudinal direction with respect to the plane of the stereoscopic display panel 108a is the Y-axis, and the perpendicular direction with respect to the plane of the stereoscopic display panel 108a is the Z-axis. The relative position is calculated by subtracting the distance from the set position of the camera 101a to the set position of the stereoscopic display panel 108a from the positions of the right eye and the left eye of the observer 10 measured by the observer position measuring unit 101. Thereby, the relative position ($x_p$, $y_p$, $z_p$) from the stereoscopic display panel 108a to the observing position of the observer 10 can be calculated.

Figure 4:
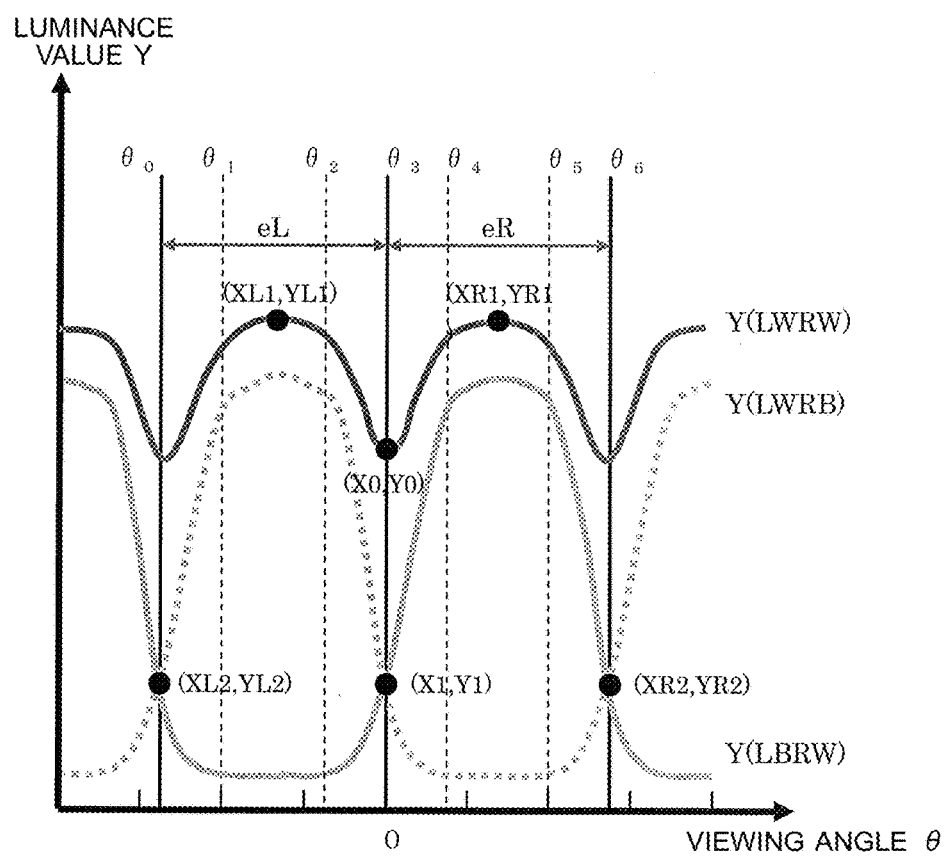
FIG. 4 is a chart showing luminance characteristic data of a stereoscopic display panel.

The device characteristic data saving unit 103 has a function which saves luminance characteristic data for the viewing angles of the stereoscopic display panel 108a. FIG. 4 shows an example of the luminance characteristic data. The lateral axis of the luminance characteristic data shows the viewing angle θ, and the longitudinal axis shows the luminance value Y on the plane of the stereoscopic display panel 108a. The viewing angle θ shows the same direction as the X-axis shown in FIG. 3. In FIG. 4, three kinds of luminance characteristic data Y(LWRW), Y(LWRB), and Y(LBRW) are plotted. Y(LWRW) is the luminance characteristic data when the left-eye image (referred to as L image hereinafter) and the right-eye image (referred to as R image hereinafter) are white, Y(LWRB) is the luminance characteristic data when the L image is white and the R image is black, and Y(LBRW) is the luminance characteristic data when the L image is black and the R image is white. Note here that the sum of Y(LWRB) and Y(LBRW) is equal to the luminance characteristic data of Y(LWRW).

The luminance distributions of Y(LWRB) and Y(LBRW) meet with each other at a point (X1, Y1) at the front observing position (in parallel to the Z-axis shown in FIG. 3), i.e., in the vicinity of θ=0, meet with each other at a point (XR2, YR2) on the +θ side, and meet with each other at a point (XL2, YL2) on the −θ side. The space between the point (X1, Y1) and the point (XR2, YR2) in the θ direction is width eR of the projection width of the right-eye image, and the space between the point (X1, Y1) and the point (XL2, YL2) in the θ direction is width eL of the projection width of the left-eye image.

Luminance deterioration is observed in the vicinity of the point (X0, Y0). This luminance deterioration is referred to as 3D moiré. In a case where the left eye is at $θ_1$ to $θ_2$ and the right eye is at $θ_4$ to $θ_5$, it is difficult to visually recognize the 3D moiré. However, when either one or both of the left and right eyes are in other ranges ($θ_2$ to $θ_3$ to $θ_4$, for example), 3D moiré is visually recognized. There are some reasons for generating 3D moiré. One of the reasons may be the shape of the light-shielding part in the boundary part between the pixels located neighboring to each other in the X-axis direction, for example.

The luminance characteristic data takes different values depending on the device characteristic of the stereoscopic display panel 108a, and it can be calculated based on the design condition and manufacture condition of the stereoscopic display panel 108a. Further, the luminance characteristic data can be acquired by measuring the stereoscopic display panel 108a with an evaluation device for the luminance characteristic. In any case, it is desirable to grasp the luminance characteristic of not only at the origin of the X-axis as the center of the stereoscopic display panel 108a (see the coordinate system of FIG. 3) but also at the three points including the outside of the panel at a prescribed value (distance WP in FIG. 6A to be described later) from the origin of the X-axis.

FIG. 5 shows an example of the luminance characteristic data at the three points at the left end, the center, and the right end with respect to the X-axis, respectively. In the center of FIG. 5B, the viewing angle θ of the point (X1, Y1) is located roughly at 0 degree as in FIG. 4. In the meantime, at the left end of FIG. 5A, the viewing angle θ of the point (X1, Y1) is located in the positive direction (+δ). In the meantime, at the right end of FIG. 5C, the viewing angle θ of the point (X1, Y1) is located in the positive direction (−ι).

Figure 6A:
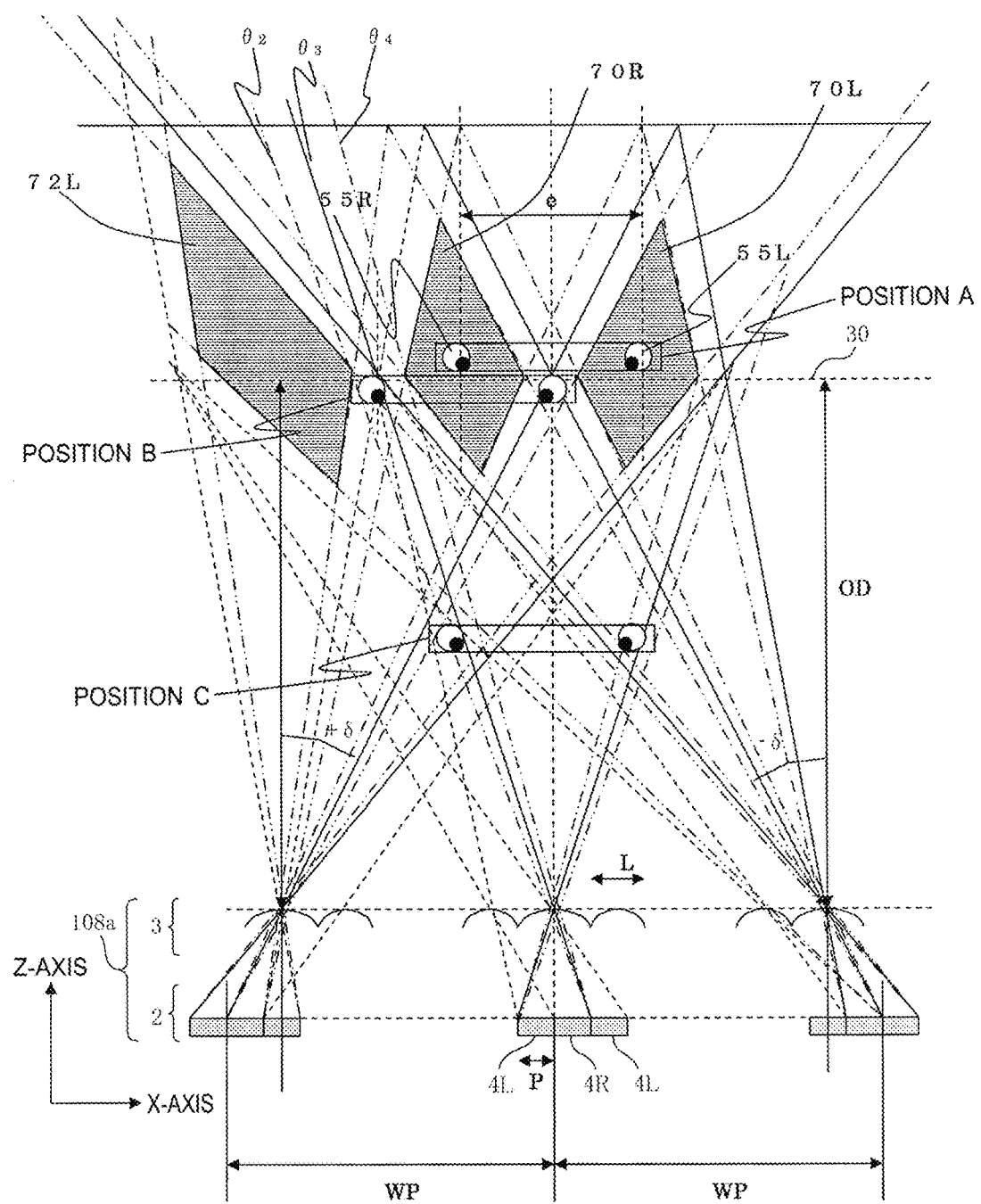
FIG. 6A is an optical model chart showing a luminance uniform area (no 3D moiré area) and a 3D moiré area from the luminance characteristic data.

The 3D moiré image area calculating unit 104 calculates an image area where the luminance fluctuation by the 3D moiré occurs for the relative position calculated by the relative position calculating unit 102 based on the luminance characteristic data saved in the device characteristic data saving unit 103. FIG. 6A shows an optical model chart which projects the right-eye image and the left-eye image to both of the left and right eyes of the observer 10, which is drawn based on the luminance characteristic data of FIG. 5. FIG. 6A shows no 3D moiré areas 70R, 70L and a 3D moiré area (range of $θ_2$ to $θ_4$) for the Z-axis that is the perpendicular direction to the plane of the stereoscopic display panel 108a and for the X-axis that is the lateral direction to the plane of the stereoscopic display panel 108a.

In FIG. 6A, the left eye 55L, the right eye 55R, the left-eye pixel 4L, the right-eye pixel 4R, the pixel width P, the space e between the both eyes, the optimum observing distance OD, the cylindrical lens width L, the distance WP from the position of the center pixel of the stereoscopic display panel 108a to the position of the pixels at both ends, the observing plane 30, and the like are written. Further, in FIG. 6A, the left-eye pixel 4L and the right-eye pixel 4R correspond to examples of "sub-pixel" or "pixel" depicted in the exemplary embodiments, and the inside of the partitions of each of the left-eye pixel 4L and the right-eye pixel 4R, i.e., the section where the light is emitted, correspond to "aperture part" depicted in the scoped of the appended claims.

Figure 6B:
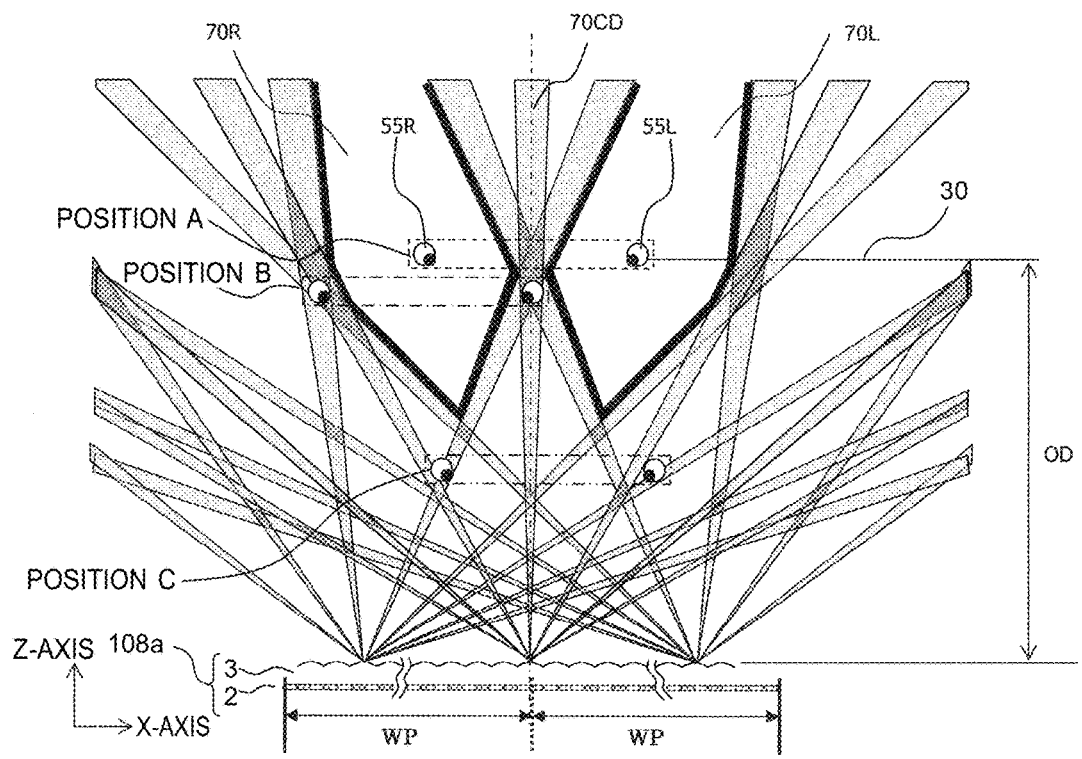
FIG. 6B is an optical model chart in which the no 3D moiré area and the 3D moiré area are separated.

FIG. 6B shows an optical model chart in which the optical model chart of FIG. 6A is separated into a no 3D moiré area and a 3D moiré area. In FIG. 6B, a gray scale section is the 3D moiré area, and a blank section is the no 3D moiré area. Further, FIG. 6B shows three positions, i.e., a relative position A where the positions of the both of the left and right eyes of the observer 10 are at proper positions, a relative position B where the viewing angle θ is slightly away from the proper position, and a relative position C slightly closer to the panel plane of the stereoscopic display device side from the proper position.

FIG. 7 shows observed images that are observed by the observer 10 from the three relative positions when a white image is displayed on the plane of the stereoscopic display panel 108a. As shown in FIG. 7A, there is no luminance fluctuation by the 3D moiré generated in the image observed from the relative position A. In the meantime, the luminance fluctuation is generated in one section on the screen of the image observed from the relative position B as shown in FIG. 7B. Further, the luminance fluctuation generated in two sections on the screen of the image observed from the relative position C as shown in FIG. 7C. Further, it can be found from the relation between the viewing angle ($θ_2$ to $θ_4$) of the 3D moiré and the observing distance that the width of the luminance fluctuation becomes wider as the observing position becomes farther from the plane of the stereoscopic display panel 108a.

The viewing angle $θ_P$ and the observing distance $D_P$ between the display plane of the stereoscopic display panel 108a and the observing position of the observer 10 are calculated by referring to the relative position calculated by the relative position calculating unit 102. Provided that the relative position is ($x_p$, $y_p$, $z_p$), the observing distance $D_P$ is calculated from Formula (3), and the viewing angle $\theta_P$ is calculated from Formula (4).

$$D_P=\sqrt{(x_p^2+y_p^2+z_p^2)} \qquad \text{Formula (3)}$$

$$\theta_p=\tan^{-1}(x_p/z_p) \qquad \text{Formula (4)}$$

By referring to the calculated viewing angle $\theta_P$ and the observing distance $D_P$, the observed image projected to the observing position of the observer 10 is detected from the optical model chart (FIG. 6A) which is drawn based on the luminance characteristic data. When there are the luminance characteristic data of at least three points as shown in FIG. 5, the optical model shown in FIG. 6A is calculated and the observed images depending on the observing positions of the observer 10 as shown in FIG. 7 can be acquired as a result. Thus, it is possible to calculate the image area where the luminance fluctuation by the 3D moiré appears.

Figure 8:
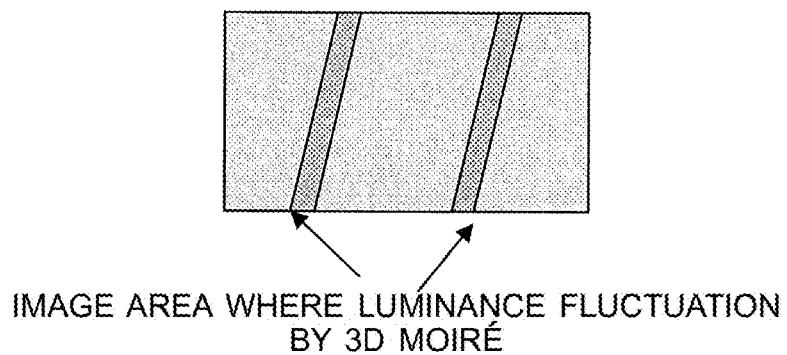
FIG. 8 is an illustration showing an observed image when there is a rotary shift generated between an electro-optical module and a light separating module.

FIG. 7 shows examples of the observed images in a case where the position precision of the display panel as the electro-optical module and the lenticular lens as the optical separating module described in FIG. 3 is high in which the luminance fluctuation by the 3D moiré exists only in roughly the perpendicular direction (Y-axis) within the screen. In the meantime, FIG. 8 shows an example of the observed image in a case where the position precision is low. Particularly when the positional relation between the display panel and the lenticular lens has a slope on the XY plane, the luminance fluctuation by the 3D moiré of an oblique component appears within the screen as shown in FIG. 8 according to the slope.

As described, it is desirable to store the information regarding the positional precision of the display panel 2 and the lenticular lens 3 to the device characteristic data saving unit 103 shown in FIG. 1 in addition to the luminance characteristic data of at least three points described above. In a case where the pitch precision of the lenticular lens 3 is low or there is a locally nonuniform area, an observed image of higher precision for the observing position can be acquired by storing the luminance characteristic data of multi-viewpoints for the X-axis direction and the Y-axis direction.

The luminance adjustment amount calculating unit 105 has a function which calculates the luminance adjustment amount suited for stereoscopic image display based on the device characteristic data for the image area calculated by the 3D moiré image area calculating unit 104. As the luminance adjustment amount calculating method, the observed image detected by the 3D moiré image area calculating unit 104 is acquired first, and the luminance adjustment amount is calculated from the luminance profile of the observed image.

Figure 9A:
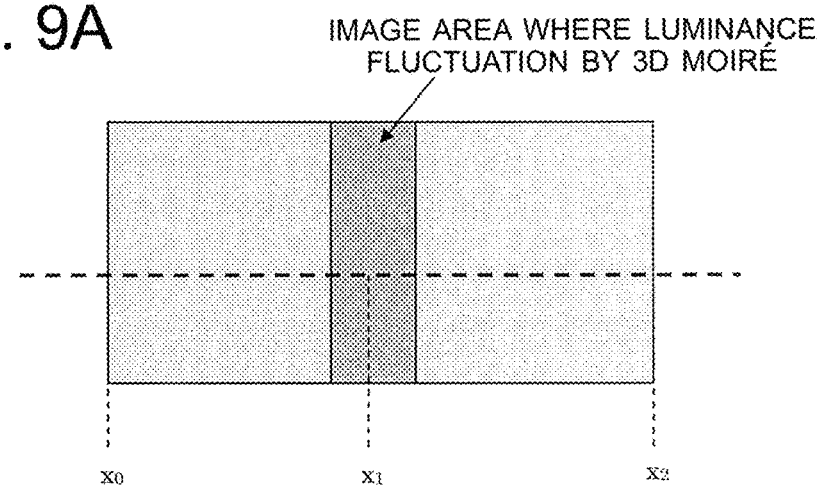
FIGS. 9A and 9B are charts, with FIG. 9A showing the relation between an observed image at position B, and FIG. 9B illustrating the luminance profile.
Figure 9B:
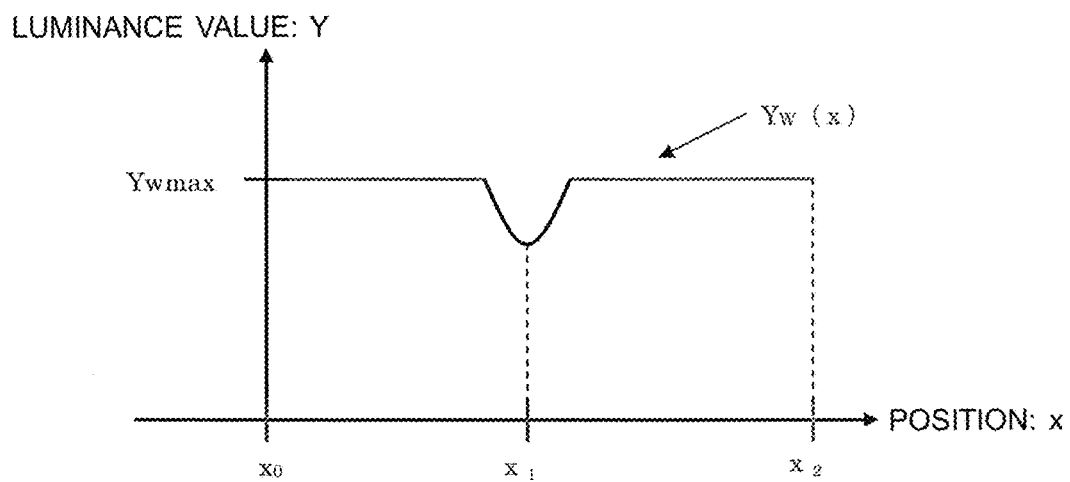

As an example, a case where the observed image shown in FIG. 7B is projected to the observer 10 is presented. FIG. 9 shows a relational chart regarding the observed image and the luminance profile. Note here that Yw is Y(LWRW) described in FIG. 4, and Y(LWRW) will be referred to as Yw in the explanations hereinafter. Further, Yw is a function of x-axis and y-axis. FIG. 9A is an illustration similar to the observed image shown in FIG. 7B, and FIG. 9B shows the change in the luminance value Yw of the observed image shown in FIG. 9A for the position in the X-axis direction. Note here that the change in the luminance value Yw for the position in the X-axis direction is the luminance profile of the stereoscopic display panel 108a.

Figure 10A:
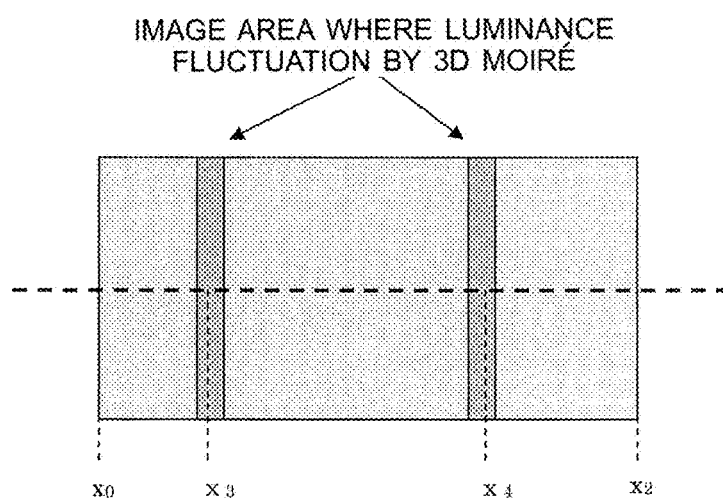
FIGS. 10A and 10B are charts, with FIG. 10A showing the relation between an observed image at position C, and FIG. 10B illustrating the luminance profile.
Figure 10B:
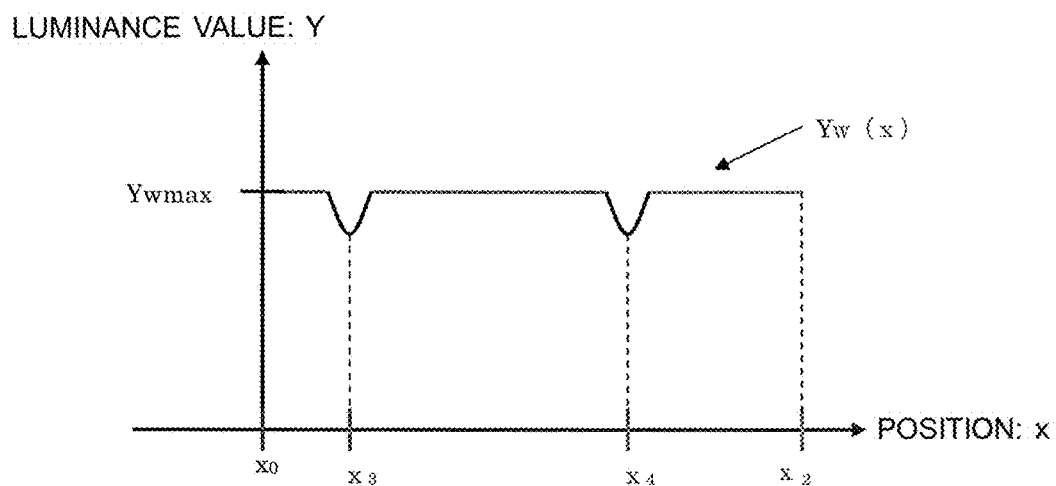

Further, FIG. 10 shows a relational chart regarding the observed image shown in FIG. 7C and the luminance profile. FIG. 10A is an observed image (with luminance fluctuation by 3D moiré) at the position C, and FIG. 10B is the luminance profile of the observed image at the position C. Thereby, the luminance profile of the stereoscopic display panel 108a can be detected from the observed image.

Then, the luminance adjustment amount is calculated by referring to the luminance profile. The luminance adjustment amount is calculated in such a manner that the luminance profile becomes constant for the X-axis direction as a result of multiplying the luminance adjustment amount to the gradation value of the image data. An example of the luminance adjustment amount calculating method is as follows. Assuming that the maximum luminance value Ywmax where the luminance value of the luminance profile at an arbitrary Y-axis (Y=y1 is shown in FIG. 10A as an example) becomes the maximum as "1", the luminance adjustment amount is calculated in such a manner that the other luminance value Yw becomes the same value as the value of Ywmax. Provided that the luminance adjustment amount in a case where the luminance value at the position x1 on the stereoscopic display panel 108a for y1 is Yw(x) is $\alpha(x)$, the luminance adjustment amount $\alpha(x)$ is calculated by following Formula (5).

$$\alpha(x)=Y\text{wmax}/Yw(x) \qquad \text{Formula (5)}$$

Figure 11:
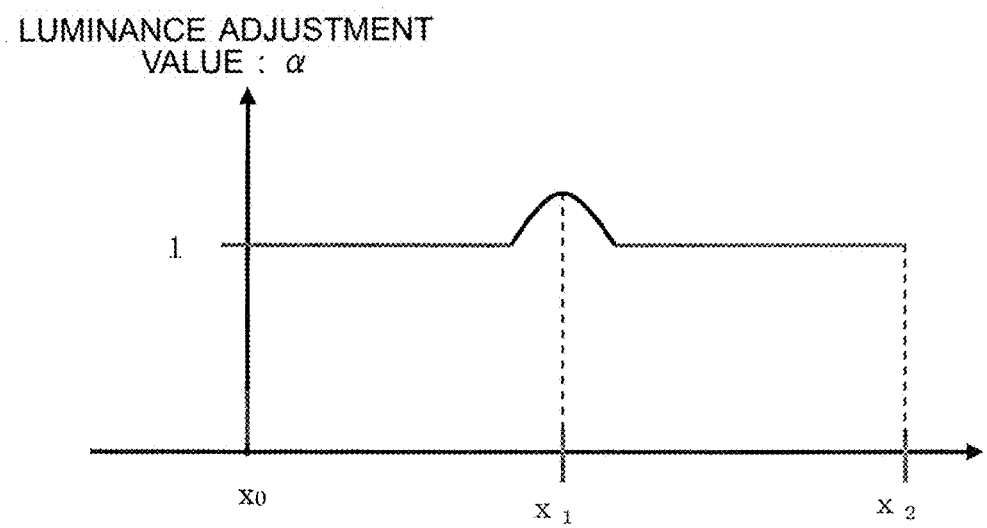
FIG. 11 is a chart showing the luminance adjustment amount at the position B.
Figure 12:
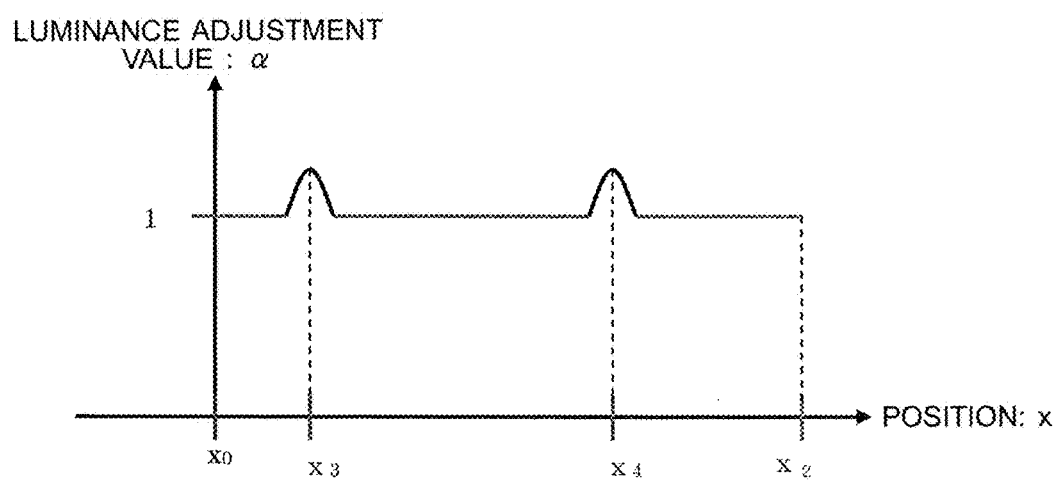
FIG. 12 is a chart showing the luminance adjustment amount at the position C.

FIG. 11 shows the luminance adjustment amount at the position B calculated from FIG. 9B, and FIG. 12 shows the luminance adjustment amount at the position C calculated from FIG. 10B. In a case where the positional relation between the display panel 2 as the electro-optical module and the lenticular lens 3 as the optical separating module described in FIG. 3 is almost ideally aligned, the luminance profile by the 3D moiré does not depend on the Y-axis direction and takes a constant value. Thus, the luminance adjustment amount also does not depend on the Y-axis and takes a constant value. Therefore, the luminance adjustment amount $\alpha(x, y)$ for all the positions $(x, y)$ on the stereoscopic display panel 108a can be calculated by Formula (6).

$$\alpha(x,y)=Y\text{wmax}/Yw(x,y) \qquad \text{Formula (6)}$$

FIG. 11 shows a calculation example of $\alpha(x)$ in Formula (5) and $\alpha(x, y)$ in Formula (6) from FIG. 9 and FIG. 10, and it is the example of a case where the luminance distribution within the plane of the stereoscopic display panel 108a is uniform (YLmax=YCmax=YRmax in FIG. 4). The actual stereoscopic display panel 108a has the luminance distribution within the plane, and calculation of $\alpha(x)$ and $\alpha(x, y)$ in such case will be described later.

As described above, in a case where the positional relation between the display panel 2 as the electro-optical module and the lenticular lens 3 as the optical separating module is almost ideally aligned, the luminance adjustment amount for all the positions on the plane of the stereoscopic display panel 108a can be calculated through calculating the luminance adjustment amount for the positions in the X-axis direction.

With the actual stereoscopic display panel 108a, there may be cases where the positional relation between the display panel 2 as the electro-optical module and the lenticular lens 3 as the optical separating module is not ideal, thereby generating a position shift within a prescribed precision. When the position precision is low, the luminance fluctuation by the 3D moiré of an oblique component as shown in FIG. 8 appears. Thus, the luminance profile by the 3D moiré changes also depending on the Y-axis direction.

Figure 13A:
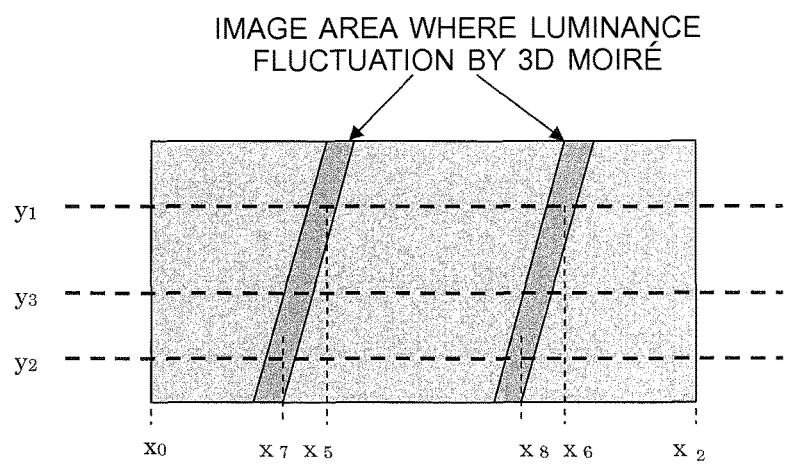
FIGS. 13A-13C are relational charts regarding the observed image and the luminance profile when there is a rotary shift generated between an electro-optical module and a light separating module, with FIG. 13A illustrating an observed image similar to that of FIG. 8, FIGS. 13B and 13C illustrating the luminance profiles for positions y1 and y2, respectively.
Figure 13B:
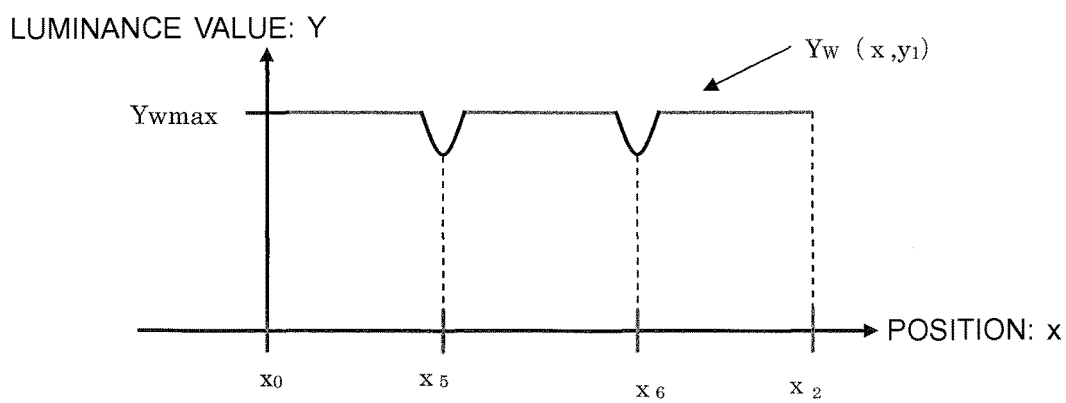
Figure 13C:
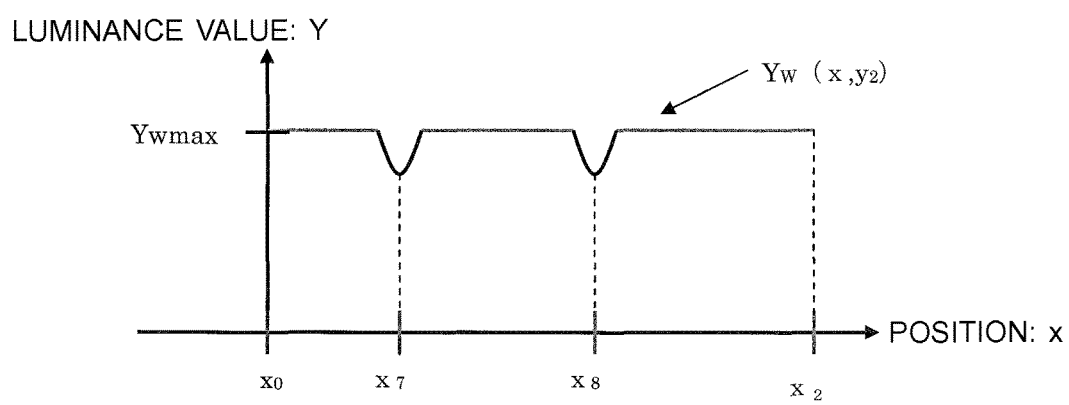

FIG. 13 shows relational charts regarding the observed image and the luminance profile in a case where there is rotary shift generated between the electro-optical module and the light separating module. FIG. 13A shows an observed image similar to that of FIG. 8. FIG. 13B shows the luminance profile for the positions in the X-axis direction at the positions on $y_1$ line of FIG. 13A, and FIG. 13C shows the luminance profile for the positions in the X-axis direction at the positions on $y_2$ line of FIG. 13A. It can be seen from FIG. 13B and FIG. 13C that the luminance profile changes also depending on the positions in the Y-axis direction. Therefore, the luminance adjustment amount is calculated in such a manner that the luminance value as the luminance profile becomes takes a constant value not only for the X-axis direction but also for the Y-axis direction.

For calculating the luminance adjustment value, the luminance profile for the positions in the X-axis direction is first calculated on the three lines, respectively, i.e., in the upper end (on $y_1$ line of FIG. 13) of the stereoscopic display panel 108a, the center (on $y_3$ line of FIG. 13), and the lower end (on $y_2$ line of FIG. 13). Then, the position in the X-axis direction where the luminance value becomes the minimum value by the luminance fluctuation caused by the 3D moiré is calculated (the positions of $x_5$ and $x_6$ on $y_1$ line of FIG. 13, and the positions of $x_7$ and $x_8$ on $y_2$ line of FIG. 13) by referring to the luminance profiles on the three lines. Then, the slope of the luminance fluctuation by the 3D moiré of the oblique component is calculated from the detected positions in the X-axis direction to calculate the luminance profile for all the positions on the plane of the stereoscopic display panel 108a. Then, from the calculated luminance profile, the luminance adjustment amount for making the luminance value constant is calculated for the X-axis direction and the Y-axis direction on the plane of the stereoscopic display panel 108a. Through the above-described processing, the luminance adjustment amount for all the positions on the plane of the stereoscopic display panel 108a is calculated.

The image data saving unit 106 has a function which saves or receives the image data. FIG. 14 shows an example of the image data saved in the image data saving unit 106. In FIG. 14, an L image and an R image are saved as the image data of the stereoscopic image content. The L image is a left-eye image projected to the left-eye area, and the R image is a right-eye image projected to the right-eye area. Each of the pixel values of the LR image (L image and R image) holds a gradation value (RGB value), and the LR image is displayed on the stereoscopic display panel 108a.

The luminance adjustment processing unit 107 has a function which performs the luminance adjustment processing on the image data saved in the image data saving unit 106 according to the luminance adjustment amount calculated by the luminance adjustment calculating unit 105. In the luminance adjustment processing, first, the position on the plane of the stereoscopic display panel 108a where the image data is displayed is specified.

Normally, the image data is displayed on the whole screen of the stereoscopic display panel 108a. However, there may be cases where the image data is displayed on a part of the stereoscopic display panel 108a due to the difference in the aspect ratio of the image data and the stereoscopic display panel 108a or the display setting of the screen. Inversely, a part of the image data may be displayed on the whole screen of the stereoscopic display panel 108a in some cases. Therefore, the position on the plane of the stereoscopic display panel 108a where the image data is displayed is specified by referring to the aspect ratio, the screen display setting information of the stereoscopic image display device 11, and the like. Then, from the position on the plane of the stereoscopic display panel 108a where the image data is displayed and the resolution of the image data, the pixel position (u, v) of the image data to be displayed at the position (x, y) on the stereoscopic display panel 108a is detected.

Then, the luminance adjustment amount α(x, y) at the position (x, y) on the plane of the stereoscopic display panel 108a where the pixel position (u, v) of the image data is displayed is multiplied to the gradation value Id(u, v) saved in the pixel position (u, v) of the image data to adjust the gradation value If(u, v) of the image data as in Formula (7).

$$If(u,v)=\alpha(x,y) \cdot Id(u,v) \quad \text{Formula (7)}$$

Note here that "Id(u, v)" is the gradation value saved in the pixel position (u, v) of the image data in the image data saving unit 106, "α(x, y)" is the luminance adjustment amount at the display position (x, y), and "If(u, v)" is the gradation value saved in the pixel position (u, v) of the image data after performing the luminance adjustment processing.

As described above, the luminance adjustment processing is performed on the image data saved in the image data saving unit 106 according to the luminance adjustment amount. The luminance adjustment processing is performed in the same manner on both images of the L image and the R image which are the image data stored in the image data saving unit 106. The image data of the L image after executing the luminance adjustment processing is referred to as an $L_f$ image, and the image data of the R image after executing the luminance adjustment processing is referred to as an $R_f$ image.

With a typical image display device, the relation between the gradation value I saved in the image data and the luminance value Y displayed on the display panel plane is not a linear relation due to the device characteristic of the display panel but is a relation approximated to the curve shown with Formula (8).

$$Y=I^\gamma \quad \text{Formula (8)}$$

Figure 15:
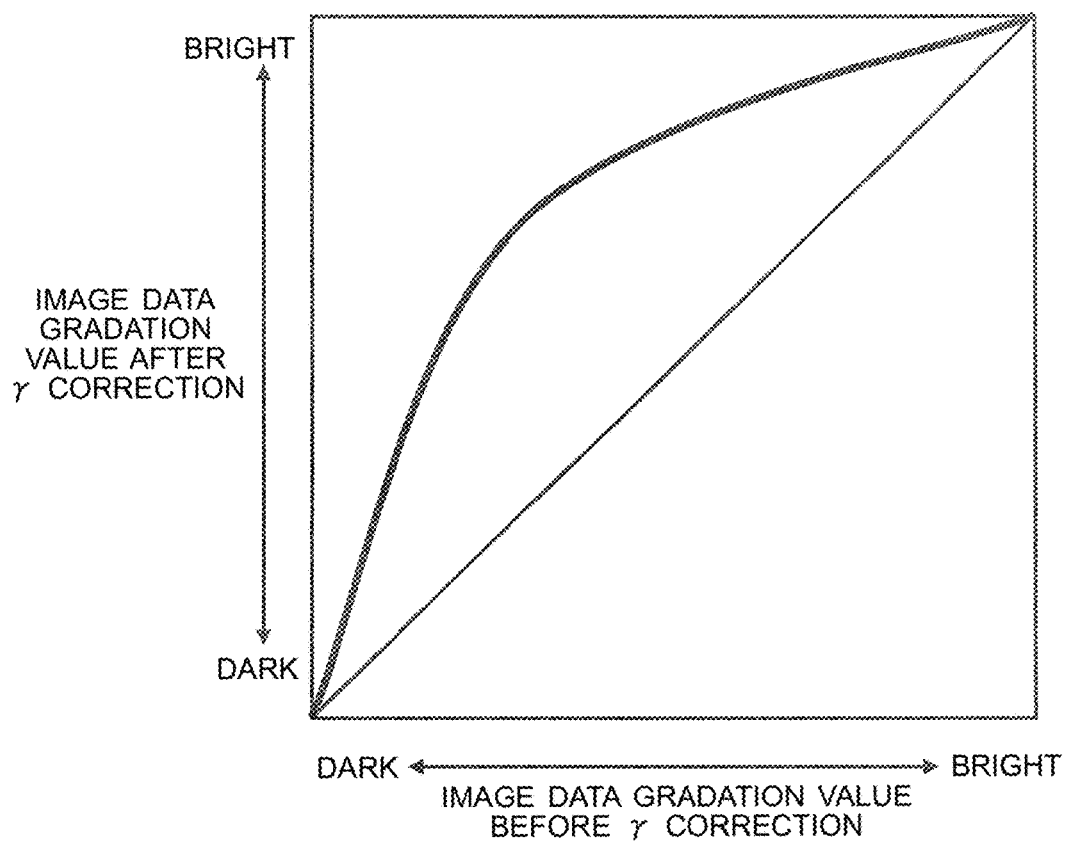
FIG. 15 is a correlation chart showing gradation values of image data before executing gamma correction and gradation values after executing gamma correction.

Therefore, on the normal image data, gamma correction processing is performed (gamma value is 2.2 in many cases) so that the relation between the gradation value I saved in the image data and the luminance value Y displayed on the display panel plane becomes the linear relation shown with Formula (9) by corresponding to the device characteristic of a typical stereoscopic display panel so that the image data can be displayed naturally on the display panel plane. FIG. 15 shows the relational chart regarding the gradation value of the image data before the gamma correction is performed and the gradation value after the gamma correction is performed.

$$Y=I \quad \text{Formula (9)}$$

When the gamma correction is performed so that the relation between the gradation value I saved in the image data and the luminance value Y displayed on the plane of the display panel 108a becomes the linear relation shown with Formula (9), the influence of the luminance fluctuation on the plane of the stereoscopic display panel 108a can be lightened through performing the luminance adjustment processing on the gradation value I saved in the image data by using Formula (7). When the relation between the gradation value I saved in the image data and the luminance value Y displayed on the plane of the display panel 108a is not the linear relation shown with Formula (9), the gamma correction processing is performed on the image data before performing the luminance adjustment processing so that the relation of Formula (9) applies. The gradation value I described heretofore is the case of the gray scale. However, it is the same for the case having color information. The same processing can be performed by using each of the gradation values Ir, Ig, and Ib of RGB instead of using the gradation value I.

The stereoscopic display panel unit 108 has a function which projects the image data on which the luminance adjustment processing is performed to the right eye and the left eye according to the relative position. The stereoscopic display panel unit 108 acquires the $L_f$ image and the $R_f$ image on which the image filtering processing is performed, and projects the $L_f$ image and the $R_f$ image by the stereoscopic display panel 108a to display the stereoscopic image content.

Figure 16:
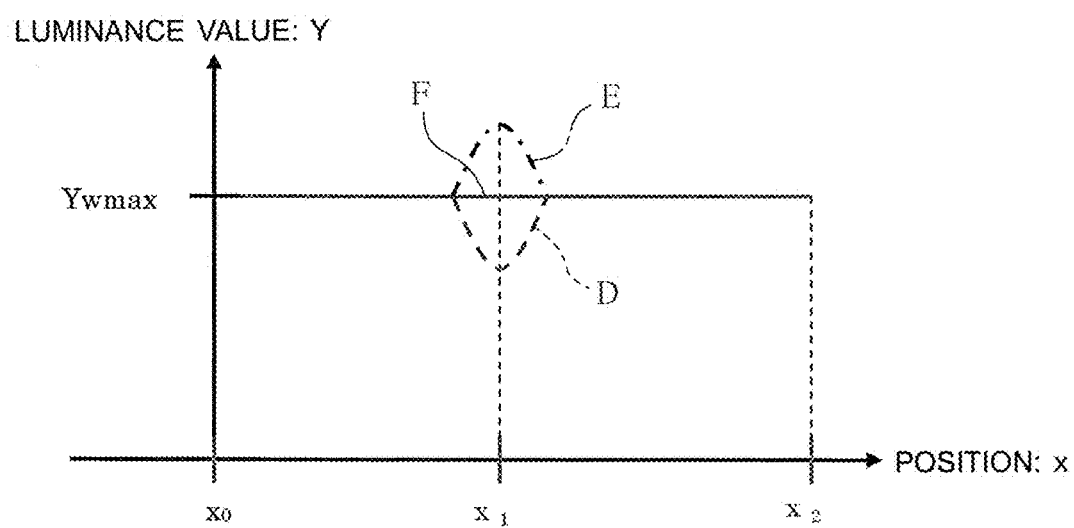
FIG. 16 is a chart showing the luminance profile of an observed image after executing luminance adjustment processing.

FIG. 16 shows the luminance profile of an observed image in a case where the image data on which the luminance adjustment processing is performed is projected to the observing position (position B of FIG. 6) of the observer from the stereoscopic display panel 108a. D, E, and F in FIG. 16 are as follows. A dotted line of D (dotted line where the luminance value falls on the lower side) shows the luminance profile (luminance profile of the observed image before the luminance adjustment processing is performed) (D) by the 3D moiré. An alternate short and long dash line of E (alternate short and long dash line where the luminance value swells on the upper side) shows the luminance profile (E) originated from the image data after the luminance adjustment processing is performed. A solid line of F shows the luminance profile (F) of the observed image acquired by projecting the image data after the luminance adjustment processing is performed to the observing position of the observer 10 from the stereoscopic display panel 108a. In the luminance profile (F) of the observed image, the luminance fluctuation is canceled and the luminance value becomes constant by adding the fall of the luminance value in the luminance profile (D) by the 3D moiré generated at the position $x_1$ in the X-axis direction and the swell of the luminance value in the luminance profile (E) originated from the image data on which the luminance adjustment processing is performed.

As described above, the luminance adjustment processing of the image data is performed according to the luminance adjustment amount calculated based on the relative position and the device characteristic data to lighten the influence of the luminance fluctuation caused by the 3D moiré.

A flowchart of the stereoscopic image processing method (1) used in the stereoscopic image display device 11 according to the first exemplary embodiment will be described by referring to FIG. 17.

In step S101, the observing position of the observer 10 is measured by using the observer position measuring unit 101.

In step S102, the relative position of the observing position of the observer 10 and the stereoscopic display panel 108a is calculated by using the relative position calculating unit 102. In step S102, the observing position of the observer 10 by having the center position of the stereoscopic display panel 108a as the origin is calculated as the relative position.

In step S103, the luminance characteristic data is acquired from the device characteristic data saving unit 103. FIG. 4 shows an example of the luminance characteristic data.

In step S104, an image area where the luminance fluctuation is generated by the 3D moiré is calculated by using the 3D moiré image area calculating unit 104 from the relative position calculated in step S102 and the luminance characteristic data acquired in step S103. In the image area calculation processing, the optical model chart (FIG. 6) is derived from the luminance characteristic data, the observed images (FIG. 7 and FIG. 8) projected to the observing position of the observer 10 from the plane of the stereoscopic display panel 108a are detected, and the image area where the luminance fluctuation by the 3D moiré is generated is calculated.

In step S105, the luminance adjustment amount is calculated from the observed image detected in step S104 by using the luminance adjustment amount calculating unit 105. For the luminance adjustment amount, calculated is the luminance adjustment amount with which the luminance profile becomes constant for the X-axis direction as a result of multiplying the luminance adjustment amount to the gradation value of the image data. As an example of the method for calculating the luminance adjustment amount, the maximum luminance value Ywmax where the luminance value of the luminance profile becomes maximum is defined as "1", and the luminance adjustment amount is calculated in such a manner that the other luminance value Yw becomes the same value as that of the Ywmax.

In step S106, the image data as the stereoscopic image content is acquired from the image data saving unit 106.

In step S107, the luminance adjustment processing is performed on the image data acquired in step S106 by using the luminance adjustment processing unit 107 according to the luminance adjustment amount calculated in step S104. In step S107, the luminance adjustment processing is performed by multiplying the luminance adjustment amount to the gradation value kept at the pixel position of the image data corresponding to the display position on the plane of the stereoscopic display panel 108a.

In step S108, the image data on which the luminance adjustment processing is performed in step S107 is displayed on the stereoscopic display panel 108a by using the stereoscopic display panel unit 108.

In step S109, whether to stop or to continuously execute the stereoscopic image display processing is set. When the power of the stereoscopic image display device 11 is turned off or interruption of the stereoscopic image display is designated by the observer 10, the stereoscopic image display processing is stopped. When there is no event for stopping the stereoscopic image display processing, the stereoscopic image display processing is continuously executed. When the stereoscopic image display processing is stopped in step S109, the stereoscopic image display processing is ended. When the stereoscopic image display processing is executed continuously in step S109, the procedure is returned to the processing of step S101 to repeatedly execute the processing from step S101 to step S109.

As described above, it is possible to provide the stereoscopic image display device and the stereoscopic image processing method with which the influence of the luminance fluctuation by the 3D moiré is lightened so that a sense of discomfort is not felt by the observer even when the observing position of the observer 10 is shifted, through performing the luminance adjustment processing on the image data according to the luminance adjustment amount calculated based on the relative position and the device characteristic data.

In the external appearance of the first exemplary embodiment (FIG. 2), illustrated is a case where the image processing unit 151, the observer position measuring unit 101, the image data saving unit 106, and the stereoscopic display panel unit 108 are placed within a single stereoscopic image display device 11. However, the functions of the stereoscopic image display device 11 may be achieved by separating those units according to the application thereof and integrating each of the separated devices.

Figure 18:
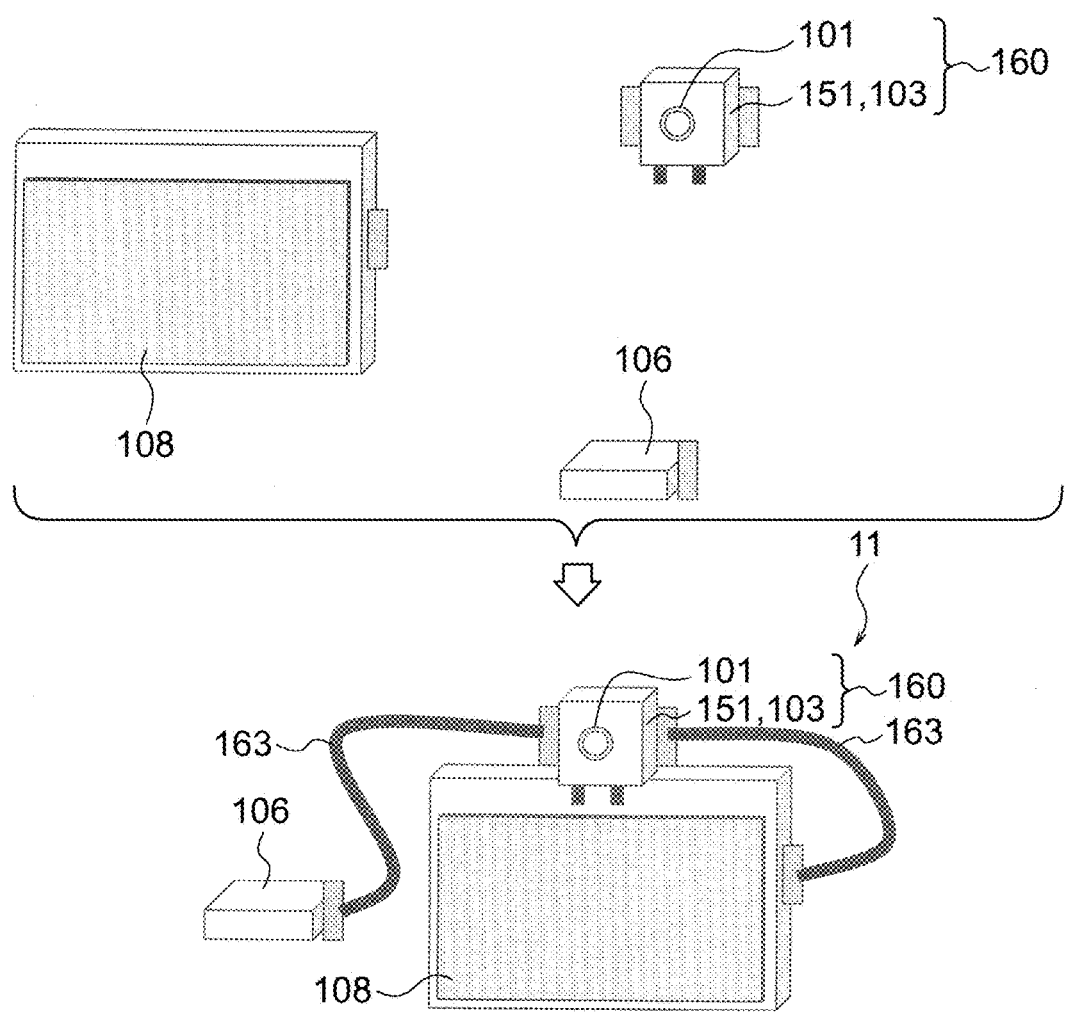
FIG. 18 is an external appearance of a stereoscopic image display device.

FIG. 18 shows a case where the stereoscopic image display device 11 is separated into three devices. The first one is the stereoscopic display panel unit 108, the second one is an image processing device 160 acquired by integrating the observer position measuring unit 101, the image processing unit 151 and the device characteristic data saving unit 103, and the third one is the device of the image data saving unit 106. The functions of the stereoscopic image display device 11 can be achieved through connecting the three devices via an image input/output cable 163 such as HDMI (registered trademark) or DVI, a data communication cable such as USB or LAN, or via radio communication such as W-LAN and transmitting/receiving various kinds of data.

Figure 19:
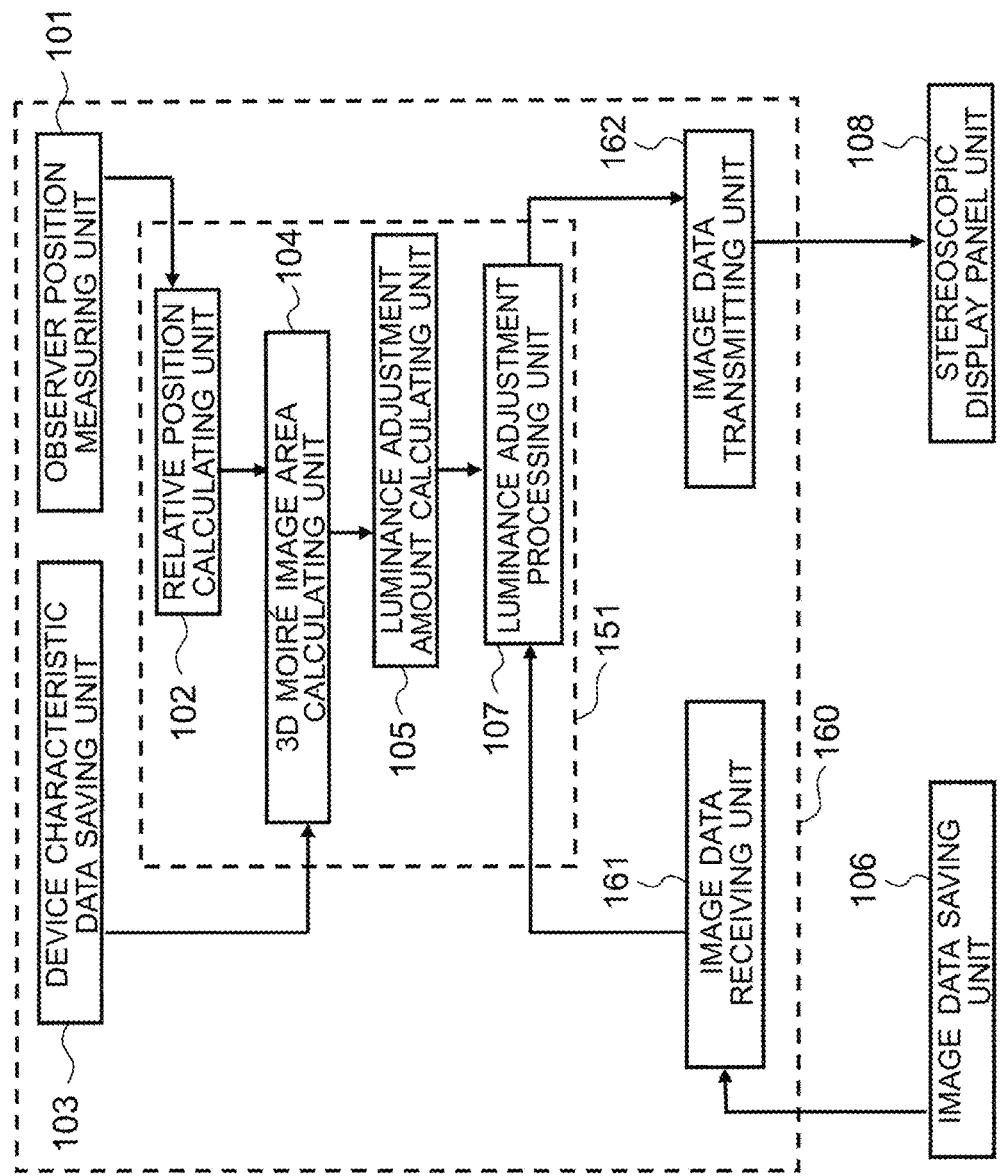
FIG. 19 is a block diagram showing an image processing device.

FIG. 19 shows a block diagram of the image processing device 160. The image processing device 160 includes the observer position measuring unit 101, the relative position calculating unit 102, the device characteristic data saving unit 103, the luminance adjustment amount calculating unit 105, the luminance adjustment processing unit 107, an image data receiving unit 161, and an image data transmitting unit 162. Note here that the observer position measuring unit 101, the relative position calculating unit 102, the device characteristic data saving unit 103, the luminance adjustment amount calculating unit 105, and luminance adjustment processing unit 107 have the same functions as each of the structural elements of the stereoscopic image processing device 11 described above.

The image data receiving unit 161 has a function which receives the image data transmitted from the image data saving unit 106 provided outside the image processing device 160 and transmits it to the luminance adjustment processing unit 107. Further, the image data transmitting unit 162 has a function which transmits the image data transmitted from the luminance adjustment processing unit 107 to the stereoscopic display panel unit 108. Examples of the image data receiving unit 161 and the image data transmitting unit 162 are a connection terminal and a data transfer device used for transmitting/receiving the image data to/from the image processing device 160 via HDMI, a DVI cable, or the like.

While the case of separating the image display device into the three devices is described in the above, the form of separation is not limited only to that case. The feature of the first exemplary embodiment is the image processing unit 151 which lightens the influence of the luminance fluctuation generated by the 3D moiré. Thus, it is possible to combine the image processing unit 151 with the observer position measuring unit 101 and to provide it as the single image processing device 160 described above.

Figure 20:
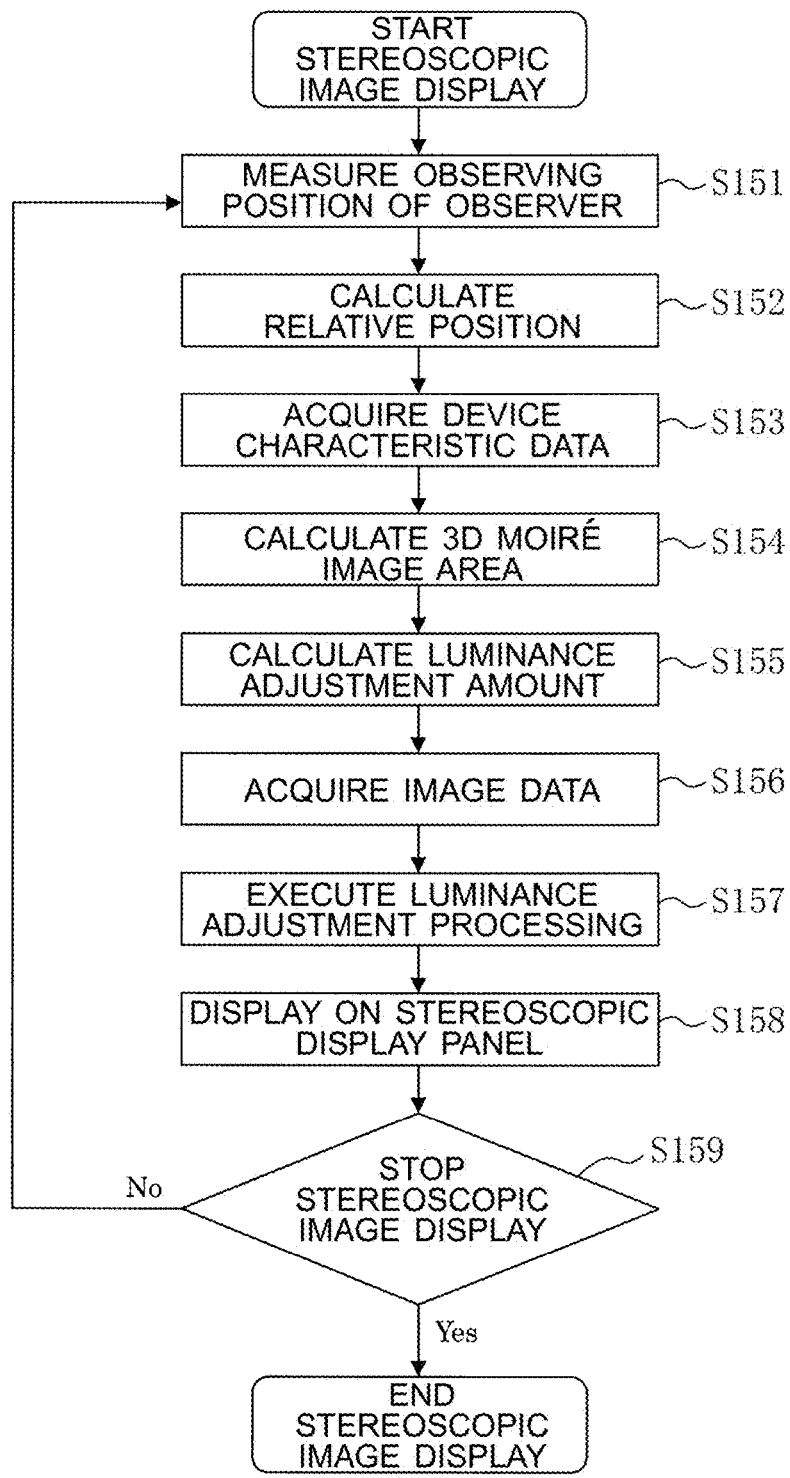
FIG. 20 is a flowchart of a stereoscopic image processing method (2)

In the above, depicted is the luminance adjustment processing method performed when the luminance profiles of the observed images projected to the right eye and the left eye of the observer 10 from the stereoscopic display panel 108a are equivalent. However, depending on the observing position of the observer 10, the luminance profiles of the observed images projected to the right eye and the left eye of the observer 10 become different. An example of the luminance adjustment processing method for the case where the luminance profiles of the observed images projected to the right eye and the left eye of the observer 10 are different will be described by referring to FIG. 20.

In step S151, the right-eye and left-eye positions of the observer are measured by using the observer position measuring unit 101.

In step S152, the relative positions from the center position of the stereoscopic display panel 108a to the observing positions of the right eye and the left eye of the observer 10 are calculated by using the relative position calculating unit 102. The relative position of the right eye of the observer is defined as $(x_R, y_R, z_R)$, and the relative position of the left eye of the observer 10 is defined as $(x_L, y_L, z_L)$.

In step S153, the luminance characteristic data is acquired from the device characteristic data saving unit 103.

In step S154, the luminance adjustment amount is calculated by using the luminance adjustment amount calculating unit 105 by detecting the luminance profiles of the observed images projected to the relative positions of the right eye and the left eye calculated in step S152 from the luminance characteristic data acquired in step S153.

Figure 17:
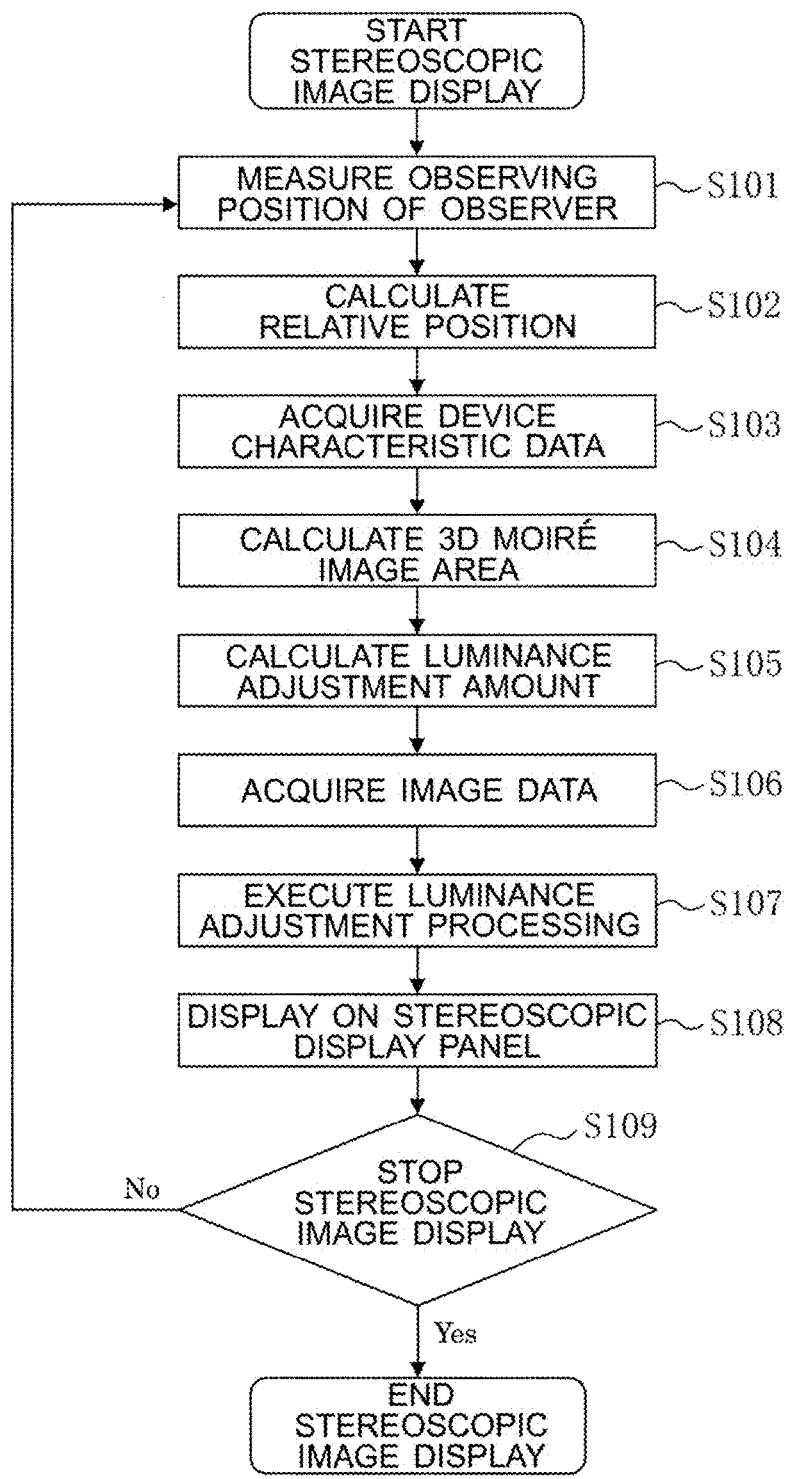
FIG. 17 is a flowchart of a stereoscopic image processing method (1)
Figure 21:
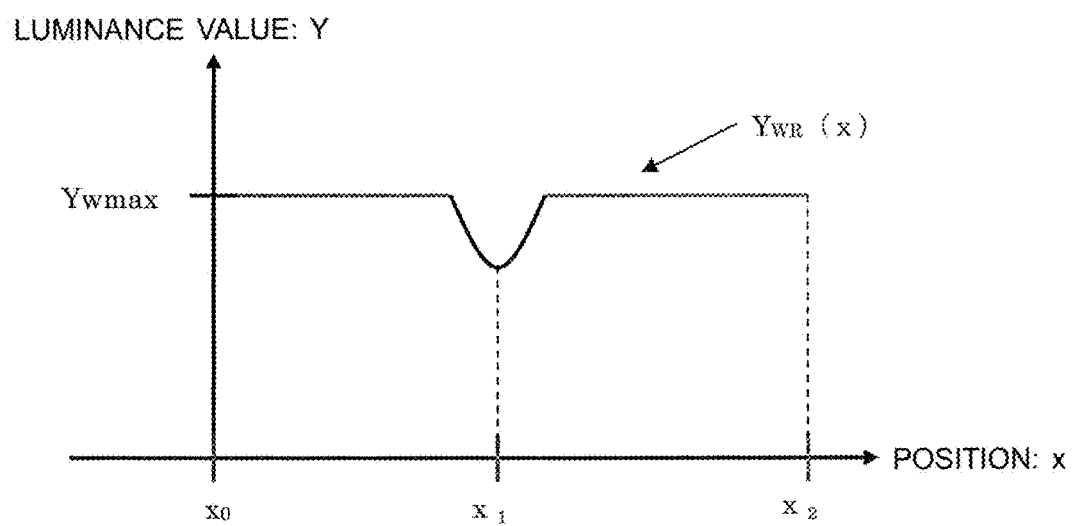
FIG. 21 is a chart showing a luminance profile of an observed image projected to the position of the right eye of an observer.
Figure 22:
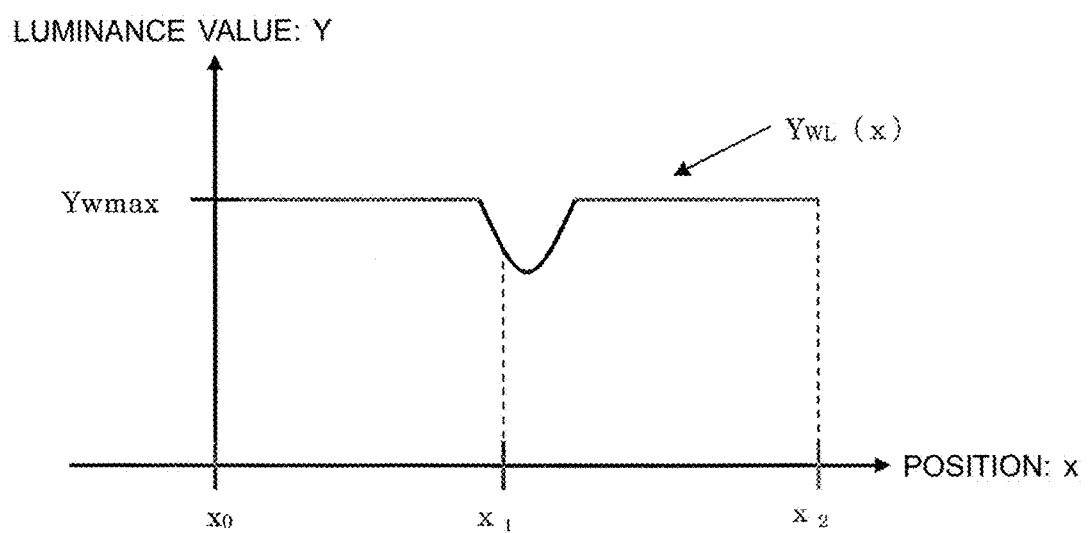
FIG. 22 is a chart showing a luminance profile of an observed image projected to the position of the left eye of an observer.
Figure 23:
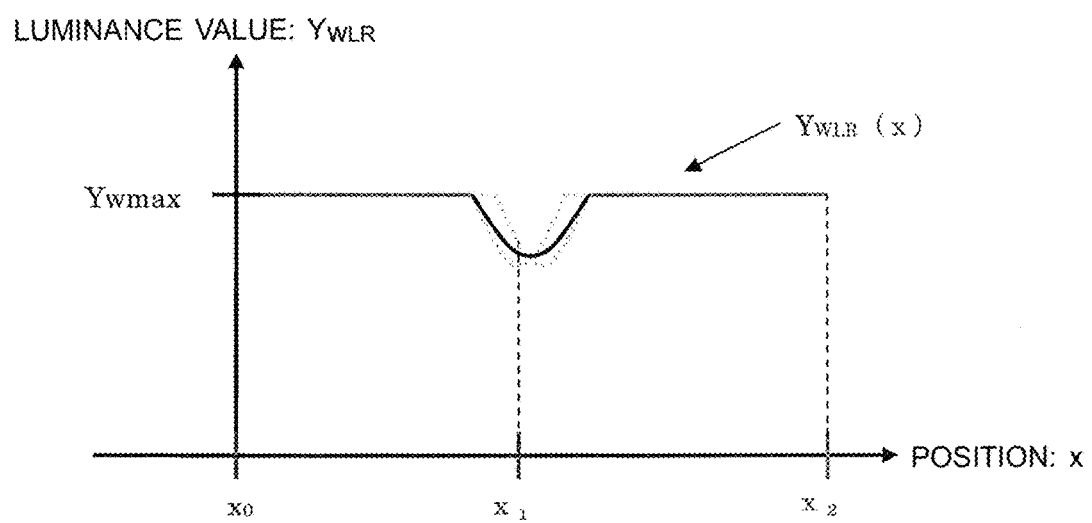
FIG. 23 is a chart showing an averaged luminance profile of the luminance profiles of the observed images projected to the right eye and the left eye.
Figure 24:
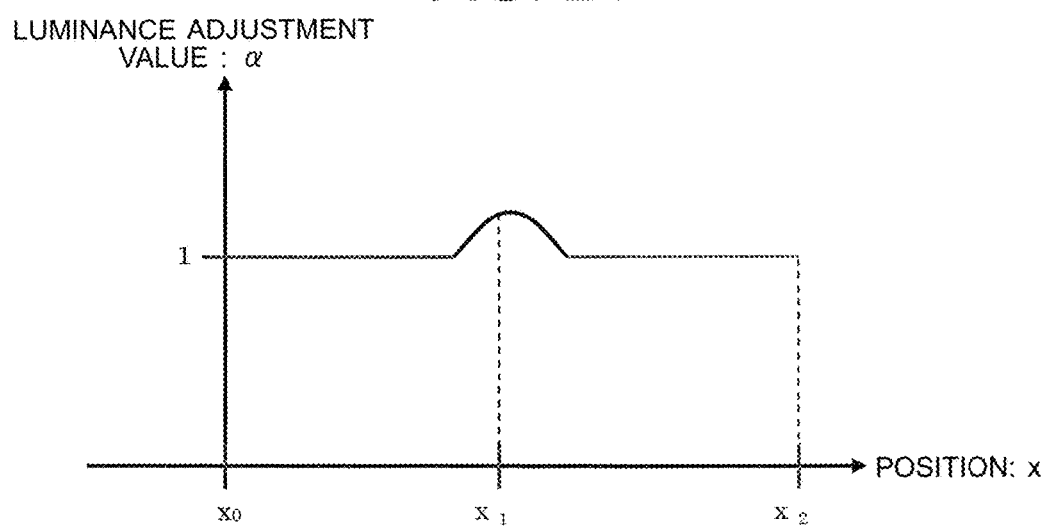
FIG. 24 shows the luminance adjustment amount for the averaged luminance profile shown in FIG. 23.

First, the same processing as that of step S104 shown in FIG. 17 is performed to calculate the luminance profile $Y_{WR}$ projected to the position of the right eye of the observer from the plane of the stereoscopic display panel 108a and also the luminance profile $Y_{WL}$ projected to the position of the left eye of the observer (FIG. 21 and FIG. 22). Then, the luminance profile $Y_{WLR}$ as the average value of the luminance profile $Y_{WR}$ projected to the position of the right eye of the observer and the luminance profile $Y_{WL}$ projected to the position of the left eye is calculated (FIG. 23). Then, the luminance adjustment amount is calculated by the same processing as that of step S104 shown in FIG. 17 by referring to the luminance profile $Y_{WLR}$. FIG. 24 shows the calculated luminance adjustment amount. The luminance adjustment amount changes depending on the positions in the X-axis direction. However, it does not depend on the positions in the Y-axis direction and takes a constant value. Thus, the luminance adjustment amount can be calculated at all the positions on the plane of the stereoscopic display panel 108a with the above-described processing.

In step S155, the L image and the R image as the image data of the stereoscopic image content are acquired from the image data saving unit 106.

In step S156, the luminance adjustment processing is performed on the image data acquired in step S155 by using the luminance adjustment processing unit 107 according to the luminance adjustment amount calculated in step S154. In step S156, the luminance adjustment processing is performed by multiplying the luminance adjustment amount equivalent to the gradation value saved in the pixel positions of the L image and the R image corresponding to the display position on the plane of the stereoscopic display panel 108a.

In step S157 and step S158, the same processing as the processing executed in step S107 and step S108 shown in FIG. 17 is performed.

As described above, it is possible to provide the stereoscopic image display device and the stereoscopic image processing method with which the influence of the luminance fluctuation by the 3D moiré is lightened so that a sense of discomfort is not felt by the observer even when the observing position of the observer is shifted, through performing the luminance adjustment processing on the image data according to the luminance adjustment amount calculated based on the device characteristic data even in a case where the luminance profiles of the observed images projected to the right eye and the left eye of the observer are different.

Figure 25:
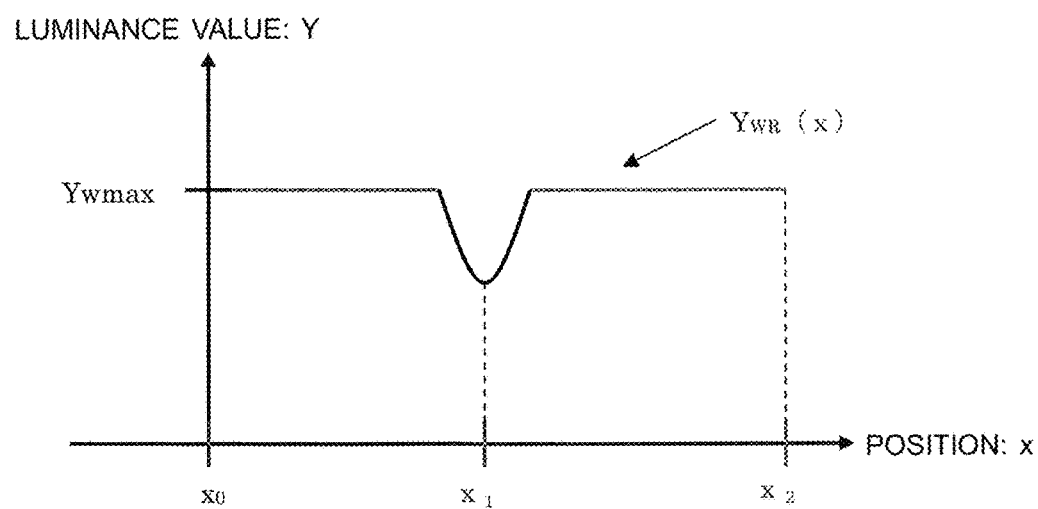
FIG. 25 is a chart showing a luminance profile of an observed image projected to the position of the right eye of an observer.
Figure 26:
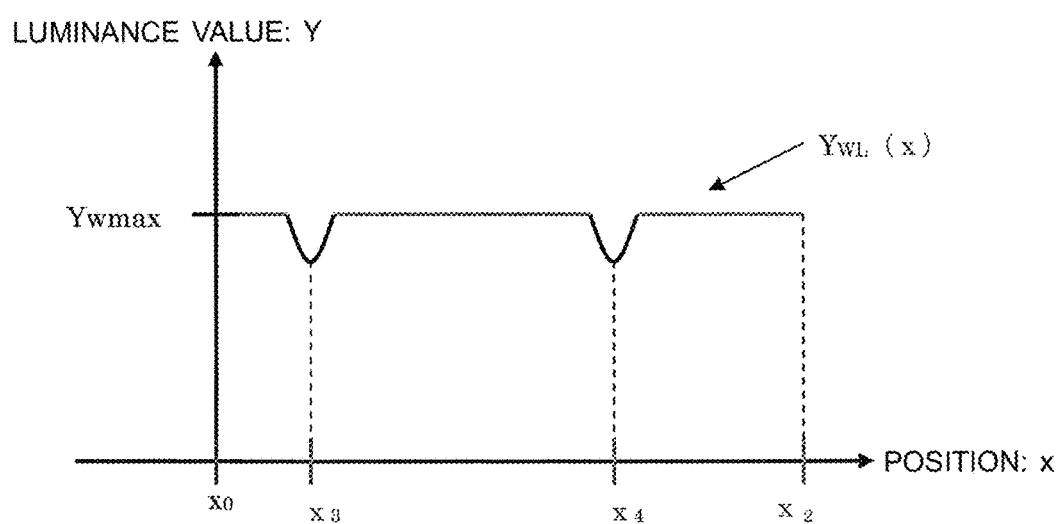
FIG. 26 is a chart showing a luminance profile of an observed image projected to the position of the left eye of an observer.

As other examples of the luminance profile, FIG. 25 shows the luminance profile $Y_{WR}$ projected to the position of the right eye of the observer 10 from the plane of the stereoscopic display panel 108a, and FIG. 26 shows the luminance profile $Y_{WL}$ projected to the position of the left eye of the observer 10. In FIG. 25 and FIG. 26, the position (X-axis direction) on the observing image plane where the luminance value is decreased due to the 3D moiré becomes largely different for the right eye and the left eye of the observer 10. Even in such case, the average value of the luminance profiles may be calculated, and the luminance adjustment amount may be calculated from the luminance profile.

Figure 27:
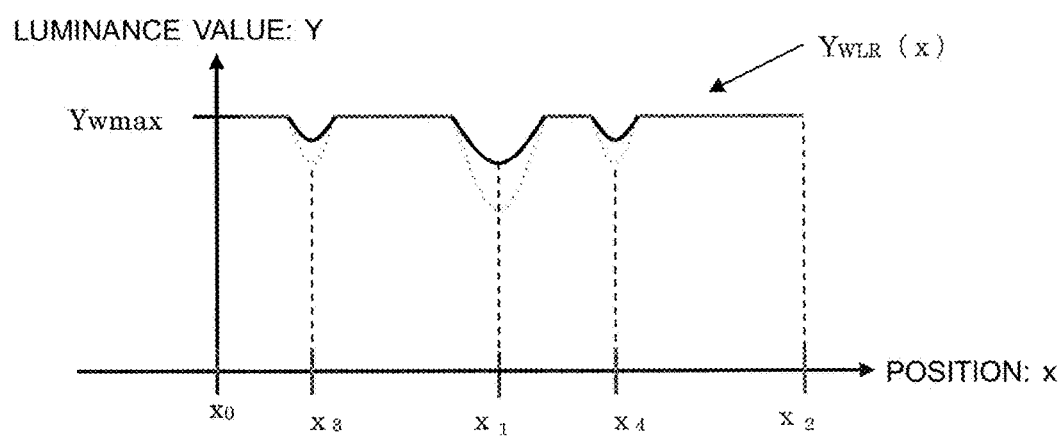
FIG. 27 shows the luminance adjustment amount for the observed image projected to the right eye of FIG. 25.
Figure 28:
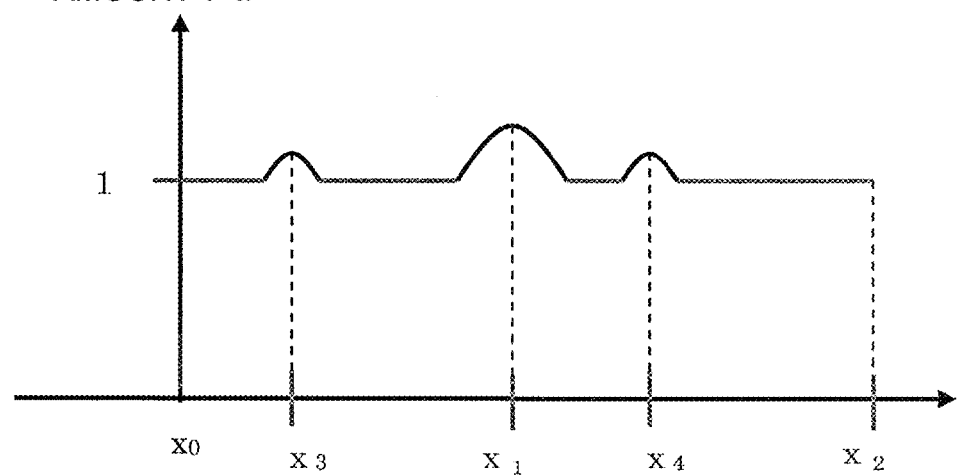
FIG. 28 shows the luminance adjustment amount for the observed image projected to the left eye of FIG. 26.

FIG. 27 shows the result acquired by calculating the average value of the luminance profiles projected to the right eye and the left eye of the observer 10. FIG. 28 shows the result acquired by calculating the luminance adjustment amount from the average value of the luminance profiles.

As described above, even in a case where largely different luminance profiles are projected to the right eye and the left eye of the observer 10, the influence of the luminance fluctuation by the 3D moiré can be lightened by calculating the luminance adjustment amount and performing the luminance adjustment processing.

Figure 29:
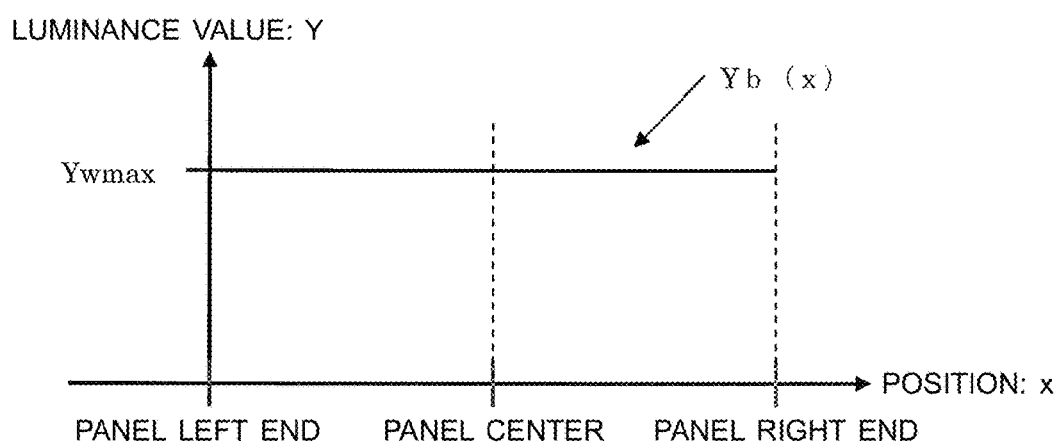
FIG. 29 is a chart showing a luminance profile of an observed image (no luminance fluctuation by 3D moiré)

In the explanations provided heretofore, when calculating the luminance adjustment amount $\alpha(x, y)$ from the luminance value $Yw(x, y)$ in the luminance profile of the observed image, it is calculated by Formula (6) by having the luminance distributions within the plane of the stereoscopic display panel 108$a$ uniform (YLmax-Y Cmax-YRmax in FIG. 4) as shown in FIG. 29 and having the maximum luminance value Ywmax where the luminance value of the luminance profile becomes maximum as the reference.

Figure 30:
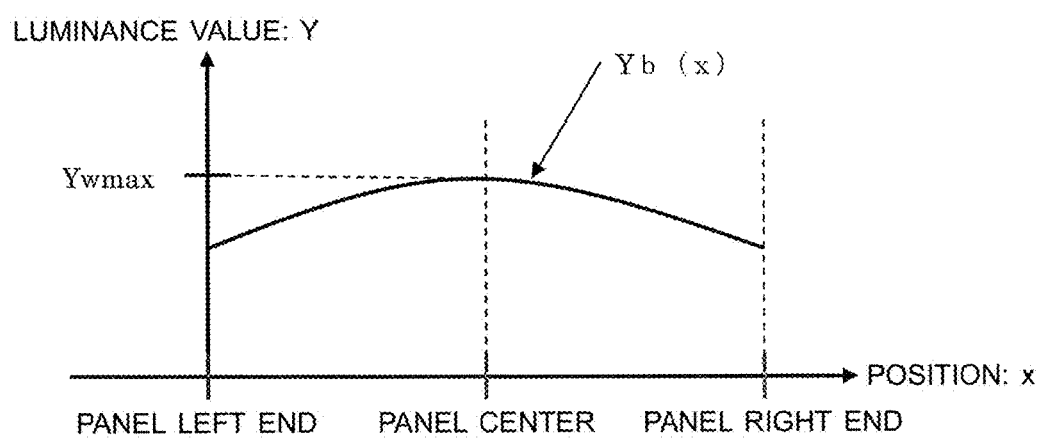
FIG. 30 is a chart showing a luminance profile of an observed image projected from a typical stereoscopic display panel (no luminance fluctuation by 3D moiré)

The actual luminance distribution within the plane of the stereoscopic display panel 108$a$ is not uniform. The stereoscopic display panel has the luminance distribution as shown in FIG. 30 in which the luminance value is the maximum in the center part of the panel and the luminance value is decreased towards the both ends of the panel (YCmax>YLmax=YRmax in FIG. 4). This distribution is defined as $Yb(x, y)$, and the maximum value Ywmax of $Yb(x, y)$ is defined as "1". The in-plane luminance distribution becomes nonuniform due to the light source position of the backlight, the optical film characteristic, and the like in the case of a liquid crystal panel and due to the film-thickness distribution and the like of the light emission layer in the case of an organic EL.

Figure 31:
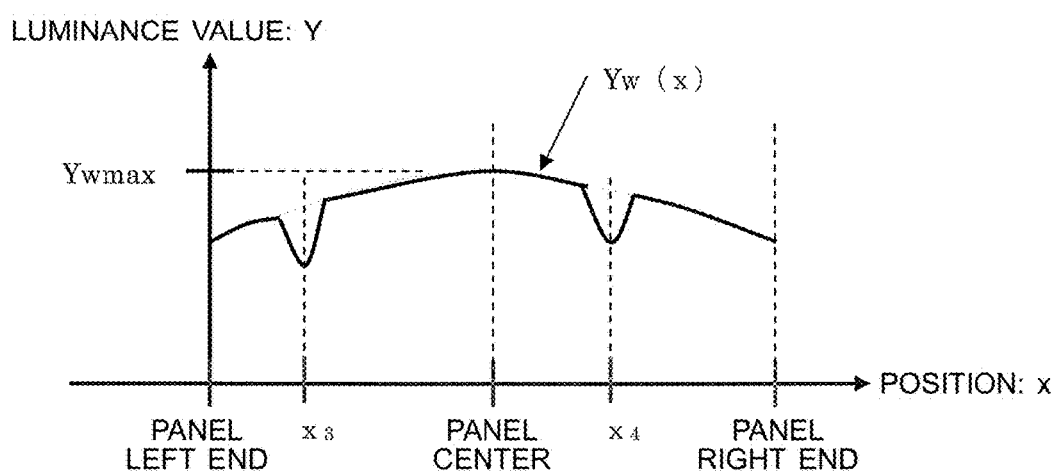
FIG. 31 is a chart showing a luminance profile of an observed image projected from a typical stereoscopic display panel (with luminance fluctuation by 3D moiré)

FIG. 31 shows $Yw(x, y)$ of the stereoscopic display panel 108$a$ of the case having the in-plane luminance distribution shown in FIG. 30. In such case, there are two methods for calculating the luminance adjustment amount $\alpha(x, y)$.

Figure 32:
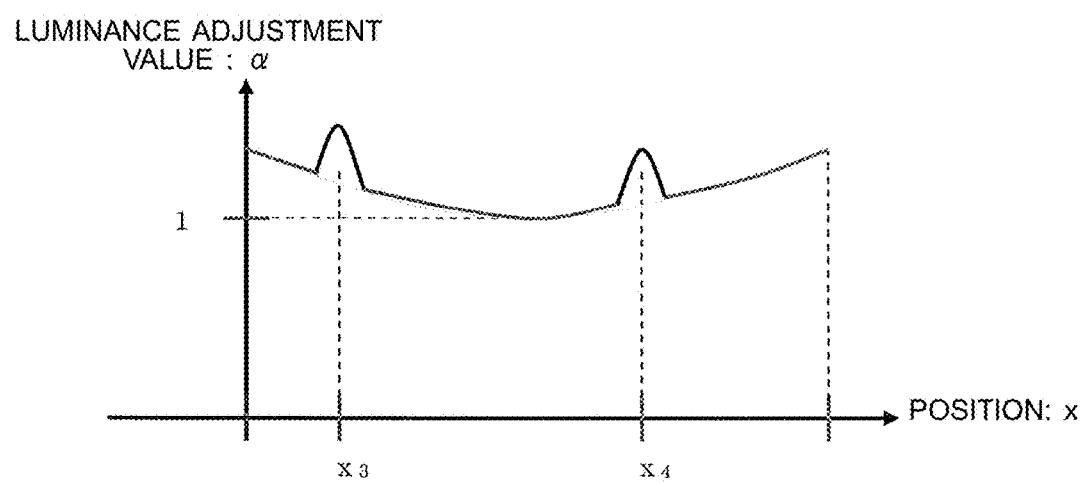
FIG. 32 is a chart showing the luminance adjustment amount for the observed image of FIG. 31.

The first calculation method is a method using Formula (6). FIG. 32 shows the luminance adjustment amount $\alpha(x, y)$ calculated by this method. With this method, the luminance adjustment amount $\alpha(x, y)$ is calculated by using only the luminance maximum value Ywmax of the stereoscopic display panel 108$a$. As a result, the luminance adjustment amount becomes a parameter for correcting not only the luminance fluctuation by the 3D moiré but also the in-plane luminance distribution resulted from the backlight and the like.

The second calculation method is a method using Formula (10).

$$\alpha(x,y)=Yb(x,y)/Yw(x,y) \qquad \text{Formula (10)}$$

Figure 33:
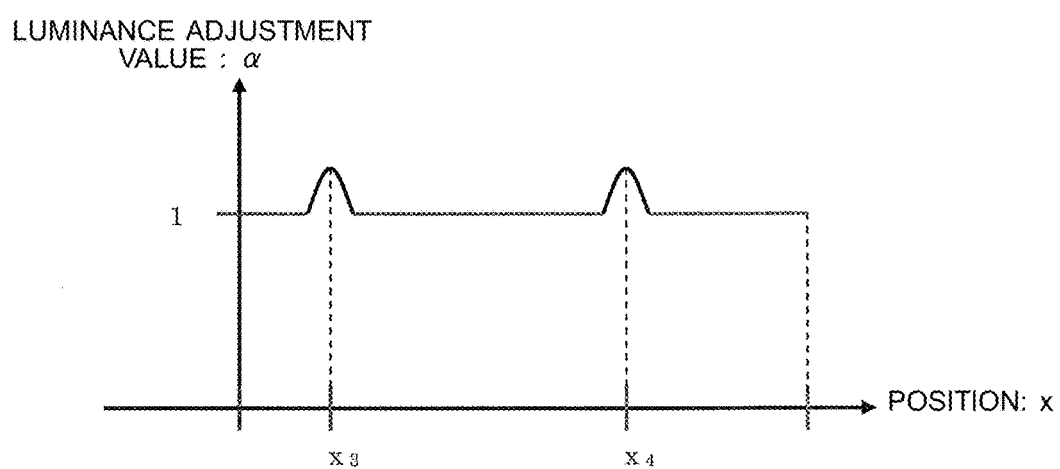
FIG. 33 is a chart showing the luminance adjustment amount for the observed image of FIG. 31.

FIG. 33 shows the luminance adjustment amount $\alpha(x, y)$ calculated by this method. With this method, the luminance adjustment amount $\alpha(x, y)$ is calculated by using the in-plane luminance distribution $yb(x, y)$ of the stereoscopic display panel 108$a$. Therefore, the luminance adjustment amount becomes a parameter for correcting only the luminance fluctuation by the 3D moiré.

When the luminance difference is small as the in-plane luminance distribution, both the first and the second calculation methods are effective. However, when there is a large luminance difference, the value of the luminance adjustment amount $\alpha(x, y)$ becomes too large with the first calculation method. Thus, gradation may not be expressed because of blown out highlights generated due to the luminance adjustment processing of the image data. The second calculation method is effective as a method for preventing such blown out highlights.

The first exemplary embodiment shows the case where the luminance value of the luminance characteristic data (FIG. 4) is decreased in the boundary between the display area of the R image and the display area of the L image. However, there are cases where the luminance value is decreased also in the center part of the display areas of the R image and the L image as in the luminance characteristic data shown in FIG. 34 due to the differences in the display modes of the electro-optical module constituting the stereoscopic display panel 108$a$ and the device structure such as the pixel shape. An example of overcoming such issue will be described as a modification example of the first exemplary embodiment.

Figure 34:
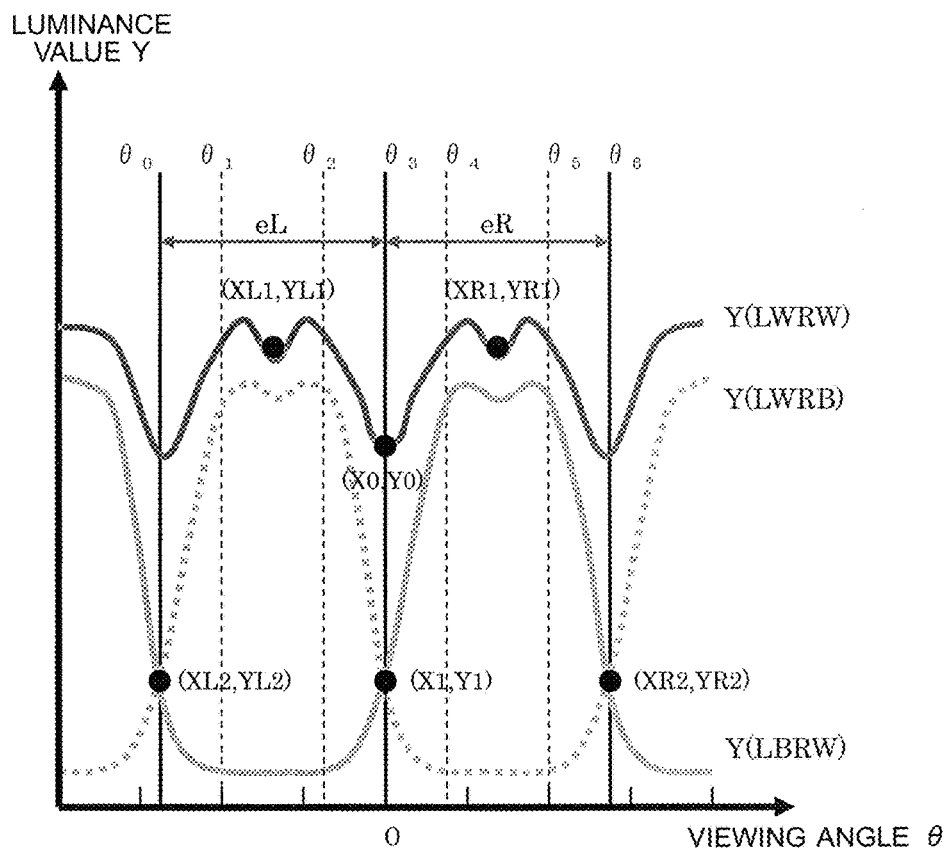
FIG. 34 is a chart showing luminance characteristic data of a stereoscopic display panel (luminance value is decreased in the center part of $\theta_1$ to $\theta_2$)
Figure 35A:
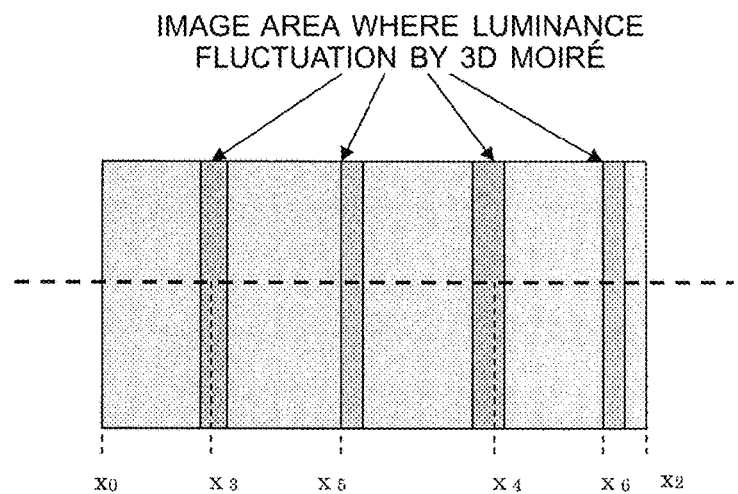
FIG. 35A is a relational chart of an observed image at position C.

In a case where the stereoscopic display panel 108$a$ having the device characteristic of the luminance characteristic data shown in FIG. 34 is used, the period of the luminance fluctuation by the 3D moiré and the image area thereof are increased in the observed image at the position C of FIG. 6 as shown in FIG. 35A unlike the case of FIG. 10A. The decrease in the luminance value in the center part of the display area is smaller than the decrease in the luminance value in the boundary between the display areas, so that the decrease in the luminance value at the positions $x_5$ and $x_6$ in FIG. 35A becomes smaller than the decrease in the luminance value at the positions $x_3$ and $x_4$. Further, FIG. 35B shows the luminance profile for the positions in the X-axis direction in the observed image (FIG. 35A).

Figure 35B:
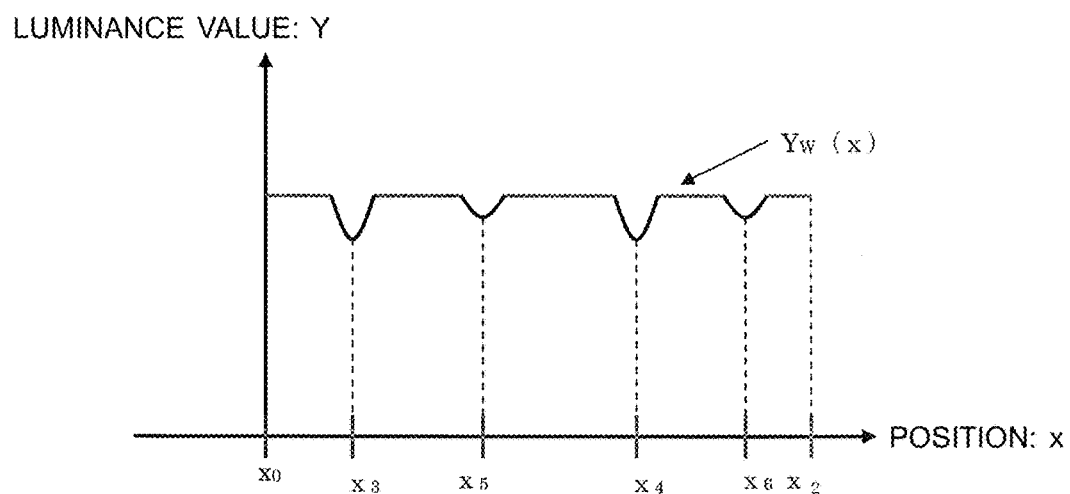
FIG. 35B illustrates the luminance profile.
Figure 36:
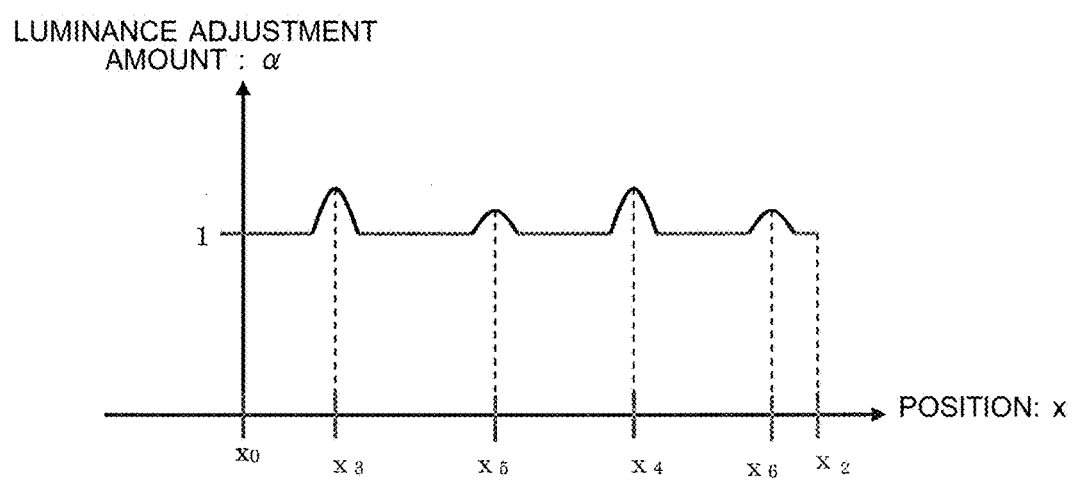
FIG. 36 is a chart showing the luminance adjustment amount at position C.

FIG. 36 shows the result acquired by calculating the luminance adjustment amount from the luminance profile of FIG. 35B. As the method for calculating the luminance adjustment amount, as in the above case, the maximum luminance value Ywmax where the luminance value of the luminance profile becomes maximum is defined as "1", and the luminance adjustment amount is calculated in such a manner that the other luminance value Yw becomes the same value as that of the Ywmax.

In the luminance characteristic data of the stereoscopic image display device 11 according to the first exemplary embodiment, a case of projecting images of two different viewpoints (L image, R image) from the stereoscopic display panel 108$a$ is shown. However, the number of viewpoints is not limited to two. Images of multi-viewpoints may be projected from the stereoscopic display panel. In a case where the images of multi-viewpoints are to be projected, the luminance characteristic data thereof changes. However, it is possible to provide the stereoscopic image display device and the stereoscopic image processing method with which the influence of the luminance fluctuation by the 3D moiré is lightened so that a sense of discomfort is not felt by the observer even when the observing position of the observer is shifted, through performing the luminance adjustment processing by calculating the luminance adjustment amount as in the case of the two viewpoints.

In other words, the stereoscopic image display device according to the first exemplary embodiment includes: the observer position measuring unit which measures the observing position of the observer; the relative position calculating unit which calculates the relative position between the observing position of the observer and the position of the stereoscopic display panel; the device characteristic data saving unit which saves the device characteristic data for the relative position of the stereoscopic display panel; the 3D moiré image area calculating unit which calculates the image area where the luminance fluctuation by the 3D moiré is generated for the relative position based on the device characteristic data; the luminance adjustment amount calculating unit which calculates the luminance adjustment amount suited for stereoscopic image display based on the device characteristic data for the image area calculated by the 3D moiré image area calculating unit; the image data saving unit which saves or receives the image data; the luminance adjustment processing unit which performs the luminance adjustment processing on the image data according to the luminance adjustment amount; and the stereoscopic display panel unit which projects the image data on which the luminance adjustment processing is performed to the right eye and the left eye according to the relative position.

The first exemplary embodiment can provide the stereoscopic image display device and the stereoscopic image processing method with which the influence of the luminance fluctuation by the 3D moiré is lightened so that a sense of discomfort is not felt by the observer even when the observing position of the observer is shifted, through performing the luminance adjustment processing on the image data according to the luminance adjustment amount calculated based on the relative position regarding the observing position of the observer and position of the stereoscopic display panel and based on the device characteristic data.

As an exemplary advantage according to the invention, the present invention can provide a stereoscopic image display device of a high picture quality and the like with which the influence of the luminance fluctuation by the 3D moiré is lightened so that a sense of discomfort is not felt by the observer even when the relative position of the observing position of the observer and the stereoscopic display panel position is shifted.

Second Exemplary Embodiment

With a second exemplary embodiment, the image area where gradation cannot be expressed because of blown out highlights generated due to the luminance adjustment processing is decreased through changing the gradation scale for the gradation value of the image data by referring to the gradation value of the image data before performing the luminance adjustment processing on the image data. It is an exemplary object thereby to provide a stereoscopic image display device and a stereoscopic image processing method with which the influence of the luminance fluctuation by the 3D moiré is lightened so that a sense of discomfort is not felt by the observer even when the observing position of the observer is shifted, while keeping the image quality of the image data.

Figure 37:
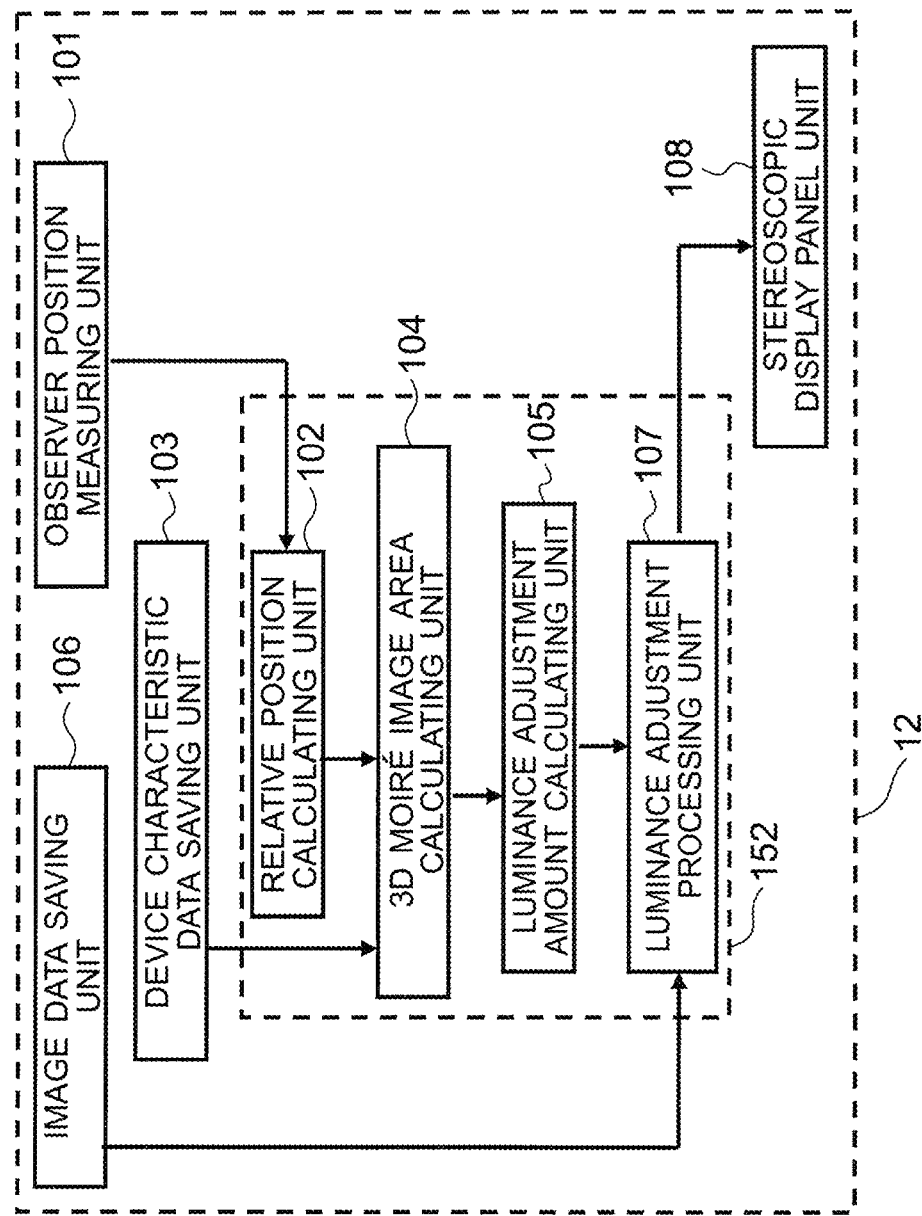
FIG. 37 is a block diagram of a stereoscopic image display device according to a second exemplary embodiment.

FIG. 37 is a block diagram of a stereoscopic image display device 12. The stereoscopic image display device 12 includes: an observer position measuring unit 101; a relative position calculating unit 102; a device characteristic data saving unit 103; a 3D moiré image area calculating unit 104; a luminance adjustment amount calculating unit 105; an image data saving unit 106; a luminance adjustment processing unit 107; and a stereoscopic display panel unit 108. Further, a processing unit that is an integration of the relative position calculating unit 102, the 3D moiré image area calculating unit 104, the luminance adjustment amount calculating unit 105; and the luminance adjustment processing unit 107 is referred to as an image processing unit 151.

Hereinafter, functions of each unit included in the stereoscopic image display device 12 will be described. The functions of the observer position measuring unit 101, the relative position calculating unit 102, the device characteristic data saving unit 103, the 3D moiré image area calculating unit 104, the luminance adjustment amount calculating unit 105, the image data saving unit 106, and the stereoscopic display panel unit 108 are the same as those of the first exemplary embodiment.

The luminance adjustment processing unit 107 according to the second exemplary embodiment performs the luminance adjustment processing on the image data according to the luminance adjustment amount calculated by the luminance adjustment amount calculating unit 105 and the gradation value of the image data saved in the image data saving unit 106. The luminance adjustment processing unit 107 according to the first exemplary embodiment performs the luminance adjustment processing for lightening the influence of the luminance fluctuation by the 3D moiré through increasing the gradation value of the image data saved in the image data saving unit 106. However, depending on the image data of the stereoscopic image content, the image data exceeds the maximum value (255 when the gradation data of the image data is of 8 bit) that can be gradation-expressed when the gradation value is increased. This results in generating blown out highlights, so that there is generated an image area that is not changed even when the luminance adjustment processing is performed.

Figure 38:
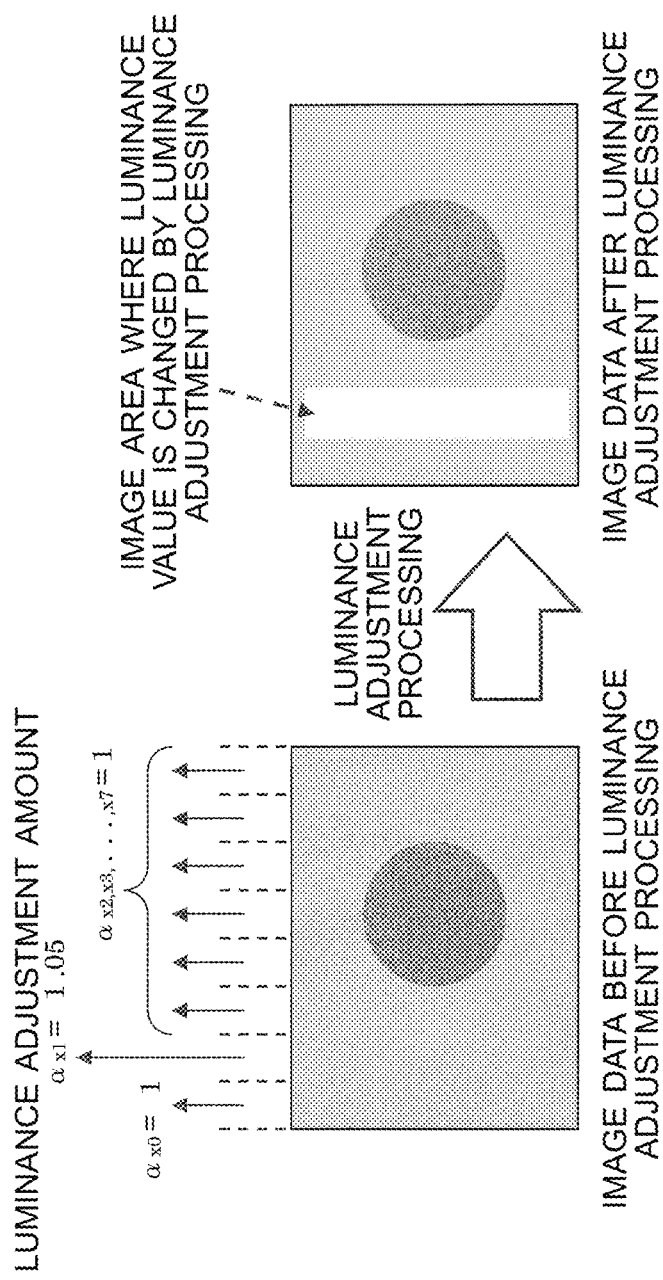
FIG. 38 is an illustration showing image data on which luminance adjustment processing is performed properly.
Figure 39:
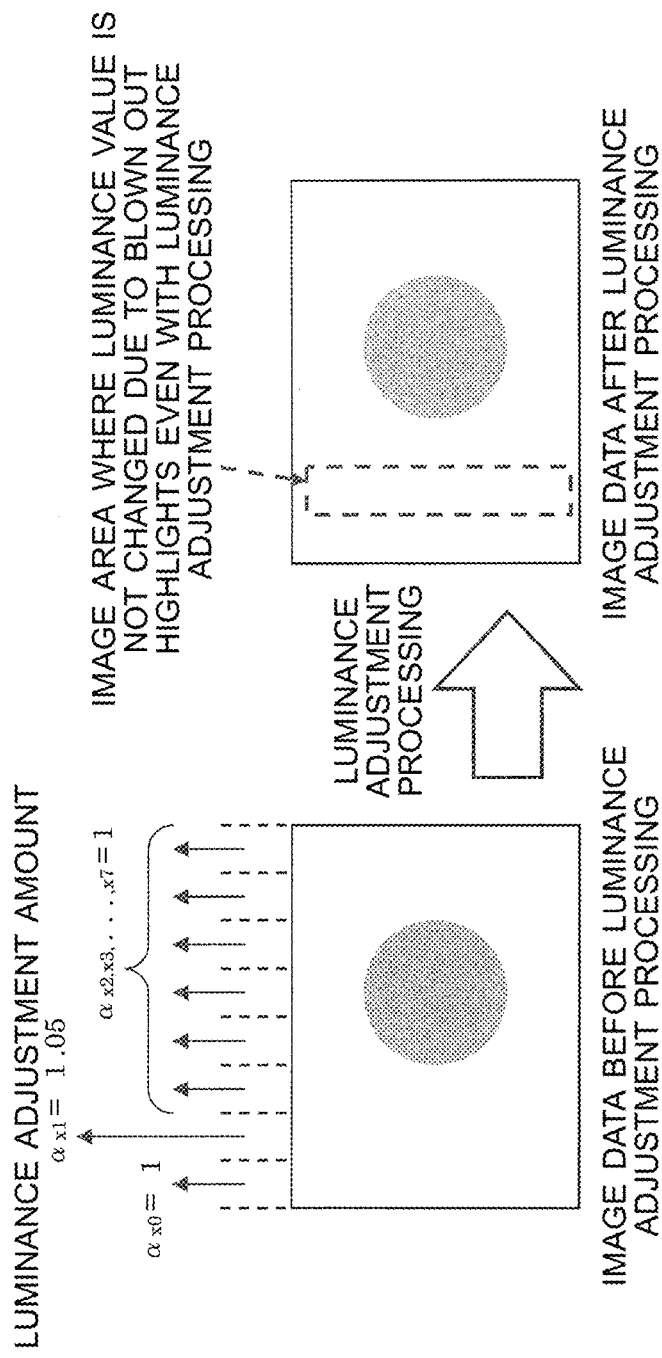
FIG. 39 is an illustration showing image data containing blown out highlights generated due to the luminance adjustment processing.

FIG. 38 shows the result of the image data on which the luminance adjustment processing is performed properly, and FIG. 39 shows the result of the image data with blown out highlights generated by the luminance adjustment processing. In FIG. 39, an image area where the gradation value does not change even when the luminance adjustment processing is performed appears, so that the influence of the luminance fluctuation by the 3D moiré appears in the observed image projected to the observer from the stereoscopic display panel even when the luminance adjustment processing is performed. Thus, with the second exemplary embodiment, when the gradation value of the image data exceeds the maximum value with which the gradation can be expressed when the luminance adjustment processing is performed, the gradation scale of the image data is changed.

Specifically, the maximum value Im where the gradation of the image data can be expressed is compared with the gradation maximum value Imax of the image data after the luminance adjustment processing is performed. When the gradation maximum value Imax is larger than the maximum value Im, the gradation value $I_j(u, v)$ saved at the pixel position (u, v) of the image data after performing the luminance adjustment processing is calculated by Formula (20). In the meantime, when the gradation maximum value Imax is smaller than the maximum value Im, the gradation value $I_j(u, v)$ is calculated by Formula (7) as in the case of the first exemplary embodiment.

$$I_j(u,v)=\alpha(x,y)\cdot I_d(u,v)\cdot Im/Imax \qquad \text{Formula (20)}$$

Figure 40:
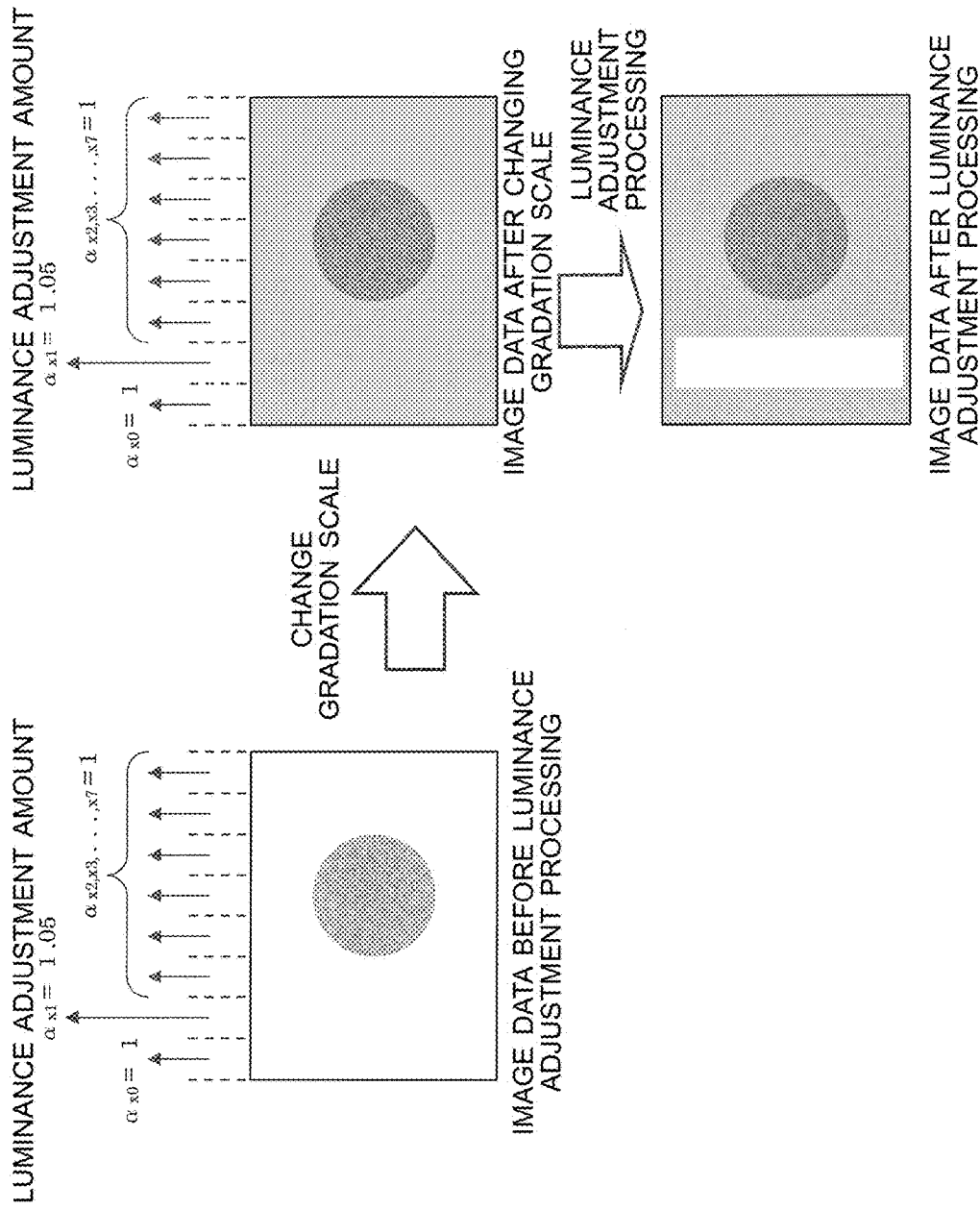
FIG. 40 is an illustration showing image data on which luminance adjustment processing is performed by changing a gradation scale.

FIG. 40 shows an example of the image data on which the luminance adjustment processing is performed after changing the gradation expression scale of the image data. Through changing the gradation scale of the image data before performing the luminance adjustment processing, it is possible to reduce the image area where the luminance value does not increase because of blown out highlights of the gradation value of the image data even when the luminance adjustment processing is performed and to lighten the influence of the luminance fluctuation by the 3D moiré appearing in the observed image that is projected to the observer from the stereoscopic display panel.

In the above, described is the case of preventing the blown out highlights generated due to the excess of the maximum value of the gradation of the image data by the luminance adjustment processing through changing the gradation expression scale of the image data. However, when the gradation value of the black side is not used in the image data of the stereoscopic image content, the gradation values of the image data may be decreased as a whole instead of changing the gradation expression scale of the image data.

Specifically, the maximum value Im where the gradation of the image data can be expressed is compared with the gradation maximum value Imax of the image data after the luminance adjustment processing is performed. When the gradation maximum value Imax is larger than the maximum value Im, the gradation value $I_f(u, v)$ saved at the pixel position (u, v) of the image data after performing the luminance adjustment processing is calculated by Formula (21).

$$I_f(u,v) = \alpha(x,y) \cdot I_d(u,v) - I\text{max} + Im \quad \text{Formula (21)}$$

In the manner described above, it is possible to reduce the image area where the luminance value does not increase due to blown out highlights generated in the image data with the luminance adjustment processing.

Further, the case of changing the gradation expression scale of the image data by referring to the gradation value of the image data of the stereoscopic image content for preventing generation of blown out highlights and the case of decreasing the gradation values of the image data as a whole are described above. However, in the case where the stereoscopic image content is a video such as a moving picture, it is desirable for the gradation value of the image data displayed at an arbitrary time and the gradation value of the image data to be displayed at a next time thereof to be about equivalent when the time continuity is taken into consideration. Thus, in a case where the stereoscopic image content is a video, the gradation scale of the image data may be set in advance to be small, for example, so that no blown out highlights occurs even when the gradation value is increased because of the luminance adjustment processing for preventing the gradation scale from being changed chronologically. Further, a new condition, e.g., gradation scale is changed when the blown out highlights generated within the image data is in 5% or more of the image area, may be added as the condition for changing the gradation scale of the image data for keeping the gradation scale to be constant.

As in the case of the first exemplary embodiment, the second exemplary embodiment can be applied to the stereoscopic display device of multi-viewpoints. Naturally, it is possible to provide the image processing unit 152 of the second exemplary embodiment as an individual image processing unit, and to achieve the function of the stereoscopic image display device 12 in combination with the stereoscopic display panel unit 108.

Figure 41:
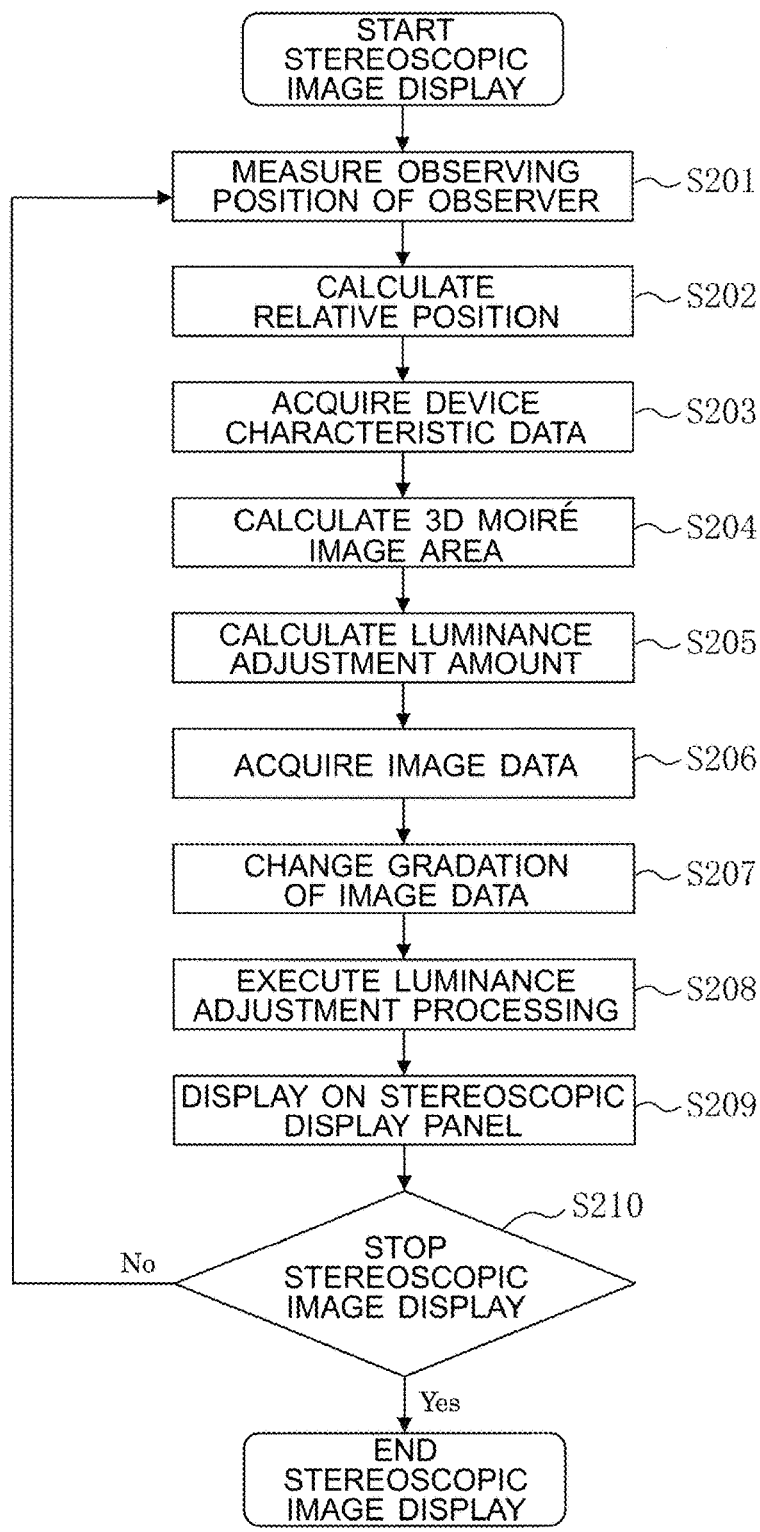
FIG. 41 is a flowchart f a stereoscopic image display method.

A flowchart of the stereoscopic image processing method used in the stereoscopic image display device 12 according to the second exemplary embodiment will be described by referring to FIG. 41.

Step S201 to step S206 are the same as step S101 to step S106 of the first exemplary embodiment.

In step S207, processing for changing the gradation value only or the gradation value and the gradation scale is performed as the gradation changing processing of the image data by using the luminance adjustment processing unit 107. When the value acquired by multiplying the gradation maximum value of the image data acquired in step S206 and the luminance adjustment amount calculated in step S205 exceeds the maximum value where the image data can be gradation-expressed, the image data gradation expression changing processing is performed. When it does not exceed the maximum value, the image data gradation expression changing processing is not performed. For the image data gradation expression changing processing, the gradation value of the image data is changed by Formula (20).

In step S208, the luminance adjustment processing is performed by using the luminance adjustment processing unit 107 on the image data on which the gradation value changing processing is performed in step S207 according to the luminance adjustment amount calculated in step S205.

In step S209 and step S210, the same processing executed in step S108 and step S109 according to the first exemplary embodiment is performed.

As described above, the image area where gradation cannot be expressed because of blown out highlights generated due to the luminance adjustment processing is decreased through changing the gradation scale for the gradation value of the image data by referring to the gradation value of the image data before performing the luminance adjustment processing on the image data. Thereby, it is possible to provide the stereoscopic image display device and the stereoscopic image processing method with which the influence of the luminance fluctuation by the 3D moiré is lightened so that a sense of discomfort is not felt by the observer even when the observing position of the observer is shifted, while keeping the image quality of the image data.

In other words, the stereoscopic image display device according to the second exemplary embodiment includes: the observer position measuring unit which measures the observing position of the observer; the relative position calculating unit which calculates the relative position between the observing position of the observer and the position of the stereoscopic display panel; the device characteristic data saving unit which saves the device characteristic data for the relative position of the stereoscopic display panel; the 3D moiré image area calculating unit which calculates the image area where the luminance fluctuation by the 3D moiré is generated for the relative position based on the device characteristic data; the luminance adjustment amount calculating unit which calculates the luminance adjustment amount suited for stereoscopic image display based on the device characteristic data for the image area calculated by the 3D moiré image area calculating unit; the image data saving unit which saves or receives the image data; the luminance adjustment processing unit which performs the luminance adjustment processing on the image data according to the luminance adjustment amount and the gradation value of the image data; and the stereoscopic display panel unit which projects the image data on which the luminance adjustment processing is performed to the right eye and the left eye according to the relative position.

With the second exemplary embodiment, the image area where gradation cannot be expressed because of blown out highlights generated due to the luminance adjustment processing is decreased through changing the gradation scale for the gradation value of the image data by referring to the gradation value of the image data when performing the luminance adjustment processing on the image data. Thereby, it is possible to provide the stereoscopic image display device and the stereoscopic image processing method with which the influence of the luminance fluctuation by the 3D moiré is lightened so that a sense of discomfort is not felt by the observer even when the observing position of the observer is shifted, while keeping the gradation expression of the image data.

Third Exemplary Embodiment

It is an exemplary object of a third exemplary embodiment to provide a stereoscopic image display device and a stereoscopic image processing method with which the influence of the luminance fluctuation by the 3D moiré is lightened so that a sense of discomfort is not felt by the observer even when the environmental temperature under which the stereoscopic image display device is used changes, through performing the luminance adjustment processing appropriate for the temperature.

Figure 42:
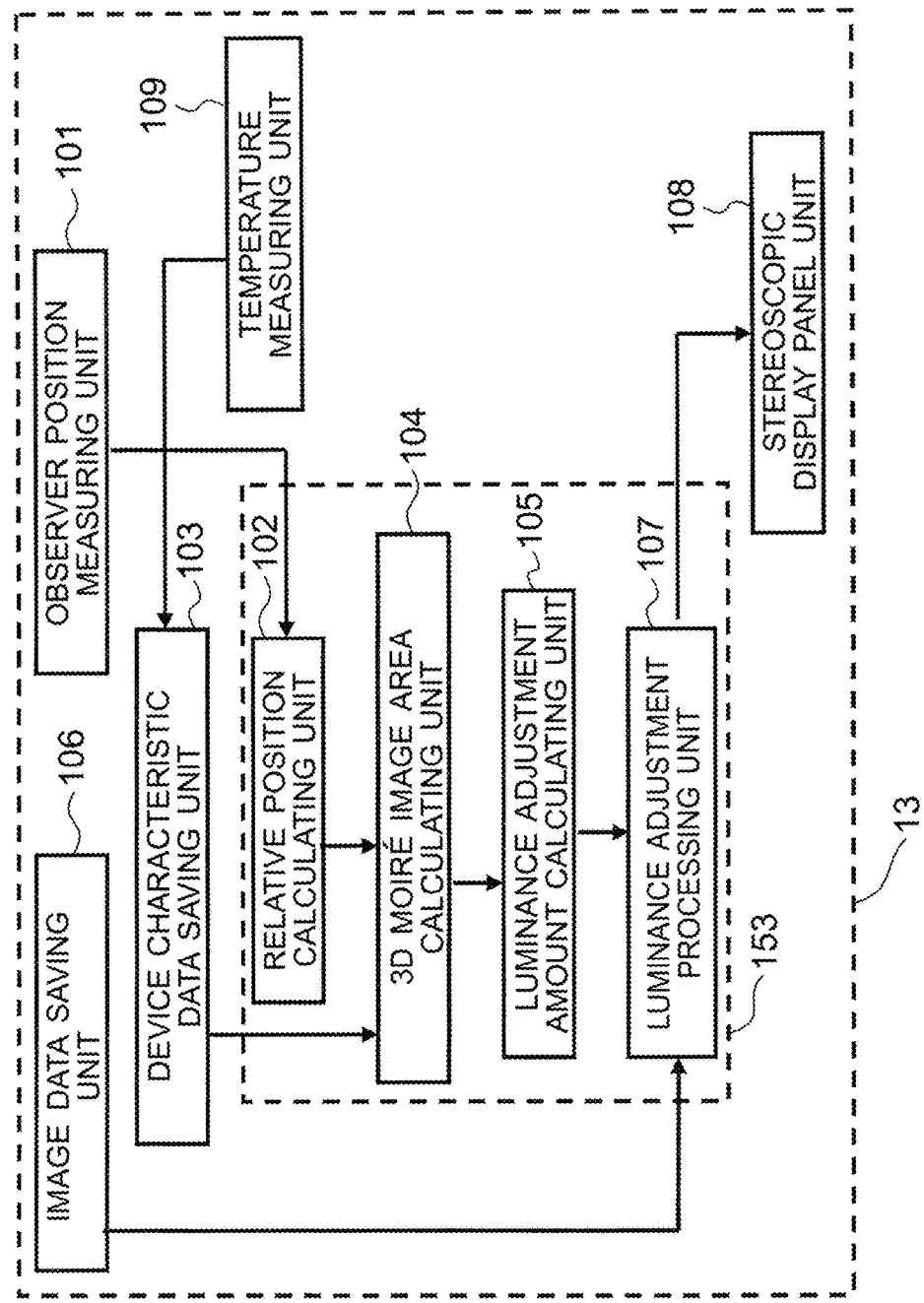
FIG. 42 is block diagram showing a stereoscopic image display device according to a third exemplary embodiment.

FIG. 42 is a block diagram of a stereoscopic image display device 13. The stereoscopic image display device 13 includes: an observer position measuring unit 101; a relative position calculating unit 102; a device characteristic data saving unit 103; a 3D moiré image area calculating unit 104; a luminance adjustment amount calculating unit 105; an image data saving unit 106; a luminance adjustment processing unit 107; a stereoscopic display panel unit 108; and a temperature measuring unit 109. Further, a processing unit that is an integration of the relative position calculating unit 102, the 3D moiré image area calculating unit 104, the luminance adjustment amount calculating unit 105, and the luminance adjustment processing unit 107 is referred to as an image processing unit 153.

Hereinafter, functions of each unit included in the stereoscopic image display device 13 will be described. The functions of the observer position measuring unit 101, the relative position calculating unit 102, the luminance adjustment amount calculating unit 105, the image data saving unit 106, the luminance adjustment processing unit 107, and the stereoscopic display panel unit 108 are the same as those of the first exemplary embodiment.

The temperature measuring unit 109 has a function which measures the temperature of the stereoscopic image display device 13. The lenticular lens 3 (see FIG. 45, for example) can be made with an inorganic material such as glass. However, it is often made with an organic material such as engineering plastic, typically polymethyl methacrylate (PMMA), cyclopoly olefin (COP), and polycarbonate (PC), because of the production cost. Therefore, when the environmental temperature under which the stereoscopic image display device is used changes, the positional relation between the lenticular lens 3 and the display panel 2 fluctuates due to the difference between the material of the lenticular lens 3 made with a plastic material and the material of the display panel 2 (see FIG. 45, for example) that normally uses a glass substrate, i.e., difference between the thermal expansion coefficients of a plastic material and a glass material.

FIG. 43 shows the luminance characteristic data of a case where the temperature drops, and FIG. 44 shows the luminance characteristic data of a case where the temperature increases. When the temperature drops, the lenticular lens 3 is contracted with respect to the display panel 2. Thus, the luminance characteristic data in the left end and the right end of the stereoscopic display panel 108a changes as the point (X1', Y1') with respect to the point (X1, Y1) of the normal temperature as shown in FIG. 43, so that the value of the viewing angle |δ| is increased. On the contrary, when the temperature increases, the lenticular lens 3 is expanded with respect to the display panel 2. Thus, the luminance characteristic data in the left end and the right end of the stereoscopic display panel 108a changes as the point (X1", Y1") with respect to the point (X1, Y1) of the normal temperature as shown in FIG. 44, so that the value of the viewing angle |δ| is decreased.

Changes of the right-eye area and the left-eye area for the environmental temperature will be described in FIG. 45 and FIG. 46 by using the optical model charts of the stereoscopic display panel 108a based on the luminance characteristic data of FIG. 43 and FIG. 44.

Figure 45:
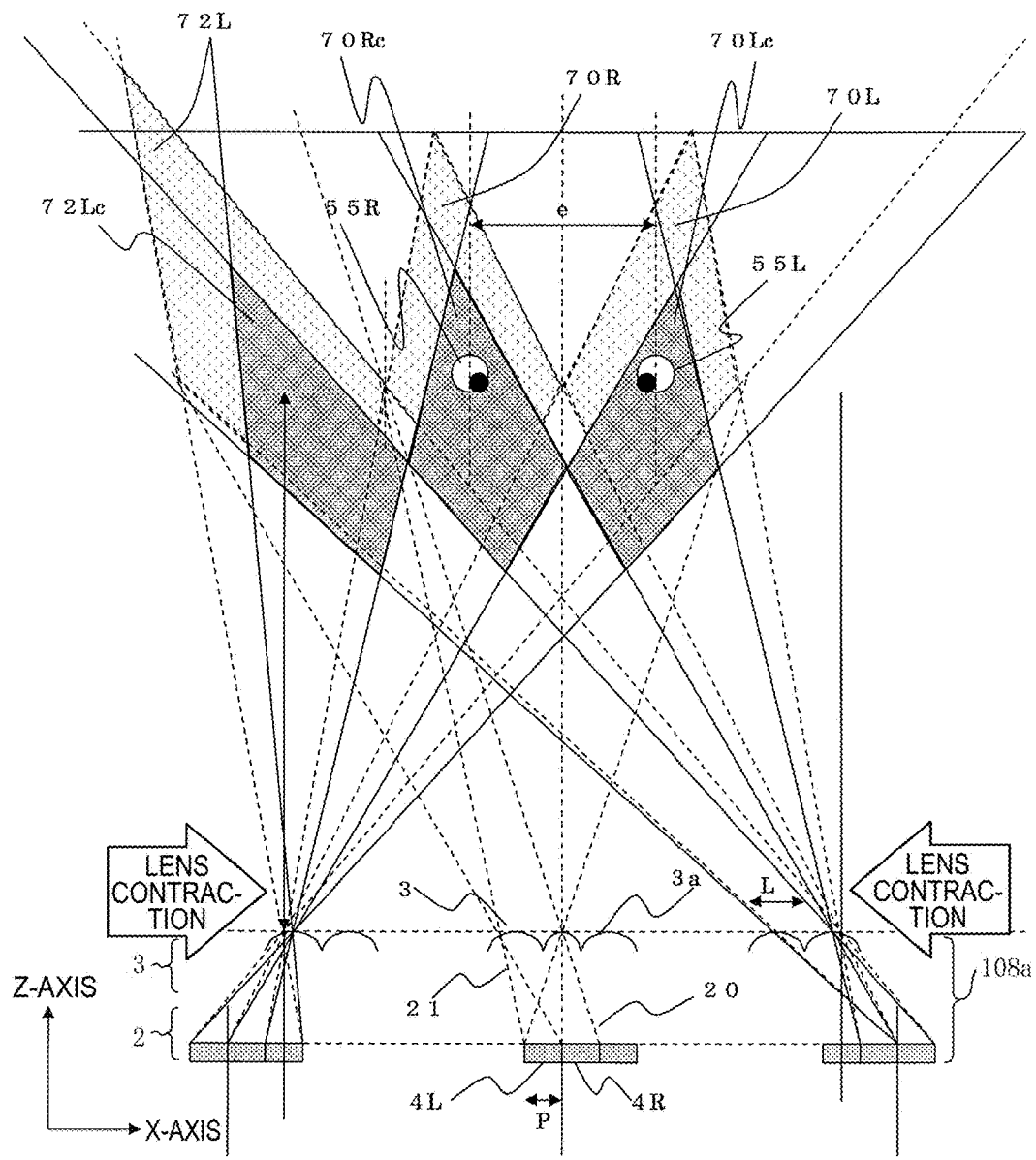
FIG. 45 is an optical model chart at low temperatures.

FIG. 45 shows the optical model chart of the stereoscopic display panel 108a when the temperature drops. The refraction of the light ray in the external end of the display panel 2 becomes large in accordance with the contraction of the lenticular lens 3, and |δ| described above is increased. Thus, when the spatial positions of the right-eye area 70R and the left-eye area 70L under the normal environmental temperature is compared with the right-eye area 70R, and the left-eye area 70L_c under the environmental temperature dropped from the normal temperature, it can be found that the right-eye area and the left-eye area become closer to the stereoscopic display panel 108a as the environmental temperature drops. In FIG. 45, cylindrical lenses 3a, 3b, light rays 20, 21, left-eye area 72L, and the like are illustrated.

Figure 46:
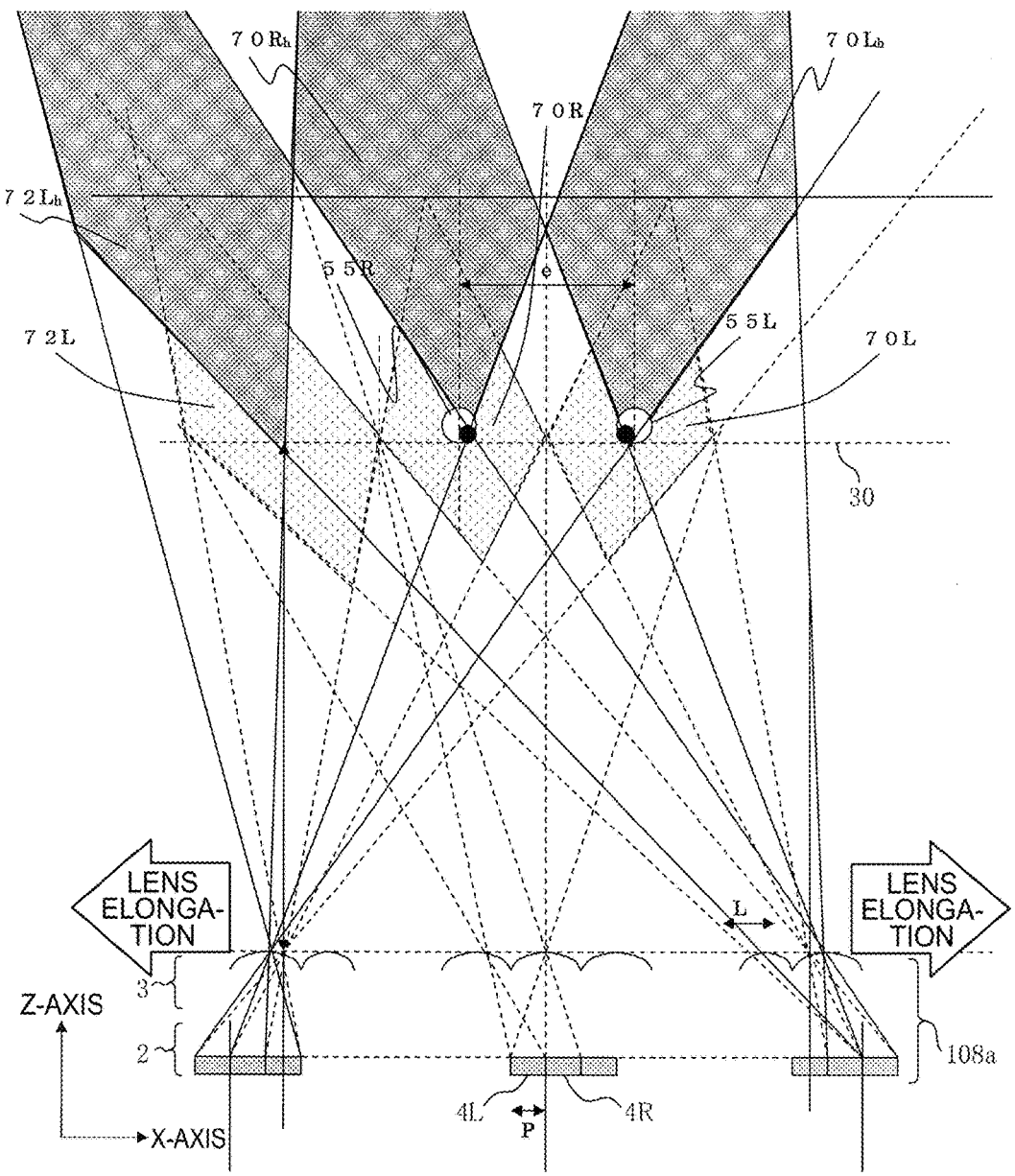
FIG. 46 is an optical model chart at high temperatures.

FIG. 46 shows the optical model chart of the stereoscopic display panel 108a when the temperature increases. The refraction of the light ray in the external end of the display panel 2 becomes small in accordance with the elongation of the lenticular lens 3, and 161 described above is decreased. Thus, when the spatial positions of the right-eye area 70R and the left-eye area 70L under the normal environmental temperature is compared with the right-eye area 70R_h and the left-eye area 70L_h under the environmental temperature increased from the normal temperature, it can be found that the right-eye area and the left-eye area become farther from the stereoscopic display panel 108a as the environmental temperature increases.

In the third exemplary embodiment, the luminance adjustment processing is performed by considering the influence of the changes in the optical model of the stereoscopic display panel 108a caused in accordance with the changes in the environmental temperature. The temperature measuring unit 109 grasps the state of the optical model of the stereoscopic display panel 108a in accordance with the temperature changes by measuring the temperatures in the vicinity of the stereoscopic display panel 108a. For measuring the temperatures, a widely-used resistance thermometer or the like can be used. Through providing the thermometer to the stereoscopic image display device 13, the environmental temperature of the stereoscopic display panel 108a can be measured.

The device characteristic data saving unit 103 shown in FIG. 42 saves in advance the luminance characteristic data corresponding to the environmental temperature under which the stereoscopic image display device 13 is used. As an example of the data, it is possible to employ arbitrary content for the data depending on the use of the stereoscopic image display device 13, e.g., the luminance characteristic data regarding the environmental temperatures of every 5 degrees in a range of −20 degrees to 60 degrees. Further, it is also possible to provide a program which saves in advance necessary parameters for calculating the luminance characteristic data and finds the luminance characteristic data according to the environmental temperature. As examples of the parameter, it is possible to use the effective linear expansion coefficient of the lenticular lens 3 provided to the display panel 2, the panel size, the panel resolution, and the like.

The 3D moiré image area calculating unit 104 shown in FIG. 42 acquires the luminance characteristic data corresponding to the temperature measured by the temperature measuring unit 109 from the device characteristic data saving unit 103, and calculates the image area where the luminance fluctuation due to the 3D moiré occurs based on the luminance characteristic data. The calculation of the image area is performed in the same manner as in the case of the first exemplary embodiment to detect the observed image projected to the relative position. Through performing the processing thereafter in the same manner as that of the first exemplary embodiment to calculate the luminance adjustment amount from the observed image, the luminance adjustment processing appropriate for the environmental temperature under which the stereoscopic image display device 13 is used can be performed.

As in the case of the first exemplary embodiment, the third exemplary embodiment can be applied to the stereoscopic display device of multi-viewpoints. Naturally, it is possible to provide the image processing unit 153 of the third exemplary embodiment as an individual image processing unit, and to achieve the function of the stereoscopic image display device 13 in combination with the stereoscopic display panel unit 108.

Figure 47:
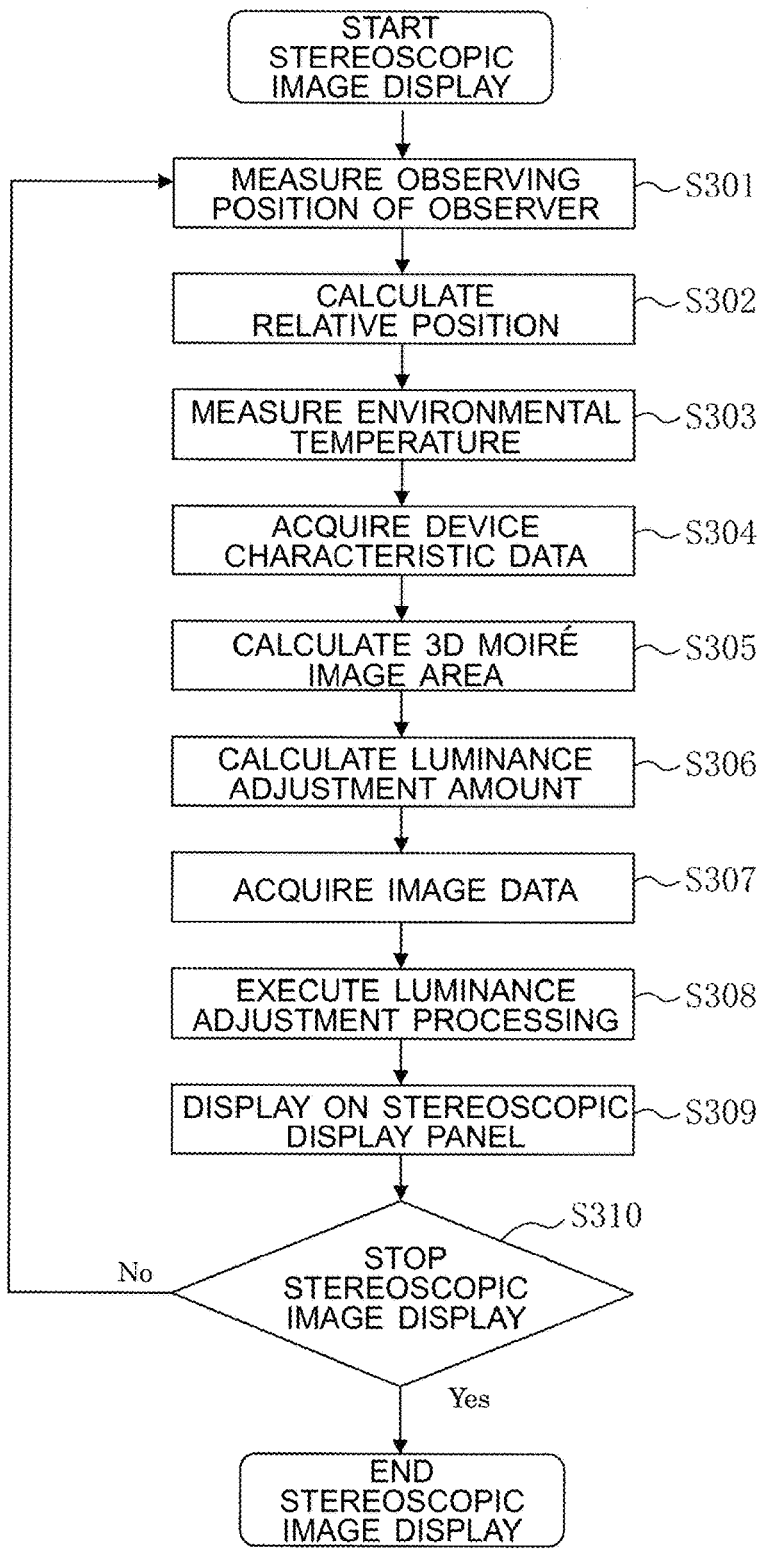
FIG. 47 is a flowchart of a stereoscopic image processing method.

A flowchart of the stereoscopic image processing method used in the stereoscopic image display device 13 according to the third exemplary embodiment will be described by referring to FIG. 47.

In step S301 and step S302, the same processing as in the first exemplary embodiment is performed.

In step S303, the temperature in the vicinity of the stereoscopic display panel 108a is measured by the temperature measuring unit 109.

In step S304, the device characteristic data corresponding to the temperature measured in step S303 is acquired from the device characteristic data saving unit 103.

In step S305 to step S310, the same processing executed in step S104 to step S109 according to the first exemplary embodiment is performed.

As described above, it is possible to provide the stereoscopic image display device and the stereoscopic image processing method with which the influence of the luminance fluctuation by the 3D moiré is lightened so that a sense of discomfort is not felt by the observer even when the environmental temperature under which the stereoscopic image display device 13 is used changes, through performing the luminance adjustment processing appropriate for the temperature.

In other words, the stereoscopic image display device according to the third exemplary embodiment includes: the observer position measuring unit which measures the observing position of the observer; the relative position calculating unit which calculates the relative position between the observing position of the observer and the position of the stereoscopic display panel; the device characteristic data saving unit which saves the device characteristic data for the relative position of the stereoscopic display panel; the 3D moiré image area calculating unit which calculates the image area where the luminance fluctuation by the 3D moiré is generated for the relative position based on the device characteristic data; the luminance adjustment amount calculating unit which calculates the luminance adjustment amount suited for stereoscopic image display based on the device characteristic data for the image area calculated by the 3D moiré image area calculating unit; the image data saving unit which saves or receives the image data; the luminance adjustment processing unit which performs the luminance adjustment processing on the image data according to the luminance adjustment amount; the stereoscopic display panel unit which projects the image data on which the luminance adjustment processing is performed to the right eye and the left eye according to the relative position; and the temperature measuring unit which measures the use environment temperature.

With the third exemplary embodiment, the luminance adjustment processing appropriate for the environmental temperature under which the stereoscopic image display device is used is achieved through calculating the luminance adjustment amount by considering the use environment temperature and the temperature characteristic data of the stereoscopic display panel in addition to the observing position of the observer and the device characteristic data. Thereby, it is possible to provide the stereoscopic image display device and the stereoscopic image processing method with which the influence of the luminance fluctuation by the 3D moiré is lightened even when the observing position of the observer is shifted, so that a sense of discomfort is not felt by the observer even when the environmental temperature under which the stereoscopic image display device is used changes, through performing the luminance adjustment processing appropriate for the temperature.

Fourth Exemplary Embodiment

It is an exemplary object of a fourth exemplary embodiment to provide a stereoscopic image display device and a stereoscopic image processing method with which the influence of the luminance fluctuation by the 3D moiré is lightened by correcting a position shift even when the observing position of the observer is shifted, so that a sense of discomfort is not felt by the observer even when the position shift is generated between the image area where the luminance fluctuation by the 3D moiré appears and the image area where the luminance adjustment processing is performed, through shifting the image area on which the luminance adjustment processing is performed by referring to the shift speed of the relative position.

Figure 48:
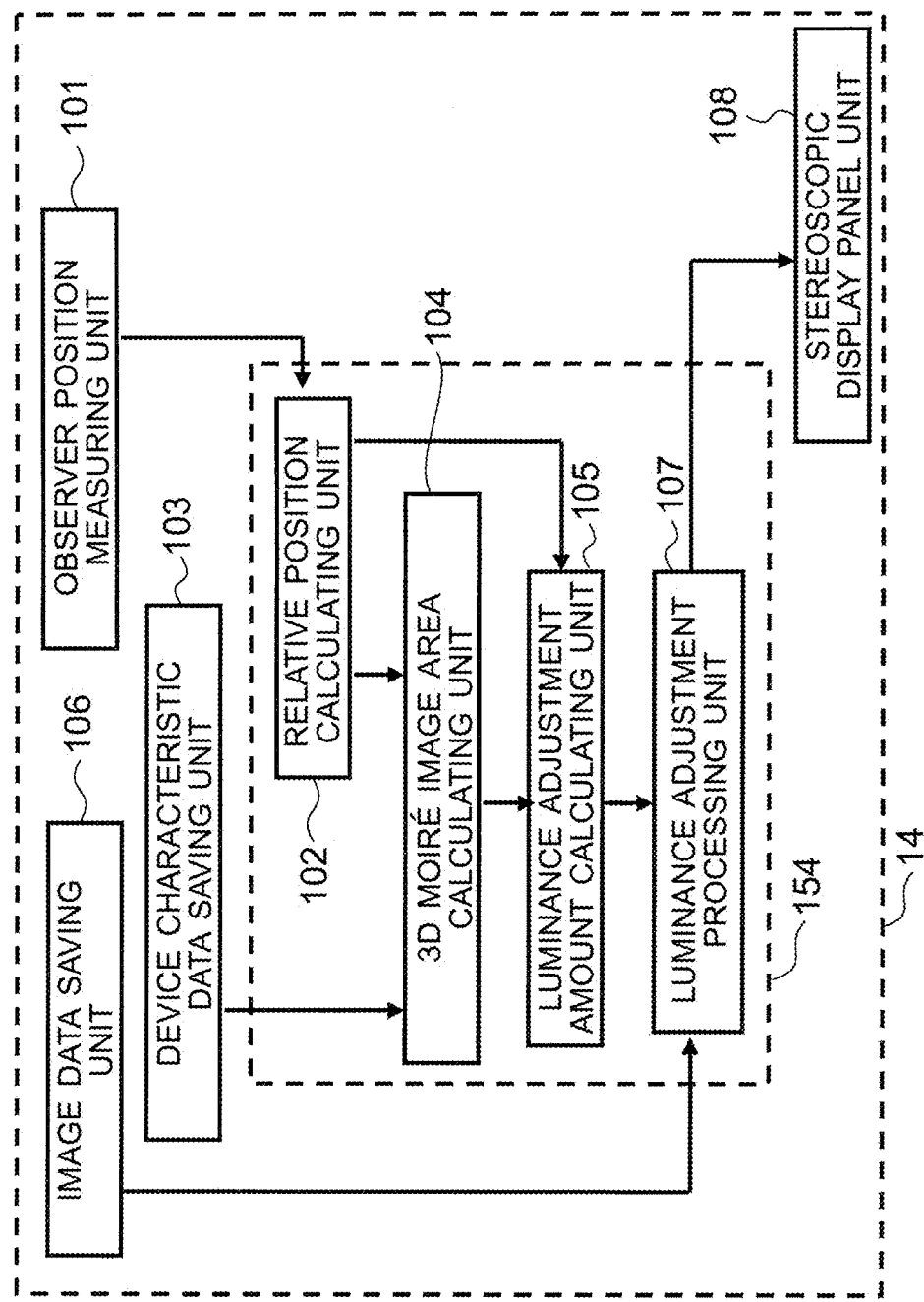
FIG. 48 is block diagram showing a stereoscopic image display device according to a fourth exemplary embodiment.

FIG. 48 is a block diagram of a stereoscopic image display device 14. The stereoscopic image display device 14 includes: an observer position measuring unit 101; a relative position calculating unit 102; a device characteristic data saving unit 103; a 3D moiré image area calculating unit 104; a luminance adjustment amount calculating unit 105; an image data saving unit 106; a luminance adjustment processing unit 107; and a stereoscopic display panel unit 108 which projects the image data on which the luminance adjustment processing is performed to the right eye and the left eye according to the relative position. Further, a processing unit that is an integration of the relative position calculating unit 102, the 3D moiré image area calculating unit 104, the luminance adjustment amount calculating unit 105, and the luminance adjustment processing unit 107 is referred to as an image processing unit 154.

Hereinafter, functions of each unit included in the stereoscopic image display device 14 will be described. The functions of the observer position measuring unit 101, the relative position calculating unit 102, the device characteristic data saving unit 103, the 3D moiré image area calculating unit 104, the image data saving unit 106, the luminance adjustment processing unit 107, and the stereoscopic display panel unit 108 are the same as those of the first exemplary embodiment.

The luminance adjustment amount calculating unit 105 calculates the luminance adjustment amount from the 3D moiré image area (image area where the luminance fluctuation by the 3D moiré appears) calculated by the 3D moiré image area calculating unit 104 by referring to the shift speed of the relative position calculated by the relative position calculating unit 102.

In order to lighten the influence of the luminance fluctuation by the 3D moiré, it is necessary to perform the luminance adjustment processing by precisely targeted on the position of the 3D moiré image area. The 3D moiré image area changes depending on the relative position. When the shift speed of the relative position is fast, delay is generated by the measurement processing executed by the observer position measuring unit 101 and the luminance adjustment processing of the image data. Thus, there may be cases where there is a position shift generated between the 3D moiré image area and the image area where the luminance fluctuation is to be lightened by the luminance adjustment processing.

Figure 49A:
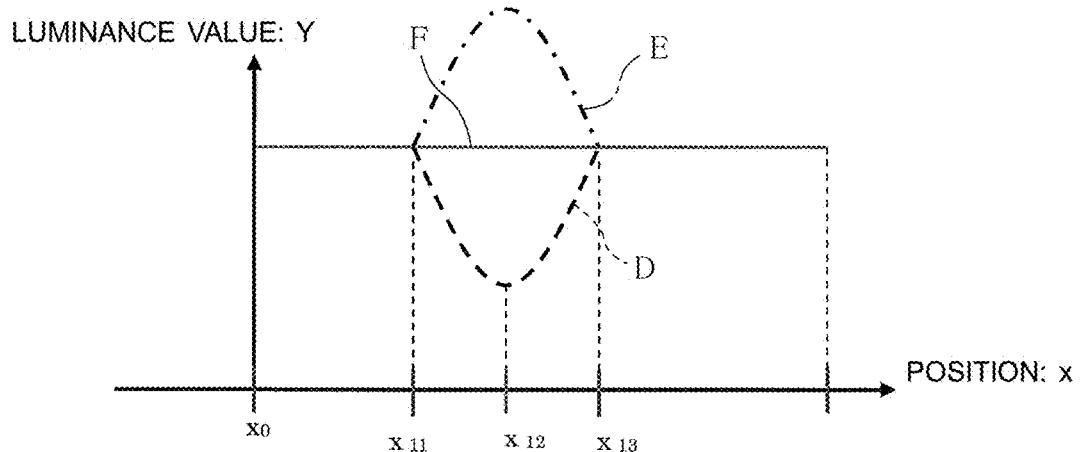
FIGS. 49A and 49B are charts of luminance profiles according to existence of position shift in an image area at slow shift speed and fast shift speed, respectively.
Figure 49B:
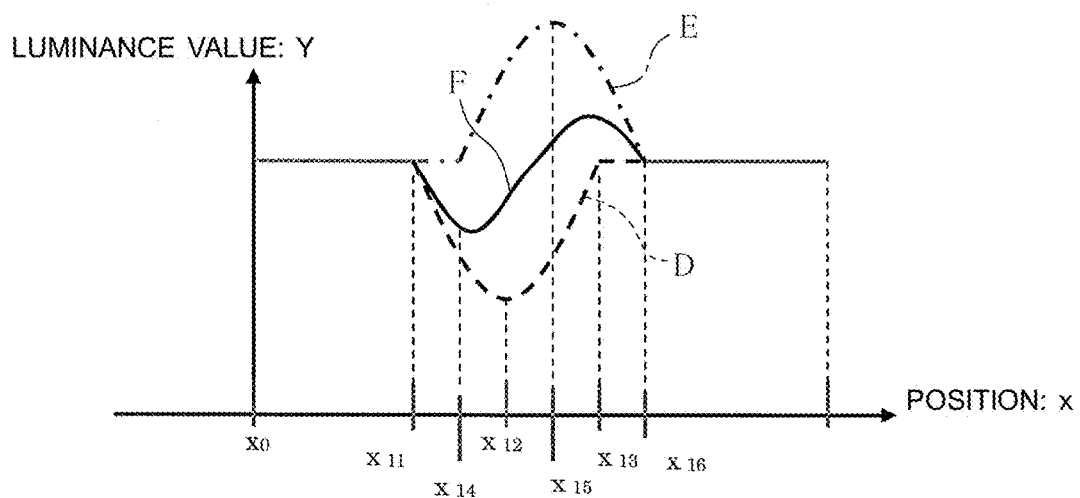

FIG. 49 shows examples where there is a position shift generated between the 3D moiré image area and the image area where the luminance adjustment processing is performed. FIG. 49A shows an example of a luminance profile of an observed image after performing the luminance adjustment processing when a position shift is not generated in the image area because the shift speed of the relative position is slow. FIG. 49B shows an example of a luminance profile of an observed image after performing the luminance adjustment processing when a position shift is generated in the image area because the shift speed of the relative position is fast. D, E, and F in FIG. 49A and FIG. 49B are as follows. A dotted line of D (dotted line where the luminance value falls on the lower side) shows the luminance profile (D) by the 3D moiré. An alternate short and long dash line of E (alternate short and long dash line where the luminance value swells on the upper side) shows the luminance profile (E) originated from the image data after the luminance adjustment processing is performed. A solid line of F shows the luminance profile (F) of the observed image acquired by projecting the image data after the luminance adjustment processing is performed to the observing position of the observer from the stereoscopic display panel 108a.

Originally, the position $x_{15}$ on the X-axis where the luminance profile (E) originated from the luminance-adjusted image data shown in FIG. 49B becomes maximum is the same position as the position $x_{12}$ on the X-axis where the luminance profile (D) by the 3D moiré becomes minimum. However, the luminance adjustment processing is delayed because the shift position of the relative position is fast, thereby generating a position shift. As described above, when the position shift is generated between the 3D moiré image area and the image area where the luminance adjustment processing is performed, the influence of the luminance fluctuation by the 3D moiré remains as in FIG. 49B even when the luminance adjustment processing is performed.

Figure 50:
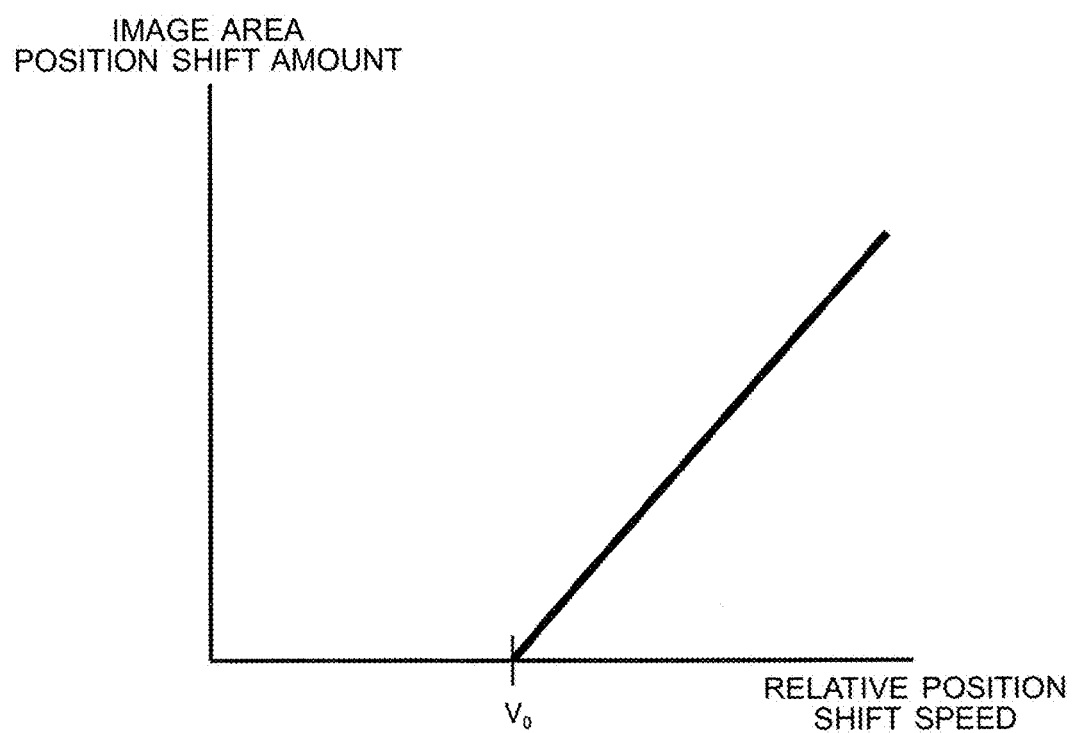
FIG. 50 is a relational chart regarding the shift speed of the relative position and the position shift amount of the image area.

The luminance adjustment amount calculating unit 105 according to the fourth exemplary embodiment calculates the luminance adjustment amount for lightening the influence of the luminance fluctuation by the 3D moiré by considering the position shift of the image area through referring to the shift speed of the relative position. The position shift amount of the image area changes depending on the shift speed of the relative position. FIG. 50 shows a relational chart regarding the shift speed of the relative position and the position shift amount of the image area.

The position shift amount of the image area depends on the measurement performance of the observer position measuring unit 101 and the performance processing speed of the image processing unit 154, so that it takes different values depending on the type of the stereoscopic image display device 14 to be used. Further, when the shift speed of the relative position is faster than the threshold speed Vo different for each stereoscopic image display device 14, the position shift of the image area is generated. When the observing position of the observer is shifted to the X-axis direction on the stereoscopic display panel 108a, the 3D moiré image area is shifted in the direction opposite from the X-axis. Thus, the 3D moiré image area appears in the opposite direction from the X-axis with respect to the image area on which the luminance adjustment processing is performed. Further, when the observing position of the observer is shifted to the direction opposite from the X-axis, the 3D moiré image area is shifted to the X-axis direction. Thus, the 3D moiré image area appears in the X-axis with respect to the image area on which the luminance adjustment processing is performed.

A luminance adjustment amount calculating method executed by the luminance adjustment calculating unit 105 according to the fourth exemplary embodiment will be described hereinafter. First, the luminance adjustment amount is calculated based on the luminance characteristic data saved in the device data characteristic saving unit 103 in the same manner as the case of the first exemplary embodiment. Then, the shift speed is calculated from the chronological change in the relative position. When the shift speed of the relative position is faster than the threshold speed Vo, the shift direction of the observer is specified from the relative position. When the shift direction is the X-axis direction, the position shift amount is detected from the chart of FIG. 50 which shows the relation between the shift speed of the relative position and the position shift amount of the image area, and the luminance adjustment amount is shifted to the direction opposite from the X-axis direction. When the shift direction is the direction opposite from the X-axis direction, the luminance adjustment amount is shifted to the X-axis direction.

Figure 51A:
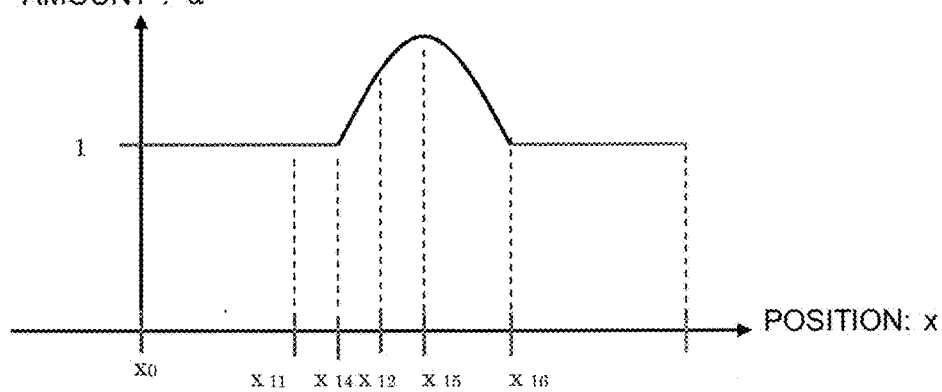
FIGS. 51A and 51B are charts showing the luminance adjustment amount corresponding to the position shift of the image area, based on two different embodiments.
Figure 51B:
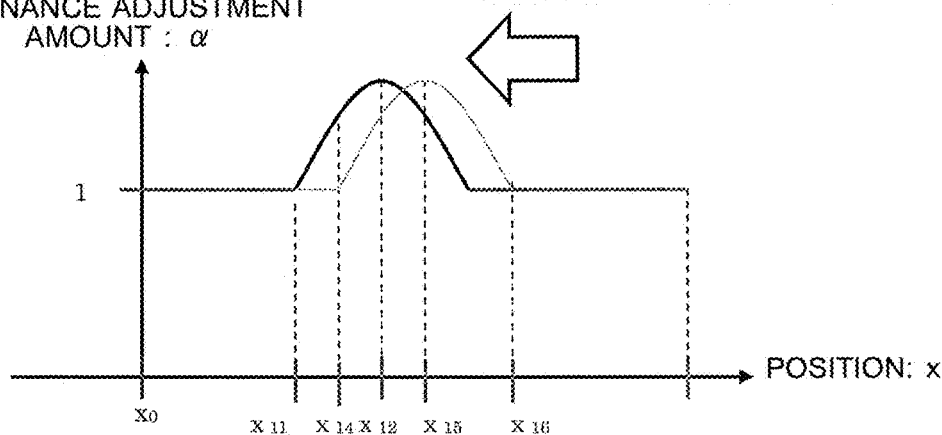

FIG. 51 shows the result of calculating the luminance adjustment amount in a case where the position shift amount of the image area is $x_{len}$. FIG. 51A shows the luminance adjustment amount calculated by the same method as that of the first exemplary embodiment. FIG. 51B shows the result of the luminance adjustment amount in which the luminance adjustment amount of FIG. 51A is shifted by the image area position shift amount $x_{len}$ in the direction opposite from the X-axis.

Figure 52:
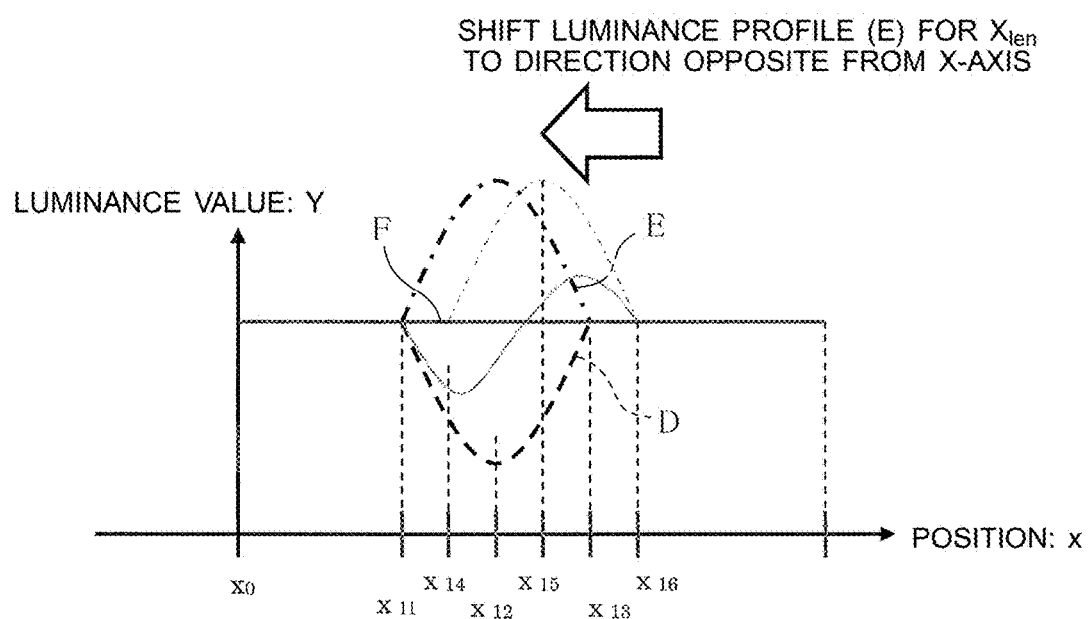
FIG. 52 is a chart showing the luminance profile corresponding to the position shift of the image area.

FIG. 52 shows the luminance profile in which the luminance adjustment amount is shifted by the image area position shift amount $x_{len}$ in the direction opposite from the X-axis. D, E, and F in FIG. 52 are as follows. A dotted line of D (dotted line where the luminance value falls on the lower side) shows the luminance profile (D) by the 3D moiré. An alternate short and long dash line of E (alternate short and long dash line where the luminance value swells on the upper side) shows the luminance profile (E) originated from the image data after the luminance adjustment processing is performed. A solid line of F shows the luminance profile (F) of the observed image acquired by projecting the image data after the luminance adjustment processing is performed to the observing position of the observer from the stereoscopic display panel 108a.

In FIG. 52, the image area of the luminance adjustment amount is shifted in the direction opposite from the X-axis by the position shift amount $x_{len}$. Thus, the luminance profile (E) originated from the image data after the luminance adjustment processing is performed is also shifted in the direction opposite from the X-axis by the position shift amount $x_{len}$. Thereby, the positions of the image areas of the luminance profile (E) originated from the image data after the luminance adjustment processing is performed and the luminance profile (D) by the 3D moiré become equivalent. Therefore, there is no luminance fluctuation in the luminance profile (F) of the observed image when the luminance-adjusted image data is projected to the observing position of the observer from the stereoscopic display panel 108a, so that the constant luminance values can be acquired.

In the manner described above, it is possible to calculate the luminance adjustment amount by considering the position shift amount even in a case where the shift speed of the relative position is fast and the position shift is generated between the 3D moiré image area and the image area where the luminance adjustment processing is performed.

As in the case of the first exemplary embodiment, the fourth exemplary embodiment can be applied to the stereoscopic display device of multi-viewpoints. Naturally, it is possible to provide the image processing unit 154 of the fourth exemplary embodiment as an individual image processing unit, and to achieve the function of the stereoscopic image display device 14 in combination with the stereoscopic display panel unit 108.

Figure 53:
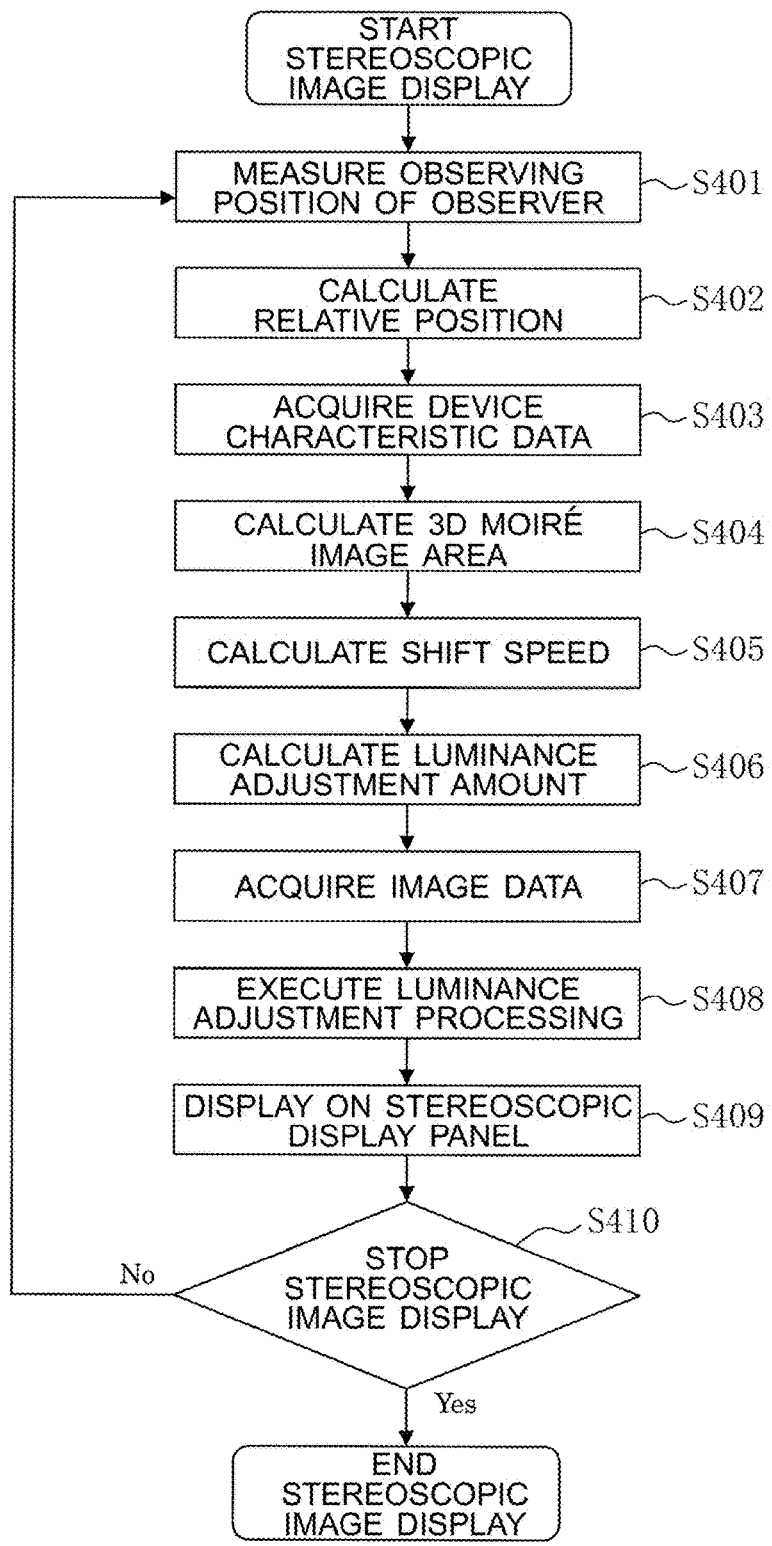
FIG. 53 is a flowchart of a stereoscopic image processing method.

A flowchart of the stereoscopic image processing method used in the stereoscopic image display device 14 according to the fourth exemplary embodiment will be described by referring to FIG. 53.

Step S401 to step S404 are same as step S101 to step S104 of the first exemplary embodiment.

In step S405, the shift speed and the shift direction are calculated from the time difference at the relative position calculated by the relative position calculating unit 102.

In step S406, the luminance adjustment amount is calculated by using the luminance adjustment amount calculating unit 105. First, as in the case of the first exemplary embodiment, the luminance adjustment amount is calculated from the luminance characteristic data of the observed image detected in step S404. Then, the shift speed and the shift direction of the relative position calculated in step S405 are referred to. When the shift speed is faster than the threshold speed Vo, the position shift amount is acquired from the relational chart (FIG. 50) regarding the shift speed and the position shift amount of the image area. Then, the luminance adjustment amount is shifted in the direction opposite from the shift direction of the observer according to the position shift amount.

In step S407 to step S410, the same processing executed in step S106 to step S109 according to the first exemplary embodiment is performed.

As described above, it is possible to provide the stereoscopic image display device and the stereoscopic image processing method with which the influence of the luminance fluctuation by the 3D moiré is lightened even when the observing position of the observer is shifted so that a sense of discomfort is not felt by the observer even when the shift speed of the relative position between the observing position of the observer and the stereoscopic display panel is fast and a position shift is generated between the 3D moiré image area and the image area where the luminance adjust-ment processing is performed, through calculating the luminance adjustment amount by considering the position shift of the image area.

In other words, the stereoscopic image display device according to the fourth exemplary embodiment includes: the observer position measuring unit which measures the observing position of the observer; the relative position calculating unit which calculates the relative position between the observing position of the observer and the position of the stereoscopic display panel; the device characteristic data saving unit which saves the device characteristic data for the relative position of the stereoscopic display panel; the 3D moiré image area calculating unit which calculates the image area where the luminance fluctuation by the 3D moiré is generated for the relative position based on the device characteristic data; the luminance adjustment amount calculating unit which calculates the luminance adjustment amount suited for stereoscopic image display based on the device characteristic data by referring to the shift speed of the relative position calculated from the chronological change of the relative position for the image area calculated by the 3D moiré image area calculating unit; the image data saving unit which saves or receives the image data; the luminance adjustment processing unit which performs the luminance adjustment processing on the image data according to the luminance adjustment amount; and the stereoscopic display panel unit which projects the image data on which the luminance adjustment processing is performed to the right eye and the left eye according to the relative position.

With the fourth exemplary embodiment, it is possible to provide the stereoscopic image display device and the stereoscopic image processing method with which the influence of the luminance fluctuation by the 3D moiré is lightened even when the observing position of the observer is shifted so that a sense of discomfort is not felt by the observer through correcting the position shift even when the position shift is generated in the image area where the luminance fluctuation by 3D moiré appears and the image area where the luminance adjustment processing is performed, through shifting the image area where the luminance adjustment processing is performed by referring to the shift speed of the relative position.

Fifth Exemplary Embodiment

It is an exemplary object of a fifth exemplary embodiment to provide a stereoscopic image display device and a stereoscopic image processing method with which the influence of the luminance fluctuation by the 3D moiré is lightened so that a sense of discomfort is not felt by the observer through smoothing the luminance profile originated from the luminance adjustment of the image data, i.e., through reducing the differential coefficient for the position X of the luminance value Yw, by widening the image area on which the luminance adjustment processing is performed even when the position shift is generated between the image area where the luminance fluctuation by the 3D moiré appears and the image area where the luminance adjustment processing is performed, through performing the image filtering processing on the luminance-adjusted image data by referring to the shift speed of the relative position.

Figure 54:
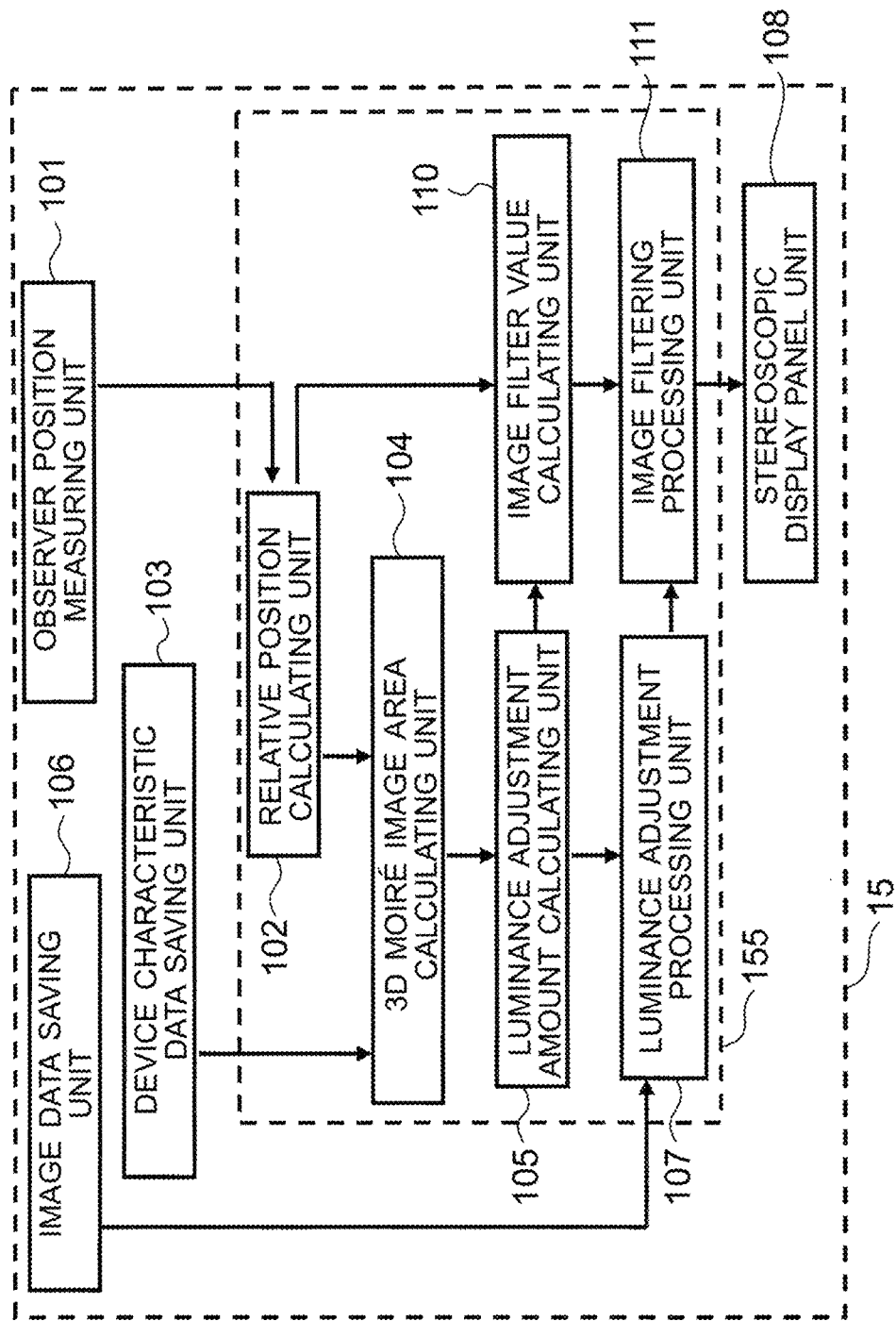
FIG. 54 is block diagram showing a stereoscopic image display device according to a fifth exemplary embodiment.

FIG. 54 is a block diagram of a stereoscopic image display device 15. The stereoscopic image display device 15 includes: an observer position measuring unit 101; a relative position calculating unit 102; a device characteristic data saving unit 103; a 3D moiré image area calculating unit 104;

a luminance adjustment amount calculating unit 105; an image data saving unit 106; a luminance adjustment processing unit 107; an image filter value calculating unit 110 which calculates the image filter value based on the luminance adjustment amount by referring to the shift speed of the relative position calculated by the relative position calculating unit 102; an image filtering processing unit 111 which performs image filtering processing on the luminance-adjusted image data according to the image filter value; and a stereoscopic display panel unit 108 which projects the image data on which the luminance adjustment processing and the image filtering processing are performed to the right eye and the left eye according to the relative position.

Further, a processing unit that is an integration of the relative position calculating unit 102, the 3D moiré image area calculating unit 104, the luminance adjustment amount calculating unit 105, the luminance adjustment processing unit 107, the image filter value calculating unit 110, and the image filtering processing unit 111 is referred to as an image processing unit 155.

Hereinafter, functions of each unit included in the stereoscopic image display device 15 will be described. The functions of the observer position measuring unit 101, the relative position calculating unit 102, the device characteristic data saving unit 103, the 3D moiré image area calculating unit 104, the luminance adjustment amount calculating unit 105, the image data saving unit 106, the luminance adjustment processing unit 107, and the stereoscopic display panel unit 108 are the same as those of the first exemplary embodiment.

The image filter value calculating unit 110 has a function which expands the image area on which the luminance adjustment processing is performed based on the shift speed of the relative position calculated by the relative position calculating unit 102 and calculates the image filter value for smoothing the gradation values of the image data.

For the image filter value, the filter shape for performing blurring processing (also referred to as smoothing processing, lowpass filtering processing, or the like) of the image data of the stereoscopic image content is employed. The typical filter shapes for performing the image blurring processing may be averaging filter, median filter, Gaussian filter, and the like. In an example provided below, a case of using a Gaussian filter will be described.

Figure 55:
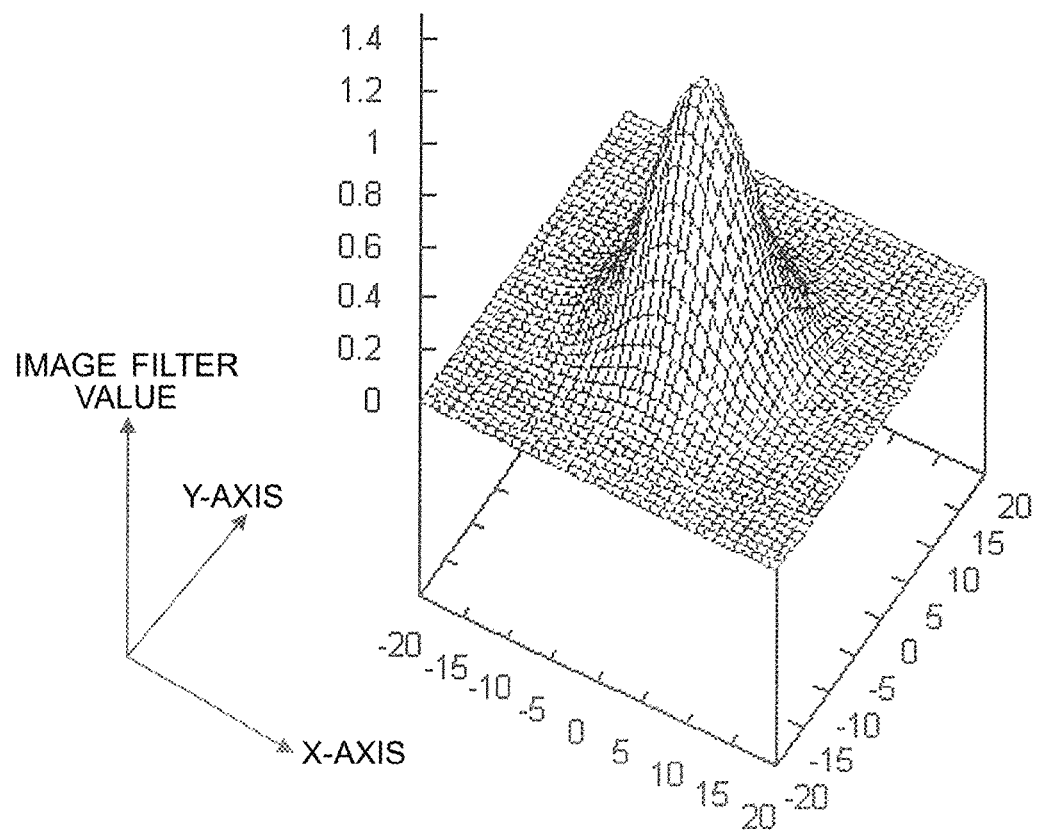
FIG. 55 is a chart showing a Gaussian filter shape.

FIG. 55 shows the Gaussian filter shape applied to the image data of the stereoscopic image content. FIG. 55 shows a two-dimensional Gaussian filter shape, in which the X-axis corresponds to the lateral axis direction of the image data and the Y-axis corresponds to the longitudinal axis of the image data. The Gaussian filter is calculated from Formula (41) of the Gaussian distribution function. Note here that variance $\sigma^2$ is an arbitrary value. When the value of $\sigma$ is large, the Gaussian filter shape becomes gradual and the effect of the image blurring processing is increased.

(Expression 1) Formula (41)

$$f(x, y) = \frac{1}{2\pi\sigma^2} \exp\left(-\frac{x^2 + y^2}{2\sigma^2}\right)$$

The image filter values are the discrete values of the Gaussian filter. The image filter values are calculated by substituting the value f(x, y) calculated by Formula (5) to the position (x, y) of each of the pixels that form the image filter values. FIG. 56A and FIG. 56B show examples of the image filter values calculated from the Gaussian filter. Provided that the value of window width of the image filter in the X-axis direction is Wx and the value of the window width in the Y-axis direction is Wy, FIG. 56A is a case where the window width of the image filter is set as 3×3 pixels (Wx=3, Wy=3), and FIG. 56B is a case where the window width of the image filter is set as 5×5 pixels (Wx=5, Wy=5).

In the explanations below, it is defined as W (W=Wx=Wy) for convenience' sake. When the window width value W of the image filter is large, the effect of the image blurring processing is increased as well. As described above, when the Gaussian filter is used for the image blurring processing, the image filter value is specified by the value of the variance $\sigma$ of the Gaussian distribution function and the window width value W of the image filter. Therefore, the image filter value calculating unit 110 simply needs to calculate the value of the variance $\sigma$ of the Gaussian distribution function and the window width value W of the image filter. Note here that the value of the variance $\sigma$ may be set as an arbitrary constant (set as $\sigma$=1, for example) and only the window width value W of the image filter may be calculated.

Figure 57:
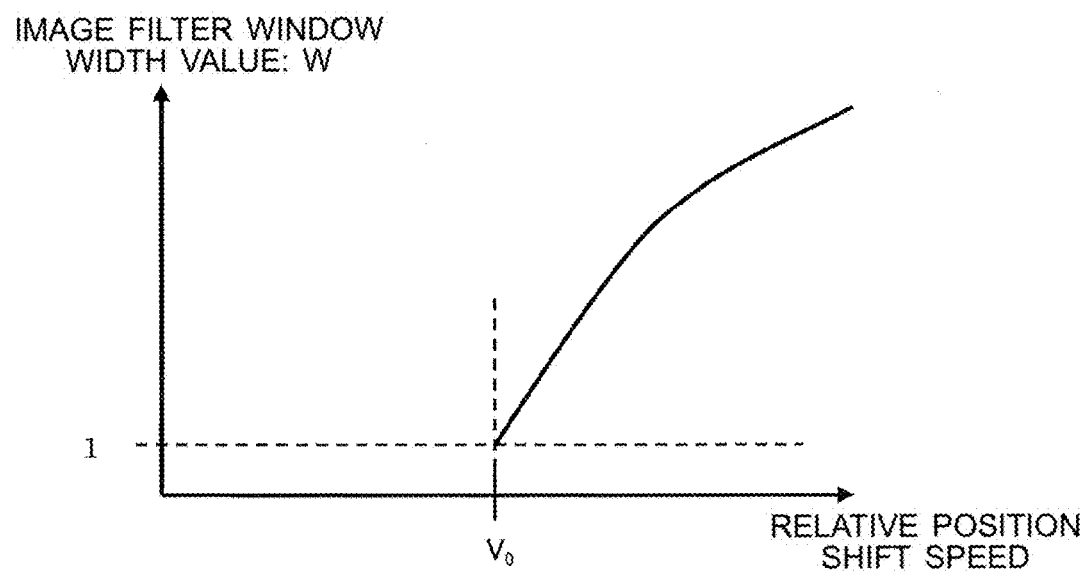
FIG. 57 is a relational chart regarding the shift speed of the relative position and the image filter value.

A case of setting the value of the variance $\sigma$ of the Gaussian distribution function as "1" and calculating only the window width value W of the image filter will be described hereinafter as an example of calculating the image filter value. FIG. 57 shows a relational chart regarding the shift speed of the relative position and the image filter window width value W. When the shift speed of the relative position is slower than the threshold speed $v_O$, the image filter window width value W is "1". When the shift speed of the relative position is faster than the threshold speed $v_O$, the image filter window width value W increases as the shift speed increases.

When the window width value W of the image filter is "1", the image data of the stereoscopic image content does not change even when the image filtering processing by using the Gaussian filter is performed. Naturally, a command value for stopping execution of the image filtering processing may be substituted instead of substituting "1" to the window width value W of the image filter in order to reduce the calculation amount of the image filtering processing. Further, the window width value W of the image filter is desirable to be an integer, so that the decimal value may be rounded off to be approximated to an integer value.

When the window width value W of the image filter is increased, the effect of the image blurring processing is increased as well. Thus, the image area on which the luminance adjustment processing is performed is widened and the luminance values become gradual. However, the image quality of the stereoscopic image content is deteriorated. On the contrary, the effect of the image blurring processing is decreased when the image filter window width value W is decreased. Thus, the image quality of the stereoscopic image content can be maintained but the image area on which the luminance adjustment processing is performed cannot be widened. Therefore, for the relational chart regarding the shift speed of the relative position and the image filter window width value W, it is desirable to present various kinds of stereoscopic image contents (stereoscopic image contents of different parallax values, contrast, brightness, and spatial frequencies of hue) to the evaluator and to totalize the results acquired by the subjective evaluation.

Further, while the case of using a square-shaped image filter by defining it as W=Wx=Wy is described in the above, Wy does not necessarily take the same value as the value of Wx. The influence of the luminance fluctuation by the 3D moiré eminently appears in the X-axis direction, so that a rectangular-shaped image filter of Wx>Wy may be used as well. It is also possible to change the value of Wy depending on the image data of the stereoscopic image content.

Further, the method for specifying the image filter value through calculating the window width values W of the image filter by defining the variance of the Gaussian filter as $\sigma=1$ is described above. However, inversely, it is also possible to specify the image filter value by calculating the variance $\sigma$ of the Gaussian filter through defining the window width value W of the image filter as a constant (e.g., 20 pixels×20 pixels). As the method for calculating $\sigma$, as in the case of the window width value W of the image filter, the relational chart regarding the luminance adjustment amount and the variance $\sigma$ of the Gaussian filter is specified by the subjective evaluation experiment of the observer.

Thereby, the variance $\sigma$ of the Gaussian filter is increased as the luminance adjustment amount becomes larger so as to increase the image blurring effect. Naturally, it is also possible to define both the variance $\sigma$ of the Gaussian filter and the window width value W of the image filter as variables and to specify the image filter value by calculating the both values. As one of the calculation methods, the value of the variance $\sigma$ of the Gaussian filter is fixed first, the window width value W of the image filter is calculated, and then the variance $\sigma$ suited for the calculated window width value W of the image filter is calculated by the same method described above.

The image filtering processing unit 111 performs the image filtering processing on the image data on which the luminance adjustment processing is performed by the luminance adjustment processing unit 107 according to the image filter value calculated by the image filter value calculating unit 110. As the examples, FIG. 58 shows luminance profiles of the observed images projected from the plane of the stereoscopic display panel when the image filter processing is applied.

Figure 58A:
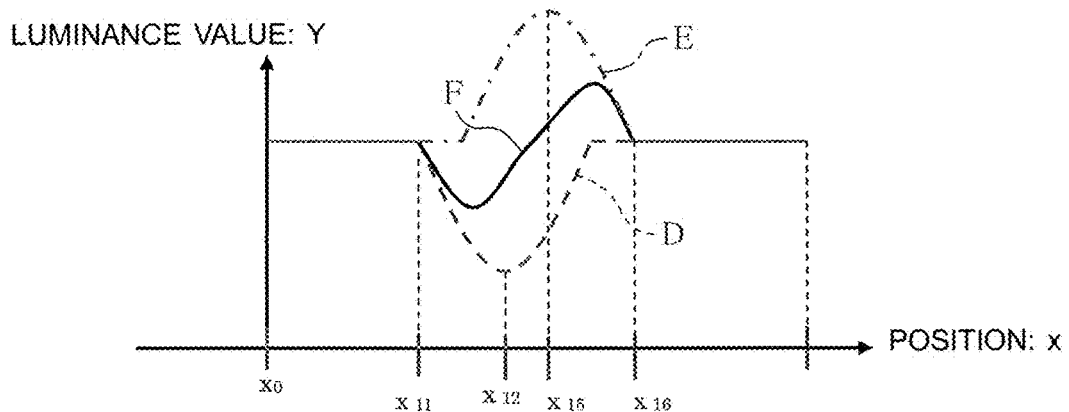
FIGS. 58A-58C are charts showing the luminance profiler after executing image filtering processing under three different conditions.

FIG. 58A shows the luminance profile of a case where a position shift is generated in the image area where the luminance adjustment processing is performed and the 3D moiré image area because the shift speed of the relative position is fast. D, E, and F in FIG. 58A are as follows. A dotted line of D (dotted line where the luminance value falls on the lower side) shows the luminance profile (D) by the 3D moiré (i.e., the luminance profile of the observed image before performing the luminance adjustment processing). An alternate short and long dash line of E (alternate short and long dash line where the luminance value swells on the upper side) shows the luminance profile (E) originated from the image data after the luminance adjustment processing is performed. A solid line of F shows the luminance profile (F) of the observed image acquired by projecting the image data after the luminance adjustment processing is performed to the observing position of the observer from the plane of the stereoscopic display panel.

Figure 58B:
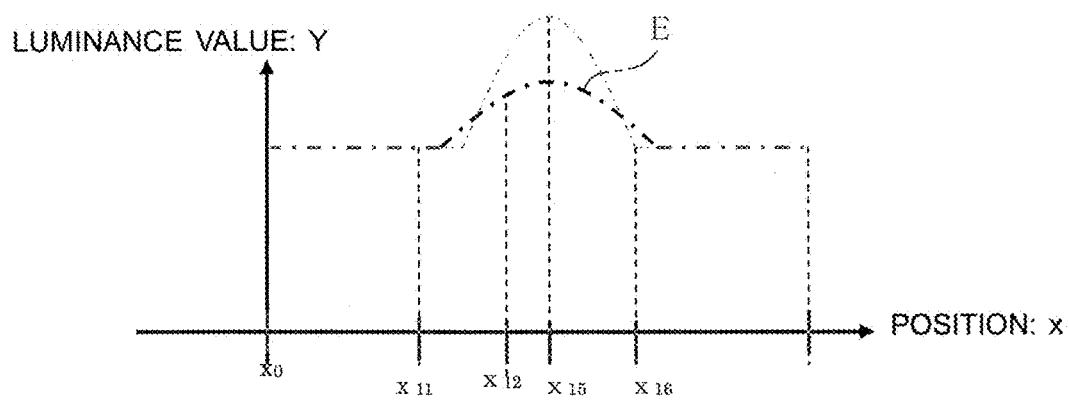

FIG. 58B shows the luminance profile (E) originated from the image data after the luminance adjustment processing and the image filtering processing are performed. It can be seen form FIG. 58B that the image area where the luminance adjustment processing is performed becomes widened by the image filtering processing, and the luminance profile originated from the luminance adjustment of the image data becomes gradual.

Figure 58C:
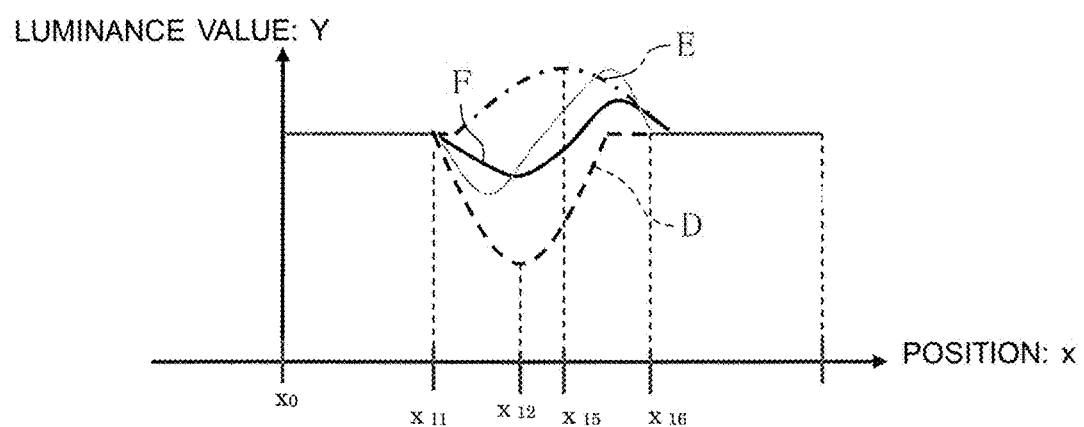

FIG. 58C shows the luminance profile in which the influence of the luminance fluctuation by the 3D moiré is lightened by performing the luminance adjustment processing and the image filtering processing. A solid line of F in FIG. 58C shows the luminance profile (F) of the observed image acquired by projecting the image data after the luminance adjustment processing and the image filtering processing are performed to the observing position of the plane of the observer from the stereoscopic display panel. Comparing the luminance profile (F) of FIG. 58A before the image filtering processing is performed with the luminance profile (F) of FIG. 58C after the image filtering processing is performed, it can be seen that the luminance fluctuation of the luminance profile (F) of FIG. 58C after the image filtering processing is performed becomes gradual. Thereby, even when a position shift is generated between the 3D moiré image area and the image area where the luminance adjustment processing is performed because the shift speed of the relative position is fast, it is possible to lighten the influence of the luminance fluctuation by the 3D moiré through widening the image area where the luminance adjustment processing is performed by the image filtering processing and through making the luminance profile originated from the luminance adjustment of the image data gradual.

As in the case of the first exemplary embodiment, the fifth exemplary embodiment can be applied to the stereoscopic display device of multi-viewpoints. Naturally, it is possible to provide the image processing unit 155 of this exemplary embodiment as an individual image processing unit, and to achieve the function of the stereoscopic image display device 15 in combination with the stereoscopic display panel unit 108.

Figure 59:
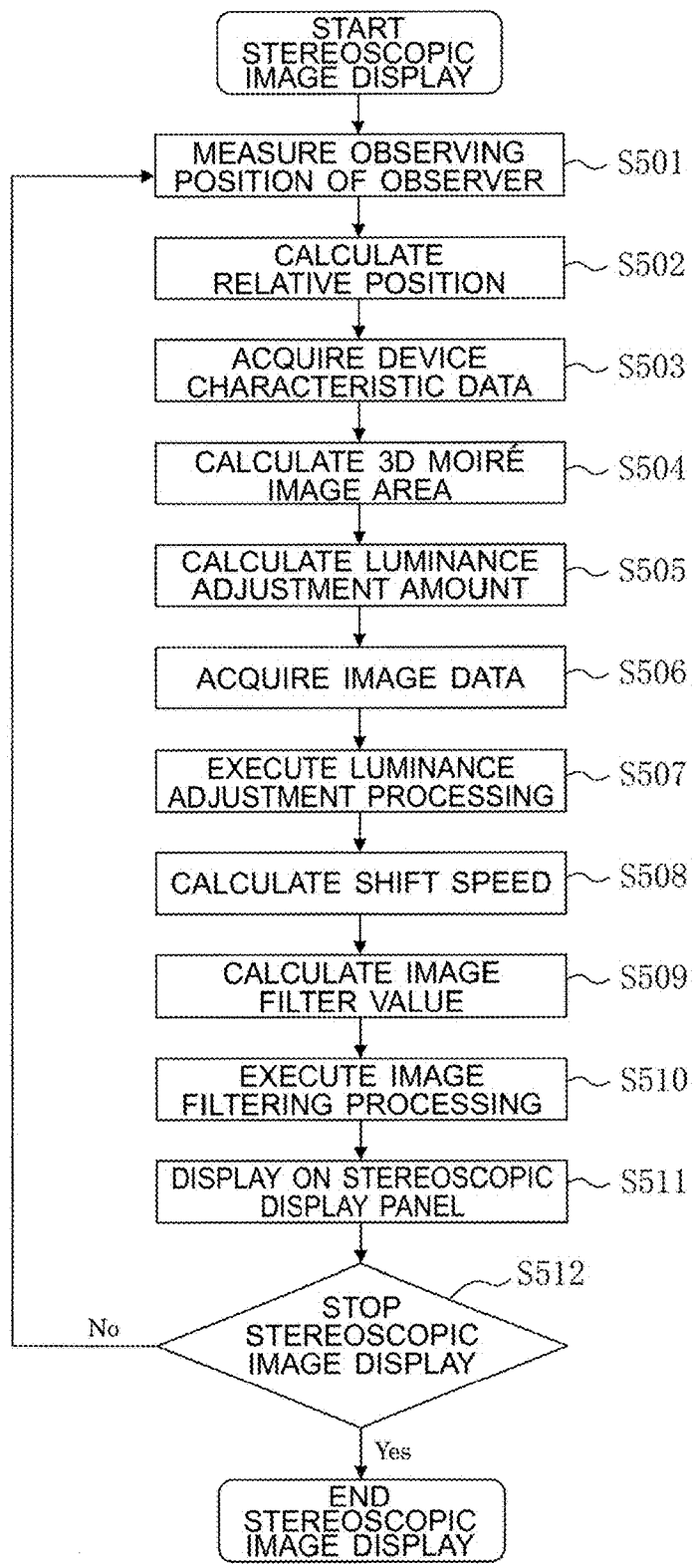
FIG. 59 is a flowchart of a stereoscopic image processing method.

A flowchart of the stereoscopic image processing method used in the stereoscopic image display device 15 according to the fifth exemplary embodiment will be described by referring to FIG. 59. Step S501 to step S507 are same as step S101 to step S107 of the first exemplary embodiment.

In step S508, the shift speed and the shift direction are calculated from the time difference of the relative position calculated by the relative position calculating unit 102.

In step S509, the image filter value is calculated by using the image filter value calculating unit 110 through referring to the shift speed of the relative position calculated in step S508. As the method for calculating the image filter value, the image filter value is calculated by referring to the relational chart (FIG. 52) regarding the shift speed of the relative position and the image filter window width value to be the image filter value.

In step S510, the image filtering processing is performed by using the image filtering processing unit 111 on the image data on which the luminance adjustment processing is performed in step S507 according to the image filter value calculated in step S509.

In step S511 and step S512, the same processing executed in step S108 and step S109 according to the first exemplary embodiment is performed.

As described above, it is possible to provide the stereoscopic image display device and the stereoscopic image processing method with which the influence of the luminance fluctuation by the 3D moiré is lightened so that a sense of discomfort is not felt by the observer even when the observing position of the observer is shifted, through widening the image area where the luminance adjustment processing is performed and through making the luminance profile originated from the luminance adjustment of the image data gradual even in a case where a position shift is generated between the image area where the luminance adjustment processing is performed and the 3D moiré image area because the shift speed of the relative position is fast.

In other words, the stereoscopic image display device according to the fifth exemplary embodiment includes: the observer position measuring unit which measures the observing position of the observer; the relative position calculating unit which calculates the relative position between the observing position of the observer and the position of the stereoscopic display panel; the device characteristic data saving unit which saves the device characteristic data for the relative position of the stereoscopic display panel; the 3D moiré image area calculating unit which calculates the image area where the luminance fluctuation by the 3D moiré is generated for the relative position based on the device characteristic data; the luminance adjustment amount calculating unit which calculates the luminance adjustment amount suited for stereoscopic image display for the image area calculated by the 3D moiré image area calculating unit; the image data saving unit which saves or receives the image data; the luminance adjustment processing unit which performs the luminance adjustment processing on the image data according to the luminance adjustment amount; the image filter value calculating unit which calculates the image filter value based on the shift speed of the relative position; the image filtering processing module which performs the image filtering processing on the luminance-adjusted image data according to the image filter value; and the stereoscopic display panel unit which projects the image data on which the image filtering processing is performed to the right eye and the left eye according to the relative position.

With the fifth exemplary embodiment, it is possible to provide the stereoscopic image display device and the stereoscopic image processing method with which the influence of the luminance fluctuation by the 3D moiré is lightened even when the observing position of the observer is shifted so that a sense of discomfort is not felt by the observer through smoothing the luminance adjustment amount with the image data by widening the image area on which the luminance adjustment processing is performed even when the position shift is generated between the image area where the luminance fluctuation by the 3D moiré appears and the image area where the luminance adjustment processing is performed, through performing the image filtering processing on the luminance-adjusted image data by referring to the shift speed of the relative position.

Sixth Exemplary Embodiment

It is an exemplary object of a sixth exemplary embodiment to provide a stereoscopic image display device and a stereoscopic image processing method with which not only the influence of the luminance fluctuation by the 3D moiré but also the influence of the CT-image by the 3D crosstalk is lightened so that a sense of discomfort is not felt by the observer even when the observing position of the observer is shifted, through performing parallax adjustment processing for lightening the influence of the CT-image by the 3D crosstalk on the image data from which the influence of the luminance fluctuation by the 3D moiré is lightened by performing the luminance adjustment processing.

Figure 61:
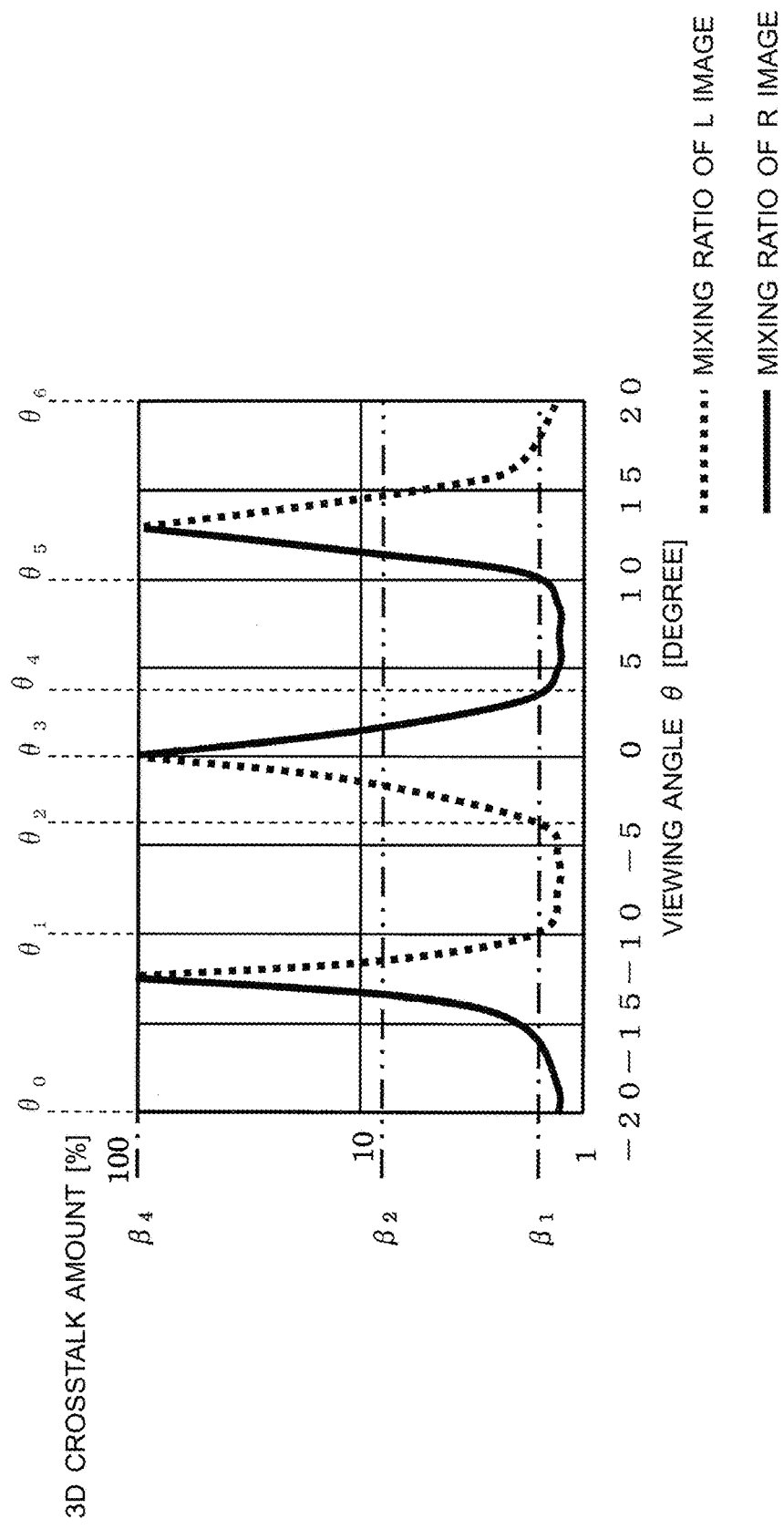
FIG. 61 is a chart showing 3D crosstalk characteristic data.

FIG. 61 shows 3D crosstalk for the viewing angle direction of the stereoscopic display panel. The 3D moiré image area shown in FIG. 4 and the 3D crosstalk image area shown in FIG. 61 almost coincide with each other. Thus, the parallax adjustment processing for easing the 3D crosstalk is performed based on the information of the 3D moiré image area calculating unit.

Figure 60:
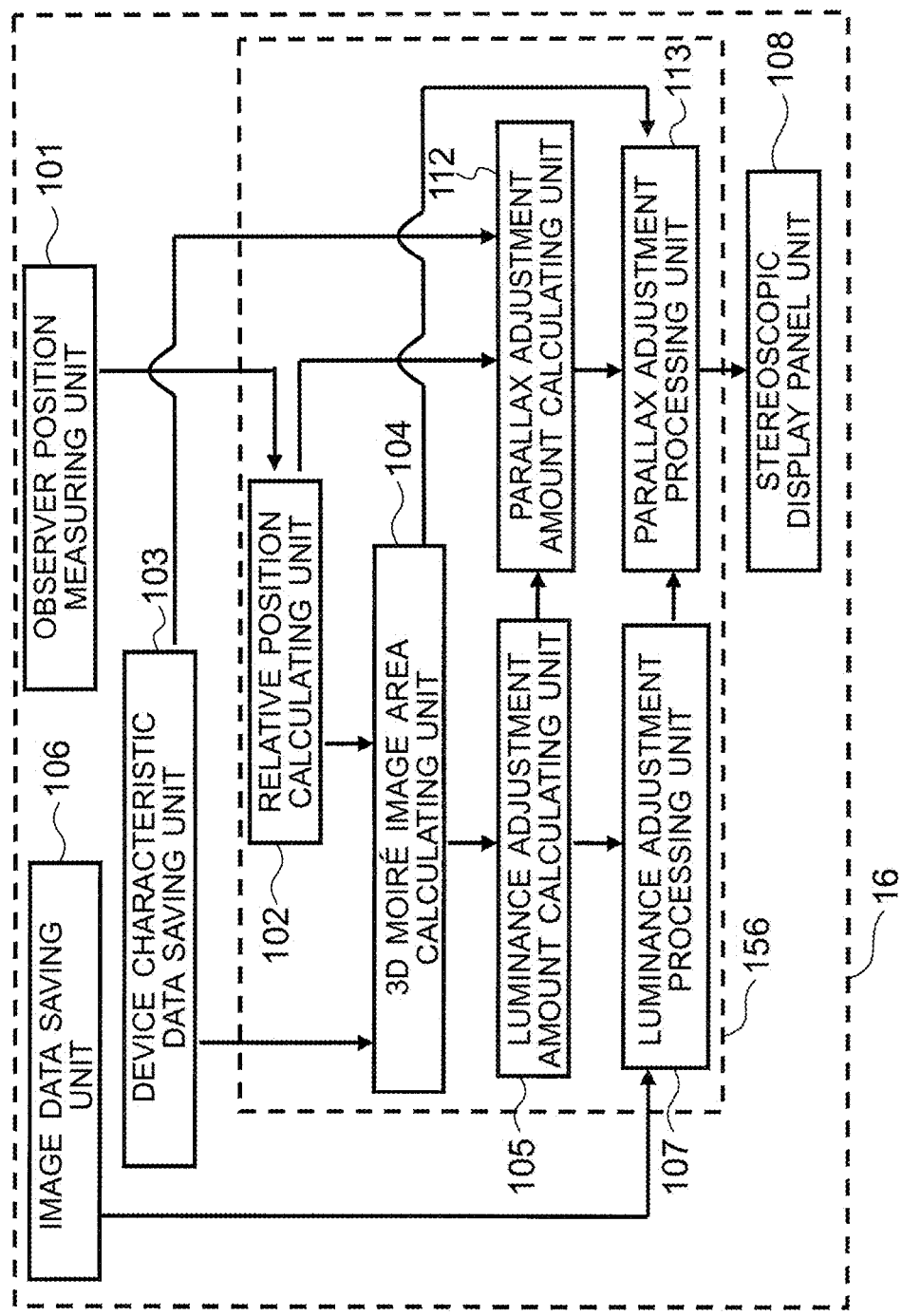
FIG. 60 is block diagram showing a stereoscopic image display device according to a sixth exemplary embodiment.

FIG. 60 is a block diagram of a stereoscopic image display device 16. The stereoscopic image display device 16 includes: an observer position measuring unit 101; a relative position calculating unit 102; a device characteristic data saving unit 103; a 3D moiré image area calculating unit 104; a luminance adjustment amount calculating unit 105; an image data saving unit 106; a luminance adjustment processing unit 107; a parallax adjustment amount calculating unit 112 which calculates the parallax adjustment amount for lightening the influence of the CT-image by the 3D crosstalk based on the relative position calculated by the relative position calculating unit 102 and the device characteristic data saved in the device characteristic data saving unit 103; a parallax adjustment processing unit 113 which performs the parallax adjustment processing on the image data in the image area calculated by the 3D moiré image area calculating unit 104 according to the parallax adjustment amount calculated by the parallax adjustment amount calculating unit 112; and a stereoscopic display panel unit 108 which projects the image data on which the luminance adjustment processing and the parallax adjustment processing are performed to the right eye and the left eye according to the relative position. Further, a processing unit that is an integration of the relative position calculating unit 102, the 3D moiré image area calculating unit 104, the luminance adjustment amount calculating unit 105, the luminance adjustment processing unit 107, the parallax adjustment amount calculating unit 112, and the parallax adjustment processing unit 113 is referred to as an image processing unit 156.

The observer position measuring unit 101, the relative position calculating unit 102, the device characteristic data saving unit 103, the 3D moiré image area calculating unit 104, the luminance adjustment amount calculating unit 105, the image data saving unit 106, the luminance adjustment processing unit 107, and the stereoscopic display panel unit 108 are the same as those of the first exemplary embodiment.

The parallax adjustment amount calculating unit 112 calculates the parallax allowable value appropriate for lightening the CT-image by the 3D crosstalk from the 3D crosstalk characteristic data saved in the device characteristic data saving unit 103, and calculates the parallax adjustment amount from the calculated parallax allowable value and the parallax maximum value of the image data.

FIG. 61 shows an example of 3D crosstalk characteristic data. The lateral axis of the 3D crosstalk characteristic data shows the viewing angle θ, and the longitudinal axis shows the 3D crosstalk amount. The 3D crosstalk amount shows a proportion of mixing the left-eye image (L image) into the right-eye image (R image) (also shows the case of inverted mixture: a proportion of mixing the R image to the L image). The 3D crosstalk characteristic data takes different values depending on the device characteristic of the stereoscopic display panel, and it is determined at the time of the designing the stereoscopic display panel. Further, it is also possible to acquire the 3D crosstalk characteristic data by measuring the stereoscopic display panel with an evaluation device for 3D crosstalk. The parallax adjustment amount is calculated from the 3D crosstalk characteristic data and the relative position calculated by the relative position calculating unit 102.

As the first processing of the method for calculating the parallax adjustment amount, the viewing angle range of a stereoscopic viewing space where no CT-image by the 3D crosstalk appears and a proper stereoscopic image is projected, the viewing angle of a 3D-crosstalk viewing space where a CT-image by the 3D crosstalk appears, and the viewing angle range of a pseudoscopic viewing space where no CT-image by the 3D crosstalk appears but a left-eye image is projected to the right eye and a right-eye image is projected to the left eye are detected from the threshold value of the 3D crosstalk amount. At that time, through setting two or more threshold values of the 3D crosstalk amount, the viewing angle range of the 3D-crosstalk viewing space where a CT-image by the 3D crosstalk appears but a stereoscopic image can be recognized since the influence thereof is small may be separated from the viewing angle range of the 3D-crosstalk viewing space where the influence of the CT-image by the 3D crosstalk is large so that the stereoscopic image cannot be visibly recognized.

As the second processing, the parallax allowable value suited for stereoscopic image display is set at the viewing angles to be the respective boundary positions of the stereoscopic viewing space, the 3D-crosstalk viewing space, and the pseudoscopic viewing space. The parallax allowable value for the threshold value of the 3D crosstalk amount is set by referring to subjective reference evaluations or the literatures thereof.

As the third processing, the parallax allowable values at all the viewing angles are calculated by performing interpolation with a line that passes through a plurality of points acquired from the viewing angles to be the boundary positions and the parallax allowable values thereof.

As the fourth processing, the viewing angle is calculated from the relative position, the parallax allowable value for the viewing angle is detected, and it is compared with the parallax maximum value of the image data that is the stereoscopic image content. When the parallax maximum value of the image data is larger than the parallax allowable value, the parallax adjustment amount as the value to be multiplied to the parallax maximum value of the image data is calculated for making the parallax maximum value of the image data equivalent to the parallax allowable value. When the parallax maximum value of the image data is smaller than the parallax allowable value, the parallax adjustment amount is set as "1". Through the processing described above, the parallax adjustment amount can be calculated.

The parallax adjustment processing unit 113 performs the parallax adjustment processing on the luminance-adjusted image data in the image area calculated by the 3D moiré image area calculating unit 104 according to the parallax adjustment amount calculated by the parallax adjustment amount calculating unit 112.

With the stereoscopic display panel unit 108 having the device characteristic of the luminance characteristic data shown in FIG. 4, the image area where a CT-image by the 3D crosstalk is generated becomes almost equivalent to the image area where the luminance fluctuation by the 3D moiré is generated calculated by the 3D moiré image area calculating unit 104.

Figure 62:
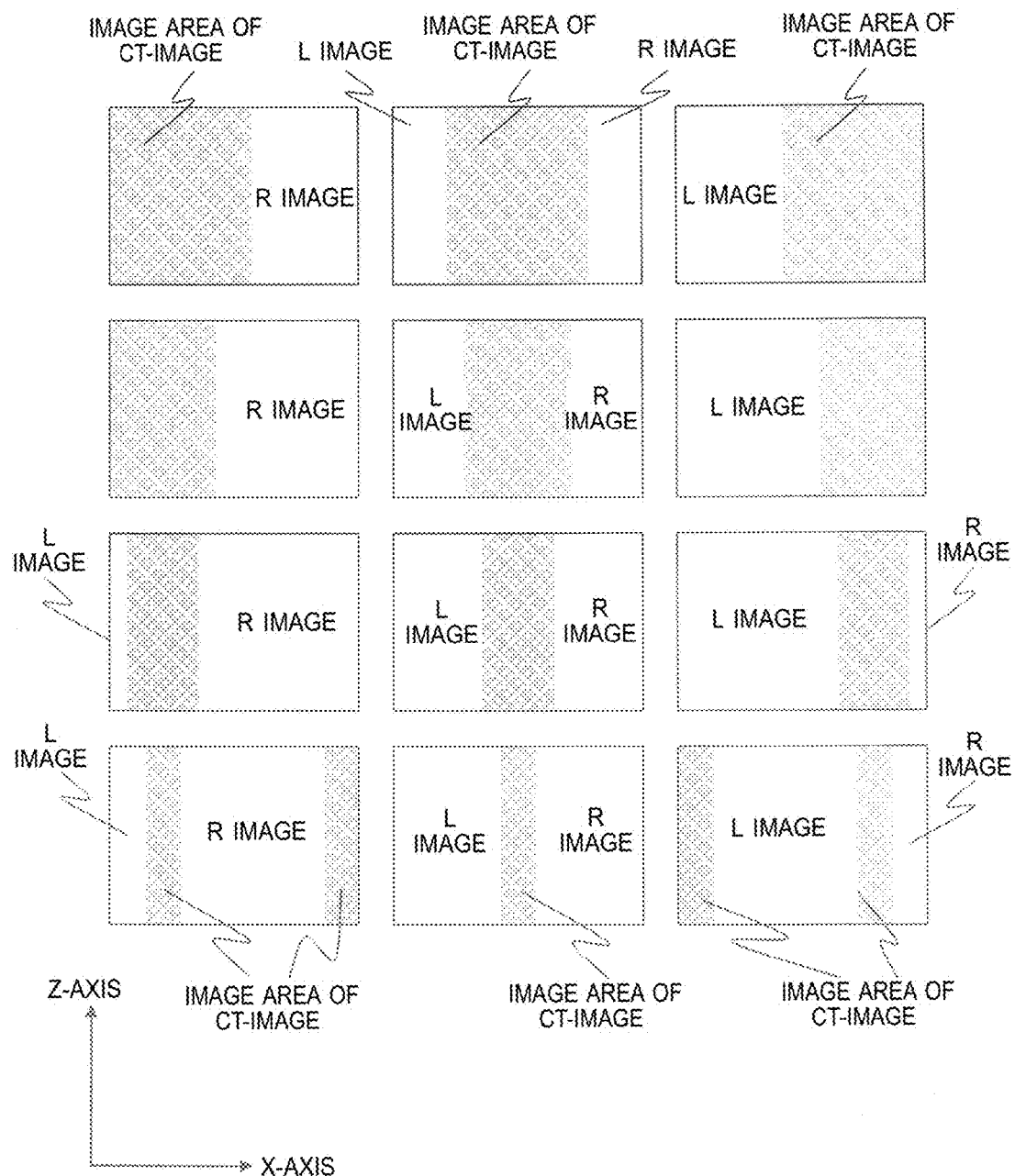
FIG. 62 shows illustrations of image areas where a CT-image by the 3D crosstalk appears in the relative position.

FIG. 62 shows examples of the image area where the CT-image appears at an arbitrary relative position. FIG. 62 shows the observed image projected to the relative position when the relative position is shifted in the X-axis direction (see FIG. 3) and in the Z-axis direction within the 3D-crosstalk viewing space. When the relative position is shifted to the X-axis direction, the image area where the CT-image appears is also shifted to the X-axis direction accordingly. Further, when the relative position is shifted to the Z-axis direction, the image area where the CT-image appears is expanded accordingly.

It is judged whether the R image, the L image, or a CT-image is projected to an arbitrary image area of the observed image projected to the right eye and the left eye of the observer based on the positional information of the right eye and the left eye of the observer acquired from the relative position calculating unit 102 and the image area information calculated by the 3D moiré image area calculating unit 104.

As a result of the judgment, the parallax value of the image area where the L image is projected to the left eye and the R image is projected to the right eye is remained as it is. The parallax adjustment processing is performed on the image area where the CT-image is projected at least to either one of the right eye and the left eye according to the parallax adjustment amount calculated by the parallax adjustment amount calculating unit 112. For the image area where the R image is projected to the left eye and the L image is projected to the right eye, the parallax value is inverted. When the R image or the L image is projected to both the right eye and the left eye, the parallax value is remained as it is.

FIG. 63 shows an execution judgment table regarding the image filtering processing corresponding to the types of the observed images (L image, R image, CT-image) projected to the right eye and the left eye of the observer. Regarding the display state of the stereoscopic image content, the image area where the R image is projected to the right eye and the L image is projected to the left eye and the image area where the L image is projected to the right eye and the R image is projected to the left eye are displayed as the stereoscopic image. The image area where a same image is projected to the right eye and the left eye of the observer is displayed as a flat image. In other image areas, the image is displayed in an intermediate display state between stereoscopic display and flat display. As the 3D crosstalk amount of the image area becomes higher, the parallax value of the stereoscopic image content becomes decreased. Thus, the image thereof is displayed in a state close to a flat image.

As described above, after lightening the influence of the luminance fluctuation by the 3D moiré by performing the luminance adjustment processing depicted in the first exemplary embodiment, the parallax adjustment processing is performed only on the image area where the CT-image by the 3D crosstalk appears. Thereby, it is possible to lighten both the influence of the luminance fluctuation by the 3D moiré and the influence of the CT-image by the 3D crosstalk while keeping the parallax value for the other image areas.

As in the case of the first exemplary embodiment, the sixth exemplary embodiment can be applied to the stereoscopic display device of multi-viewpoints. Needless to say, it is possible to provide the image processing unit 156 of this exemplary embodiment as an individual image processing unit, and to achieve the function of the stereoscopic image display device 16 in combination with the stereoscopic display panel unit 108.

Now, as a modification example of the sixth exemplary embodiment, there is considered a case where the luminance characteristic data of a stereoscopic display panel has a luminance fluctuation to be the 3D moiré within a stereoscopic image area as shown in FIG. 34. In such case, there is an area where the 3D moiré image area and the 3D crosstalk image area do not match with each other.

Figure 64:
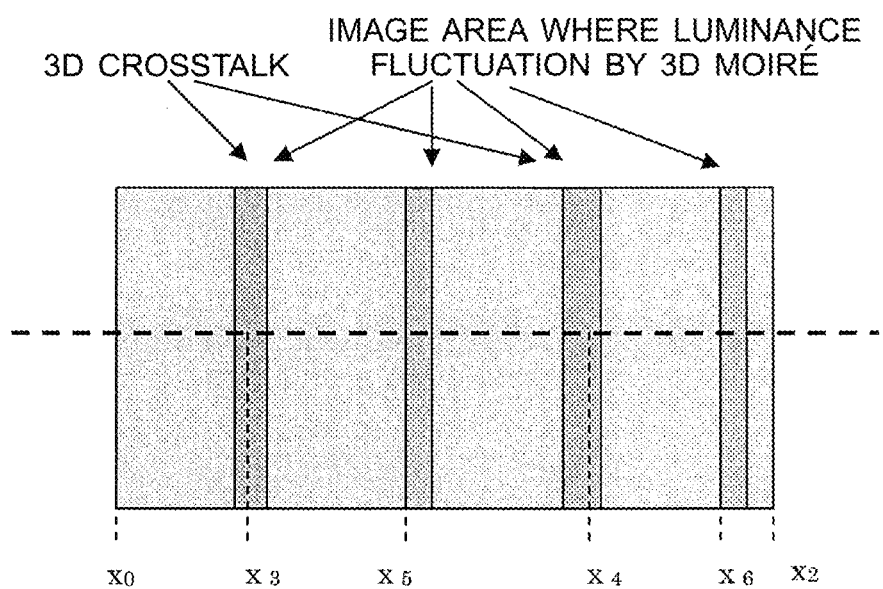
FIG. 64 is an observed image at position C.

For example, with the stereoscopic image display device having the luminance characteristic data shown in FIG. 34, the observed image is displayed as in a state shown in FIG. 64 when the relative position is the position C of FIG. 6A. In the display, the 3D moiré image area is the positions $x_3$, $x_4$, $x_5$, and $x_6$ in the X-axis direction of FIG. 64. However, the 3D crosstalk image area is the positions $x_3$ and $x_4$ in the X-axis direction of FIG. 64 from the 3D crosstalk characteristic data shown in FIG. 61, and it can be seen that the both image areas do not match with each other. Therefore, in a case of handling the luminance characteristic data having the luminance fluctuation to be the 3D moiré within a stereoscopic normal vision range, it is necessary to calculate the 3D crosstalk image area separately from the image area calculated by the 3D moiré image area calculating unit 104.

Figure 65:
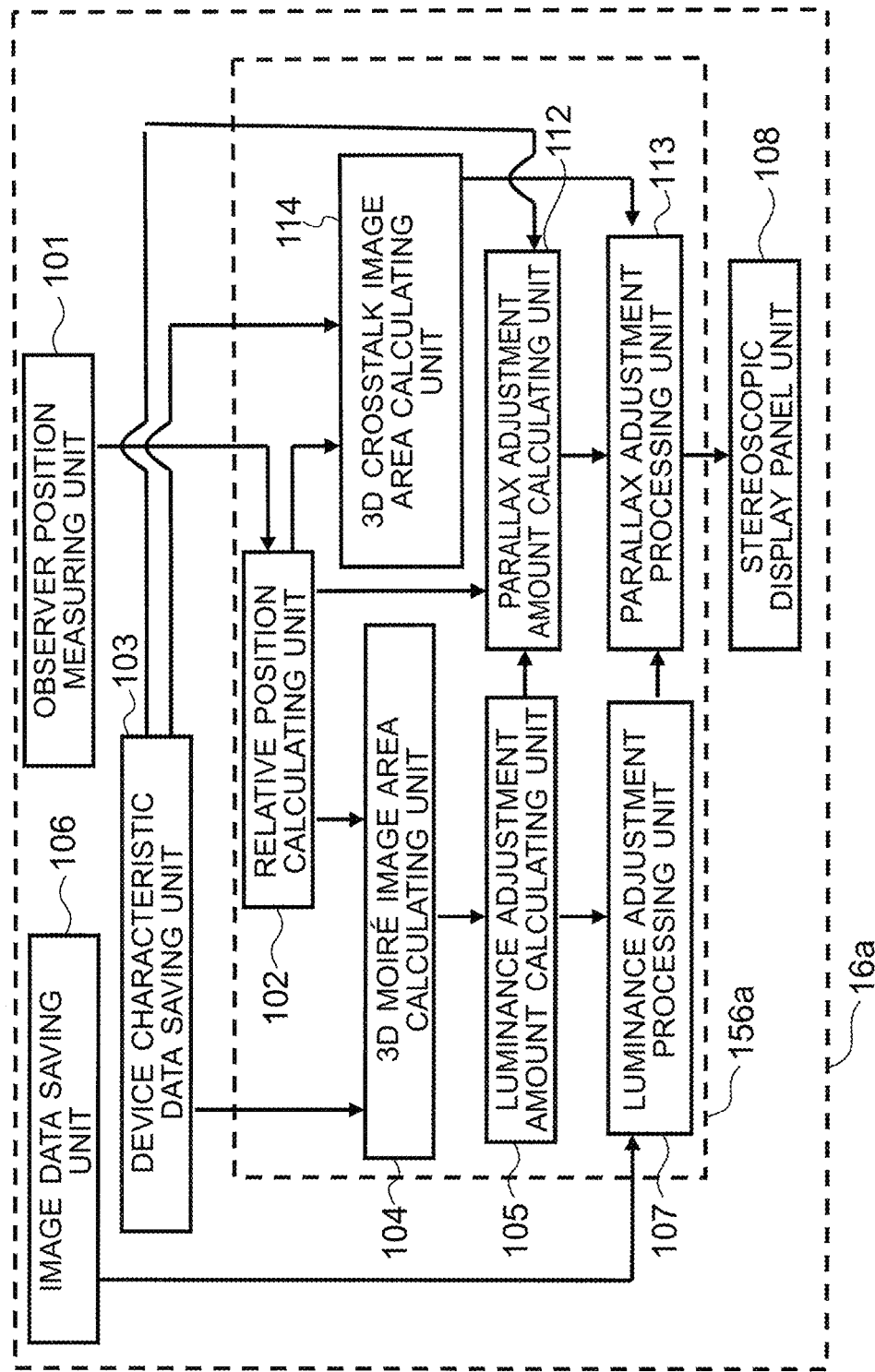
FIG. 65 is block diagram showing a stereoscopic image display device according to a modification example of the sixth exemplary embodiment.

FIG. 65 shows the modification example of the sixth exemplary embodiment. The structure of a stereoscopic image display device 16*a* of this example is acquired by adding a 3D crosstalk image area calculating unit 114 to the structure shown in FIG. 60. The 3D crosstalk image area calculating unit 114 calculates the 3D crosstalk image area from the relative position calculated by the relative position calculating unit 102 and the 3D crosstalk characteristic data saved in the device characteristic data saving unit 103. As the method for calculating the 3D crosstalk image area, the optical model chart showing the 3D-crosstalk viewing space is derived from the 3D crosstalk characteristic data and the observed image for the relative position is detected to calculate the image area where the CT-image by the 3D crosstalk appears. Note that the processing unit including the 3D crosstalk image area calculating unit 114 is defined as an image processing unit 156*a*.

Figure 66:
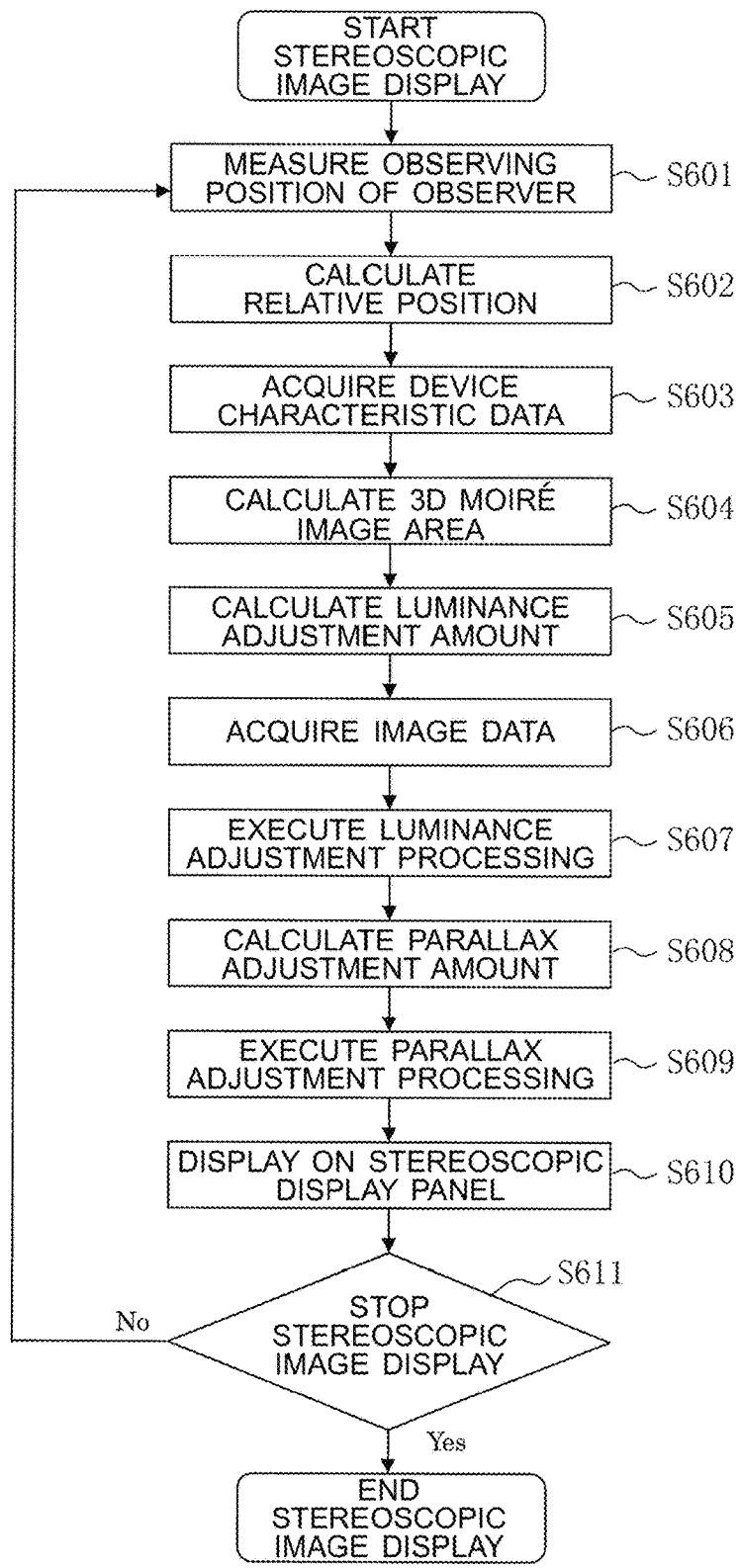
FIG. 66 is a flowchart of a stereoscopic image processing method.

A flowchart of the stereoscopic image processing method used in the stereoscopic image display devices 16 and 16*a* according to the sixth exemplary embodiment will be described by referring to FIG. 66.

Step S601 to step S607 are same as step S101 to step S107 of the first exemplary embodiment.

In step S608, the parallax adjustment amount for lightening the influence of the CT-image by the 3D crosstalk is calculated by using the parallax adjustment amount calculating unit 112 based on the relative position calculated by the relative position calculating unit 102 and the 3D crosstalk characteristic data saved in the device characteristic data saving unit 103

In step S609, the parallax adjustment processing is performed on the luminance-adjusted image data by using the parallax adjustment processing unit 113 according to the parallax adjustment amount calculated in step S608.

In step S610 and step S611, the same processing executed in step S108 and step S109 according to the first exemplary embodiment is performed.

As described above, it is possible to provide the stereoscopic image display device and the stereoscopic image processing method with which both the influence of the luminance fluctuation by the 3D moiré and the influence of the CT-image by the 3D crosstalk are lightened so that a sense of discomfort is not felt by the observer even when the observing position of the observer is shifted.

In other words, the stereoscopic image display device according to the sixth exemplary embodiment includes: the observer position measuring unit which measures the observing position of the observer; the relative position calculating unit which calculates the relative position between the observing position of the observer and the position of the stereoscopic display panel; the device characteristic data saving unit which saves the device characteristic data for the relative position of the stereoscopic display panel; the luminance adjustment amount calculating unit which calculates the luminance adjustment amount suited for stereoscopic image display for the relative position based on the device characteristic data; the parallax adjustment amount calculating unit which calculates the parallax adjustment amount suited for stereoscopic image display for the relative position based on the device characteristic data; the image data saving unit which saves or receives the image data; the luminance adjustment processing unit which performs the luminance adjustment processing on the image data according to the luminance adjustment amount; the parallax adjustment processing unit which performs the parallax adjustment processing on the luminance-adjusted image data according to the parallax adjustment amount; and the stereoscopic display panel unit which projects the image data on which the luminance adjustment processing and the parallax adjustment processing are performed to the right eye and the left eye according to the relative position.

With the sixth exemplary embodiment, it is possible to provide the stereoscopic image display device and the stereoscopic image processing method with which the influence of the CT-image by the 3D crosstalk is lightened in addition to the influence of the luminance fluctuation by the 3D moiré so that a sense of discomfort is not felt by the observer even when the observing position of the observer is shifted, through performing parallax adjustment processing for lightening the influence of the CT-image by the 3D crosstalk on the image data from which the influence of the luminance fluctuation by the 3D moiré is lightened by performing the luminance adjustment processing.

Seventh Exemplary Embodiment

It is an exemplary object of a seventh exemplary embodiment to provide a stereoscopic image display device and a stereoscopic image processing method with which not only the influence of the luminance fluctuation by the 3D moiré but also the influence of the CT-image by the 3D crosstalk is lightened so that a sense of discomfort is not felt by the observer even when the observing position of the observer is shifted, through performing image filtering processing for lightening the influence of the CT-image by the 3D crosstalk on the image data from which the influence of the luminance fluctuation by the 3D moiré is lightened by performing the luminance adjustment processing.

FIG. 61 shows 3D crosstalk for the viewing angle direction of the stereoscopic display panel. The 3D moiré image area shown in FIG. 4 and the 3D crosstalk image area shown in FIG. 61 almost coincide with each other. Thus, the image filtering processing for easing the 3D crosstalk is performed based on the information of the 3D moiré image area calculating unit.

Figure 67:
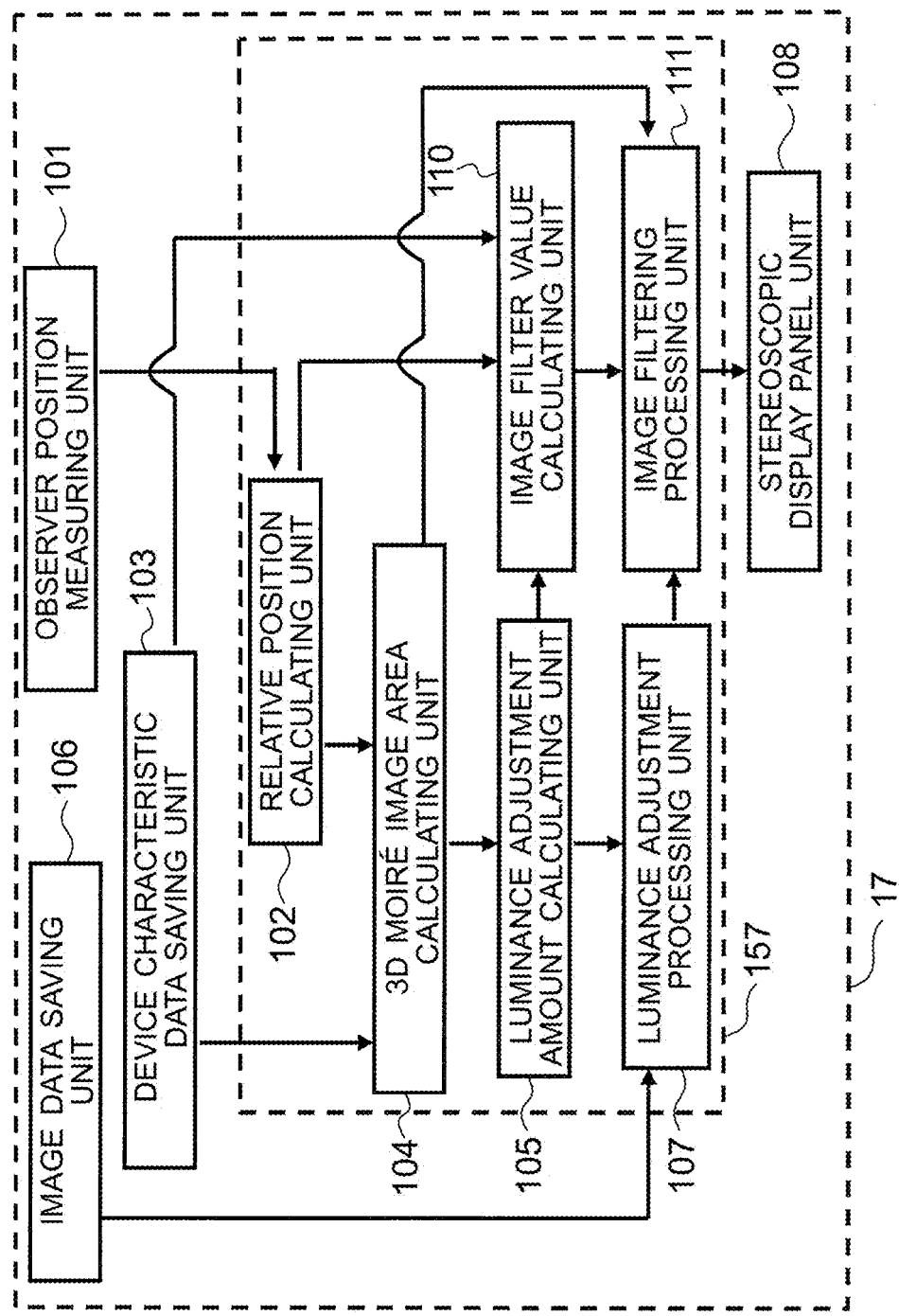
FIG. 67 is block diagram showing a stereoscopic image display device according to a seventh exemplary embodiment.

FIG. 67 is a block diagram of a stereoscopic image display device 17. The stereoscopic image display device 17 includes: an observer position measuring unit 101; a relative position calculating unit 102; a device characteristic data saving unit 103; a 3D moiré image area calculating unit 104; a luminance adjustment amount calculating unit 105; an image filter value calculating unit 110 which calculates the image filter value suited for stereoscopic image display for the relative position based on the device characteristic data; an image data saving unit 106; a luminance adjustment processing unit 107; an image filtering processing unit 111 which performs the image filtering processing on the luminance-adjusted image data according to the image filter value; and a stereoscopic display panel unit 108 which projects the image data on which the luminance adjustment processing and the image filtering processing are performed to the right eye and the left eye according to the relative position. Further, a processing unit that is an integration of the relative position calculating unit 102, the 3D moiré image area calculating unit 104, the luminance adjustment amount calculating unit 105, the luminance adjustment processing unit 107, the image filter value calculating unit 110, and the image filtering processing unit 111 is referred to as an image processing unit 157.

The observer position measuring unit 101, the relative position calculating unit 102, the device characteristic data saving unit 103, the 3D moiré image area calculating unit 104, the luminance adjustment amount calculating unit 105, the image data saving unit 106, the luminance adjustment processing unit 107, and the stereoscopic display panel unit 108 are the same as those of the first exemplary embodiment.

The image filter value calculating unit 110 according to the seventh exemplary embodiment calculates the image filter value appropriate for lightening the CT-image by the 3D crosstalk from the 3D crosstalk characteristic data saved in the device characteristic data saving unit 103. As the first processing of the method for calculating the parallax adjustment amount, the viewing angle range of a stereoscopic viewing space where no CT-image by the 3D crosstalk appears and a proper stereoscopic image is projected, the viewing angle of a 3D-crosstalk viewing space where a CT-image by the 3D crosstalk appears, and the viewing angle range of a pseudoscopic viewing space where no CT-image by the 3D crosstalk appears but a left-eye image is projected to the right eye and a right-eye image is projected to the left eye are detected from the threshold value of the 3D crosstalk amount. At that time, through setting two or more threshold values of the 3D crosstalk amount, the viewing angle range of the 3D-crosstalk viewing space where a CT-image by the 3D crosstalk appears but a stereoscopic image can be visibly recognized since the influence thereof is small may be separated from the viewing angle range of the 3D-crosstalk viewing space where the influence of the CT-image by the 3D crosstalk is large so that the stereoscopic image cannot be visibly recognized.

As the second processing, the image filter value suited for stereoscopic image display is set at the viewing angles to be the respective boundary positions of the stereoscopic viewing space, the 3D-crosstalk viewing space, and the pseudoscopic viewing space. The image filter value for the threshold value of the 3D crosstalk amount is set through deriving it by conducting a subjective evaluation experiment.

As the third processing, the image filter values at all the viewing angles are calculated by performing interpolation with a line that passes through a plurality of points acquired from the viewing angles to be the boundary positions and the image filter values thereof.

As the fourth processing, the viewing angle is calculated from the relative position, and the image filter value for the viewing angle is calculated. Through the processing described above, the image filter value can be calculated.

The image filtering processing unit 111 according to the seventh exemplary embodiment performs the image filtering processing on the luminance-adjusted image data in the image area calculated by the 3D moiré image area calculating unit 104 according to the image filter value calculated by the image filter value calculating unit 110. With the stereoscopic display panel unit 108 having the device characteristic of the luminance characteristic data shown in FIG. 4, the image area where a CT-image by the 3D crosstalk is generated becomes almost equivalent to the image area where the luminance fluctuation by the 3D moiré is generated calculated by the 3D moiré image area calculating unit 104. The image area where the CT-image by the 3D crosstalk appears at an arbitrary relative position is the same as the range shown in FIG. 62 depicted in the sixth exemplary embodiment.

As described above, after lightening the influence of the luminance fluctuation by the 3D moiré by performing the luminance adjustment processing depicted in the first exemplary embodiment, the image filtering processing is performed only on the image area where the CT-image by the 3D crosstalk appears. Thereby, it is possible to lighten both the influence of the luminance fluctuation by the 3D moiré and the influence of the CT-image by the 3D crosstalk while suppressing the deterioration of the image quality caused by the image filtering processing for the other image areas.

As in the case of the first exemplary embodiment, the seventh exemplary embodiment can be applied to the stereoscopic display device of multi-viewpoints. Needless to say, it is possible to provide the image processing unit 157 of the seventh exemplary embodiment as an individual image processing unit, and to achieve the function of the stereoscopic image display device 17 in combination with the stereoscopic display panel unit 108.

Now, as a modification example of the seventh exemplary embodiment, there is considered a case where the luminance characteristic data of a stereoscopic display panel has a luminance fluctuation to be the 3D moiré within a stereoscopic image area as shown in FIG. 34. As in the modification example of the sixth exemplary embodiment, there is an area where the 3D moiré image area and the 3D crosstalk image area do not match with each other.

For example, with the stereoscopic image display device having the luminance characteristic data shown in FIG. 34, the observed image is displayed as in a state shown in FIG. 64 when the relative position is the position C of FIG. 6A. In the display, the 3D moiré image area is the positions $x_3$, $x_4$, $x_5$, and $x_6$ in the X-axis direction of FIG. 64. However, the 3D crosstalk image area is the positions $x_3$ and $x_4$ in the X-axis direction of FIG. 64 from the 3D crosstalk characteristic data shown in FIG. 61, and it can be seen that the both image areas do not match with each other. Therefore, in a case of handling the luminance characteristic data having the luminance fluctuation to be the 3D moiré within a stereoscopic normal vision range, it is necessary to calculate the 3D crosstalk image area separately from the image area calculated by the 3D moiré image area calculating unit 104.

Figure 68:
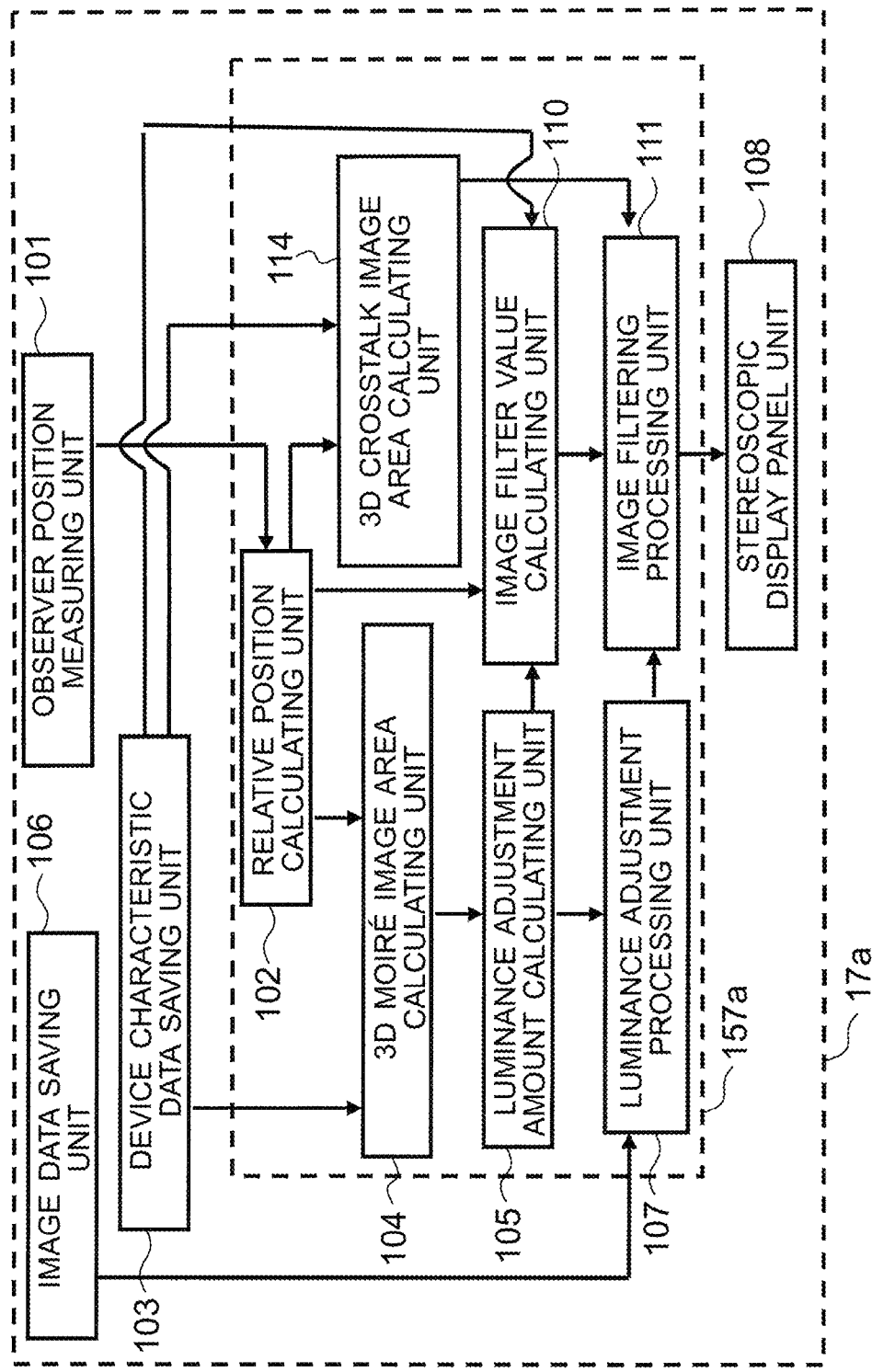
FIG. 68 is block diagram showing a stereoscopic image display device according to a modification example of the seventh exemplary embodiment.

FIG. 68 shows the modification example of the seventh exemplary embodiment. The structure of a stereoscopic image display device 17a of this example is acquired by adding a 3D crosstalk image area calculating unit 114 to the structure shown in FIG. 67. The 3D crosstalk image area calculating unit 114 calculates the 3D crosstalk image area from the relative position calculated by the relative position calculating unit 102 and the 3D crosstalk characteristic data saved in the device characteristic data saving unit 103. As the method for calculating the 3D crosstalk image area, the optical model chart showing the 3D-crosstalk viewing space is derived from the 3D crosstalk characteristic data and the observed image for the relative position is detected to calculate the image area where the CT-image by the 3D crosstalk appears. Note that the processing unit including the 3D crosstalk image area calculating unit 114 is defined as an image processing unit 157a.

Figure 69:
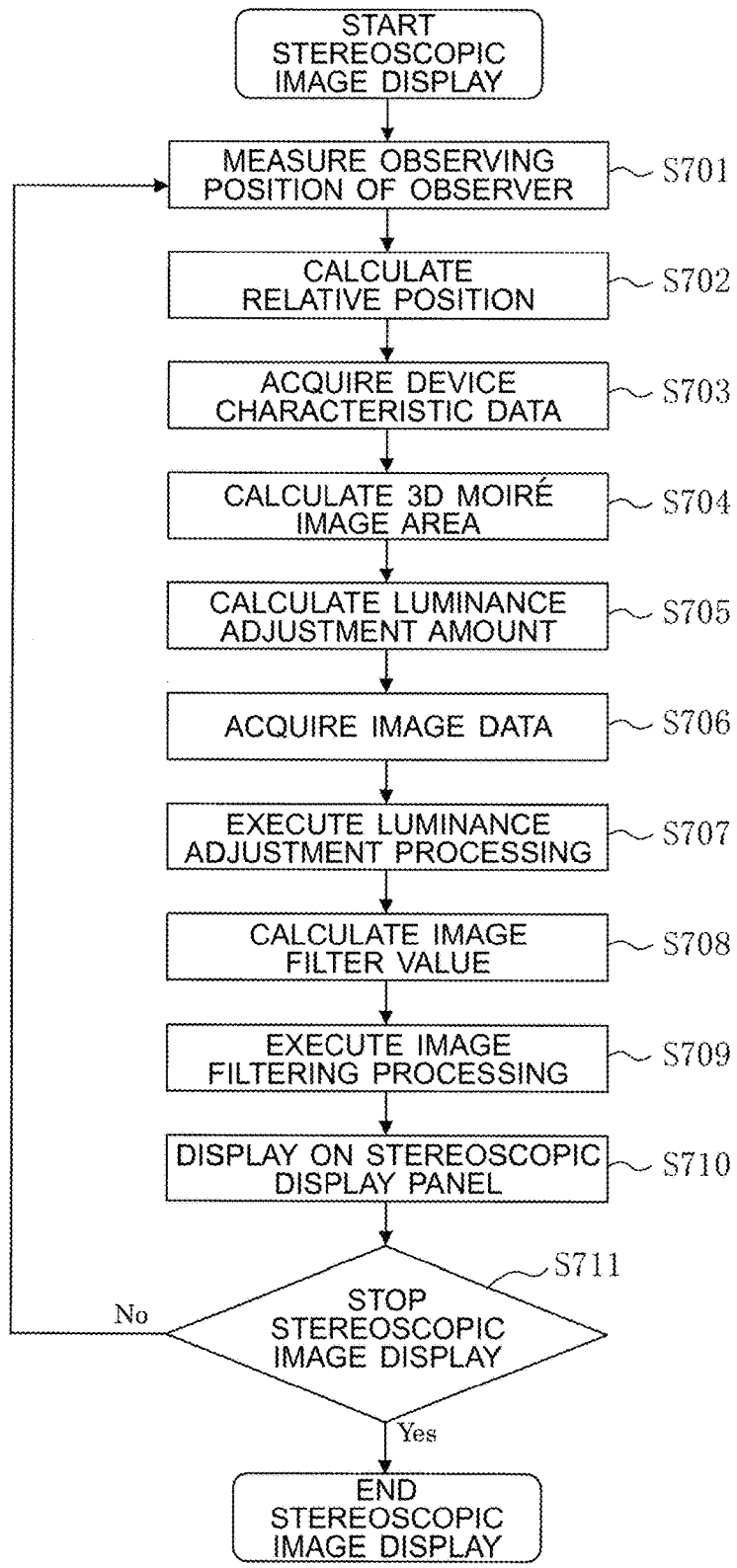
FIG. 69 is a flowchart of a stereoscopic image processing method.

A flowchart of the stereoscopic image processing method used in the stereoscopic image display devices 17 and 17a according to the seventh exemplary embodiment will be described by referring to FIG. 69.

Step S701 to step S707 are same as step S101 to step S107 of the first exemplary embodiment. In step S708, the image filter value for lightening the influence of the CT-image by the 3D crosstalk is calculated by using the image filter value calculating unit 110 based on the relative position calculated by the relative position calculating unit 102 and the 3D crosstalk characteristic data saved in the device characteristic data saving unit 103

In step S709, the image filtering processing is performed on the luminance-adjusted image data in the image area where the CT-image by the 3D crosstalk appears by using the image filtering processing unit 111 according to the image filter value calculated in step S708.

In step S710 and step S711, the same processing executed in step S108 and step S109 according to the first exemplary embodiment is performed.

As described above, it is possible to provide the stereoscopic image display device and the stereoscopic image processing method with which both the influence of the luminance fluctuation by the 3D moiré and the influence of the CT-image by the 3D crosstalk are lightened so that a sense of discomfort is not felt by the observer even when the observing position of the observer is shifted.

In other words, the stereoscopic image display device according to the seventh exemplary embodiment includes: the observer position measuring unit which measures the observing position of the observer; the relative position calculating unit which calculates the relative position between the observing position of the observer and the position of the stereoscopic display panel; the device characteristic data saving unit which saves the device characteristic data for the relative position of the stereoscopic display panel; the luminance adjustment amount calculating unit which calculates the luminance adjustment amount suited for stereoscopic image display for the relative position based on the device characteristic data; the image filter value calculating unit which calculates the image filter value suited for stereoscopic image display for the relative position based on the device characteristic data; the image data saving unit which saves or receives the image data; the luminance adjustment processing unit which performs the luminance adjustment processing on the image data according to the luminance adjustment amount; the image filtering processing unit which performs the image filtering processing on the luminance-adjusted image data according to the image filter value; and the stereoscopic display panel unit which projects the image data on which the luminance adjustment processing and the parallax adjustment processing are performed to the right eye and the left eye according to the relative position.

With the seventh exemplary embodiment, it is possible to provide the stereoscopic image display device and the stereoscopic image processing method with which the influence of the CT-image by the 3D crosstalk is lightened in addition to the influence of the luminance fluctuation by the 3D moiré so that a sense of discomfort is not felt by the observer even when the observing position of the observer is shifted, through performing the image filtering processing for lightening the influence of the CT-image by the 3D crosstalk on the image data from which the influence of the luminance fluctuation by the 3D moiré is lightened by performing the luminance adjustment processing.

Eighth Exemplary Embodiment

It is an exemplary object of an eighth exemplary embodiment to provide a stereoscopic image display device and a stereoscopic image processing method with which the influence of the luminance fluctuation by the 3D moiré is lightened so that a sense of discomfort is not felt by the observer even when the observer observes the stereoscopic image display device from the top-to-bottom direction.

In the first exemplary embodiment, presented is the case where the luminance profile on the plane of the stereoscopic display panel is calculated by considering the changes in the viewing angles θ and the observing distance D caused due to the shift in the relative position between the observing position of the observer and the stereoscopic display panel to lighten the influence of the luminance fluctuation by the 3D moiré. Note here that the viewing angle θ shows the angles on the X-Z plane corresponding to the lateral direction of the stereoscopic display panel. In a case where the luminance profiles on the plane of the stereoscopic display panel observed by the observer are the same when viewed from the front direction and from the top-to-bottom direction, the luminance profile on the stereoscopic display panel at an arbitrary relative position can be calculated by using the luminance profile calculation method depicted in the first exemplary embodiment.

However, in a case where the luminance profiles on the plane of the stereoscopic display panel observed by the observer are different when viewed from the front direction and from the top-to-bottom direction, it is necessary to lighten the influence of the luminance fluctuation by the 3D moiré through calculating the luminance profile on the stereoscopic display panel by also considering the viewing angles φ on the X-Z-axis plane that corresponds to the top-to-bottom direction of the stereoscopic display panel.

Figure 70:
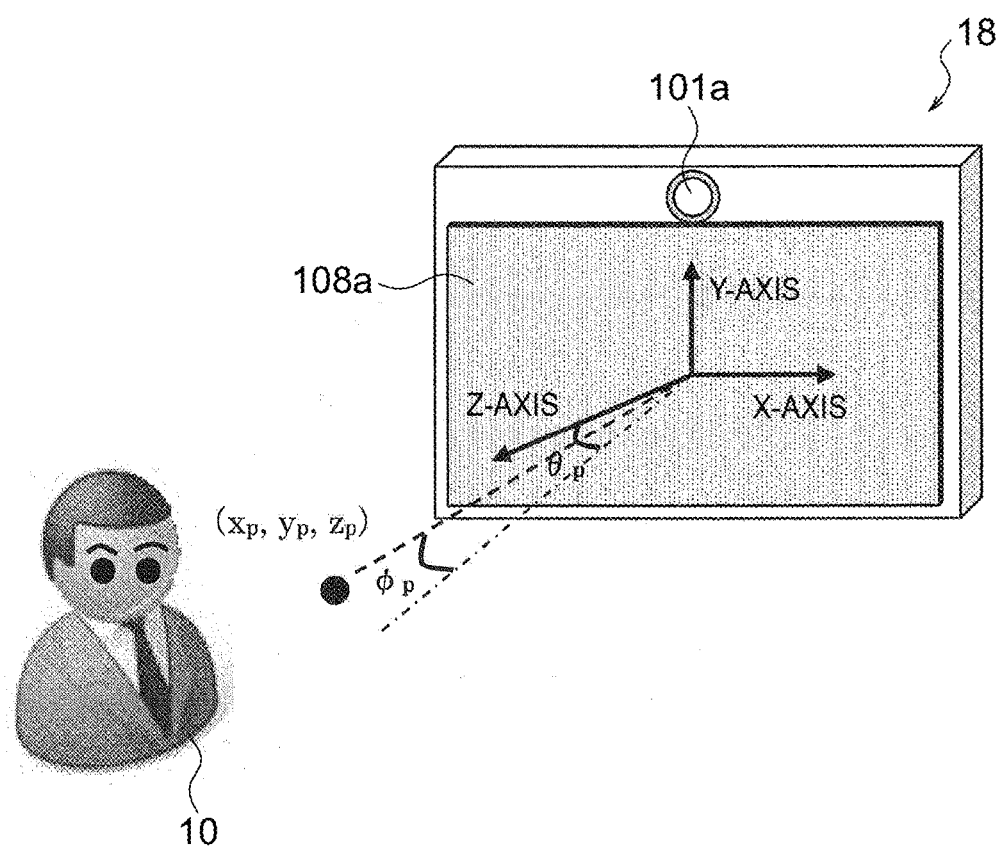
FIG. 70 is a chart showing a coordinate system of the relative position regarding the observing position of an observer and the stereoscopic display panel.

FIG. 70 shows a chart of a coordinate system of the relative positions regarding the observing position of an observer and the stereoscopic display panel. In FIG. 70, the observer 10, a stereoscopic image display device 18, the stereoscopic display panel 108a, a camera 101a, and the like are illustrated. The relative position is expressed with the viewing angle $\theta_p$ on the X-Z-axis plane, the viewing angle $\varphi_p$ on the Y-Z-axis plane, and the observing distance $D_p$. Provided that the relative positions is ($x_p$, $y_p$, $z_p$), the viewing angle $\varphi_p$ is calculated from Formula (80), and the viewing angle $\theta_p$ and the observing distance $D_p$ are calculated from Formula (4) and Formula (3) as in the case of the first exemplary embodiment.

$$\varphi_p = \tan^{-1}(y_p/z_p) \qquad \text{Formula (80)}$$

It is considered that one of the reasons the luminance profile on the plane of the stereoscopic display panel 108a varies depending on the viewing angle φ is the influence of the defocus effect caused by the difference between the optical path length from the liquid crystal panel as an electro-optical module to the lenticular lens as an optical separating module within the stereoscopic display panel 108a and the focal distance of the lenticular lens.

Some stereoscopic image display devices are optically designed in such a manner that the optical path length between the liquid crystal panel and the lenticular lens is slightly shorter (or longer) than the focal distance of the lenticular lens for defocusing (blurring) the image data displayed on the liquid crystal panel plane with the lenticular lens in order to lighten the influence of the luminance fluctuation by the 3D moiré. When the stereoscopic display panel is observed from the front direction, the influence of the luminance fluctuation by the 3D moiré is lightened by the defocus effect. However, when the stereoscopic display panel is observed from the top-to-bottom direction, the defocus effect is decreased and the influence of the luminance fluctuation by the 3D moiré is not lightened when the optical path length between the liquid crystal panel and the lenticular lens is changed and becomes close to the focal distance of the lenticular lens.

Figure 71:
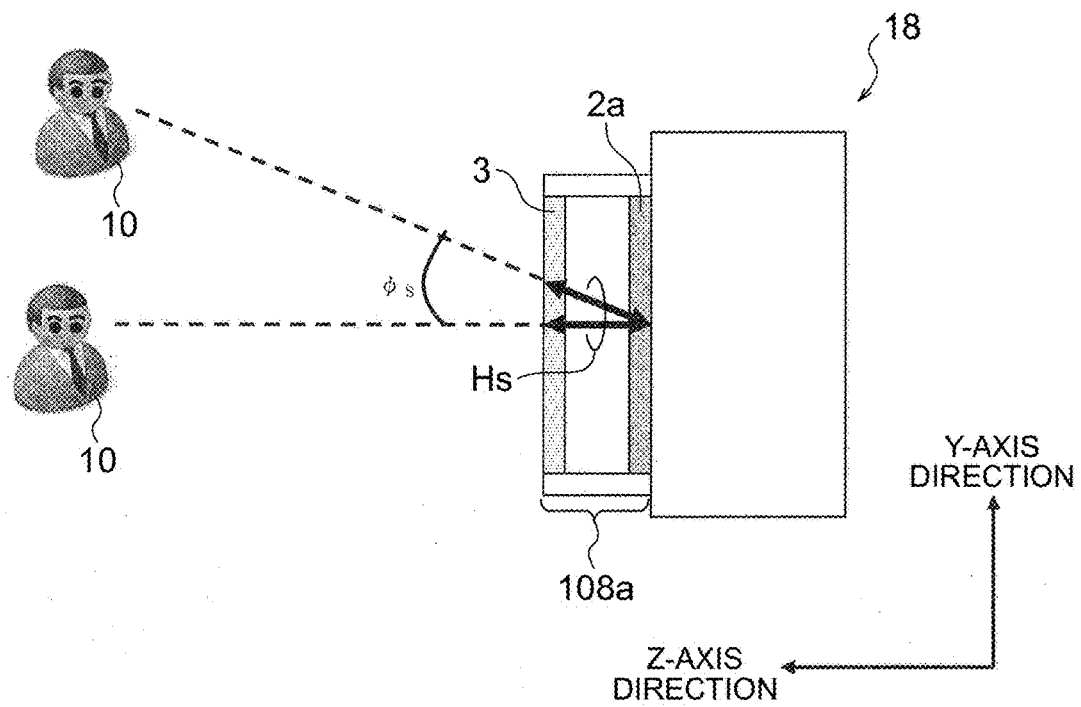
FIG. 71 is a chart showing changes in the optical path length between a liquid crystal display panel and a lenticular lens.

FIG. 71 shows changes in the optical path length between the liquid crystal panel and the lenticular lens with respect to the viewing angle φ. In FIG. 71, the observer 10, the stereoscopic image display device 18, the stereoscopic display panel 108a, the liquid crystal panel 2a, the lenticular lens 3, the viewing angle $φ_S$, the optical path length $H_S$, and the like are illustrated. Provided that the viewing angle difference between the relative position when observing the stereoscopic display panel 108a from the front direction and the relative position when observing the stereoscopic display panel 108a from the upper direction is $φ_S$ and the optical path length between the liquid crystal panel 2a and the lenticular lens 3 is $H_S$, the optical path length $H_S$ can be expressed as in Formula (81).

$$H_S = (1/\cos φ_S) H_D \quad \text{Formula (81)}$$

Note here that $H_D$ shows the distance between the liquid crystal panel 2a and the lenticular lens 3 (equivalent to the optical path length between the liquid crystal panel 2a and the lenticular lens 3 when the stereoscopic display panel 108a is observed from the front direction). From Formula (81), the optical path length $H_S$ increases as the viewing angle difference $φ_S$ increases.

Figure 72:
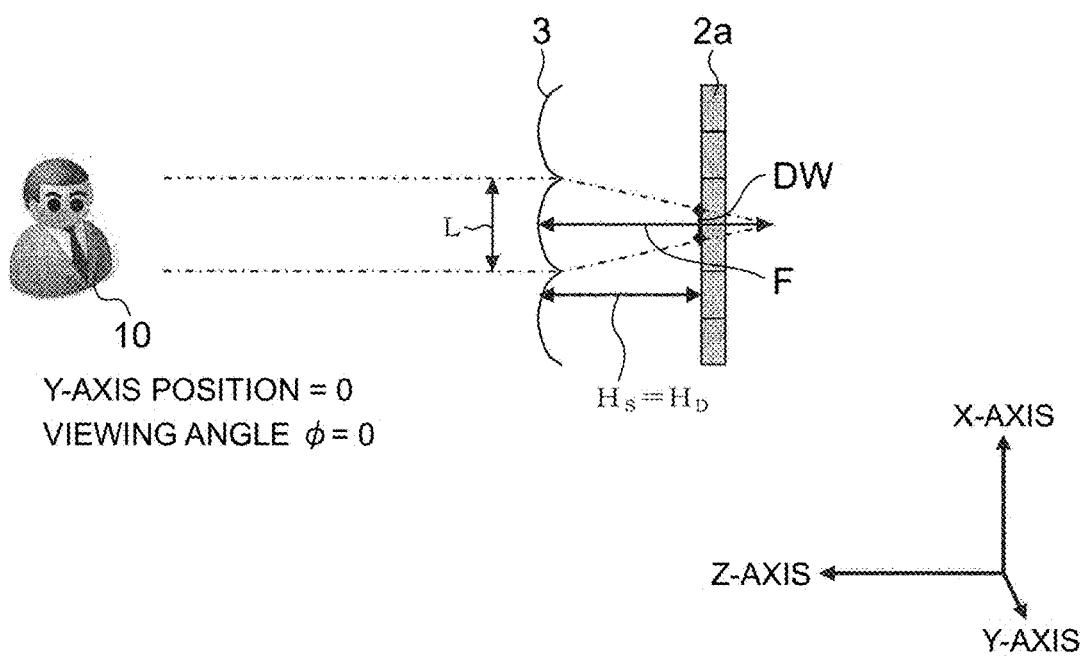
FIG. 72 shows a chart showing changes in the defocus effect depending on the optical path length.
Figure 73:
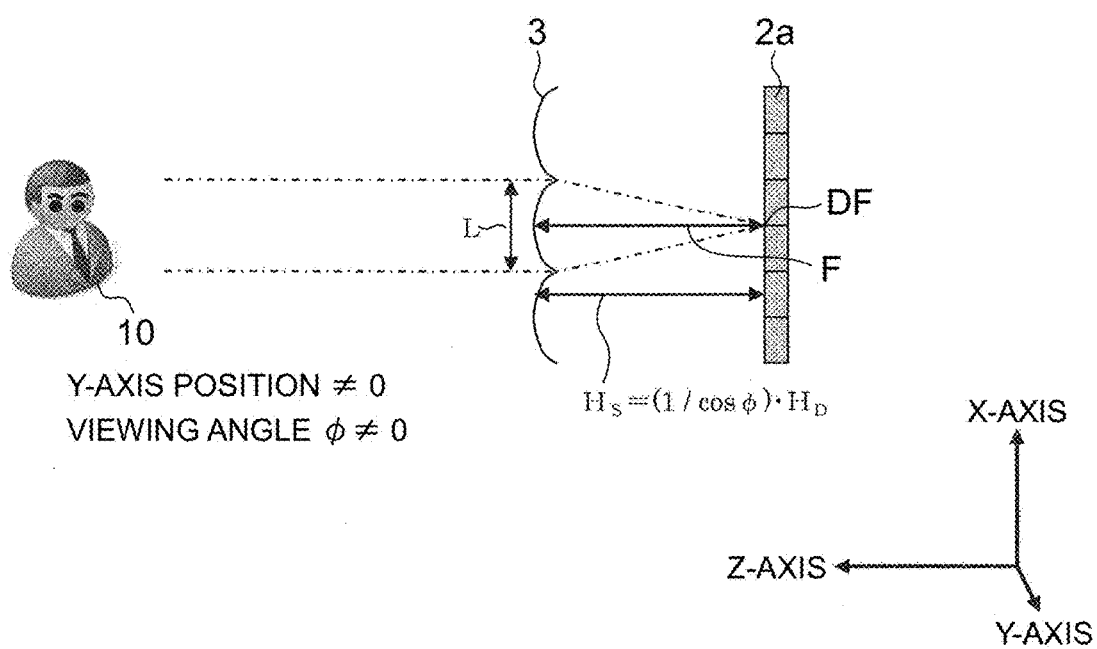
FIG. 73 shows a chart showing changes in the defocus effect depending on the optical path length.

FIG. 72 and FIG. 73 show the changes in the defocus effect caused by the changes in the optical path length $H_S$. FIG. 72 shows the defocus width DW by the lenticular lens 3 when the stereoscopic display panel 108a is observed from the front direction. The viewing angle φ is 0 when observed from the front direction, so that the optical path length $H_S$ and the distance $H_D$ from the liquid crystal panel 2a to the lenticular lens 3 are equivalent.

In FIG. 72, provided that the defocused width of the image data displayed on the liquid crystal panel 2a by the lenticular lens 3 is DW, the defocus width DW is expressed as in Formula (82).

$$DW = L(F - H_S)/F \quad \text{Formula (82)}$$

Note here that F shows the focal distance of the lenticular lens 3, and L is the width of the lenticular lens 3 (cylindrical lens width). The focal distance F of the lenticular lens 3 is defined as the focal distance stipulated from the curvature radius of the lenticular lens 3 on the optical path when the stereoscopic display panel 108a is observed from the front direction. As can be seen from Formula (82), the defocus width DW is proportional to the difference between the focal distance F of the lenticular lens 3 and the optical path length $H_S$.

FIG. 73 shows the defocus width DW by the lenticular lens 3 when the stereoscopic display panel 108a is observed from the top-to-down direction. The viewing angle φ has a value in the top-to-down direction, so that the optical path length $H_S$ is calculated from Formula (81). When the optical path length $H_S$ increases and becomes equivalent to the focal distance F of the lenticular lens 3, the defocus width DW becomes 0. Thus, the defocus effect by the lenticular lens 3 disappears.

Figure 80:
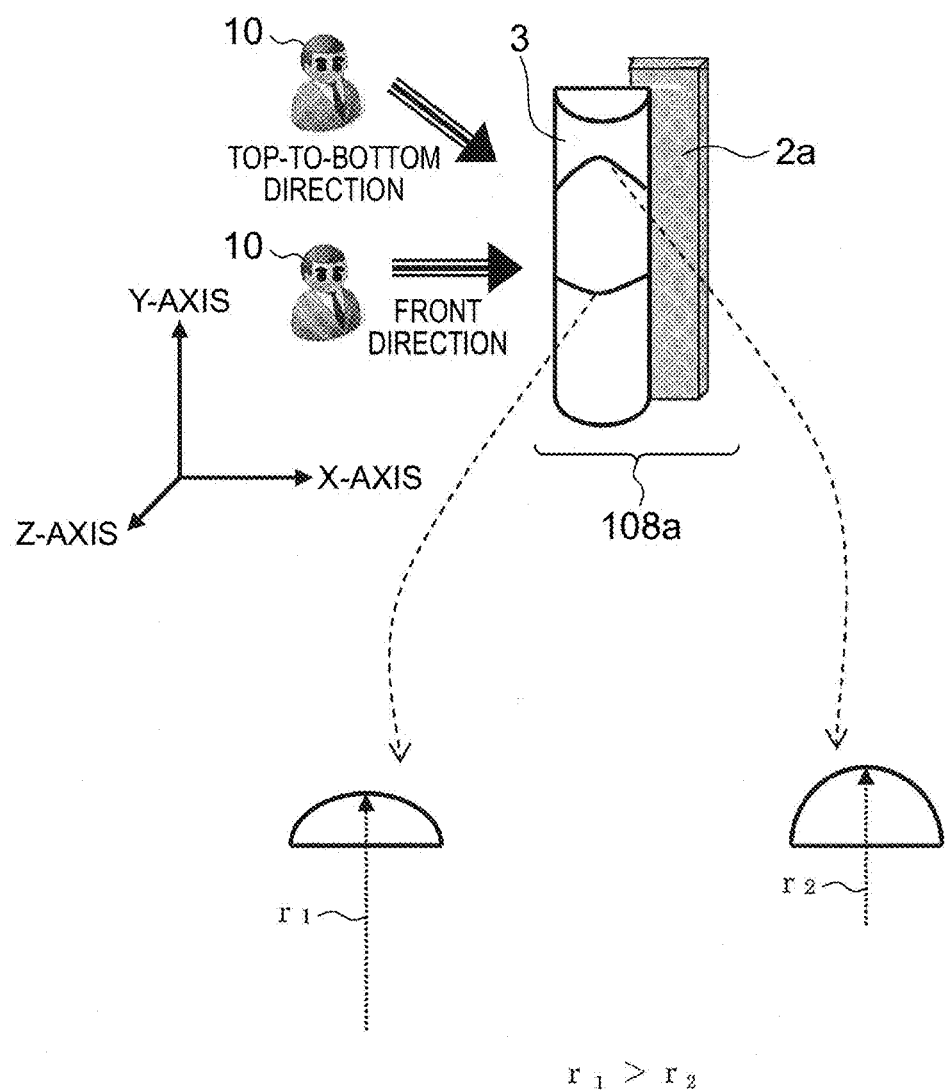
FIG. 80 is an illustration showing the apparent curvature radius of a lenticular lens depending on the observing position.

As shown in FIG. 80, the optical path going through the inside of the lenticular lens 3 changes when the stereoscopic display panel 108a is observed from the top-to-bottom direction. Thus, the curvature radius of the lenticular lens 3 changes depending on the positions on the curved face of the lenticular lens 3. In FIG. 80, the apparent curvature radius of the lenticular lens 3 when the stereoscopic display panel 108a is observed from the front direction is defined as $r_1$, and the apparent curvature radius of the lenticular lens 3 when the stereoscopic display panel 108a is observed from the top-to-bottom direction is defined as $r_2$.

In that case, the apparent curvature radius $r_2$ is shorter than the apparent curvature radius $r_1$. When the curvature radius of the lenticular lens 3 is shortened, the focal distance F of the lenticular lens 3 becomes shortened as well. Thus, the viewing angle φ at which the defocus effect actually disappears is an angle slightly smaller than the angle calculated from Formula (81) and Formula (82).

However, the apparent curvature radius $r_1$ matches with the curvature radius of the lenticular lens 3, so that the curvature radius is constant for the X-axis direction that is the viewing angle direction. In the meantime, the apparent curvature radius $r_2$ changes for the X-axis direction that is the viewing angle direction. Therefore, when observing the stereoscopic display panel 108a from the top-to-down direction, it is necessary to consider this point regarding the move of the image for the viewing angle direction.

Figure 74A:
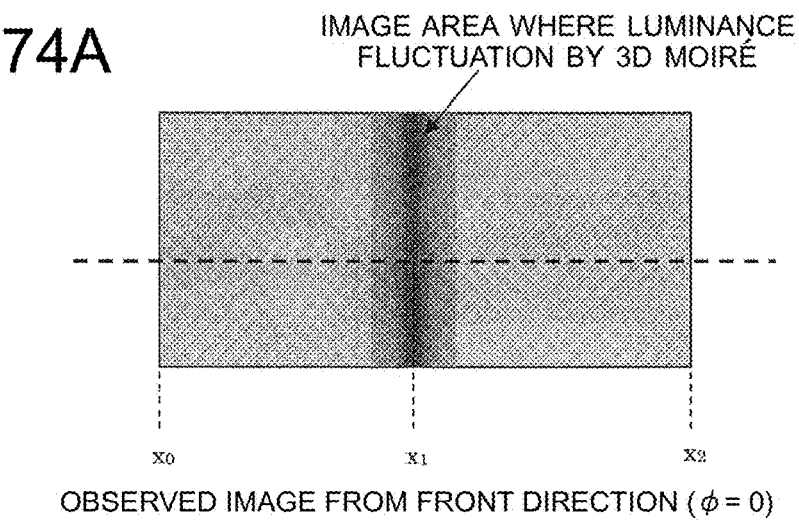
FIGS. 74A and 74B show a relational chart regarding an observed image from a front direction and a luminance profile, respectively.
Figure 74B:
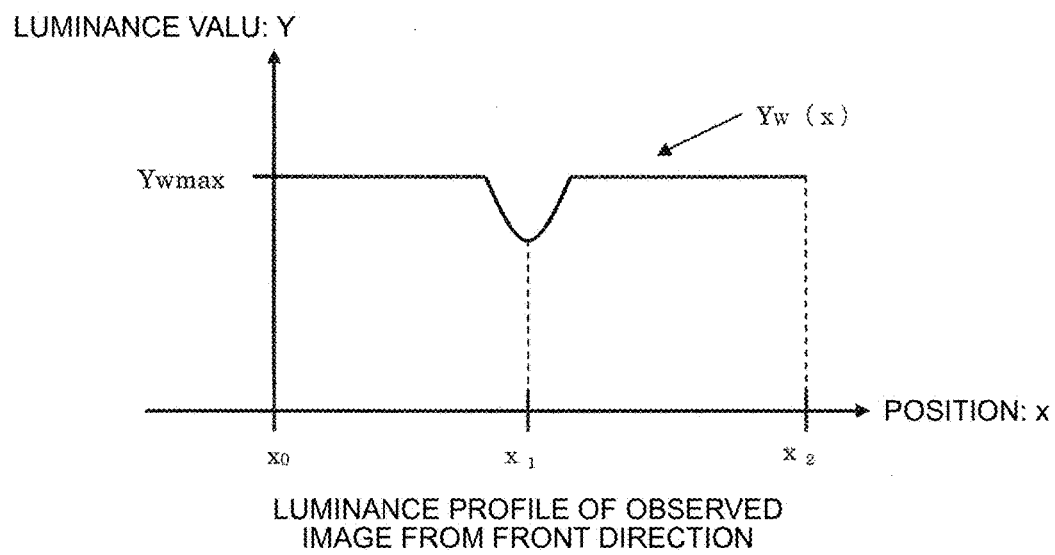
Figure 75A:
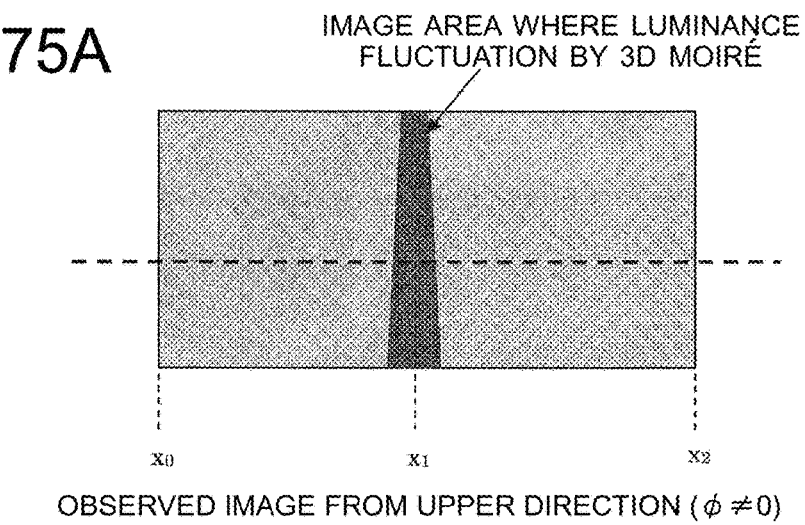
FIGS. 75A and 75B show a relational chart regarding an observed image from a top-to-bottom direction and a luminance profile, respectively.
Figure 75B:
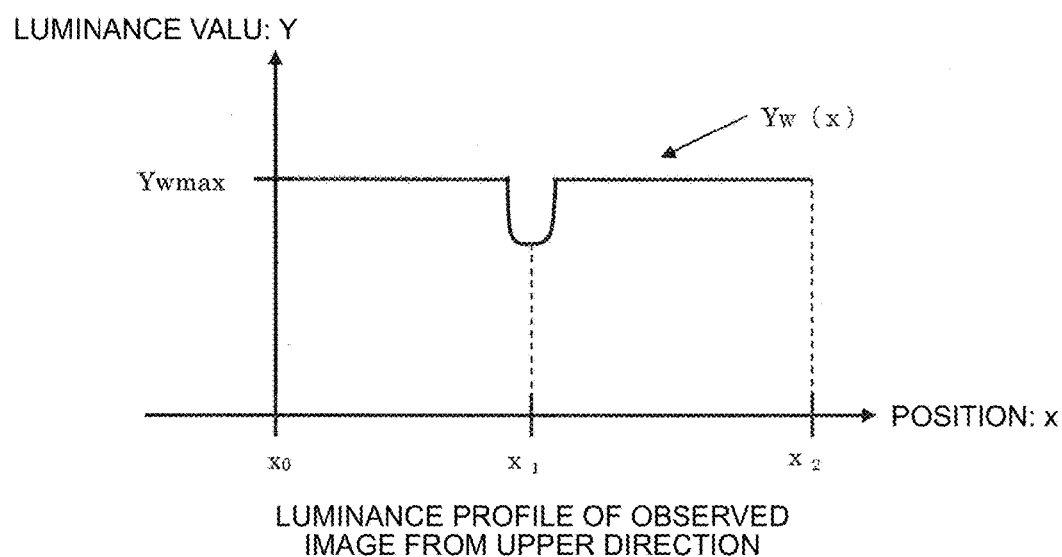

FIG. 74 shows the observed image on the plane of the stereoscopic display panel and the luminance profile when the observer observes the stereoscopic display panel from the front direction. FIG. 75 shows the observed image on the plane of the stereoscopic display panel and the luminance profile when the observer observes the stereoscopic display panel from the upper direction.

In FIG. 74, the image data is defocused due to the defocus effect of the lenticular lens, so that the image area where the luminance fluctuation by the 3D moiré occurs is widened. However, the luminance profile gradually fluctuates and becomes inconspicuous. Thus, the influence of the luminance fluctuation by the 3D moiré is lightened. In the meantime, in FIG. 75, the defocus effect by the lenticular lens disappears, so that the image area where the luminance fluctuation by the 3D moiré occurs is narrowed. However, the luminance profile fluctuates drastically, so that the influence of the luminance fluctuation by the 3D moiré becomes prominent.

Even when the relative positions between the observer and the stereoscopic display panel are the same, the viewing angle φ changes depending on the positions from which the stereoscopic display panel plane is observed. Also, the optical path length $H_S$ from the liquid crystal panel to the lenticular lens and the apparent curvature radius of the lenticular lens also change. The change in the viewing angle φ depends on the Y-axis position on the stereoscopic display panel plane, so that the image area where the luminance fluctuation by the 3D moiré occurs also changes depending on the Y-axis position on the stereoscopic display panel plane. Thereby, the image area where the luminance fluctuation by the 3D moiré occurs when the stereoscopic display panel is observed from the upper direction comes to be in a trapezoid shape as shown in FIG. 75, for example.

With the eighth exemplary embodiment, the luminance adjustment processing for lightening the luminance fluctuation by the 3D moiré is performed also in the case where the luminance profiles on the stereoscopic display panel plane observed by the observer vary depending on the viewing angles φ because of the reasons such as deterioration in the defocus effect of the lenticular lens.

Figure 76:
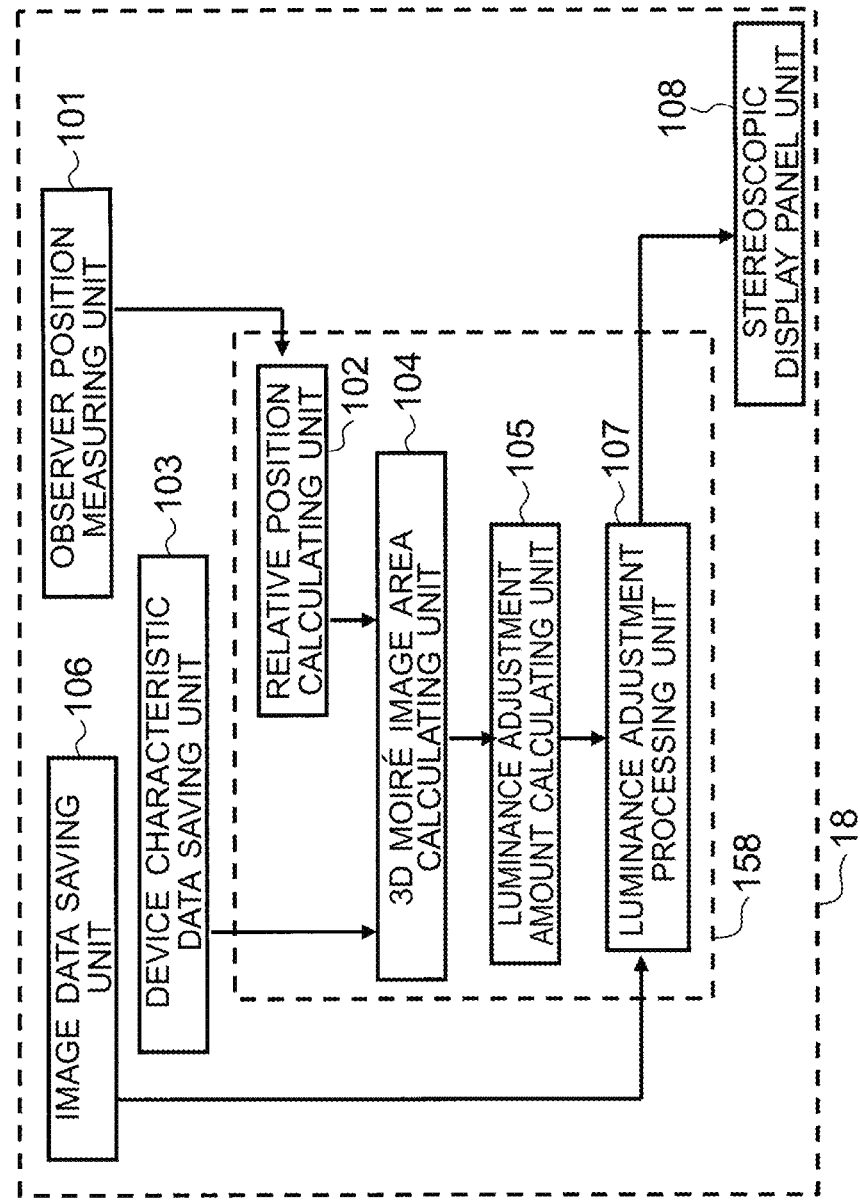
FIG. 76 is block diagram showing a stereoscopic image display device according to an eighth exemplary embodiment.

FIG. 76 is a block diagram of a stereoscopic image display device 18 according to the eighth exemplary embodiment. The stereoscopic image display device 18 includes: an observer position measuring unit 101; a relative position calculating unit 102; a device characteristic data saving unit 103; a 3D moiré image area calculating unit 104;

a luminance adjustment amount calculating unit 105; an image data saving unit 106; a luminance adjustment processing unit 107; and a stereoscopic display panel unit 108. Further, a processing unit that is an integration of the relative position calculating unit 102, the 3D moiré image area calculating unit 104, the luminance adjustment amount calculating unit 105, and the luminance adjustment processing unit 107 is referred to as an image processing unit 158.

Hereinafter, functions of each unit included in the stereoscopic image display device 18 will be described. The functions of the observer position measuring unit 101, the relative position calculating unit 102, the luminance adjustment amount calculating unit 105, the image data saving unit 106, the luminance adjustment processing unit 107, and the stereoscopic display panel unit 108 are the same as those of the first exemplary embodiment.

The device characteristic data saving unit 103 according to the eighth exemplary embodiment has a function which saves the luminance characteristic data of the stereoscopic display panel for the viewing angle θ and the viewing angle φ of the relative position as the device characteristic data. For the luminance characteristic data for the viewing angle φ, the luminance characteristic data of the stereoscopic display panel at a plurality of viewing angles φ may be measured by an evaluation device for luminance characteristic or may be calculated based on the design condition and the manufacture condition of the stereoscopic display panel.

As an example thereof, the distance $H_D$ between the liquid crystal panel and the lenticular lens, the focal distance F of the lenticular lens, and the width L of the lenticular lens are saved in advance in the device characteristic data saving unit 103, the defocus width by the lenticular lens is calculated from the viewing angle φ of the relative position, and the luminance characteristic data for an arbitrary viewing angle φ is calculated from the reference luminance characteristic data.

First, the luminance characteristic data of the stereoscopic display panel measured from the relative position at the viewing angle $φ_E$ at which the optical path length $H_S$ and the focal distance F become equivalent so that the defocus effect disappears is saved in the device characteristic data saving unit 103. The difference between the optical path length $H_S$ and the focal distance F is increased as the difference between the viewing angle $φ_E$ of the saved luminance characteristic data and the viewing angle φ of the relative position is increased, so that the defocus width by the lenticular lens is also increased according to Formula (82). Thereby, through calculating the defocus width at an arbitrary viewing angle φ and defocusing the luminance characteristic data saved in the device characteristic data saving unit 103 to calculate the luminance characteristic data at the arbitrary viewing angle φ.

As described above, through saving the distance $H_D$ between the liquid crystal panel and the lenticular lens, the focal distance F of the lenticular lens, and the width L of the lenticular lens, and the luminance characteristic data of the stereoscopic display panel at the viewing angle $φ_E$, the luminance characteristic data of the stereoscopic display panel at the arbitrary viewing angle φ can be calculated.

The 3D moiré image area calculating unit 104 calculates the image area where the luminance fluctuation by the 3D moiré occurs for the relative position calculated by the relative position calculating unit 102 based on the luminance characteristic data saved in the device characteristic data saving unit 103. In the eighth exemplary embodiment, the luminance characteristic data of the stereoscopic display panel corresponding to the viewing angle φ of the relative position is acquired from the device characteristic data saving unit 103. Then, the luminance profile on the stereoscopic display panel plane at the viewing angle θ of the relative position and the observing distance D is calculated from the optical model as in the case of the first exemplary embodiment based on the luminance characteristic data of the stereoscopic display panel corresponding to the viewing angle φ, and the image area where the luminance fluctuation by the 3D moiré occurs is calculated. Thereby, the luminance profile on the plane of the stereoscopic display panel at the arbitrary viewing angle φ, the viewing angle θ, and the observing distance D can be calculated.

As in the case of the first exemplary embodiment, the luminance adjustment amount calculating unit 105 calculates the luminance adjustment amount from the luminance profile on the plane of the stereoscopic display panel calculated by the 3D moiré image area calculating unit 104. The luminance adjustment processing unit 107 also performs the luminance adjustment processing on the image data according to the luminance adjustment amount as in the case of the first exemplary embodiment.

Further, in addition to the luminance adjustment processing, the defocus effect may be added to the image area where the luminance fluctuation by the 3D moiré occurs by performing the image filtering processing through adding the image filter value calculating unit and the image filtering processing unit to the stereoscopic image display device 18 as in the case of the fifth exemplary embodiment. The image filter value calculating unit calculates the amount of lost defocus effect of the lenticular lens by the viewing angle φ of the relative position from the luminance profile on the plane of the stereoscopic display panel calculated by the 3D moiré image area calculating unit 104, and calculates the image filter value for compensating the loss. The image filtering processing unit performs the image filtering processing for adding the defocus effect to the image area where the luminance fluctuation by the 3D moiré occurs within the image data by referring to the image filter value calculated by the image filter value calculating unit.

As described above, it is possible to provide the stereoscopic image display device and the stereoscopic image processing method with which the influence of the luminance fluctuation by the 3D moiré is lightened so that a sense of discomfort is not felt by the observer even when the defocus effect of the lenticular lens is deteriorated when the observer observes the stereoscopic image display device from the top-to-bottom direction.

In the above-described case, deterioration of the defocus effect of the lenticular lens is considered to be one of the reasons the luminance profile on the plane of the stereoscopic display panel varies depending on the viewing angle φ. Another reason may be the change in the luminance characteristic that depends on the viewing angle φ of the liquid crystal panel according to the alignment characteristic of the liquid crystal.

Figure 77A:
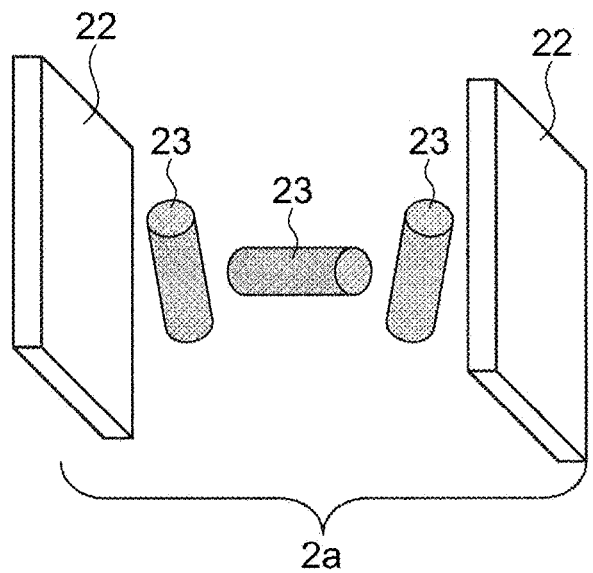
FIGS. 77A and 77B show schematic views of the layout of liquid crystal molecules at maximum voltage and no voltage, respectively.
Figure 77B:
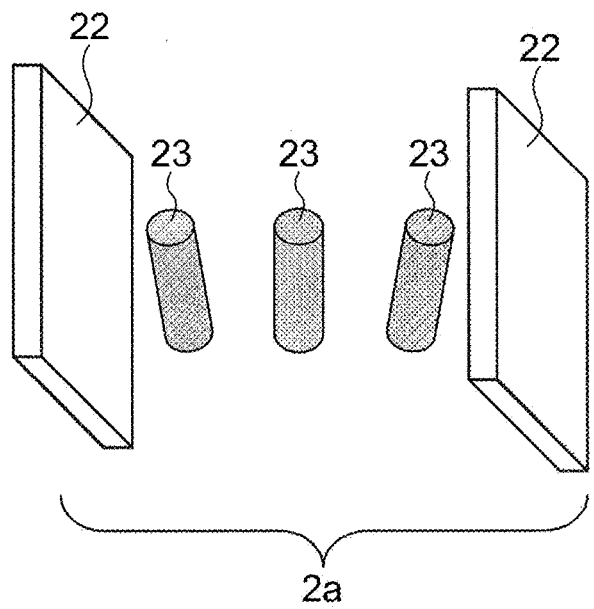
Figure 78:
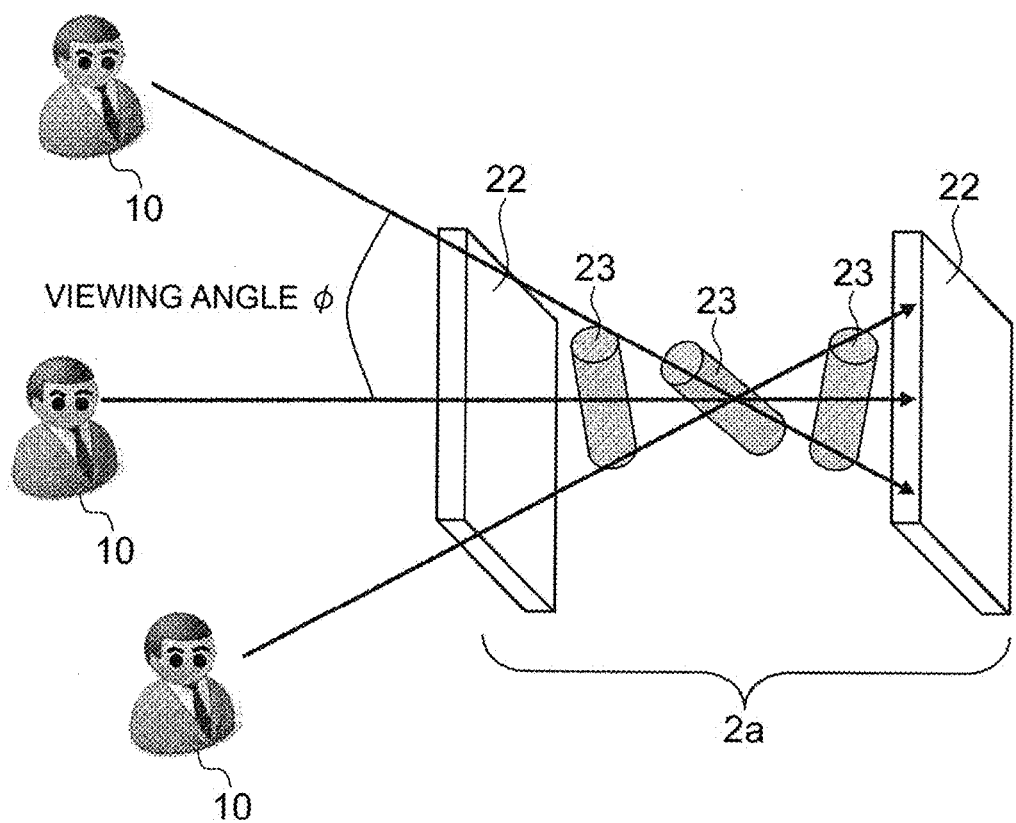
FIG. 78 shows schematic views of the layout of liquid crystal molecules.

Particularly, the changes in the luminance characteristic depending on the viewing angles are large with liquid crystal panels employing TN (Twisted Nematic) type or VA (Vertical Alignment) type driving method. FIG. 77A, FIG. 77B, and FIG. 78 show the schematic charts of the alignment of the liquid crystal molecules of the TN type. FIG. 77A is the schematic chart showing a state where a maximum voltage is applied to electrodes 22 of the liquid crystal panel 2a to completely block the light amount of a backlight. FIG. 77B is the schematic chart showing a state where the voltage of the electrodes 22 of the liquid crystal panel 2a is turned OFF to maximize the transmitting light amount of the backlight.

FIG. 78 is the schematic chart showing a state where an intermediate voltage is applied to electrodes 22 of the liquid crystal panel 2a to adjust the light amount the backlight to be an intermediate value.

As shown in FIG. 77A, FIG. 77B, and FIG. 78, the light amount of the backlight is adjusted with the angle of the liquid crystal molecules 23 in the TN system and the VA system. Thus, as shown in FIG. 78, the light amount transmitting through the liquid crystal panel 2a varies depending on the viewing angle φ of the relative position, so that the change in the luminance characteristic depending on the viewing angle φ becomes large. In the eighth exemplary embodiment, the luminance profile on the plane of the stereoscopic display panel at an arbitrary viewing angle φ may be calculated from the luminance profile on the stereoscopic panel plane at the viewing angle $φ_E$ saved in the device characteristic data saving unit 103 by considering the change in the luminance characteristic according to the alignment characteristic of the liquid crystal in addition to the deterioration in the defocus effect of the lenticular lens.

While the cases where the optical path length $H_S$ is changed depending on the viewing angle φ of the relative position and the defocus effect of the lenticular lens is deteriorated and where the luminance characteristic changes according to the alignment characteristic of the liquid crystal are depicted above. However, deterioration of the defocus effect and changes in the luminance characteristic also occur depending on the viewing angle θ of the relative position as in the case with the viewing angle φ. Therefore, the luminance adjustment processing by considering the deterioration of the defocus effect and changes in the luminance characteristic may also be performed for the viewing angle θ. However, as the luminance characteristic data for the viewing angle θ, data measured by using an evaluation device for luminance characteristic is used in many cases. Thus, the measured data may include the influence of the deterioration of the defocus effect and the changes in the luminance characteristic in many cases.

A flowchart of the stereoscopic image processing method used in the stereoscopic image display device 18 according to the eighth exemplary embodiment will be described by referring to FIG. 79.

Figure 79:
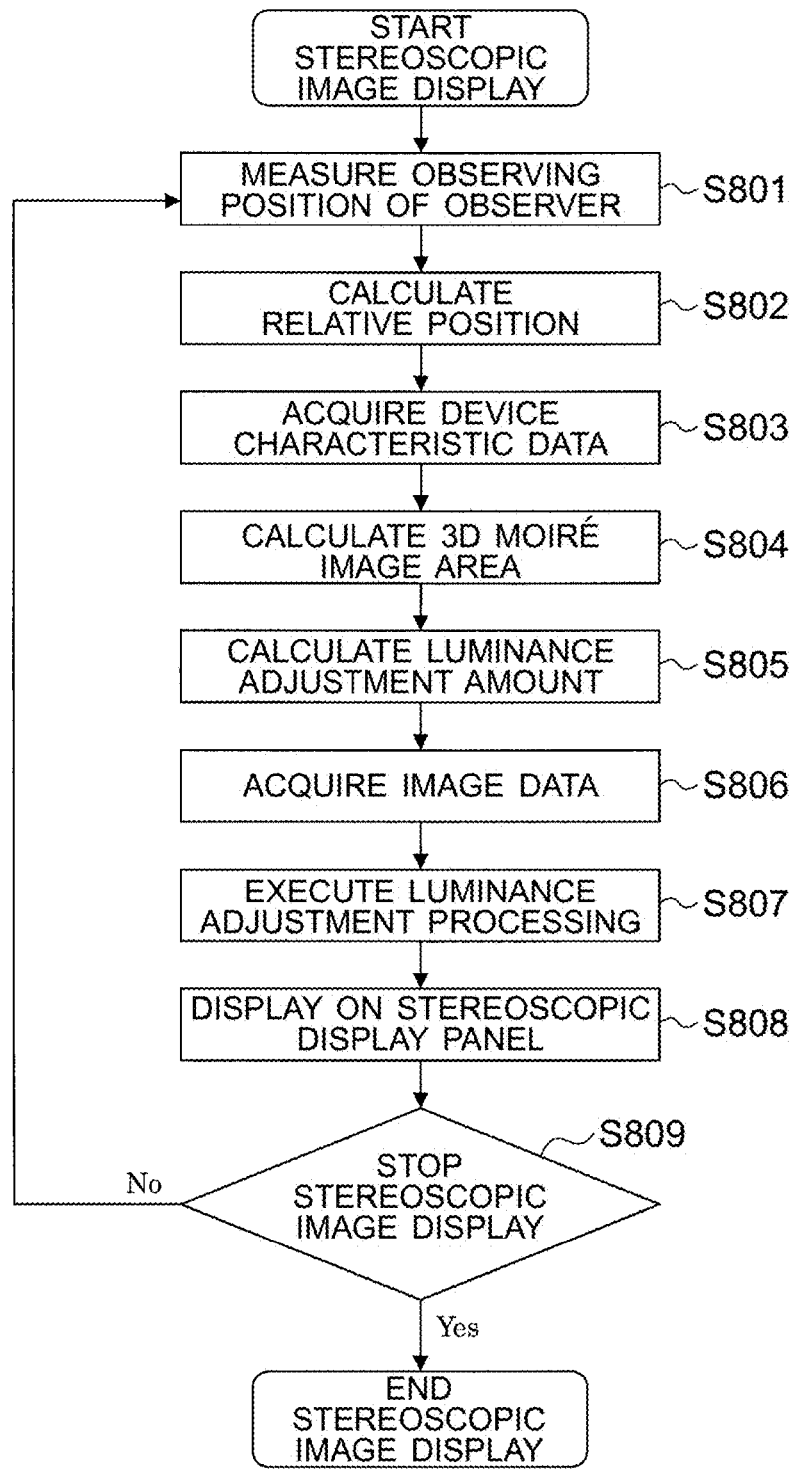
FIG. 79 is a flowchart of a stereoscopic image processing method.

The processing of step S801 and step S802 shown in FIG. 79 is the same processing as that of step S101 and step S102 in the flowchart of the first exemplary embodiment shown in FIG. 17.

In step S803, the luminance characteristic data corresponding to the relative position calculated in step S802 is acquired from the device characteristic data saving unit 103. For the luminance characteristic data corresponding to the viewing angle φ of an arbitrary relative position, the defocus width by the lenticular lens may be calculated from the viewing angle φ and the defocus effect may be added to the reference luminance characteristic data to calculate the luminance characteristic data corresponding to the viewing angle φ.

In step S804, the luminance profile on the plane of the stereoscopic display panel observed by the observer at the relative position (the viewing angle θ, the observing distance D) is calculated from the luminance characteristic data corresponding to the viewing angle φ of a relative position acquired in step S803, and the image area where the luminance fluctuation by the 3D moiré occurs is calculated.

The processing of step S805 to step S809 is the same processing as that of step S105 to step S109 in the flowchart of the first exemplary embodiment shown in FIG. 17.

As described above, it is possible to provide the stereoscopic image display device and the stereoscopic image processing method with which the influence of the luminance fluctuation by the 3D moiré is lightened so that a sense of discomfort is not felt by the observer even when the observer observes the stereoscopic image display device from the top-to-bottom direction.

Ninth Exemplary Embodiment

It is an exemplary object of an ninth exemplary embodiment to provide a stereoscopic image display device and a stereoscopic image processing method with which the influence of the luminance fluctuation by the 3D moiré is lightened further so that a sense of discomfort is not felt by the observer, through performing dithering processing on the image data to make fine adjustment of the luminance values on the plane of the stereoscopic display panel.

Figure 81:
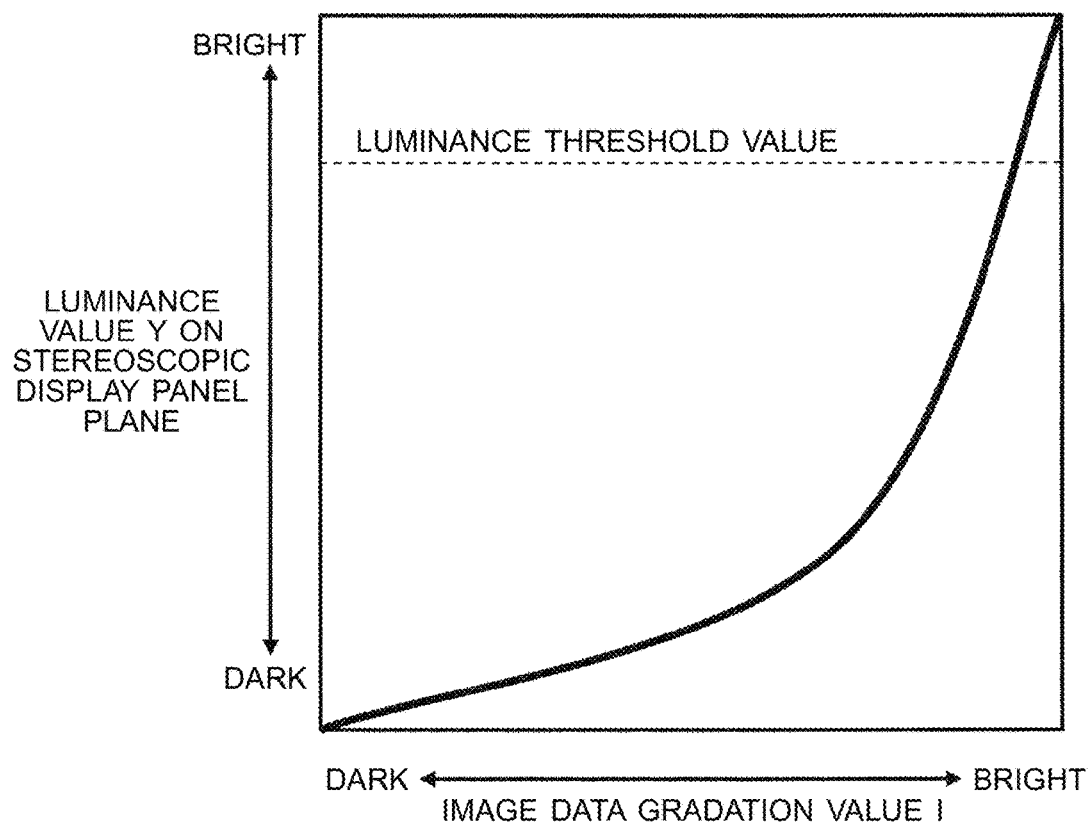
FIG. 81 is a correlation chart regarding the luminance values of a stereoscopic display panel and gradation values of image data.

The relation between the luminance value Y on the plane of the stereoscopic display panel on the stereoscopic image display device and the gradation value I of the image data is not a linear relation by the device characteristic of the stereoscopic but a relation approximated to a curve shown in Formula (8) described in the first exemplary embodiment. FIG. 81 shows a chart regarding the relation between the luminance value Y and the gradation value I.

As can be seen from FIG. 81, the luminance value Y changes largely for the change in the gradation value I in the area where the luminance value Y is large. As an example, provide that the width of the gradation value I of the image data is 256 gradations, when the gradation value I of the image data becomes 200 or higher, the luminance value Y changes largely when the gradation value I is changed only for 1 gradation. Thus, it is difficult to perform the luminance adjustment processing of the luminance value Y by changing the gradation value I.

Therefore, in the ninth exemplary embodiment, the influence of the luminance fluctuation by the 3D moiré is lightened further by performing fine adjustment of the luminance value Y through performing the luminance adjustment processing on the luminance value Y by applying the dithering processing on the image data in addition to changing the gradation value of the image data in the area where the luminance value Y is large.

Figure 82:
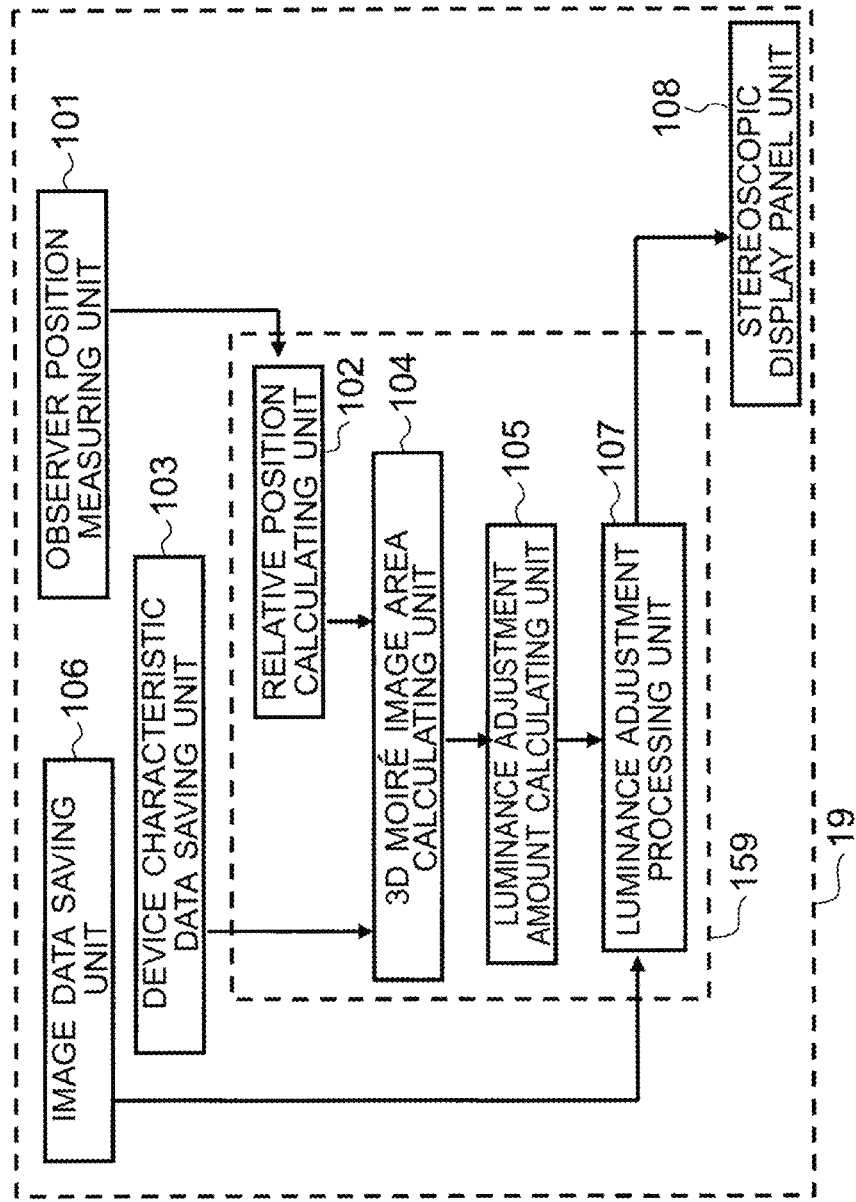
FIG. 82 is block diagram showing a stereoscopic image display device according to a ninth exemplary embodiment.

FIG. 82 is a block diagram of a stereoscopic image display device 19 according to the ninth exemplary embodiment. The stereoscopic image display device 19 includes: an observer position measuring unit 101; a relative position calculating unit 102; a device characteristic data saving unit 103; a 3D moiré image area calculating unit 104; a luminance adjustment amount calculating unit 105; an image data saving unit 106; a luminance adjustment processing unit 107; and a stereoscopic display panel unit 108. Further, a processing unit that is an integration of the relative position calculating unit 102, the 3D moiré image area calculating unit 104, the luminance adjustment amount calculating unit 105, and the luminance adjustment processing unit 107 is referred to as an image processing unit 159.

Hereinafter, functions of each unit included in the stereoscopic image display device 19 will be described. The functions of the observer position measuring unit 101, the relative position calculating unit 102, the device characteristic data saving unit 103, the 3D moiré image area calculating unit 104, the luminance adjustment amount calculating unit 105, the image data saving unit 106, and the stereoscopic display panel unit 108 are the same as those of the first exemplary embodiment.

The luminance adjustment processing unit 107 according to the ninth exemplary embodiment has a function which performs the luminance adjustment processing on the image data saved in the image data saving unit 106 according to the luminance adjustment amount calculated by the luminance adjustment calculating unit 105 as in the case of the first exemplary embodiment. However, the luminance adjustment processing unit 107 according to the ninth exemplary embodiment is different from that of the first exemplary embodiment in respect that it performs the luminance adjustment processing by applying the dithering processing on the image data in addition to changing the gradation value of the image data.

An example of the luminance adjustment processing by dithering is shown below. The dithering processing is applied only in the image area where the luminance fluctuation by the 3D moiré occurs and where the luminance value Y is large. In the image area where the dithering processing is applied, first, the width of the gradation value of the image data is expanded from 256 gradations to 65536 gradations, and the gradation value of the image data corresponding to the luminance value Y is calculated. Then, the dithering processing is performed in order to compress the width of the gradation value of the image data from 65536 gradations to 256 gradations. A typical dithering processing method may be an error diffusion method.

With the error diffusion method, the dithering processing is performed by executing compression processing on the gradation values while diffusing the error generated when compressing the width of the gradation values to the surrounding pixels. FIG. 83A shows the processing order direction of the dithering processing done by the error diffusion method. In general, with the error diffusion method, the position of the pixel as the target of the compression processing is shifted from the left end of the image data to the right end and shifted from the target pixel on the right end to the target pixel on the left end of the stage that is one stage lower to perform the compression processing on the entire image data. As the typical error diffusion patterns used at the time of the error diffusion processing, there are Floyd-Steinberg as shown in FIG. 83B, JajuNi as shown in FIG. 83C, and the like.

Figure 84A:
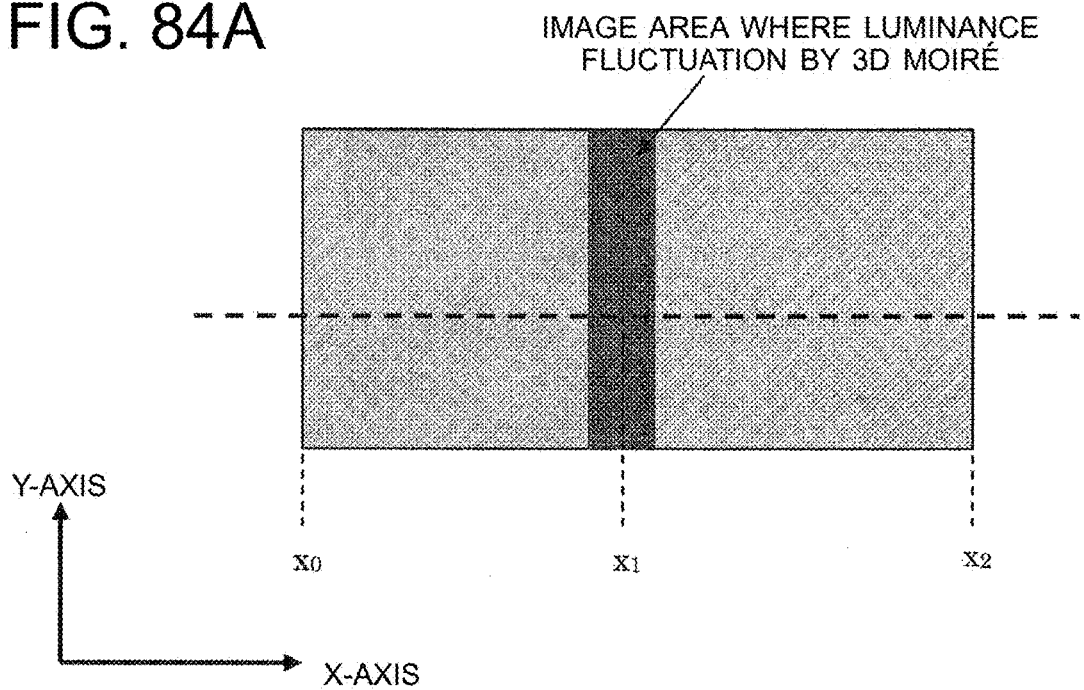
FIG. 84A is an illustration showing an observed image in which a luminance fluctuation by 3D moiré is generated.

For the dithering processing according to the ninth exemplary embodiment, a typical error diffusion method may be employed or an error diffusion method which takes the influence of the luminance fluctuation by the 3D moiré into consideration may be employed as well. FIG. 84A shows the observed image where the luminance fluctuation by the 3D moiré is generated. Normally, the boundary line of the image areas where the luminance fluctuation by the 3D moiré occurs is a straight line that is in parallel to the Y-axis. Further, the luminance fluctuation by the 3D moiré occurs for the X-axis direction but hardly occurs for the Y-axis direction. Error diffusion at the time of the dithering processing is performed in accordance with such characteristic.

Figure 84B:
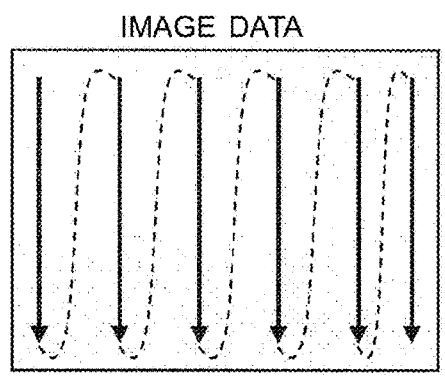
FIG. 84B is an illustration showing processing directions of dithering.

Since the boundary line of the image areas where the luminance fluctuation by the 3D moiré occurs is a line in parallel to the Y-axis, the boundary line of the image area on which the dithering processing is applied is also a straight line in parallel to the Y-axis. Thus, in order to perform the dithering processing efficiently on the image area where the luminance fluctuation by the 3D moiré occurs, the processing order direction of the dithering processing may be changed to shift the pixel as the target of the compression processing from the top end of the image data to the lower end as shown in FIG. 84B. The error diffusion pattern is changed to the diffusion pattern shown in FIG. 85A and FIG. 85B in accordance with the change in the processing order direction of the dithering processing.

Figure 86:
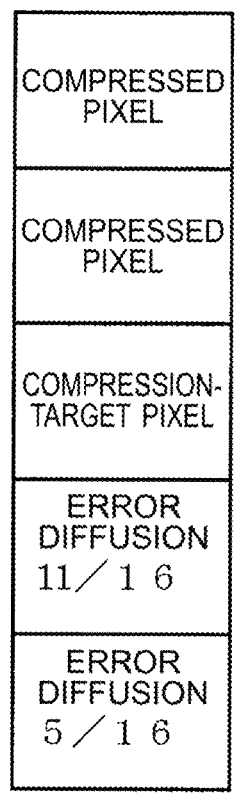
FIG. 86 is a table showing an error diffusion pattern.

Further, with the typical error diffusion method, the error generated at the time of compression is diffused to the surrounding pixels. Thus, the error is diffused to the X-axis direction and Y-axis direction of the image data. However, the luminance fluctuation by the 3D moiré appears in accordance with the change in the X-axis direction, so that the error diffusion direction may be limited to the Y-axis direction. FIG. 86 shows the diffusion pattern in which the error diffusion direction is limited to the Y-axis direction. Even when the diffusion pattern is limited to the Y-axis direction, the luminance fluctuation by the 3D moiré appears in accordance with the change in the X-axis direction. Thus, the Y-axis position of the pixel whose gradation value is carried up by the dithering processing changes according to the X-axis direction. Therefore, the positions of the pixels whose gradation value is carried up are diffused even when the diffusion pattern limited to the Y-axis direction is used, so that the fine dithering processing can be performed.

FIG. 87 shows an example where the dithering processing is performed by using the diffusion pattern limited to the Y-axis direction. As shown in FIG. 87, the value of the error diffused in the Y-axis direction varies depending on the positions in the X-axis direction. Thus, the position of the pixel whose gradation value is carried up changes depending on the positions in the X-axis direction. However, depending on the amount of the luminance fluctuation by the 3D moiré, the pixels whose gradation values are carried up by the dithering processing are not diffused so that the gradation values of the pixels neighboring to each other in the X-axis direction may coincide with each other accidentally. In order to avoid such state, processing for sliding the position of the pixel whose gradation value is carried up in the Y-axis direction may be added in a case where the pixels neighboring to each other in the X-axis direction consecutively have the carried-up gradation values.

Further, instead of calculating the position of the pixel to carry up the gradation value by repeating the error diffusion processing successively in the Y-axis direction by using the diffusion pattern, the position of the pixel to carry up the gradation value may be specified from the value of the error generated when compressing the gradation value of the pixel at the head position in the Y-axis direction.

Through employing the error diffusion method which takes the influence of the luminance fluctuation by the 3D moiré, the calculation processing amount is decreased and the dithering processing is performed at a high speed.

A flowchart of the stereoscopic image processing method used in the stereoscopic image display device 19 according to the ninth exemplary embodiment will be described by referring to FIG. 88.

Figure 88:
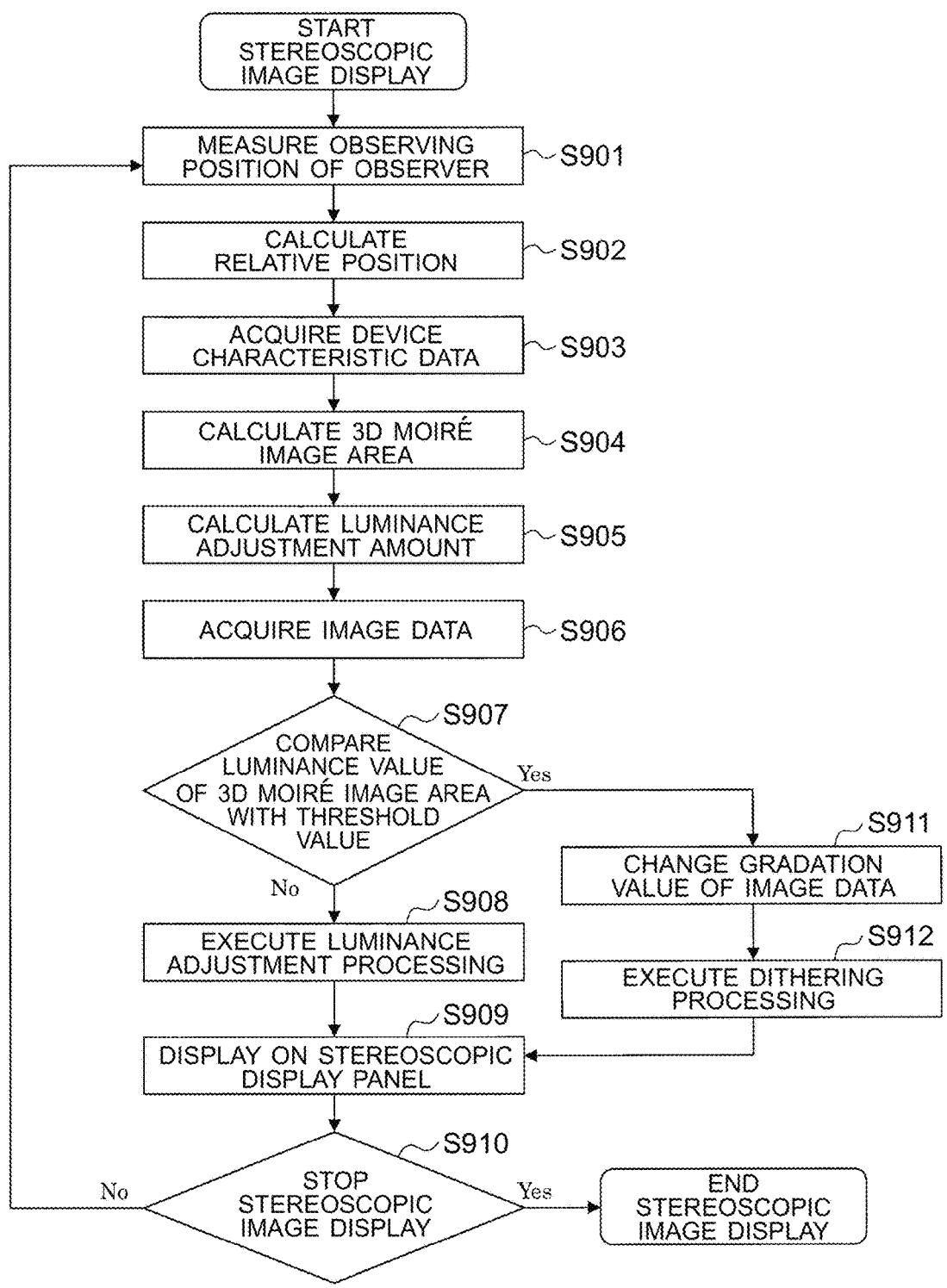
FIG. 88 is a flowchart of a stereoscopic image processing method.

The processing of step S901 to step S906 shown in FIG. 88 is the same processing as that of step S101 to step S106 in the flowchart of the first exemplary embodiment shown in FIG. 17.

In step S907, it is judged whether the luminance value within the 3D moiré image area is equal to an arbitrary threshold value or more by referring to the luminance value within the 3D moiré image area calculated in step S904. When the luminance value is equal to or more than the arbitrary threshold value, the processing of step S911 is executed. When the luminance value is less than the arbitrary threshold value, the processing of step S908 is executed. Note here that the arbitrary threshold value is set as the threshold value of the luminance area where the luminance value changes largely for the change in the gradation value of the image data based on the device characteristic value of the stereoscopic display panel. For example, when the luminance value is expressed in 100 stages, the threshold value is set as 80.

The processing of step S908 to step S910 is the same processing as that of step S107 to step S109 in the flowchart of the first exemplary embodiment shown in FIG. 17.

In step S911, the image data in which the gradation value of the image data acquired in step S906 is expanded is generated. Then, the gradation value corresponding to the luminance adjustment amount is calculated by referring to the luminance adjustment amount calculated in step S905, and the gradation value of the image data in which the width of the gradation value is expanded is changed.

In step S912, the dithering processing is performed on the image data for compressing the image data in which the width of the gradation value is expanded to the image data of a normal gradation value width.

As described above, it is possible to provide the stereoscopic image display device and the stereoscopic image processing method with which the influence of the luminance fluctuation by the 3D moiré is lightened further so that a sense of discomfort is not felt by the observer through performing dithering processing on the image data to make fine adjustment of the luminance values on the plane of the stereoscopic display panel.

Another Exemplary Embodiment

The luminance adjustment amount calculating unit 105 according to all the above-described exemplary embodiments calculates the 3D moiré image area from the luminance characteristic data saved in the device characteristic data saving unit 103 and calculates the luminance adjustment amount from the luminance profile of that image area. However, the luminance adjustment amount calculating unit 105 may calculate the luminance adjustment amount without using the luminance characteristic data so as to be able to achieve the luminance adjustment processing even under a condition where the luminance characteristic data cannot be acquired. In such case, the precision of the luminance adjustment amount is deteriorated compared to that of the luminance adjustment processing using the luminance characteristic data. However, by using the stereoscopic display panel having such a stereoscopic display characteristic that the luminance fluctuation by the 3D moiré is small, it is possible to perform the luminance adjustment processing for lightening the influence of the luminance fluctuation by the 3D moiré in a practically usable level even when the observer shifts the position.

As an example for calculating the luminance adjustment amount without using the luminance characteristic data, there is a case where the observer oneself subjectively sets the luminance adjustment amount. As a first setting, the observer sets a 3D moiré area and a no 3D moiré area according to the observing position (observing distance Z and viewing angle θ) while observing a stereoscopic image projected from the stereoscopic display panel of the stereoscopic image display device. It is desirable to do the setting at a plurality of positions for improving the precision of the luminance adjustment amount. Further, for the setting, it is possible to use input devices such as a keyboard and a touch panel provided to the stereoscopic image display device.

As a second setting, for setting the image area (3D moiré image area) where the luminance fluctuation by the 3D moiré appears on the observed image in the 3D moiré area, the observer shifts the position in the X-axis direction of the plane of the stereoscopic display panel and sets the observing position at which the 3D moiré image area appears in both ends of the observed image projected from the stereoscopic display panel. Then, the position of the observed image where the 3D moiré image area appears is calculated in the intermediate position from the observing positions at both ends.

As a third setting, it is also possible for the observer to calculate the luminance adjustment amount by increasing the gradation value of the image data displayed at the position of the 3D moiré image area and setting the gradation value with which the luminance fluctuation by the 3D moiré is not visibly recognized.

Further, it is also possible to calculate the luminance adjustment amount by increasing the gradation value of the image data displayed at the position of the 3D moiré image area to an arbitrary value by using only the first setting and the second setting described above. In that case, it is effective to perform the image filtering processing after the luminance adjustment processing for making a steep luminance profile remained after the luminance adjustment processing gradual. Further, the first, second or third setting value can be saved in the device characteristic data saving unit 103 or can be stored in the luminance adjustment amount calculating unit 105 while omitting the device characteristic data saving unit 103.

Another example for calculating the luminance adjustment amount is as follows. Even when the device characteristic data of the stereoscopic display panel 108 of the stereoscopic image display device which displays stereoscopic image contents is unknown, the device characteristic data of a plurality of stereoscopic display panels are saved in the device characteristic data saving unit 103 in advance by associating it with the specification data such as the screen sizes and the optimum viewing distances of the stereoscopic display panels. Then, when displaying the stereoscopic image content, the device characteristic data associated with the specification data similar to the specification data of the stereoscopic display panel used for display is acquired from the device characteristic data saving unit 103, and the luminance adjustment amount is calculated.

As described above, it is possible to provide the stereoscopic image display device and the stereoscopic image processing method with which the influence of the luminance fluctuation by the 3D moiré is lightened so that a sense of discomfort is not felt by the observer, through calculating the luminance adjustment amount and performing luminance adjustment processing even when the device characteristic data of the stereoscopic display panel unit of the stereoscopic image display device is unknown.

As the exemplary embodiments of the present invention, the stereoscopic image display device, the image processing device, and the stereoscopic image processing method which lighten the influence of the luminance fluctuation by the 3D moiré generated when displaying a stereoscopic image are described. However, the present invention can be applied not only to the case of displaying a stereoscopic image but also to the case of displaying a flat image. The present invention can also be used as the so-called N-image (N is a natural number of 2 or more) switching mode which displays a flat image by projecting a same image to the left eye and the right eye of the observer and switches the contents of the flat image depending on the observing position by increasing the angle of the light rays distributed from the stereoscopic display panel unit. Further, the 3D moiré is caused when the no-display area between the pixels of each of the viewpoints is recognized by the optical module, so that the luminance fluctuation by the 3D moiré also appears when a flat image is displayed by using a stereoscopic display panel. Through performing the luminance adjustment processing even in the case of the 3D moiré generated when displaying a flat image in the same manner as the case of the 3D moiré generated when displaying a stereoscopic image, the influence of the luminance fluctuation by the 3D moiré in such case can be lightened.

While the present invention has been described above by referring to each of the exemplary embodiments, the present invention is not limited only to each of the exemplary embodiments described above. Various changes and modifications that occur to those skilled in the art can be added to the structures and details of the present invention. Further, proper combinations of a part or a whole part of the structures of each of the exemplary embodiments are also included in the present invention.

While a part of or a whole part of the exemplary embodiments can be summarized as follows, the present invention is not limited only to the followings.

(Supplementary Note 1)

A stereoscopic image display device, which includes
a stereoscopic display panel unit which includes: a display panel in which a plurality of pixels, each having at least a sub-pixel for displaying a first-viewpoint image and a sub-pixel for displaying a second-viewpoint image, are arranged in matrix; and an optical module which distributes light emitted from each of the sub-pixels to different directions from each other, wherein, assuming that the direction of distributing the light ray as a first direction, luminance is deteriorated by 3D moiré generated between aperture parts of the pixels and the optical module when a viewpoint position of an observer is shifted to the first direction, and the stereoscopic image display device further includes:
an image data saving unit which saves or receives image data corresponding to at least two viewpoints;
an observer position measuring unit which measures an observing position of the observer;
a relative position calculating unit which calculates a relative position of the stereoscopic display panel unit with respect to the measured observing position;
a luminance adjustment amount calculating unit which calculates a luminance adjustment amount suited for stereoscopic image display with respect to the relative position; and
a luminance adjustment processing unit which performs luminance adjustment processing on image data corresponding to each of the viewpoints according to the luminance adjustment amount.

(Supplementary Note 2)

The stereoscopic image display device as depicted in Supplementary Note 1, which further includes:
a device characteristic data saving unit which saves device characteristic data containing a display characteristic of the stereoscopic display panel unit with respect to viewing angles; and
a 3D moiré image area calculating unit which calculates a luminance fluctuation area by the 3D moiré at the relative position based on the device characteristic data, wherein
the luminance adjustment amount calculating unit calculates the luminance adjustment amount based on the device characteristic data.

(Supplementary Note 3)

The stereoscopic image display device as depicted in Supplementary Note 2, wherein
the relative position is a distance and an viewing angle between a display plane of the stereoscopic display panel unit and the observing position of the observer.

(Supplementary Note 4)

The stereoscopic image display device as depicted in Supplementary Note 2 or 3, wherein:
provided that the image distributing direction is the first direction, and a direction orthogonal to the first direction on the display plane of the stereoscopic display panel is a second direction,
the device characteristic data contains luminance characteristic data of the stereoscopic display panel unit; and
the 3D moiré image area calculating unit calculates the luminance fluctuation area in the first direction at each of the viewpoints based on the relative position and the luminance characteristic data.

(Supplementary Note 5)

The stereoscopic image display device as depicted in Supplementary Note 4, wherein:
the device characteristic data further contains position precision data between the display panel and the optical module constituting the stereoscopic display panel unit; and
provided that the direction orthogonal to the first direction on the display plane of the stereoscopic display panel unit is the second direction, the 3D moiré image area calculating unit calculates the luminance fluctuation area in the first direction and the second direction at each of the viewpoints based on the relative position, the luminance characteristic data, and the position precision data.

(Supplementary Note 6)

The stereoscopic image display device as depicted in any one of Supplementary Notes 1 to 5, wherein
the luminance adjustment processing unit performs the luminance adjustment processing after performing gamma correction processing.

(Supplementary Note 7)

The stereoscopic image display device as depicted in any one of Supplementary Notes 1 to 6, wherein
when the luminance fluctuation area for the first direction at each of the viewpoints varies for each of the viewpoints, the luminance adjustment amount calculating unit calculates the luminance adjustment amount for each of the luminance fluctuation areas.

(Supplementary Note 8)

The stereoscopic image display device as depicted in any one of Supplementary Notes 1 to 6, wherein
when the luminance fluctuation area for the first direction at each of the viewpoints varies for each of the viewpoints, the luminance adjustment amount calculating unit calculates the luminance adjustment amount by averaging the luminance fluctuation areas.

(Supplementary Note 9)

The stereoscopic image display device as depicted in any one of Supplementary Notes 1 to 8, wherein
when a gradation value of the image data exceeds a luminance maximum value with which gradations can be expressed when the luminance adjustment processing is performed according to the luminance adjustment amount, the luminance adjustment processing unit performs the luminance adjustment processing by changing a gradation expression scale of the image data.

(Supplementary Note 10)

The stereoscopic image display device as depicted in any one of Supplementary Notes 2 to 9, which further includes a temperature measuring unit which measures an environmental temperature, wherein
the luminance adjustment amount calculating unit calculates the luminance adjustment amount based on the luminance fluctuation area and the device characteristic data corresponding to the environmental temperature.

(Supplementary Note 11)

The stereoscopic image display device as depicted in any one of Supplementary Notes 1 to 10, wherein
the luminance adjustment amount calculating unit shifts the luminance fluctuation area to the first direction as the image distributing direction according to a shift speed of the relative position, and calculates the luminance adjustment amount based on the shifted luminance fluctuation area.

(Supplementary Note 12)

The stereoscopic image display device as depicted in any one of Supplementary Notes 1 to 11, which further includes:
an image filter value calculating unit which calculates an image filter value according to the shift speed of the relative position; and
an image filtering processing unit which performs image filtering processing on the image data on which the luminance adjustment processing is performed according to the image filter value, wherein
the image data on which the luminance adjustment processing and the filtering processing is performed is outputted to the stereoscopic display panel unit.

(Supplementary Note 13)

The stereoscopic image display device as depicted in any one of Supplementary Notes 1 to 12, which further includes:
a parallax adjustment amount calculating unit which calculates a parallax adjustment amount suited for stereoscopic image display based on the relative position; and
a parallax adjustment processing unit which performs parallax adjustment processing on the image data according to the parallax adjustment amount, wherein
the image data on which the luminance adjustment processing and the parallax adjustment processing are performed is outputted to the stereoscopic display panel unit.

(Supplementary Note 14)

The stereoscopic image display device as depicted in any one of Supplementary Notes 2 to 12, which further includes:
a parallax adjustment amount calculating unit which calculates a parallax adjustment amount suited for stereoscopic image display based on the device characteristic data and the relative position; and
a parallax adjustment processing unit which performs parallax adjustment processing on the image data according to the parallax adjustment amount, wherein:
the device characteristic data further contains 3D crosstalk data;
the parallax adjustment amount calculating unit calculates the parallax adjustment amount based on the 3D crosstalk data and the relative position; and
the image data on which the luminance adjustment processing and the parallax adjustment processing are performed is outputted to the stereoscopic display panel unit.

(Supplementary Note 15)

The stereoscopic image display device as depicted in any one of Supplementary Notes 1 to 13, which further includes:
an image filter value calculating unit which calculates an image filter value suited for stereoscopic image display according to the relative position; and
an image filtering processing unit which performs image filtering processing on the image data on which the luminance adjustment processing is performed according to the image filter value, wherein
the image data on which the luminance adjustment processing and the filtering processing are performed is outputted to the stereoscopic display panel unit.

(Supplementary Note 16)

The stereoscopic image display device as depicted in any one of Supplementary Notes 2 to 12 or Supplementary Note 14, which further includes:
an image filter value calculating unit which calculates an image filter value suited for stereoscopic image display based on the device characteristic data and the relative position; and
an image filtering processing unit which performs image filtering processing on the image data on which the luminance adjustment processing is performed according to the image filter value, wherein:
the device characteristic data further contains 3D crosstalk data;
the image filter value calculating unit calculates the image filter value based on the 3D crosstalk data and the relative position; and
the image filtering processing unit outputs the image data on which the luminance adjustment processing and the filtering processing are performed to the stereoscopic display panel unit.

(Supplementary Note 17)

The stereoscopic image display device as depicted in any one of Supplementary Notes 1 to 16, wherein:
the 3D moiré image area calculating unit makes classification into a 3D moiré image area as the luminance fluctuation area in which an observed image where a luminance fluctuation by 3D moiré appears is projected according to the relative position and a no 3D moiré image area in which an observed image where the luminance fluctuation by the 3D moiré does not appear is projected according to the relative position; and
the luminance adjustment amount calculating unit increases the gradation value of the image data that is the 3D moiré image area than the gradation value of the image data that is the no 3D moiré image area when calculating the luminance adjustment amount.

(Supplementary Note 18)

The stereoscopic image display device as depicted in Supplementary Note 4 or 5, wherein
the 3D moiré image area calculating unit calculates: the luminance fluctuation by the 3D moiré in the second direction based on an extent of defocus determined between a focal distance of the optical module constituting the stereoscopic display panel unit and an optical path distance from the display panel to the optical module according to the observing position; and the luminance fluctuation area by the 3D moiré for the relative position.

(Supplementary Note 19)

The stereoscopic image display device as depicted in Supplementary Note 18, wherein
the 3D moiré image area calculating unit changes the focal distance of the optical module according to an apparent curvature radius of a lenticular lens, which changes depending on the observing position, and calculates the luminance fluctuation by the 3D moiré in the second direction.

(Supplementary Note 20)

The stereoscopic image display device as depicted in Supplementary Note 18 or 19, wherein:
the 3D moiré image area calculating unit calculates the luminance fluctuation area by the 3D moiré that is in a trapezoid shape;
the luminance adjustment amount calculating unit calculates the luminance adjustment amount from the luminance fluctuation area by the 3D moiré that is in the trapezoid shape; and
the luminance adjustment processing unit performs the luminance adjustment processing on the luminance fluctuation area by the 3D moiré that is in the trapezoid shape according to the luminance adjustment amount.

(Supplementary Note 21)

The stereoscopic image display device as depicted in any one of Supplementary Notes 18 to 20, which includes an image filter value calculating unit and an image filtering processing unit, wherein:
the image filter value calculating unit calculates the image filter value based on the extent of the defocus determined between the focal distance of the optical module and the optical path distance from the display panel to the optical module according to the observing position; and
the image filtering processing unit performs the image filtering processing on the luminance fluctuation area by the 3D moiré according to the image filter value.

(Supplementary Note 22)

The stereoscopic image display device as depicted in any one of Supplementary Notes 2 to 21, wherein
the luminance adjustment processing unit performs the luminance adjustment processing by changing the gradation value of the image data and performing dithering on the image data corresponding to each of the viewpoints according to the luminance adjustment amount.

(Supplementary Note 23)

The stereoscopic image display device as depicted in Supplementary Note 22, wherein
when performing the dithering, error diffusion processing for dithering is performed in accordance with the luminance fluctuation area by the 3D moiré calculated by the 3D moiré image area calculating unit.

(Supplementary Note 24)

The stereoscopic image display device as depicted in Supplementary Note 23, wherein
the error diffusion processing is performed only in the second direction.

(Supplementary Note 25)

The stereoscopic image display device as depicted in Supplementary Note 23 or 24, wherein
when positions of pixels whose gradation values are carried up by the error diffusion processing appear consecutively in a manner neighboring to each other in the X-axis direction at the time of performing the dithering, the positions of the pixels whose gradation values are carried up are changed on the Y-axis.

(Supplementary Note 26)

An image processing device which includes:
a relative position calculating unit which calculates a relative position of the stereoscopic display panel with respect to the measured observing position;
a 3D moiré image area calculating unit which calculates a luminance fluctuation area by 3D moiré at the relative position based on device characteristic data;
a luminance adjustment amount calculating unit which calculates a luminance adjustment amount suited for stereoscopic image display based on the luminance fluctuation area; and
a luminance adjustment processing unit which performs luminance adjustment processing on image data corresponding to each of the viewpoints according to the luminance adjustment amount.

(Supplementary Note 27)

The image processing device as depicted in Supplementary Note 26, which further includes:
an observer position measuring unit which measures the observing position of the observer;
an image data receiving unit which receives the image data before the luminance adjustment processing is performed; and
an image data transmitting unit which outputs the image data after the luminance adjustment processing is performed.

(Supplementary Note 28)

A stereoscopic image processing method applied to a stereoscopic display panel which includes: a display panel in which a plurality of pixels, each having at least a sub-pixel for displaying a first-viewpoint image and a sub-pixel for displaying a second-viewpoint image, are arranged in matrix; and an optical module which distributes light emitted from each of the sub-pixels to different directions from each other, wherein, assuming that the direction of distributing the light ray as a first direction, luminance is deteriorated by 3D moiré generated between aperture parts of the pixels and the optical module when a viewpoint position of an observer is shifted to the first direction, and the method includes:
measuring an observing position of the observer;
calculating a relative position of the observing position and the stereoscopic display panel;
calculating a luminance adjustment amount suited for stereoscopic image display with respect to the relative position;
performing luminance adjustment processing on image data according to the luminance adjustment amount; and
outputting image data on which the luminance adjustment processing is performed to the stereoscopic display panel.

(Supplementary Note 29)

A stereoscopic image processing method applied to a stereoscopic display panel which includes: a display panel in which a plurality of pixels, each having at least a sub-pixel for displaying a first-viewpoint image and a sub-pixel for displaying a second-viewpoint image, are arranged in matrix; and an optical module which distributes light emitted from each of the sub-pixels to different directions from each other, wherein, assuming that the direction of distributing the light ray as a first direction, luminance is deteriorated by 3D moiré generated between aperture parts of the pixels and the optical module when a viewpoint position of an observer is shifted to the first direction, and the method includes:
saving device characteristic data containing a display characteristic of the stereoscopic display panel with respect to viewing angles;
saving or receiving image data corresponding to at least two viewpoints;

measuring an observing position of the observer;
calculating a relative position of the observing position and the stereoscopic display panel;
calculating a luminance fluctuation area by the 3D moiré at the relative position based on the device characteristic data;
calculating a luminance adjustment amount suited for stereoscopic image display based on the luminance fluctuation area; and
performing luminance adjustment processing on image data corresponding to each of the viewpoints according to the luminance adjustment amount.

INDUSTRIAL APPLICABILITY

The present invention can be applied to a stereoscopic image processing system and a stereoscopic image display system having a function which displays stereoscopic image content on the stereoscopic image display device. Note that the present invention is not limited only to the above-described exemplary embodiments and that it is possible to apply changes and modifications as necessary within the scope of the present invention.

What is claimed is:

1. A stereoscopic image display device, comprising:
a stereoscopic display panel unit which includes:
a display panel in which a plurality of pixels, each having at least a sub-pixel for displaying a first-viewpoint image and a sub-pixel for displaying a second-viewpoint image, are arranged in a matrix; and
an optical module which distributes light emitted from each of the sub-pixels to different directions from each other,
wherein, assuming that a direction of distributing a light ray as a first direction, luminance fluctuation is caused by 3D moire generated between aperture parts of the pixels and the optical module when a viewpoint position of an observer is shifted to the first direction, the stereoscopic image display device further comprising:
a device characteristic data saving unit which saves device characteristic data containing a display characteristic of the stereoscopic display panel unit with respect to viewing angles;
an image data saving unit which saves or receives image data corresponding to at least two viewpoints;
an observer position measuring unit which measures an observing position of the observer;
a relative position calculating unit which calculates a relative position of the stereoscopic display panel unit with respect to the measured observing position;
a 3D moire image area calculating unit which calculates a luminance fluctuation area caused by the 3D moire at the relative position based on the device characteristic data;
a luminance adjustment amount calculating unit which calculates a luminance adjustment amount which reduces an influence of luminance fluctuation caused by the 3D moire generated between the aperture parts of the pixels and the optical module, when the viewpoint position of the observer is shifted to the first direction, based on the luminance fluctuation area; and
a luminance adjustment processing unit which performs luminance adjustment processing on image data corresponding to each of the viewpoints according to the luminance adjustment amount,
wherein the relative position is a distance and a viewing angle between a display plane of the stereoscopic display panel unit and the observing position of the observer,
wherein the device characteristic data contains luminance characteristic data of the stereoscopic display panel unit indicating a relation between the viewing angle and a luminance value for each distance,
wherein the 3D moire image area calculating unit calculates the luminance fluctuation area in the first direction at each of the viewpoints based on the relative position and the luminance characteristic data, and
wherein the luminance adjustment processing unit performs the luminance adjustment processing after performing gamma correction processing.

2. The stereoscopic image display device as claimed in claim 1, wherein:
the device characteristic data further contains position precision data between the display panel and the optical module constituting the stereoscopic display panel unit; and
provided that a direction orthogonal to the first direction on the display plane of the stereoscopic display panel unit is the second direction, the 3D moiré image area calculating unit calculates the luminance fluctuation area in the first direction and the second direction at each of the viewpoints based on the relative position, the luminance characteristic data, and the position precision data.

3. The stereoscopic image display device as claimed in claim 1, wherein:
the 3D moiré image area calculating unit classifies a 3D moiré image area as the luminance fluctuation area in which an observed image where the luminance fluctuation caused by 3D moiré appears is projected according to the relative position, and a no 3D moiré image area in which an observed image where the luminance fluctuation caused by the 3D moiré does not appear is projected according to the relative position; and
the luminance adjustment amount calculating unit increases a gradation value of the image data that is the 3D moiré image area and sets the gradation value of the image data to that when the 3D moiré is not visibly recognized when calculating the luminance adjustment amount.

4. The stereoscopic image display device as claimed in claim 1, wherein the optical module is a lenticular lens.

5. A stereoscopic image processing method applied to a stereoscopic display panel which includes:
a display panel in which a plurality of pixels, each having at least a sub-pixel for displaying a first-viewpoint image and a sub-pixel for displaying a second-viewpoint image, are arranged in a matrix; and
an optical module which distributes light emitted from each of the sub-pixels to different directions from each other,
wherein, assuming that a direction of distributing a light ray as a first direction, luminance fluctuation is caused by 3D moire generated between aperture parts of the pixels and the optical module when a viewpoint position of an observer is shifted to the first direction, the method comprising:

saving device characteristic data containing a display characteristic of the stereoscopic display panel with respect to viewing angles;

saving or receiving image data corresponding to at least two viewpoints;

measuring an observing position of the observer;

calculating a relative position of the observing position and the stereoscopic display panel;

calculating a luminance fluctuation area caused by the 3D moire generated between the aperture parts of the pixels and the optical module, when the viewpoint position of the observer is shifted to the first direction, at the relative position, based on the device characteristic data;

calculating a luminance adjustment amount which reduces an influence of the luminance fluctuation caused by the 3D moire based on the luminance fluctuation area; and performing luminance adjustment processing on image data corresponding to each of the viewpoints according to the luminance adjustment amount, wherein the relative position is a distance and a viewing angle between a display plane of the stereoscopic display panel unit and the observing position of the observer, wherein the device characteristic data contains luminance characteristic data of the stereoscopic display panel unit indicating a relation between the viewing angle and a luminance value for each distance, wherein the luminance fluctuation area in the first direction at each of the viewpoints is calculated based on the relative position and the luminance characteristic data when calculating the luminance fluctuation area, and wherein the luminance adjustment processing unit performs the luminance adjustment processing after performing gamma correction processing.

6. The stereoscopic image display device as claimed in claim 5, wherein the optical module is a lenticular lens.

* * * * *